(12) United States Patent
Ramer et al.

(10) Patent No.: US 8,311,888 B2
(45) Date of Patent: Nov. 13, 2012

(54) REVENUE MODELS ASSOCIATED WITH SYNDICATION OF A BEHAVIORAL PROFILE USING A MONETIZATION PLATFORM

(75) Inventors: Jorey Ramer, Cambridge, MA (US); Adam Soroca, Cambridge, MA (US); Dennis Doughty, Brookline, MA (US)

(73) Assignee: Jumptap, Inc., Cambridge, MA (US)

( * ) Notice: Subject to any disclaimer, the term of this patent is extended or adjusted under 35 U.S.C. 154(b) by 568 days.

(21) Appl. No.: 12/400,185

(22) Filed: Mar. 9, 2009

(65) Prior Publication Data

US 2009/0240586 A1 Sep. 24, 2009

Related U.S. Application Data

(63) Continuation-in-part of application No. 11/267,940, filed on Nov. 5, 2005, and a continuation-in-part of application No. 11/268,671, filed on Nov. 5, 2005, now Pat. No. 8,103,545, and a continuation-in-part of application No. 11/271,164, filed on Nov. 11, 2005, and a continuation-in-part of application No. 11/274,933, filed on Nov. 14, 2005, and a continuation-in-part of application No. 11/274,905, filed on Nov. 14, 2005, and a continuation-in-part of application No. 11/274,884, filed on Nov. 14, 2005, and a continuation-in-part of application No. 11/282,120, filed on Nov. 16, 2005, now Pat. No. 7,660,581, and a continuation-in-part of application No. 11/281,902, filed on Nov. 16, 2005, and a continuation-in-part of application No. 11/335,900, filed on Jan. 18, 2006, now Pat. No. 7,769,764, and a continuation-in-part of application No. 11/335,904, filed on Jan. 19, 2006, now Pat. No. 7,752,209, and a continuation-in-part of application No. 11/337,233, filed on Jan. 19, 2006, now Pat. No. 7,603,360, and a continuation-in-part of application No. 11/337,234, filed on Jan. 19, 2006, and a continuation-in-part of application No. 11/336,432, filed on Jan. 19, 2006, now Pat. No. 7,860,871, and a continuation-in-part of application No. 11/337,180, filed on Jan. 19, 2006, (Continued)

(51) Int. Cl.
*G06Q 30/00* (2012.01)
(52) U.S. Cl. .................................. 705/14.64
(58) Field of Classification Search ............... 705/14, 705/14.64
See application file for complete search history.

(56) References Cited

U.S. PATENT DOCUMENTS 5,568,030 A 10/1996 Nishikawa et al.
(Continued)

FOREIGN PATENT DOCUMENTS

| | | |
|---|---|---|
| JP | 03076896 | 3/2003 |
| JP | 2003/323142 | 11/2003 |
| JP | 2005/71163 | 3/2005 |

(Continued)

OTHER PUBLICATIONS

Oracle Communications ("Mobile Advertising: Buy In or Lose Out"). Sep. 2008.*

(Continued)

*Primary Examiner* — Eric T Wong
(74) *Attorney, Agent, or Firm* — Jumptap, Inc.

(57) ABSTRACT

The present application discloses improved capabilities for aggregating user behavioral data across multiple wireless operators and delivering content to a mobile communication facility based on that aggregation, among other factors.

2 Claims, 39 Drawing Sheets

Related U.S. Application Data

(63) now Pat. No. 7,577,665, and a continuation-in-part of application No. 11/337,112, filed on Jan. 19, 2006, and a continuation-in-part of application No. 11/347,826, filed on Feb. 3, 2006, and a continuation-in-part of application No. 11/347,825, filed on Feb. 3, 2006, now abandoned, and a continuation-in-part of application No. 11/347,842, filed on Feb. 3, 2006, now abandoned, and a continuation-in-part of application No. 11/355,915, filed on Feb. 16, 2006, now Pat. No. 7,702,318, and a continuation-in-part of application No. 11/387,147, filed on Mar. 21, 2006, now Pat. No. 7,912,458, and a continuation-in-part of application No. 11/413,273, filed on Apr. 27, 2006, now abandoned, and a continuation-in-part of application No. 11/414,168, filed on Apr. 27, 2006, now Pat. No. 7,676,394, and a continuation-in-part of application No. 11/414,740, filed on Apr. 27, 2006, now abandoned, and a continuation-in-part of application No. 11/382,226, filed on May 8, 2006, now abandoned, and a continuation-in-part of application No. 11/382,237, filed on May 8, 2006, now abandoned, and a continuation-in-part of application No. 11/382,243, filed on May 8, 2006, now Pat. No. 8,229,914, and a continuation-in-part of application No. 11/382,246, filed on May 8, 2006, now abandoned, and a continuation-in-part of application No. 11/382,249, filed on May 8, 2006, now abandoned, and a continuation-in-part of application No. 11/382,257, filed on May 8, 2006, now abandoned, and a continuation-in-part of application No. 11/382,260, filed on May 8, 2006, and a continuation-in-part of application No. 11/382,262, filed on May 8, 2006, and a continuation-in-part of application No. 11/382,618, filed on May 10, 2006, and a continuation-in-part of application No. 11/382,637, filed on May 10, 2006, now abandoned, and a continuation-in-part of application No. 11/382,648, filed on May 10, 2006, now abandoned, and a continuation-in-part of application No. 11/382,676, filed on May 10, 2006, now abandoned, and a continuation-in-part of application No. 11/382,684, filed on May 10, 2006, now abandoned, and a continuation-in-part of application No. 11/382,690, filed on May 10, 2006, now abandoned, and a continuation-in-part of application No. 11/382,696, filed on May 10, 2006, now abandoned, and a continuation-in-part of application No. 11/383,236, filed on May 15, 2006, now abandoned, and a continuation-in-part of application No. 11/383,511, filed on May 16, 2006, now abandoned, and a continuation-in-part of application No. 11/422,797, filed on Jun. 7, 2006, now abandoned, and a continuation-in-part of application No. 11/553,567, filed on Oct. 27, 2006, now Pat. No. 7,548,915, and a continuation-in-part of application No. 11/553,587, filed on Oct. 27, 2006, now abandoned, and a continuation-in-part of application No. 11/553,598, filed on Oct. 27, 2006, now abandoned, and a continuation-in-part of application No. 11/553,626, filed on Oct. 27, 2006, now abandoned, and a continuation-in-part of application No. 11/553,569, filed on Oct. 27, 2006, now abandoned, and a continuation-in-part of application No. 11/553,659, filed on Oct. 27, 2006, now abandoned, and a continuation-in-part of application No. 11/553,713, filed on Oct. 27, 2006, and a continuation-in-part of application No. 11/553,746, filed on Oct. 27, 2006, now abandoned, and a continuation-in-part of application No. 11/928,819, filed on Oct. 30, 2007, now abandoned, and a continuation-in-part of application No. 11/928,847, filed on Oct. 30, 2007, now abandoned, and a continuation-in-part of application No. 11/928,877, filed on Oct. 30, 2007, and a continuation-in-part of application No. 11/928,909, filed on Oct. 30, 2007, now abandoned, and a continuation-in-part of application No. 11/928,937, filed on Oct. 30, 2007, now Pat. No. 8,027,879, and a continuation-in-part of application No. 11/928,960, filed on Oct. 30, 2007, and a continuation-in-part of application No. 11/928,990, filed on Oct. 30, 2007, and a continuation-in-part of application No. 11/929,016, filed on Oct. 30, 2007, and a continuation-in-part of application No. 11/929,039, filed on Oct. 30, 2007, and a continuation-in-part of application No. 11/929,059, filed on Oct. 30, 2007, now abandoned, and a continuation-in-part of application No. 11/929,081, filed on Oct. 30, 2007, and a continuation-in-part of application No. 11/929,096, filed on Oct. 30, 2007, and a continuation-in-part of application No. 11/929,105, filed on Oct. 30, 2007, now abandoned, and a continuation-in-part of application No. 11/929,129, filed on Oct. 30, 2007, now abandoned, and a continuation-in-part of application No. 11/929,148, filed on Oct. 30, 2007, now abandoned, and a continuation-in-part of application No. 11/929,171, filed on Oct. 30, 2007, and a continuation-in-part of application No. 11/929,253, filed on Oct. 30, 2007, now abandoned, and a continuation-in-part of application No. 11/929,272, filed on Oct. 30, 2007, now abandoned, and a continuation-in-part of application No. 11/929,297, filed on Oct. 30, 2007, now abandoned, and a continuation-in-part of application No. 11/929,308, filed on Oct. 30, 2007, now Pat. No. 8,195,133, and a continuation-in-part of application No. 11/929,328, filed on Oct. 30, 2007, now Pat. No. 8,131,271.

(60) Provisional application No. 61/037,617, filed on Mar. 18, 2008, provisional application No. 61/052,024, filed on May 9, 2008, provisional application No. 60/785,242, filed on Mar. 22, 2006, provisional application No. 60/720,193, filed on Sep. 23, 2005, provisional application No. 60/731,991, filed on Nov. 1, 2005, provisional application No. 60/717,151, filed on Sep. 14, 2005, provisional application No. 60/968,188, filed on Aug. 27, 2007, provisional application No. 60/946,132, filed on Jun. 25, 2007.

U.S. PATENT DOCUMENTS

| | | |
|---|---|---|
| 5,627,886 A | 5/1997 | Bowman |
| 5,671,436 A | 9/1997 | Morris et al. |
| 5,778,316 A | 7/1998 | Persson et al. |
| 5,825,883 A | 10/1998 | Archibald |
| 5,918,014 A | 6/1999 | Robinson |
| 5,943,611 A | 8/1999 | Molne |
| 5,948,061 A | 9/1999 | Merriman et al. |
| 5,963,940 A | 10/1999 | Liddy et al. |
| 5,973,683 A | 10/1999 | Cragun et al. |
| 5,974,398 A | 10/1999 | Hanson et al. |
| 5,996,011 A | 11/1999 | Humes |
| 6,006,225 A | 12/1999 | Bowman et al. |
| 6,009,410 A | 12/1999 | LeMole et al. |

| | | | |
|---|---|---|---|
| 6,012,002 A | 1/2000 | Tapping et al. |
| 6,021,397 A | 2/2000 | Jones et al. |
| 6,029,139 A | 2/2000 | Cunningham et al. |
| 6,045,048 A | 4/2000 | Wilz, Sr. et al. |
| 6,061,658 A | 5/2000 | Chou et al. |
| 6,078,314 A | 6/2000 | Ahn |
| 6,092,100 A | 7/2000 | Berstis et al. |
| 6,097,939 A | 8/2000 | Jacobs et al. |
| 6,101,379 A | 8/2000 | Rahman et al. |
| 6,108,533 A | 8/2000 | Brohoff |
| 6,135,349 A | 10/2000 | Zirkel |
| 6,141,341 A | 10/2000 | Jones et al. |
| 6,178,407 B1 | 1/2001 | Lotvin et al. |
| 6,182,050 B1 | 1/2001 | Ballard |
| 6,199,099 B1 | 3/2001 | Gershman et al. |
| 6,216,129 B1 | 4/2001 | Eldering |
| 6,226,510 B1 | 5/2001 | Boling et al. |
| 6,236,978 B1 | 5/2001 | Tuzhilin |
| 6,236,979 B1 | 5/2001 | Kawabata |
| 6,246,997 B1 | 6/2001 | Cybul et al. |
| 6,247,047 B1 | 6/2001 | Wolff |
| 6,253,188 B1 | 6/2001 | Witek et al. |
| 6,256,739 B1 | 7/2001 | Skopp et al. |
| 6,269,361 B1 | 7/2001 | Davis et al. |
| 6,285,987 B1 | 9/2001 | Roth et al. |
| 6,311,180 B1 | 10/2001 | Fogarty |
| 6,324,519 B1 | 11/2001 | Eldering |
| 6,327,470 B1 | 12/2001 | Ostling |
| 6,335,927 B1 | 1/2002 | Elliott et al. |
| 6,336,117 B1 | 1/2002 | Massarani |
| 6,339,761 B1 | 1/2002 | Cottingham |
| 6,356,905 B1 | 3/2002 | Gershman et al. |
| 6,360,221 B1 | 3/2002 | Gough et al. |
| 6,374,177 B1 | 4/2002 | Lee et al. |
| 6,414,635 B1 | 7/2002 | Stewart et al. |
| 6,446,076 B1 | 9/2002 | Burkey et al. |
| 6,480,837 B1 | 11/2002 | Dutta |
| 6,487,538 B1 | 11/2002 | Gupta et al. |
| 6,490,443 B1 | 12/2002 | Freeny |
| 6,490,450 B1 | 12/2002 | Batni et al. |
| 6,512,919 B2 | 1/2003 | Ogasawara |
| 6,516,416 B2 | 2/2003 | Gregg et al. |
| 6,519,585 B1 | 2/2003 | Kohli |
| 6,526,275 B1 | 2/2003 | Calvert |
| 6,556,997 B1 | 4/2003 | Levy |
| 6,559,828 B1 | 5/2003 | Impio |
| 6,560,651 B2 | 5/2003 | Katz et al. |
| 6,564,327 B1 | 5/2003 | Klensin et al. |
| 6,573,883 B1 | 6/2003 | Bartlett |
| 6,577,861 B2 | 6/2003 | Ogasawara |
| 6,587,835 B1 | 7/2003 | Treyz et al. |
| 6,593,944 B1 | 7/2003 | Nicolas et al. |
| 6,597,903 B1 | 7/2003 | Dahm et al. |
| 6,615,172 B1 | 9/2003 | Bennett et al. |
| 6,631,372 B1 | 10/2003 | Graham |
| 6,647,269 B2 | 11/2003 | Hendrey et al. |
| 6,651,053 B1 | 11/2003 | Rothschild |
| 6,664,922 B1 | 12/2003 | Fan |
| 6,665,837 B1 | 12/2003 | Dean et al. |
| 6,701,317 B1 | 3/2004 | Wiener et al. |
| 6,704,727 B1 | 3/2004 | Kravets |
| 6,704,787 B1 | 3/2004 | Umbreit |
| 6,718,324 B2 | 4/2004 | Edlund et al. |
| 6,718,365 B1 | 4/2004 | Dutta |
| 6,728,731 B2 | 4/2004 | Sarukkai et al. |
| 6,742,047 B1 | 5/2004 | Tso |
| 6,754,833 B1 * | 6/2004 | Black et al. ............... 726/7 |
| 6,775,537 B1 | 8/2004 | Panichkul |
| 6,775,831 B1 | 8/2004 | Carrasco et al. |
| 6,778,834 B2 | 8/2004 | Laitinen et al. |
| 6,778,975 B1 | 8/2004 | Anick et al. |
| 6,799,298 B2 | 9/2004 | deVries et al. |
| 6,813,489 B1 | 11/2004 | Wu et al. |
| 6,813,501 B2 | 11/2004 | Kinnunen et al. |
| 6,826,572 B2 | 11/2004 | Colace et al. |
| 6,829,475 B1 | 12/2004 | Lee et al. |
| 6,832,259 B2 | 12/2004 | Hymel et al. |
| 6,832,353 B2 | 12/2004 | Itavaara et al. |
| 6,834,195 B2 | 12/2004 | Brandenberg et al. |
| 6,842,767 B1 | 1/2005 | Partovi et al. |
| 6,847,969 B1 | 1/2005 | Mathai et al. |
| 6,853,982 B2 | 2/2005 | Smith et al. |
| 6,871,140 B1 | 3/2005 | Florance et al. |
| 6,871,202 B2 | 3/2005 | Broder |
| 6,876,997 B1 | 4/2005 | Rorex et al. |
| 6,892,206 B2 | 5/2005 | Dharap |
| 6,896,188 B1 | 5/2005 | Graham |
| 6,904,408 B1 | 6/2005 | McCarthy et al. |
| 6,907,566 B1 | 6/2005 | McElfresh et al. |
| 6,920,448 B2 | 7/2005 | Kincaid et al. |
| 6,920,488 B1 | 7/2005 | Le Pennec et al. |
| 6,937,998 B1 | 8/2005 | Swartz et al. |
| 6,941,376 B2 | 9/2005 | Mitchell et al. |
| 6,947,930 B2 | 9/2005 | Anick et al. |
| 6,947,976 B1 | 9/2005 | Devitt et al. |
| 6,950,994 B2 | 9/2005 | Dharap |
| 6,954,641 B2 | 10/2005 | McKenna et al. |
| 6,963,867 B2 | 11/2005 | Ford et al. |
| 6,968,178 B2 | 11/2005 | Pradhan et al. |
| 6,968,333 B2 | 11/2005 | Abbott et al. |
| 6,978,263 B2 | 12/2005 | Soulanille |
| 6,978,264 B2 | 12/2005 | Chandrasekar et al. |
| 6,983,272 B2 | 1/2006 | Davis et al. |
| 6,983,280 B2 | 1/2006 | Cheung et al. |
| 6,993,494 B1 | 1/2006 | Boushy et al. |
| 7,007,239 B1 | 2/2006 | Hawkins et al. |
| 7,020,654 B1 | 3/2006 | Najmi |
| 7,027,987 B1 | 4/2006 | Franz et al. |
| 7,035,811 B2 | 4/2006 | Gorenstein |
| 7,047,033 B2 | 5/2006 | Wyler |
| 7,062,258 B1 | 6/2006 | Sini et al. |
| 7,062,453 B1 | 6/2006 | Clarke |
| 7,071,842 B1 | 7/2006 | Brady, Jr. |
| 7,085,555 B2 | 8/2006 | Zellner et al. |
| 7,089,036 B2 | 8/2006 | Prise |
| 7,089,592 B2 | 8/2006 | Adjaoute |
| 7,103,347 B2 | 9/2006 | Chow et al. |
| 7,120,235 B2 | 10/2006 | Altberg et al. |
| 7,130,923 B2 | 10/2006 | Mason |
| 7,159,194 B2 | 1/2007 | Wong et al. |
| 7,162,493 B2 | 1/2007 | Weiss et al. |
| 7,184,020 B2 | 2/2007 | Matsui |
| 7,185,088 B1 | 2/2007 | Joy et al. |
| 7,185,286 B2 | 2/2007 | Zondervan et al. |
| 7,188,307 B2 | 3/2007 | Ohsawa |
| 7,191,177 B2 | 3/2007 | Konaka |
| 7,219,309 B2 | 5/2007 | Kaasila et al. |
| 7,228,327 B2 | 6/2007 | Shuster |
| 7,240,049 B2 | 7/2007 | Kapur et al. |
| 7,243,163 B1 | 7/2007 | Friend et al. |
| 7,277,718 B2 | 10/2007 | Wong |
| 7,281,042 B2 | 10/2007 | Hsu et al. |
| 7,289,623 B2 | 10/2007 | Lurie |
| 7,308,254 B1 | 12/2007 | Rissanen |
| 7,308,261 B2 | 12/2007 | Henderson et al. |
| 7,330,890 B1 | 2/2008 | Partovi et al. |
| 7,356,524 B2 | 4/2008 | Zurek et al. |
| 7,370,283 B2 | 5/2008 | Othmer |
| 7,373,599 B2 | 5/2008 | McElfresh et al. |
| 7,376,714 B1 | 5/2008 | Gerken |
| 7,412,405 B2 | 8/2008 | Huang et al. |
| 7,437,364 B1 | 10/2008 | Fredricksen et al. |
| 7,444,337 B2 | 10/2008 | Zhou et al. |
| 7,461,528 B2 | 12/2008 | Taniguchi et al. |
| 7,487,112 B2 | 2/2009 | Barnes, Jr. |
| 7,499,948 B2 | 3/2009 | Smith |
| 7,536,322 B1 | 5/2009 | Selinger et al. |
| 7,540,051 B2 | 6/2009 | Gundersen et al. |
| 7,548,915 B2 | 6/2009 | Ramer et al. |
| 7,565,139 B2 | 7/2009 | Neven, Sr. et al. |
| 7,590,759 B2 | 9/2009 | Omar |
| 7,603,106 B2 | 10/2009 | Aaltonen et al. |
| 7,603,349 B1 | 10/2009 | Kraft et al. |
| 7,647,024 B2 | 1/2010 | Wang et al. |
| 7,711,743 B2 | 5/2010 | Cavagnaro et al. |
| 7,725,419 B2 | 5/2010 | Lee et al. |
| 7,743,045 B2 | 6/2010 | Guha et al. |
| 7,751,807 B2 | 7/2010 | Lin et al. |

| Patent/Publication | Date | Name |
|---|---|---|
| 7,761,109 B2 | 7/2010 | Allen |
| 7,783,729 B1 | 8/2010 | Macaluso |
| 7,801,899 B1 | 9/2010 | Spitkovsky |
| 7,844,491 B1 | 11/2010 | Haitsuka et al. |
| 7,895,077 B2 | 2/2011 | Anand et al. |
| 7,904,341 B2 | 3/2011 | Flinn et al. |
| 7,912,458 B2 | 3/2011 | Ramer et al. |
| 7,920,849 B2 | 4/2011 | Pop |
| 7,930,342 B2 | 4/2011 | Mattila et al. |
| 7,983,662 B1 | 7/2011 | Ramer et al. |
| 8,073,700 B2 | 12/2011 | Jaramillo et al. |
| 2001/0030234 A1 | 10/2001 | Wiklof |
| 2001/0032133 A1 | 10/2001 | Moran |
| 2001/0037174 A1 | 11/2001 | Dickerson |
| 2001/0041561 A1 | 11/2001 | Ventulett et al. |
| 2001/0042785 A1 | 11/2001 | Walker et al. |
| 2001/0044758 A1 | 11/2001 | Talib et al. |
| 2001/0047363 A1 | 11/2001 | Peng |
| 2001/0049636 A1 | 12/2001 | Hudda et al. |
| 2001/0049677 A1 | 12/2001 | Talib et al. |
| 2001/0051911 A1 | 12/2001 | Marks et al. |
| 2001/0054001 A1 | 12/2001 | Robinson |
| 2001/0054066 A1 | 12/2001 | Spitzer |
| 2002/0007303 A1 | 1/2002 | Brookler et al. |
| 2002/0013727 A1 | 1/2002 | Lee |
| 2002/0029186 A1 | 3/2002 | Roth et al. |
| 2002/0029267 A1 | 3/2002 | Sankuratripati et al. |
| 2002/0035605 A1* | 3/2002 | McDowell et al. ............ 709/206 |
| 2002/0046104 A1 | 4/2002 | Kaddeche et al. |
| 2002/0051521 A1 | 5/2002 | Patrick |
| 2002/0052674 A1 | 5/2002 | Chang et al. |
| 2002/0052781 A1 | 5/2002 | Aufricht et al. |
| 2002/0053076 A1 | 5/2002 | Landesmann |
| 2002/0062310 A1 | 5/2002 | Marmor et al. |
| 2002/0062393 A1 | 5/2002 | Borger et al. |
| 2002/0073034 A1 | 6/2002 | Wagner et al. |
| 2002/0073420 A1 | 6/2002 | Yoon |
| 2002/0077084 A1 | 6/2002 | Zellner et al. |
| 2002/0077897 A1 | 6/2002 | Zellner et al. |
| 2002/0077908 A1 | 6/2002 | Sakuma et al. |
| 2002/0078045 A1 | 6/2002 | Dutta |
| 2002/0078209 A1 | 6/2002 | Peng |
| 2002/0082049 A1 | 6/2002 | Prise |
| 2002/0087408 A1 | 7/2002 | Burnett |
| 2002/0103789 A1 | 8/2002 | Turnbull et al. |
| 2002/0105539 A1 | 8/2002 | Gamzon et al. |
| 2002/0107985 A1 | 8/2002 | Hwang et al. |
| 2002/0111172 A1 | 8/2002 | DeWolf et al. |
| 2002/0123928 A1 | 9/2002 | Eldering et al. |
| 2002/0128903 A1 | 9/2002 | Kernahan |
| 2002/0143860 A1 | 10/2002 | Catan |
| 2002/0147652 A1 | 10/2002 | Gheith et al. |
| 2002/0165773 A1 | 11/2002 | Natsuno et al. |
| 2002/0165790 A1 | 11/2002 | Bancroft et al. |
| 2002/0169654 A1 | 11/2002 | Santos et al. |
| 2002/0171691 A1 | 11/2002 | Currans et al. |
| 2002/0177443 A1 | 11/2002 | Tokuyoshi |
| 2002/0184622 A1 | 12/2002 | Emura et al. |
| 2002/0198791 A1 | 12/2002 | Perkowski |
| 2003/0003929 A1 | 1/2003 | Himmel et al. |
| 2003/0004831 A1 | 1/2003 | Owens |
| 2003/0004984 A1 | 1/2003 | Chou |
| 2003/0006911 A1 | 1/2003 | Smith et al. |
| 2003/0014399 A1 | 1/2003 | Hansen et al. |
| 2003/0014659 A1 | 1/2003 | Zhu |
| 2003/0018539 A1 | 1/2003 | La Poutre et al. |
| 2003/0020749 A1 | 1/2003 | Abu-Hakima et al. |
| 2003/0028889 A1 | 2/2003 | McCoskey et al. |
| 2003/0045273 A1 | 3/2003 | Pyhalammi et al. |
| 2003/0046291 A1 | 3/2003 | Fascenda |
| 2003/0050863 A1 | 3/2003 | Radwin |
| 2003/0050986 A1 | 3/2003 | Matthews et al. |
| 2003/0055816 A1 | 3/2003 | Paine |
| 2003/0055831 A1 | 3/2003 | Ryan et al. |
| 2003/0058842 A1 | 3/2003 | Bud |
| 2003/0060198 A1 | 3/2003 | Li |
| 2003/0060214 A1 | 3/2003 | Hendrey et al. |
| 2003/0063072 A1 | 4/2003 | Brandenberg et al. |
| 2003/0065805 A1 | 4/2003 | Barnes, Jr. |
| 2003/0078882 A1 | 4/2003 | Sukeda et al. |
| 2003/0079222 A1 | 4/2003 | Boykin et al. |
| 2003/0084098 A1 | 5/2003 | Lavin et al. |
| 2003/0088452 A1 | 5/2003 | Kelly |
| 2003/0093311 A1 | 5/2003 | Knowlson |
| 2003/0093314 A1 | 5/2003 | Leung et al. |
| 2003/0097451 A1 | 5/2003 | Bjorksten et al. |
| 2003/0100320 A1 | 5/2003 | Ranjan |
| 2003/0110225 A1 | 6/2003 | Billadeau |
| 2003/0114145 A1 | 6/2003 | Boda et al. |
| 2003/0115318 A1 | 6/2003 | Wueste |
| 2003/0126095 A1 | 7/2003 | Allen |
| 2003/0126126 A1 | 7/2003 | Lee et al. |
| 2003/0130887 A1 | 7/2003 | Nathaniel |
| 2003/0132298 A1 | 7/2003 | Swartz et al. |
| 2003/0135460 A1 | 7/2003 | Talegon |
| 2003/0135581 A1 | 7/2003 | Phelan et al. |
| 2003/0135582 A1 | 7/2003 | Allen et al. |
| 2003/0135825 A1 | 7/2003 | Gertner et al. |
| 2003/0140004 A1 | 7/2003 | O'Leary et al. |
| 2003/0146932 A1 | 8/2003 | Weng et al. |
| 2003/0149793 A1 | 8/2003 | Bannoura et al. |
| 2003/0149937 A1 | 8/2003 | McElfresh et al. |
| 2003/0149938 A1 | 8/2003 | McElfresh et al. |
| 2003/0158776 A1 | 8/2003 | Landesmann |
| 2003/0163833 A1 | 8/2003 | Chiba et al. |
| 2003/0172042 A1 | 9/2003 | Agui |
| 2003/0172145 A1 | 9/2003 | Nguyen |
| 2003/0187878 A1 | 10/2003 | Sandifer |
| 2003/0187996 A1 | 10/2003 | Cardina et al. |
| 2003/0195009 A1 | 10/2003 | Endo |
| 2003/0204447 A1 | 10/2003 | Dalzell et al. |
| 2003/0220866 A1 | 11/2003 | Pisaris-Henderson et al. |
| 2003/0226866 A1 | 12/2003 | Har-Shen |
| 2004/0005894 A1 | 1/2004 | Trossen et al. |
| 2004/0019478 A1 | 1/2004 | Rucker et al. |
| 2004/0023644 A1 | 2/2004 | Montemer |
| 2004/0023654 A1 | 2/2004 | Jang |
| 2004/0024752 A1 | 2/2004 | Manber et al. |
| 2004/0029567 A1 | 2/2004 | Timmins et al. |
| 2004/0034853 A1 | 2/2004 | Gibbons et al. |
| 2004/0044571 A1 | 3/2004 | Bronnimann et al. |
| 2004/0054569 A1 | 3/2004 | Pombo et al. |
| 2004/0059708 A1 | 3/2004 | Dean et al. |
| 2004/0068552 A1 | 4/2004 | Kotz et al. |
| 2004/0073574 A1 | 4/2004 | Shimizu et al. |
| 2004/0077337 A1 | 4/2004 | Vestergaard et al. |
| 2004/0116070 A1 | 6/2004 | Fishman et al. |
| 2004/0117195 A1 | 6/2004 | Bodin |
| 2004/0117302 A1 | 6/2004 | Weichert et al. |
| 2004/0122735 A1 | 6/2004 | Meshkin |
| 2004/0133848 A1 | 7/2004 | Hunt et al. |
| 2004/0137886 A1 | 7/2004 | Ross et al. |
| 2004/0158630 A1 | 8/2004 | Chang et al. |
| 2004/0170155 A1 | 9/2004 | Omar et al. |
| 2004/0193698 A1 | 9/2004 | Lakshminarayana |
| 2004/0199422 A1 | 10/2004 | Napier et al. |
| 2004/0199575 A1 | 10/2004 | Geller |
| 2004/0203630 A1 | 10/2004 | Wang |
| 2004/0203854 A1 | 10/2004 | Nowak |
| 2004/0214557 A1 | 10/2004 | Liao et al. |
| 2004/0218562 A1 | 11/2004 | Orava et al. |
| 2004/0220926 A1 | 11/2004 | Lamkin et al. |
| 2004/0225647 A1 | 11/2004 | Connelly et al. |
| 2004/0230461 A1 | 11/2004 | Talib et al. |
| 2004/0230503 A1 | 11/2004 | Lucas |
| 2004/0230574 A1 | 11/2004 | Kravets |
| 2004/0230636 A1 | 11/2004 | Masuoka et al. |
| 2004/0243569 A1 | 12/2004 | Burrows |
| 2004/0249700 A1 | 12/2004 | Gross |
| 2004/0249768 A1 | 12/2004 | Kontio et al. |
| 2004/0259553 A1 | 12/2004 | Delaney et al. |
| 2004/0260689 A1 | 12/2004 | Colace et al. |
| 2004/0267611 A1 | 12/2004 | Hoerenz |
| 2005/0015406 A1 | 1/2005 | Sambhus et al. |
| 2005/0021110 A1 | 1/2005 | Maschke et al. |
| 2005/0027591 A9 | 2/2005 | Gailey et al. |
| 2005/0027666 A1 | 2/2005 | Beck et al. |
| 2005/0041647 A1 | 2/2005 | Stinnie |

| | | |
|---|---|---|
| 2005/0043989 A1 | 2/2005 | Shifrin |
| 2005/0049908 A2 | 3/2005 | Hawks |
| 2005/0060381 A1 | 3/2005 | Huynh et al. |
| 2005/0064852 A1 | 3/2005 | Baldursson |
| 2005/0065917 A1 | 3/2005 | Anick et al. |
| 2005/0065950 A1 | 3/2005 | Chaganti et al. |
| 2005/0065995 A1 | 3/2005 | Milstein et al. |
| 2005/0068169 A1 | 3/2005 | Copley et al. |
| 2005/0071325 A1 | 3/2005 | Bem et al. |
| 2005/0071741 A1 | 3/2005 | Acharya et al. |
| 2005/0071766 A1 | 3/2005 | Brill et al. |
| 2005/0075097 A1 | 4/2005 | Lehikoinen et al. |
| 2005/0075932 A1 | 4/2005 | Mankoff |
| 2005/0076014 A1 | 4/2005 | Agarwal et al. |
| 2005/0080786 A1 | 4/2005 | Fish et al. |
| 2005/0085239 A1 | 4/2005 | Cedervall |
| 2005/0086109 A1 | 4/2005 | McFadden et al. |
| 2005/0086112 A1 | 4/2005 | Shkedi |
| 2005/0097204 A1 | 5/2005 | Horowitz et al. |
| 2005/0105513 A1 | 5/2005 | Sullivan et al. |
| 2005/0114312 A1 | 5/2005 | Mosescu |
| 2005/0119936 A1 | 6/2005 | Buchanan et al. |
| 2005/0125723 A1 | 6/2005 | Griswold et al. |
| 2005/0131762 A1 | 6/2005 | Bharat et al. |
| 2005/0144065 A1 | 6/2005 | Calabria et al. |
| 2005/0144073 A1 | 6/2005 | Morrisroe et al. |
| 2005/0144251 A1 | 6/2005 | Slate |
| 2005/0144297 A1 | 6/2005 | Dahlstrom et al. |
| 2005/0149395 A1 | 7/2005 | Henkin et al. |
| 2005/0149399 A1 | 7/2005 | Fukunaga et al. |
| 2005/0149922 A1 | 7/2005 | Vincent |
| 2005/0154716 A1 | 7/2005 | Watson et al. |
| 2005/0154717 A1 | 7/2005 | Watson et al. |
| 2005/0154996 A1 | 7/2005 | Othmer |
| 2005/0159164 A1 | 7/2005 | Leedom |
| 2005/0164704 A1 | 7/2005 | Winsor |
| 2005/0165666 A1 | 7/2005 | Wong et al. |
| 2005/0171863 A1 | 8/2005 | Hagen |
| 2005/0171936 A1 | 8/2005 | Zhu |
| 2005/0177593 A1 | 8/2005 | Solomon |
| 2005/0185060 A1 | 8/2005 | Neven |
| 2005/0187971 A1 | 8/2005 | Hassan et al. |
| 2005/0188056 A1 | 8/2005 | Kangas et al. |
| 2005/0190747 A1 | 9/2005 | Sindhwani et al. |
| 2005/0191936 A1 | 9/2005 | Marine et al. |
| 2005/0198095 A1 | 9/2005 | Du et al. |
| 2005/0203806 A1 | 9/2005 | Jacobs et al. |
| 2005/0203888 A1 | 9/2005 | Woosley et al. |
| 2005/0210391 A1 | 9/2005 | Othmer |
| 2005/0216334 A1 | 9/2005 | Mehrabani-Farsi |
| 2005/0221802 A1 | 10/2005 | Hosono |
| 2005/0221843 A1 | 10/2005 | Friedman et al. |
| 2005/0222989 A1 | 10/2005 | Haveliwala et al. |
| 2005/0223000 A1 | 10/2005 | Davis et al. |
| 2005/0227676 A1 | 10/2005 | De Vries et al. |
| 2005/0227679 A1 | 10/2005 | Papulov |
| 2005/0233742 A1 | 10/2005 | Karaoguz et al. |
| 2005/0233755 A1 | 10/2005 | Jacovi et al. |
| 2005/0234768 A1 | 10/2005 | Wald et al. |
| 2005/0234891 A1 | 10/2005 | Walther et al. |
| 2005/0234929 A1 | 10/2005 | Ionescu et al. |
| 2005/0240472 A1 | 10/2005 | Postrel |
| 2005/0240477 A1 | 10/2005 | Friday et al. |
| 2005/0240557 A1 | 10/2005 | Rorex et al. |
| 2005/0240580 A1 | 10/2005 | Zamir et al. |
| 2005/0245241 A1 | 11/2005 | Durand et al. |
| 2005/0246132 A1 | 11/2005 | Olin et al. |
| 2005/0246415 A1 | 11/2005 | Belfiore et al. |
| 2005/0251444 A1 | 11/2005 | Varian et al. |
| 2005/0256766 A1 | 11/2005 | Garcia et al. |
| 2005/0266889 A1 | 12/2005 | Kuhl et al. |
| 2005/0273351 A1 | 12/2005 | Chudnovsky et al. |
| 2005/0273779 A1 | 12/2005 | Cheng et al. |
| 2005/0289113 A1 | 12/2005 | Bookstaff |
| 2006/0004594 A1 | 1/2006 | Doliov |
| 2006/0004627 A1 | 1/2006 | Baluja |
| 2006/0004739 A1 | 1/2006 | Anthony et al. |
| 2006/0004850 A1 | 1/2006 | Chowdhury |
| 2006/0010699 A1 | 1/2006 | Tamura |
| 2006/0012677 A1 | 1/2006 | Neven, Sr. et al. |
| 2006/0015201 A1 | 1/2006 | Lapstun et al. |
| 2006/0019716 A1 | 1/2006 | Pell et al. |
| 2006/0020593 A1 | 1/2006 | Ramsaier et al. |
| 2006/0020596 A1 | 1/2006 | Liu et al. |
| 2006/0022048 A1 | 2/2006 | Johnson |
| 2006/0026013 A1 | 2/2006 | Kraft |
| 2006/0036565 A1 | 2/2006 | Bruecken |
| 2006/0041556 A1 | 2/2006 | Taniguchi et al. |
| 2006/0046712 A1 | 3/2006 | Shamp et al. |
| 2006/0046838 A1 | 3/2006 | Paulsen et al. |
| 2006/0059107 A1 | 3/2006 | Elmore et al. |
| 2006/0059129 A1 | 3/2006 | Azuma et al. |
| 2006/0064346 A1 | 3/2006 | Steenstra et al. |
| 2006/0069746 A1 | 3/2006 | Davis et al. |
| 2006/0073810 A1 | 4/2006 | Pyhalammi et al. |
| 2006/0074883 A1 | 4/2006 | Teevan et al. |
| 2006/0085251 A1 | 4/2006 | Greene |
| 2006/0085750 A1 | 4/2006 | Easton, Jr. et al. |
| 2006/0099064 A1 | 5/2006 | Barrese et al. |
| 2006/0100998 A1 | 5/2006 | Edwards et al. |
| 2006/0106674 A1 | 5/2006 | Muller |
| 2006/0106710 A1 | 5/2006 | Meek et al. |
| 2006/0112179 A1 | 5/2006 | Baumeister et al. |
| 2006/0122879 A1 | 6/2006 | O'Kelley |
| 2006/0123014 A1 | 6/2006 | Ng |
| 2006/0123053 A1 | 6/2006 | Scannell |
| 2006/0129541 A1 | 6/2006 | Morgan et al. |
| 2006/0149624 A1 | 7/2006 | Baluja et al. |
| 2006/0149625 A1 | 7/2006 | Koningstein |
| 2006/0155597 A1 | 7/2006 | Gleason |
| 2006/0155706 A1 | 7/2006 | Kalinichenko et al. |
| 2006/0161778 A1 | 7/2006 | Stirbu |
| 2006/0167747 A1 | 7/2006 | Goodman et al. |
| 2006/0171340 A1 | 8/2006 | Maeda et al. |
| 2006/0178986 A1 | 8/2006 | Giordano et al. |
| 2006/0184417 A1 | 8/2006 | Van der Linden et al. |
| 2006/0190328 A1 | 8/2006 | Singh et al. |
| 2006/0190331 A1 | 8/2006 | Tollinger et al. |
| 2006/0190439 A1 | 8/2006 | Chowdhury et al. |
| 2006/0200384 A1 | 9/2006 | Arutunian et al. |
| 2006/0212350 A1 | 9/2006 | Ellis et al. |
| 2006/0212451 A1 | 9/2006 | Serdy, Jr. et al. |
| 2006/0217110 A1 | 9/2006 | Othmer |
| 2006/0224447 A1 | 10/2006 | Koningstein |
| 2006/0230427 A1 | 10/2006 | Kunkel et al. |
| 2006/0236257 A1 | 10/2006 | Othmer et al. |
| 2006/0236258 A1 | 10/2006 | Othmer et al. |
| 2006/0242007 A1 | 10/2006 | Leong et al. |
| 2006/0242017 A1* | 10/2006 | Libes et al. ............ 705/14 |
| 2006/0242129 A1 | 10/2006 | Libes et al. |
| 2006/0253427 A1 | 11/2006 | Wu et al. |
| 2006/0256130 A1 | 11/2006 | Gonzalez |
| 2006/0258397 A1 | 11/2006 | Kaplan et al. |
| 2006/0259365 A1 | 11/2006 | Agarwal et al. |
| 2006/0259434 A1 | 11/2006 | Vilcauskas, Jr. et al. |
| 2006/0259479 A1 | 11/2006 | Dai |
| 2006/0271425 A1 | 11/2006 | Goodman et al. |
| 2006/0271438 A1 | 11/2006 | Shotland et al. |
| 2006/0277271 A1 | 12/2006 | Morse et al. |
| 2006/0282314 A1 | 12/2006 | Zamanian et al. |
| 2006/0287919 A1 | 12/2006 | Rubens et al. |
| 2006/0287936 A1 | 12/2006 | Jacobson |
| 2006/0288015 A1 | 12/2006 | Schirripa et al. |
| 2006/0293065 A1 | 12/2006 | Chew et al. |
| 2006/0294025 A1 | 12/2006 | Mengerink |
| 2006/0294084 A1 | 12/2006 | Patel et al. |
| 2006/0294094 A1 | 12/2006 | King et al. |
| 2006/0294225 A1 | 12/2006 | Grecco et al. |
| 2007/0005570 A1 | 1/2007 | Hurst-Hiller et al. |
| 2007/0005584 A1 | 1/2007 | Feng et al. |
| 2007/0005587 A1 | 1/2007 | Johnson et al. |
| 2007/0011078 A1 | 1/2007 | Jain et al. |
| 2007/0016473 A1 | 1/2007 | Anderson et al. |
| 2007/0027744 A1 | 2/2007 | Carson et al. |
| 2007/0027751 A1 | 2/2007 | Carson et al. |
| 2007/0027753 A1 | 2/2007 | Collins |
| 2007/0027839 A1 | 2/2007 | Ives |
| 2007/0027857 A1 | 2/2007 | Deng et al. |

| | | |
|---|---|---|
| 2007/0032240 A1 | 2/2007 | Finnegan et al. |
| 2007/0033210 A1 | 2/2007 | Baudino et al. |
| 2007/0043730 A1 | 2/2007 | Wisely |
| 2007/0050248 A1 | 3/2007 | Huang et al. |
| 2007/0055938 A1 | 3/2007 | Herring et al. |
| 2007/0060173 A1 | 3/2007 | Ramer et al. |
| 2007/0061146 A1 | 3/2007 | Jaramillo et al. |
| 2007/0061197 A1 | 3/2007 | Ramer et al. |
| 2007/0061198 A1 | 3/2007 | Ramer et al. |
| 2007/0061211 A1 | 3/2007 | Ramer et al. |
| 2007/0061229 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061300 A1 | 3/2007 | Ramer et al. |
| 2007/0061301 A1 | 3/2007 | Ramer et al. |
| 2007/0061302 A1 | 3/2007 | Ramer et al. |
| 2007/0061303 A1 | 3/2007 | Ramer et al. |
| 2007/0061317 A1 | 3/2007 | Ramer et al. |
| 2007/0061328 A1 | 3/2007 | Ramer et al. |
| 2007/0061331 A1 | 3/2007 | Ramer et al. |
| 2007/0061332 A1 | 3/2007 | Ramer et al. |
| 2007/0061333 A1 | 3/2007 | Ramer et al. |
| 2007/0061334 A1 | 3/2007 | Ramer et al. |
| 2007/0061335 A1 | 3/2007 | Ramer et al. |
| 2007/0061336 A1 | 3/2007 | Ramer et al. |
| 2007/0061363 A1 | 3/2007 | Ramer et al. |
| 2007/0066341 A1 | 3/2007 | Silverbrook et al. |
| 2007/0067267 A1 | 3/2007 | Ives |
| 2007/0067297 A1 | 3/2007 | Kublickis |
| 2007/0067329 A1 | 3/2007 | Kamvar et al. |
| 2007/0067824 A1 | 3/2007 | Silverbrook et al. |
| 2007/0073656 A1 | 3/2007 | Bandi |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0073989 A1 | 3/2007 | Sharma et al. |
| 2007/0075915 A1 | 4/2007 | Cheon et al. |
| 2007/0078832 A1 | 4/2007 | Ott et al. |
| 2007/0078851 A1 | 4/2007 | Grell et al. |
| 2007/0083611 A1 | 4/2007 | Farago et al. |
| 2007/0088838 A1 | 4/2007 | Levkovitz et al. |
| 2007/0088851 A1 | 4/2007 | Levkovitz et al. |
| 2007/0094042 A1 | 4/2007 | Ramer et al. |
| 2007/0100648 A1 | 5/2007 | Borquez et al. |
| 2007/0100650 A1 | 5/2007 | Ramer et al. |
| 2007/0100651 A1 | 5/2007 | Ramer et al. |
| 2007/0100652 A1 | 5/2007 | Ramer et al. |
| 2007/0100653 A1 | 5/2007 | Ramer et al. |
| 2007/0100805 A1 | 5/2007 | Ramer et al. |
| 2007/0100806 A1 | 5/2007 | Ramer et al. |
| 2007/0106564 A1 | 5/2007 | Matotek et al. |
| 2007/0112739 A1 | 5/2007 | Burns et al. |
| 2007/0118533 A1 | 5/2007 | Ramer et al. |
| 2007/0118739 A1 | 5/2007 | Togashi et al. |
| 2007/0135084 A1 | 6/2007 | Ido et al. |
| 2007/0136261 A1 | 6/2007 | Taboada et al. |
| 2007/0143348 A1 | 6/2007 | Rosenberg |
| 2007/0168354 A1 | 7/2007 | Ramer et al. |
| 2007/0185768 A1 | 8/2007 | Vengroff et al. |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0202900 A1 | 8/2007 | Inselberg |
| 2007/0203887 A1 | 8/2007 | Dynin |
| 2007/0233730 A1 | 10/2007 | Johnston et al. |
| 2007/0239724 A1 | 10/2007 | Ramer et al. |
| 2007/0244900 A1 | 10/2007 | Hopkins et al. |
| 2007/0250711 A1 | 10/2007 | Storey |
| 2007/0260635 A1 | 11/2007 | Ramer et al. |
| 2007/0274506 A1 | 11/2007 | Schundler |
| 2007/0276829 A1 | 11/2007 | Wang et al. |
| 2007/0288427 A1 | 12/2007 | Ramer et al. |
| 2008/0009268 A1 | 1/2008 | Ramer et al. |
| 2008/0052157 A1 | 2/2008 | Kadambi et al. |
| 2008/0070209 A1 | 3/2008 | Zhuang et al. |
| 2008/0071743 A1 | 3/2008 | Jhaveri et al. |
| 2008/0082518 A1 | 4/2008 | Loftesness |
| 2008/0103879 A1 | 5/2008 | Armstrong |
| 2008/0103900 A1* | 5/2008 | Flake et al. ............... 705/14 |
| 2008/0120173 A1 | 5/2008 | Papulov |
| 2008/0162260 A1 | 7/2008 | Rohan et al. |
| 2008/0188207 A1 | 8/2008 | Lee |
| 2008/0214148 A1 | 9/2008 | Ramer et al. |
| 2008/0214149 A1 | 9/2008 | Ramer et al. |
| 2008/0214150 A1 | 9/2008 | Ramer et al. |
| 2008/0214151 A1 | 9/2008 | Ramer et al. |
| 2008/0214152 A1 | 9/2008 | Ramer et al. |
| 2008/0214153 A1 | 9/2008 | Ramer et al. |
| 2008/0214154 A1 | 9/2008 | Ramer et al. |
| 2008/0214155 A1 | 9/2008 | Ramer et al. |
| 2008/0214156 A1 | 9/2008 | Ramer et al. |
| 2008/0214157 A1 | 9/2008 | Ramer et al. |
| 2008/0214162 A1 | 9/2008 | Ramer et al. |
| 2008/0214166 A1 | 9/2008 | Ramer et al. |
| 2008/0214204 A1 | 9/2008 | Ramer et al. |
| 2008/0215428 A1 | 9/2008 | Ramer et al. |
| 2008/0215429 A1 | 9/2008 | Ramer et al. |
| 2008/0215475 A1 | 9/2008 | Ramer et al. |
| 2008/0215623 A1 | 9/2008 | Ramer et al. |
| 2008/0231642 A1 | 9/2008 | Okita |
| 2008/0242279 A1 | 10/2008 | Ramer et al. |
| 2008/0248809 A1 | 10/2008 | Gower |
| 2008/0270220 A1 | 10/2008 | Ramer et al. |
| 2008/0271120 A1 | 10/2008 | Parkes et al. |
| 2009/0005040 A1 | 1/2009 | Bourne |
| 2009/0017805 A1 | 1/2009 | Sarukkai et al. |
| 2009/0029687 A1 | 1/2009 | Ramer et al. |
| 2009/0030952 A1 | 1/2009 | Donahue et al. |
| 2009/0055435 A1 | 2/2009 | Kiviluoto et al. |
| 2009/0076906 A1 | 3/2009 | Kansal et al. |
| 2009/0076914 A1 | 3/2009 | Coueignoux |
| 2009/0177542 A1 | 7/2009 | Haberman et al. |
| 2009/0187820 A1 | 7/2009 | Stinson et al. |
| 2009/0192866 A1 | 7/2009 | Karnam et al. |
| 2009/0199085 A1 | 8/2009 | Park |
| 2009/0222329 A1 | 9/2009 | Ramer et al. |
| 2009/0234711 A1 | 9/2009 | Ramer et al. |
| 2009/0234745 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0247140 A1* | 10/2009 | Gupta et al. ............... 455/418 |
| 2009/0271407 A1 | 10/2009 | Hawkins et al. |
| 2011/0159902 A1 | 6/2011 | Ramer et al. |
| 2011/0177799 A1 | 7/2011 | Ramer et al. |
| 2011/0202874 A1 | 8/2011 | Ramer et al. |

FOREIGN PATENT DOCUMENTS

| | | |
|---|---|---|
| KP | 2005/50016 | 5/2005 |
| KR | 10-2001-0108011 | 7/2001 |
| KR | 2001078607 A | 8/2001 |
| KR | 0366120 | 12/2002 |
| KR | 10-2008-0065589 | 7/2008 |
| KR | 10-0858273 B1 | 9/2008 |
| WO | WO 01/71949 A1 | 9/2001 |
| WO | WO-2004/021218 A2 | 3/2004 |
| WO | WO-2004057883 A2 | 7/2004 |
| WO | WO-2005/062794 A2 | 7/2005 |
| WO | WO-2005/094094 A1 | 10/2005 |
| WO | WO-2006/104895 A2 | 5/2006 |
| WO | WO-2007033358 A2 | 3/2007 |
| WO | WO-2007033358 A3 | 3/2007 |
| WO | WO-2008052205 A2 | 5/2008 |
| WO | WO-2008052205 A3 | 5/2008 |
| WO | WO-2009/002999 A2 | 12/2008 |
| WO | WO-2009/002999 A3 | 12/2008 |

OTHER PUBLICATIONS

NPL, *Mobile Commerce: Need to leave the country? Now you can do it faster . . .; New travel deals search expands world of WAP. M2 Presswire.*, (Jun. 7, 2005),1.

Hyoguchi Hyoguchi, K. *Advertising strategies tap cell phones. The Nikkei Weekly* (Japan), (Oct. 6, 2003),1-3.
NPL, "Unisource Announces Trial Using GSM for Fast and Secure Money Transactions on the Internet", Findarticles.com, (Mar. 11 1997),1-3.
Resnick, et al., "PICS:Internet Access Controls Without Censorship", *Communications of the ACM*,vol. 39(10), (Oct. 1996),pp. 87-93.
Gourley, et al., "HTTP: The Definitive Guide", O'Reilly,Chapter-9,(Sep. 1, 2002),1-4 pgs.
"Office Action", U.S. Appl. No. 11/335,904, (Dec. 31, 2007),all.
"Office Action", U.S. Appl. No. 11/336,432, (Dec. 10, 2007),all.
"Office Action", U.S. Appl. No. 11/337,112, (Dec. 5, 2007),all.
"Office Action", U.S. Appl. No. 11/347,842, (Mar. 13, 2008),all.
"Office Action", U.S. Appl. No. 11/335,900, (Dec. 28, 2007),all.
"Office Action", U.S. Appl. No. 11/337,233, (Jan. 9, 2008),all.
"Office Action", U.S. Appl. No. 11/337,180, (Dec. 12, 2007),all.
"Office Action", U.S. Appl. No. 11/347,825, (Apr. 25, 2008),all.
OA, "Office Action", U.S. Appl. No. 11/267,940, (Mar. 18, 2008),all.
OA, "Office Action", U.S. Appl. No. 11/267,905, (Nov. 27, 2007),all.
OA, "Office Action", U.S. Appl. No. 11/281,902, (Apr. 15, 2008),all.
OA, "Office Action", U.S. Appl. No. 11/282,120, (Apr. 8, 2008),all.
OA, "Office Action", U.S. Appl. No. 11/382,226, (Feb. 19, 2008),all.
OA, "Office Action", U.S. Appl. No. 11/382,243, (Mar. 18, 2008),all.
OA, "Office Action", U.S. Appl. No. 11/382,246, (Mar. 11, 2008),all.
OA, "Office Action", U.S. Appl. No. 11/382,249, (Mar. 19, 2008),all.
OA, "Office Action", U.S. Appl. No. 11/382,257, (Feb. 21, 2008),all.
OA, "Office Action", U.S. Appl. No. 11/382,618, (Feb. 11, 2008),all.
OA, "Office Action", U.S. Appl. No. 11/382,637, (Feb. 19, 2008),all.
OA, "Office Action", U.S. Appl. No. 11/382,648, (Feb. 8, 2008),all.
OA, "Office Action", U.S. Appl. No. 11/382,676, (Mar. 4, 2008),all.
OA, "Office Action", U.S. Appl. No. 11/382,676, (Feb. 21, 2008),all.
OA, "Office Action", U.S. Appl. No. 11/383,236, (Apr. 2, 2008),all.
OA, "Office Action", U.S. Appl. No. 11/553,587, (Mar. 11, 2008),all.
OA, "Office Action", U.S. Appl. No. 11/553,626, (Apr. 29, 2008),all.
OA, "Office Action", U.S. Appl. No. 11/553,569, (Apr. 16, 2008),all.
OA, "Office Action", U.S. Appl. No. 11/553,713, (Apr. 17, 2008),all.
OA, "Office Action", U.S. Appl. No. 11/422,797, (Mar. 11, 2008),all.
OA, "Application U.S. Appl. No. 11/382,260, Non-Final Office Action mailed May 14, 2008", OARN,26pgs.
OA, "U.S. Appl. No. 11/337,180, Non-Final Office Action mailed May 14, 2008", OARN,43pgs.
OA, "U.S. Appl. No. 11/553,598, Non-Final Office Action mailed May 14, 2008", OARN,27pgs.
OA, "U.S. Appl. No. 11/274,905 Final Office Action mailed May 14, 2008", FOAR,17 Pgs.
OA, "U.S. Appl. No. 11/336,432 Final Office Action mailed May 22, 2008", FOAR,33 pgs.
FOA, "U.S. Appl. No. 11/335,900 Final Office Action mailed Jun. 25, 2008", FOAR,28 pgs.
"U.S. Appl. No. 11/337,112 Final Office Action mailed Jul. 9, 2008", FOAR,64 pgs.
"U.S. Appl. No. 11/335,904, Final Office Action mailed Jul. 22, 2008.", FOAR,17 pgs.
"U.S. Appl. No. 11/553,581 Non-Final Office Action mailed on Aug. 7, 2008", OARN,15 Pgs.
"U.S. Appl. No. 11/553,567 Non-Final Office Action mailed Aug. 6, 2008", OARN,19 Pgs.
"U.S. Appl. No. 11/337,233 Final Office Action mailed Aug. 11, 2008", FOAR,28 Pgs.
"U.S. Appl. No. 11/281,902, Non-Final Office Action mailed Aug. 14, 2008", OARN,34 pgs.
"U.S. Appl. No. 11/268,671, Non-Final Office Action mailed Aug. 15, 2008", OARN,22 pgs.
"U.S. Appl. No. 11/414,168 Non-Final Office Action mailed Aug. 14, 2008", OARN,9pgs.
"U.S. Appl. No. 11/382,246, Final Office Action mailed Aug. 20, 2008", FOAR,21.
"U.S. Appl. No. 11/382,696, Non-Final Office Action mailed Sep. 17, 2008.", OARN,32 pgs.
"U.S. Appl. No. 11/382,243 Final Office Action Mailed on Sep. 26, 2008", FOAR,32 Pgs.
"U.S. Appl. No. 11/382,226 Final Office Action mailed Sep. 24, 2008", FOAR,26 Pgs.
"U.S. Appl. No. 11/355,915, Non-Final Office Action mailed Oct. 7, 2008", OARN,21 pgs.
"U.S. Appl. No. 11/347,842, Final Office Action Mailed Oct. 8, 2008", FOAR,37 pgs.
"U.S. Appl. No. 11/382,257, Final Office Action mailed Oct. 16, 2008", FOAR,26pgs.
"U.S. Appl. No. 11/553,587 Final Office Action mailed Oct. 15, 2008", FOAR,34 Pgs.
"U.S. Appl. No. 11/337,234, Non-Final Office Action mailed Oct. 15, 2008", OARN,3 pgs.
"U.S. Appl. No. 11/382,684 Non-Final Office Action Mailed on Oct. 23, 2008", OARN,17 Pgs.
"U.S. Appl. No. 11/422,797 Final Office Action Mailed on Oct. 29, 2008", FOAR,4 Pgs.
"U.S. Appl. No. 11/383,236, Final Office Action Mailed Oct. 29, 2008", FOAR,23 pgs.
"U.S. Appl. No. 11/382,648 Final Office Action mailed Nov. 7, 2008", 26 pgs.
"U.S. Appl. No. 11/382,637 (Final Office Action Mailed on Nov. 12, 2008)", 23 Pgs.
"U.S. Appl. No. 11/382,676 Final Office Action mailed Dec. 4, 2008", 27 pgs.
"U.S. Appl. No. 11/347,825, Final Office Action mailed Jan. 7, 2009", 31 pgs.
"ISR PCT/US2008/068108", *International Search Report*, (Dec. 29, 2008).
"WO-PCT/US2008/068108", *Written Opinion*, (Dec. 29, 2008).
"U.S. Appl. No. 11/382,262 Non-Final Office Action mailed Jan. 14, 2009", 24 Pgs.
"U.S. Appl. No. 11/382,690, Non-Final Office Action mailed Feb. 23, 2009", 25 pgs.
"U.S. Appl. No. 11/387,147, Non-Final Office Action mailed Mar. 5, 2009", 28 pgs.
"U.S. Appl. No. 11/382,246, Non-Final Office Action mailed Mar. 30, 2009", 20 pgs.
"U.S. Appl. No. 11/553,746, Non-Final Office Action mailed Apr. 1, 2009", 36 pgs.
"U.S. Appl. No. 11/382,696 FOA", Jul. 6, 2010, all.
"U.S. Appl. No. 12/905,197, NFOA Dec. 8, 2010", Dec. 8, 2010, all.
"U.S. Appl. No. 11/928,909, Non-Final Office Action mailed Dec. 16, 2010", ,46.
"U.S. Appl. No. 11/928,990 NFOA", Dec. 28, 2010 , all.
"U.S. Appl. No. 11/929,059, Non-Final Office Action mailed Sep. 23, 2010", , 41 pgs.
"U.S. Appl. No. 11/929,096, Non-Final Office Action mailed Jan. 3, 2011", , 52.
"U.S. Appl. No. 12/576,887 NFOA", Sep. 29, 2010 , all.
"U.S. Appl. No. 12/847,624, NFOA", Dec. 8, 2010 , all.
"U.S. Appl. No. 11/928,847, Non-Final Office Action mailed Aug. 4, 2010", , 39 pgs.
"U.S. Appl. No. 11/282,120", *Notice of Allowance Rec'd* Dec. 7, 2009 , all.
"Cal/Vision.com Helps Wireless Users Make Sense of Dollars and Cents", *Wireless Today.* Mar. 6, 2000 , all.
"Final Office Action, May 31, 2010", *English Language version*.
"Final Office Action, May 31, 2010,", *Japanese language, Japanese patent search* , all.
"Korean Office Action", *Provisional Rejection for Korean Patent* Appl. No. 10-22008-7008835 Dec. 21, 2010 , all.
"NPL-188_References Cited", *English translation* , 1.
Kato, Sako , ""Keyword advertisements for beginners"", *iNTERNET magazine 2nd stage No. 112, Japan Impress Inc*, Japanese language May 1, 2004 , 112-123.
Masuda, Katsuyoshi , "Katsuyoshi Masuda", *Fierce Competition in search engines—Behind-the-scenes of portal site businesses.* IT Select 2.0, vol. 5, No. 6, *Japan Media Select Inc.* Jun. 1, 2005, vol. 5 Japanese Language Jun. 1, 2005 , 32-35.
Nomoto, Mikihito , ""Learn the world of SEO"", *Windows Server World* vol. 9, No. 11, *Japan IDG Japan, Inc., Mikihiko Nomoto* Japanese Language Nov. 1, 2004 , 90-93.

"U.S. Appl. No. 11/929,297, Non-Final Office Action mailed Jan. 19, 2010", , 35 Pgs.

"U.S. Appl. No. 11/382,246, Final Office Action mailed Dec. 28, 2009", , 35 pgs.

"U.S. Appl. No. 11/422,797, Final Office Action mailed Dec. 29, 2009", , 30 Pgs.

"U.S. Appl. No. 11/282,120", U.S. Appl. No. 11/282,120 *Notice of Allowance and Fees Due* , all.

"U.S. Appl. No. 11/335,904", U.S. Appl. No. 11/335,904 / *Late receipt of OA/References from Webb* , all.

"U.S. Appl. No. 11/337,112", U.S. Appl. No. 11/337,112 / *Late receipt of OA/References from Webb* , all.

"U.S. Appl. No. 11/355,915, Notice of Allowance mailed Feb. 24, 2010", , 14.

"U.S. Appl. No. 11/413,273, Non-Final Office Action mailed Feb. 26, 2010", , 44.

"U.S. Appl. No. 11/414,740, Non-Final Office Action mailed Mar. 1, 2010", , 45 PgS.

"U.S. Appl. No. 11/553,598, NFOA", U.S. Appl. No. 11/553,598, filed Aug. 4, 2009 , 1-14.

"U.S. Appl. No. 11/335,900; FOA", U.S. Appl. No. 11/335,900, filed Feb. 24, 2010 , 11.

"U.S. Appl. No. 11/336,432", U.S. Appl. No. 11/336,432, filed Dec. 9, 2009 , 1-12.

"U.S. Appl. No. 11/337,234", U.S. Appl. No. 11/337,234, filed Jan. 8, 2010 , 1-13.

"U.S. Appl. No. 11/382,260", U.S. Appl. No. 11/382,260, filed Aug. 4, 2009 , 1-20.

"U.S. Appl. No. 12/795,860 NFOA", U.S. Appl. No. 12/705,860, filed Mar. 10, 2011 , all.

"U.S. Appl. No. 12/905,271, NFOA, Jan. 31, 2011", U.S. Appl. No. 12/905,271, filed Jan. 31, 2011 , all.

"U.S. Appl. No. 11/274,884 Final OA Apr. 1, 2011", U.S. Appl. No. 11/274,884, filed Apr. 1, 2011 , all.

"U.S. Appl. No. 11/387,147, Notice of Allowance mailed Feb. 4, 2011", , 12.

"U.S. Appl. No. 11/929,272, Non-Final Office Action mailed Nov. 5, 2010", , 41.

"U.S. Appl. No. 11/271,164, Final Office Action mailed Mar. 18, 2011", , 20.

"U.S. Appl. No. 11/382,237 Non-Final Office Action mailed Apr. 29, 2009", U.S. Appl. No. 11/382,237, 30 pgs.

"U.S. Appl. No. 11/267,940_FOA", U.S. Appl. No. 11/267,940, (Jan. 7, 2009),1-12.

"U.S. Appl. No. 11/268,671, Non-Final Office Action mailed Aug. 15, 2008", U.S. Appl. No. 11/268,671, Notice of References Cited,(Apr. 7, 2009),1.

"U.S. Appl. No. 11/282,120", U.S. Appl. No. 11/282,120, Non Final Office Action,(May 12, 2009),all.

"U.S. Appl. No. 11/336,432_FOA", U.S. Appl. No. 11/336,432, Final Office Action,(Apr. 16, 2009), 1-15.

"U.S. Appl. No. 11/347,826_FOA", U.S. Appl. No. 11/347,826, Final Office Action,(Apr. 29, 2009),1-11.

"U.S. Appl. No. 11/414,168_FOA", U.S. Appl. No. 11/414,168, Final Rejection Action,(Apr. 28, 2009).

"U.S. Appl. No. 11/382,226", Serial No. 11/3825,226 042709, Non Final Office Action,(Apr. 27, 2009),1-13.

"U.S. Appl. No. 11/382,257_NFOA", U.S. Appl. No. 11/382,257, NFOA,(May 28, 2009),all.

"U.S. Appl. No. 11/382,260_FOA", U.S. Appl. No. 11/382,260, Final Office Actrion,(Dec. 29, 2008),all.

"U.S. Appl. No. 11/382,696_FOA", U.S. Appl. No. 11/382,696, Final Rejection Action,(Apr. 15, 2009),all.

NFOA, "U.S. Appl. No. 11/553,626", U.S. Appl. No. 11/553,626, (Jun. 1, 2009),all.

NFOA, "U.S. Appl. No. 11/553,626", U.S. Appl. No. 11/553,626, (Oct. 15, 2008),all.

NFOA, "U.S. Appl. No. 11/553,587", U.S. Appl. No. 11/553,587, NFOA,(May 12, 2009),all.

"U.S. Appl. No. 12/400,166, Non-Final Office Action, Jun. 28, 2011", Jun. 28, 2011 , 1-23.

"U.S. Appl. No. 12/976,584", filed May 5, 2011 , all.

"U.S. Appl. No. 11/267,940", filed Apr. 15, 2011 , all.

"PCT/US2010/026633 ISR", Documentation not provided, search documents in Korean. Oct. 28, 2010 , all.

"U.S. Appl. No. 11/929,308", filed Apr. 19, 2011.

"U.S. Appl. No. 11/337,112, Non-Final Office Action mailed Jun. 8, 2011", , 24.

"U.S. Appl. No. 11/382,262, Non-Final Office Action mailed Jun. 7, 2011", , 34.

"U.S. Appl. No. 11/382,618, Non-Final Office Action mailed May 24, 2011", , 11.

"U.S. Appl. No. 11/928,937, Notice of Allowance mailed Jun. 14, 2011", , 19.

"U.S. Appl. No. 12/400,153, Non-Final Office Action mailed Jun. 22, 2011", , 46.

"U.S. Appl. No. 12/762,036, Notice of Allowance mailed May 9, 2011", , 5.

"U.S. Appl. No. 12/905,197, Notice of Allowance mailed May 5, 2011", , 8.

"U.S. Appl. No. 11/928,960, Final Office Action mailed Apr. 27, 2011", , 74.

"U.S. Appl. No. 11/929,039, Final Office Action mailed Jun. 24, 2011", , 21 pgs.

"U.S. Appl. No. 12/576,887, Final Office Action mailed Jun. 3, 2011", , 63.

NPL, "Unisource in GSM trial of Mobile Electronic banking and shopping", *Mobile Communications*, (Mar. 20, 1997).

OA, "Office Action", U.S. Appl. No. 11/337,233, (Jan. 9, 2008),all.

OA, "Office Action", U.S. Appl. No. 11/337,180, (Dec. 12, 2007),all.

OA, "Office Action", U.S. Appl. No. 11/347,825, (Apr. 25, 2008),all.

OA, "Office Action", U.S. Appl. No. 11/335,900, (Dec. 28, 2007),all.

OA, "Office Action", U.S. Appl. No. 11/335,904, (Dec. 31, 2007),all.

OA, "Office Action", U.S. Appl. No. 11/336,432, (Dec. 10, 2007),all.

OA, "Office Action", U.S. Appl. No. 11/337,112, (Dec. 5, 2007),all.

OA, "Office Action", U.S. Appl. No. 11/347,842, (Mar. 13, 2008),all.

ISR, "PCT//US06/35976_092407", US Patent Application No. PCT/US06/35976, International Search Report,(Sep. 24, 2007).

Intl Searching Authority, "International Search Report", For US Patent Application No. PCT/US07/82754, mailed on Mar. 13, 2008.

"U.S. Appl. No. 11/382,262,Final Office Action mailed Aug. 7, 2009", 11.

"U.S. Appl. No. 11/268,671 FOA, Sep. 2, 2010", U.S. Appl. No. 11/268,671, filed Sep. 2, 2010 , 1-11.

"U.S. Appl. No. 11/382,676 NFOA Apr. 29, 2010", Apr. 29, 2010 , all.

"U.S. Appl. No. 11/382,696 FOA", Jul. 6, 2010 , all.

"U.S. Appl. No. 11/271,164, Non-Final Office Action mailed Jun. 23, 2010", , 4 Pgs.

"U.S. Appl. No. 11/274,884, Non-Final Office Action mailed Jul. 20, 2010", OARN , 46.

"U.S. Appl. No. 11/382,246, Non-Final Office Action mailed Jul. 22, 2010", , 22.

"U.S. Appl. No. 11/928,847, Non-Final Office Action mailed Aug. 4, 2010", U.S. Appl. No. 11/928,847 , 39 pgs.

"U.S. Appl. No. 11/928,960, Non-Final Office Action mailed Aug. 5, 2010", , 40.

"U.S. Appl. No. 11/929,039, Non-Final Office Action mailed Sep. 30, 2010", , 41 pgs.

"U.S. Appl. No. 11/929,081, Non-Final Office Action mailed Sep. 29, 2010", , 43.

"U.S. Appl. No. 11/929,105 , Non-Final Office Action mailed Aug. 19, 2010", , 40.

"U.S. Appl. No. 11/929,148, Non-Final Office Action mailed Aug. 26, 2010", , 47.

"U.S. Appl. No. 11/929,308, Non-Final Office Action mailed Aug. 4, 2010"42 pgs.

"U.S. Appl. No. 12/533,689, Non-Final Office Action mailed Sep. 8, 2010"25 pgs.

"U.S. Appl. No. 11/553,659, Non-Final Office Action mailed Sep. 29, 2010".

"U.S. Appl. No. 11/929,016, Non-Final Office Action mailed Sep. 30, 2010", , 39 pgs.

"U.S. Appl. No. 11/383,511 Non-Final Office Action", Aug. 19, 2010 , all.

"U.S. Appl. No. 11/929,059", U.S. Appl. No. 11/929,059, filed Sep. 23, 2010 , all.

"U.S. Appl. No. 11/553,598, FOA,", Apr. 27, 2010 , all.
"U.S. Appl. No. 11/335,900", Notice of Allowance Rec'd Jun. 11, 2010 , all.
"U.S. Appl. No. 11/335,900", Issue Fee Paid Jun. 11, 2010, all.
"U.S. Appl. No. 11/336,432 Non-Final Office Action, Jun. 9, 2010", , all.
"U.S Appl. No. 11/347,825, FOA, May 25, 2010", , all.
"U.S Appl. No. 12/483,790 NFOA, 062110", , all
"Business Editors/High-Tech Writers", *Business 2.0 Uses Internet Keywords to Link Magazine Readers to Online Content;U Publication Integrates Internet Keywords Within Content, Easing Information Gathering for Readers*. Business Wire Sep. 26, 2000 , p. 1.
"U.S Appl. No. 11/382,243 Notice of Appeal", Jun. 15, 2010 , all.
FOA, , "U.S Appl. No. 11/274,905 FOA May 27, 2010".
FOA, "U.S Appl. No. 11/382,618 May 28, 2010".
FOA, "U.S Appl. No. 11/553,713 May 26, 2010".
NFOA, "U.S Appl. No. 11/929,253 Jun. 10, 2010".
"U.S. Appl. No. 11/274,933, Non-Final Office Action mailed Sep. 9, 2009", 32 Pgs.
"U.S. Appl. No. 11/355,915", *NFOA*, July. 9, 2009, 1-11.
"U.S. Appl. No. 11/337,234, Non-Final Office Action mailed Oct. 15, 2008", 1-18.
"U.S. Appl. No. 11/422,797", *NFOA*, Mar. 18, 2009, 1-29.
"U.S. Appl. No. 11/382,249", *NFOA*, Jun. 11, 2009 all.
"U.S. Appl. No. 11/382,676", *NFOA*, Aug. 14, 2009, 1-29.
"U.S. Appl. No. 11/268,671 FOA Oct. 27, 2009", all.
"The Popularity of 'Get It Now' from Verizon Soars as Customers Download 12 million Applications", *Verizon Wireless*, (Jun. 5, 2003),all.
"U.S. Appl. No. 11/335,900", U.S. Appl. No. 11/335,900, (Sep. 16, 2009),all.
"Using Your Treo 600 Smartphone by PalmOne", *Includes setup information and instructions for most tasks*, 2004, 1-174.
"U.S. Appl. No. 11/382,684", U.S. Appl. No. 11/382,684, all.
"Nokia gives cell phones new address", *by Ben Charny Posted on ZDNet News*: Nov 5, 2003 8:31:00 PM.
"Nokia 9500 Communicator User Guide", *Nokia Corporation*, 2005.
""AdWords" Wikipedia Article, revised Oct. 25, 2005", accessed via http://www.wikipedia.org/ History tab, (Oct. 25, 2005),all.
"U.S. Appl. No. 11/387,147, Final Office Action mailed Oct. 22, 2009", 26.
"U.S. Appl. No. 11/928,877, Non-Final Office Action", Nov. 4, 2010 , all.
"U.S. Appl. No. 11/928,819, Non-Final Office Action mailed Nov. 10, 2010", , 40.
"U.S. Appl. No. 11/929,129, Non-Final Office Action mailed Nov. 26, 2010", , 51.
"U.S. Appl. No. 11/929,328, Non-Final Office Action mailed Nov. 19, 2010", , 38.
"U.S. Appl. No. 11/337,234, Final Rejection, Sep. 22, 2010", all.
"U.S. Appl. No. 11/414,740 Final Rejection", Oct. 13, 2010 , 1-13.
"U.S. Appl. No. 11/928,937 NFOA", Sep. 30, 2010, all.
"U.S. Appl. No. 11/929,171; NFOA,", Nov. 5, 2010, all.
"U.S. Appl. No. 11/274,933, NFOA, 062011", Jun. 20, 2011 , 1-18.
"U.S. Appl. No. 11/382,243, NOA & Fees Due, Jul. 13, 2011", U.S. Appl. No. 11/382,243 Notice of Allowance and Fees Due , 31 pages.
"U.S. Appl. No. 11/928,877, Final Office Action mailed Jul. 22, 2011", , 19.
"U.S. Appl. No. 11/268,671, Notice of Allowance Mailed Aug. 15, 2011", , 19.
"U.S. Appl. No. 11/928,819, Final Office Action mailed Jul. 20, 2011", , 18.
"U.S. Appl. No. 11/928,909, Final Office Action mailed Aug. 11, 2011", , 15.
"U.S. Appl. No. 11/928,990, Final Office Action mailed Aug. 2, 2011", , 43.
"U.S. Appl. No. 11/929,129, Final Office Action mailed Aug. 10, 2011", , 18.
"U.S. Appl. No. 11/929,272, Non-Final Office Action mailed Jul. 18, 2011", U.S. Appl. No. 11/929,272 , 20.
"U.S. Appl. No. 11/929,328, Notice of Allowance mailed Jul. 29, 2011", , 24.
"U.S. Appl. No. 12/134,033, Non Final Office Action mailed Jul. 21, 2011", , 50.
"U.S. Appl. No. 12/400,166, Non-Final Office Action mailed Jun. 28, 2011", , 57.
"U.S. Appl. No. 12/483,790, Notice of Allowance mailed Aug. 17, 2011", , 25.
"U.S. Appl. No. 12/847,624, Notice of Allowance mailed Jul. 25, 2011", , 19.
"U.S. Appl. No. 11/929,016, Final Office Action mailed Jul. 13, 2011", U.S. Appl. No. 11/929,016 , 23.
"U.S. Appl. No. 11/929,081, Final Office Action mailed Jun. 28, 2011", U.S. Appl. No. 11/929,081 , 26.
"U.S. Appl. No. 11/929,171, Final Office Action mailed Jul. 6, 2011", U.S. Appl. No. 11/929,171 , 39.
Foong, Cynthia Wong Kwai, "Mobile Device Agents for Delivering Context Aware Information in Targeted Advertising", retrieved on Jul. 2004, 148 pages, online available at <http://library.must.edu.my/v3/Catalog-Databases/MUST-Theses/2004/General/Cynthia-FinalThesis.pdf>.

* cited by examiner

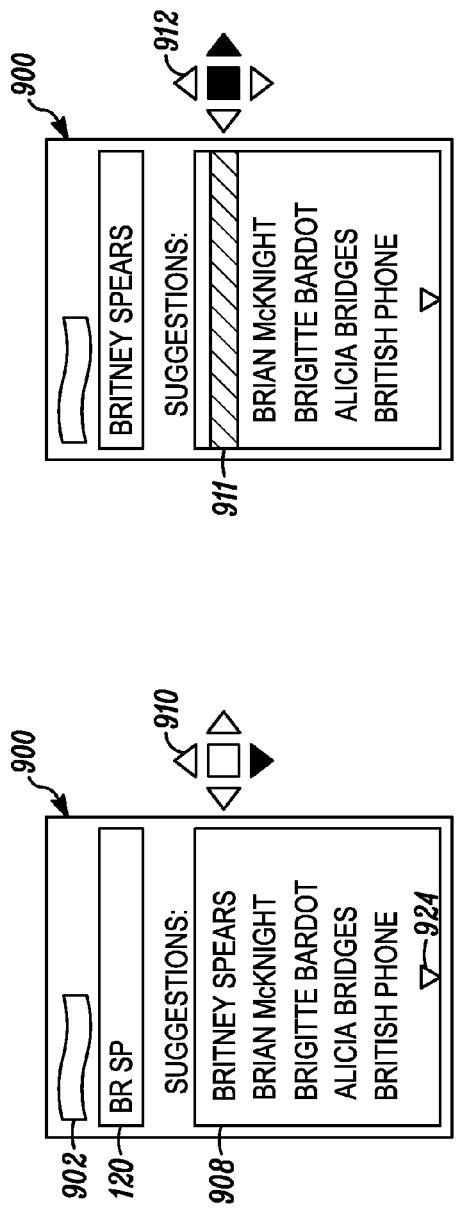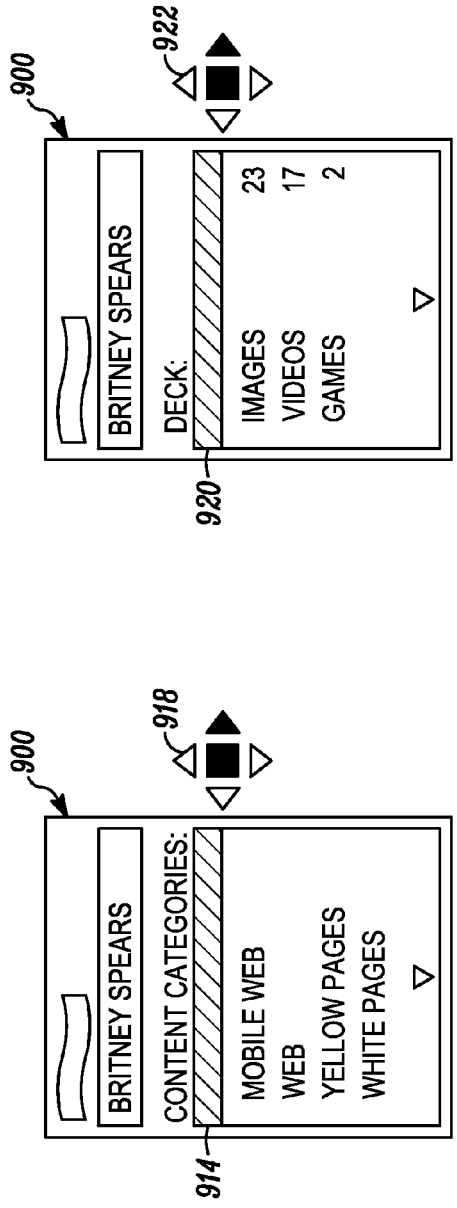

| ADSPOTS LIST | ADPROVIDERS LIST | CORE SETUP | KSP SETUP | DEVICE PROFILES | SEARCH |

AD SPOT

IN IT'S SIMPLEST FORM AN AD SPOT REPRESENTS A LOCATION ON A PAGE TO DISPLAY ADS. IT IS A COLLECTION OF INFORMATION THAT DESCRIBES WHAT AD PROVIDERS, AD TYPES, YIELD OPTIMIZATION ALGORITHM, MERGING ALGORITHM, AND FIXED ATTRIBUTES MAY BE USED TO SERVE UP ADS. AN AD SPOT IN THE MONETIZATION PLATFORM IS A DESIGN TIME TEMPLATE THAT IS MERGED WITH THE REQUEST PARAMETERS DURING RUNTIME TO EXECUTE AD SEARCH QUERIES

ADVICE: IF YOU CHANGE THE AD TYPES OF THE AD SPOT, IT MAY NOT MATCH WITH THE AD PROVIDERS

| NAME | MST_HOME_BANNER_TOP |
| DESCRIPTION | HOME PAGE BANNER SPOT |
| REQUIRED ADS | ☐ |
| DEFAULT AD PROVIDER | CHOOSE ONE ▷ |
| OFFLINE | ☐ |
| ADULT CONTENT | ALLOWED ▷ |
| LISTING TYPE | BID ▷ |
| AD LIMIT | 10 |

○ SERVICE STATUS  ⊗ LOGOUT

*FIG. 34*

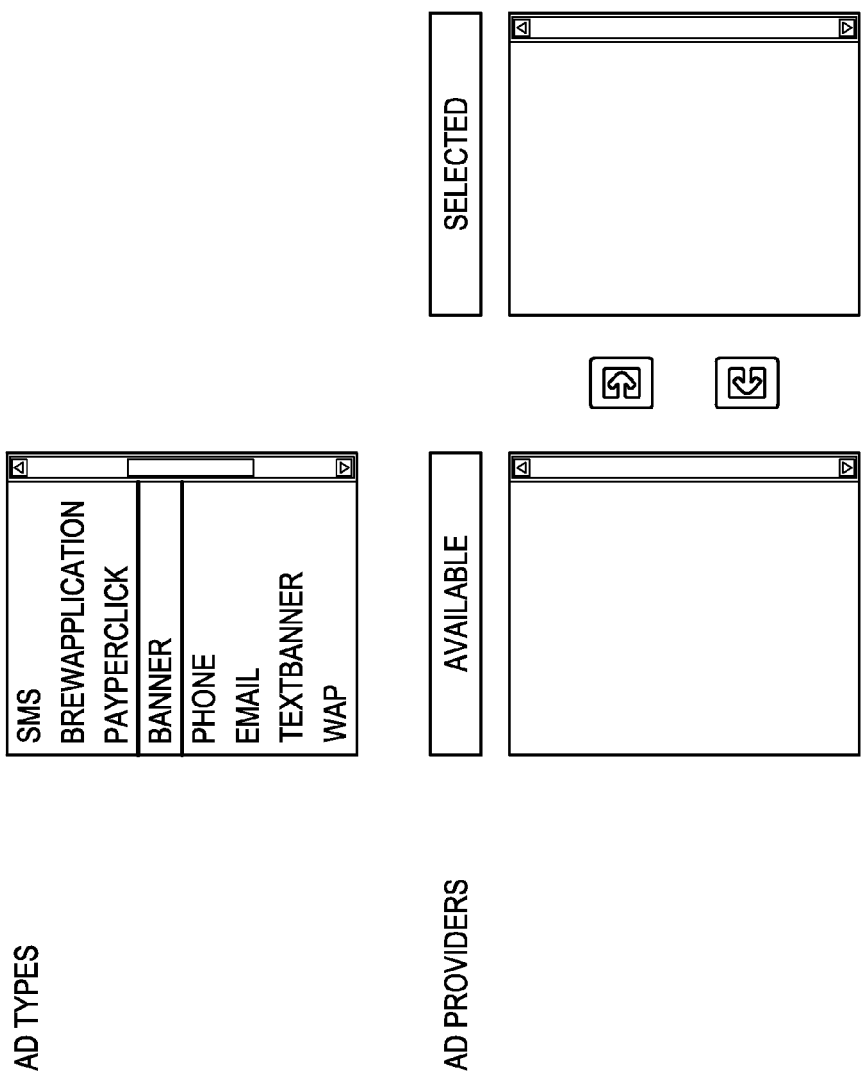

AD PROVIDER PROXY PARAMETERS

CERTAIN AD PROVIDERS EXPOSE PARAMETERS THAT SHOULD BE CONFIGURED FOR EACH AD SPOT. YOU CAN USE THE CONTROL BELOW TO ADD PARAMETERS AND DELETE THEM FROM THE TABLE. THE TABLE SHOWS CURRENTLY SELECTED AD PROVIDER'S PARAMETERS. GRAY LINES INDICATE PARAMETERS THAT WILL NOT BE SUBMITTED, AS THEIR AD PROVIDER IS NOT SELECTED. PARAMETERS WITH LANGUAGE "*" ARE MANDATORY AND CANNOT BE DELETED IF THEIR AD PROVIDER IS SELECTED

PROVIDERS [CHOOSE ONE ▽]   VALUE [        ]   TYPE [        ]
PARAMETERS [CHOOSE ONE ▽]   LANGUAGE [        ]   REQUIRED

[ADD PARAMETER]

SHOWING 1 TO 6 OF 6                                                                 << <1> >>

| ADPROVIDER NAME | LANGUAGE | PARAMETER NAME | VALUE | REQUIRED | TYPE | ACTION |
|---|---|---|---|---|---|---|
|  | * | -FORMAT | XHTML | TRUE | STRING | EDIT |
|  | * | -INTERSTITIAL | FALSE | TRUE | BOOLEAN | EDIT |
|  | * | -PUBLISHER-ID | 3808 | TRUE | INTEGER | EDIT |
|  | * | -SERVERURL | HTTP://AD.M-ADX.COM/AD/ | TRUE | URL | EDIT |
|  | * | -SPOT-ID | 38081106 | TRUE | INTEGER | EDIT |
|  | * | -TIMEOUT | 1000 | TRUE | INTEGER | EDIT |

SIMPLE PARAMETERS

THESE ARE AD SPOT'S COMMON PARAMETERS. YOU MAY ADD AND DELETE THEM AT WILL. IT IS IMPORTANT THAT YOU HIT THE "SUBMIT" BUTTON WHEN YOU ARE FINISHED TO UPDATE OR CREATE THE AD SPOT

| NAME | LANGUAGE | VALUE |
|---|---|---|
| ☐ DP-LOC | * | * |
| ☐ DP-TRAFFICPARTNER | * | * |

NEW PARAMETER    DELETE CHECKED

[SUBMIT]

*FIG. 36*

REVENUE MODELS ASSOCIATED WITH SYNDICATION OF A BEHAVIORAL PROFILE USING A MONETIZATION PLATFORM

CROSS-REFERENCE TO RELATED APPLICATIONS

This application claims the benefit of the following commonly-owned U.S. Provisional Patent Applications, each of which is incorporated herein by reference in its entirety: App. No. 61/037,617 filed on Mar. 18, 2008 and entitled "PRESENTING CONTENT TO A MOBILE COMMUNICATION FACILITY BASED ON CONTEXTUAL AND BEHAVIORAL DATA RELATING TO A PORTION OF A MOBILE CONTENT," and App. No. 61/052,024 filed on May 9, 2008 and entitled "MONETIZATION PLATFORM."

This application is a continuation-in-part, and claims the benefit, of each of the following commonly owned U.S. patent applications, each of which is incorporated herein by reference in its entirety: U.S. application Ser. No. 11/267,940 filed on Nov. 5, 2005 and entitled "MANAGING SPONSORED CONTENT FOR DELIVERY TO MOBILE COMMUNICATION FACILITIES", U.S. application Ser. No. 11/268,671 filed on Nov. 5, 2005 now U.S. Pat. No. 8,103,545 and entitled "MANAGING PAYMENT FOR SPONSORED CONTENT PRESENTED TO MOBILE COMMUNICATION FACILITIES", U.S. application Ser. No. 11/271,164 filed on Nov. 11, 2005 and entitled "MANAGING SPONSORED CONTENT BASED ON DEVICE CHARACTERISTICS", U.S. application Ser. No. 11/274,933 filed on Nov. 14, 2005 and entitled "PRESENTATION OF SPONSORED CONTENT ON MOBILE COMMUNICATION FACILITIES", U.S. application Ser. No. 11/274,905 filed on Nov. 14, 2005 and entitled "MANAGING SPONSORED CONTENT BASED ON GEOGRAPHIC REGION", U.S. application Ser. No. 11/274,884 filed on Nov. 14, 2005 and entitled "MANAGING SPONSORED CONTENT BASED ON TRANSACTION HISTORY", U.S. application Ser. No. 11/282,120 filed on Nov. 16, 2005 now U.S. Pat. No. 7,660,581 and entitled "MANAGING SPONSORED CONTENT BASED ON USAGE HISTORY", U.S. application Ser. No. 11/281,902 filed on Nov. 16, 2005 and entitled "MANAGING SPONSORED CONTENT BASED ON USER CHARACTERISTICS", U.S. application Ser. No. 11/335,900 filed on Jan. 18, 2006 now U.S. Pat. No. 7,769,764 and entitled "MOBILE ADVERTISEMENT SYNDICATION", U.S. application Ser. No. 11/335,904 filed on Jan. 19, 2006 now U.S. Pat. No. 7,752,209 and entitled "PRESENTING SPONSORED CONTENT ON A MOBILE COMMUNICATION FACILITY", U.S. application Ser. No. 11/337,233 filed on Jan. 19, 2006 now U.S. Pat. No. 7,603,360 and entitled "LOCATION INFLUENCED SEARCH RESULTS", U.S. application Ser. No. 11/337,234 filed on Jan. 19, 2006 and entitled "MOBILE COMMUNICATION FACILITY CHARACTERISTIC INFLUENCED SEARCH RESULTS", U.S. application Ser. No. 11/336,432 filed on Jan. 19, 2006 now U.S. Pat. No. 7,860,871 and entitled "USER HISTORY INFLUENCED SEARCH RESULTS", U.S. application Ser. No. 11/337,180 filed on Jan. 19, 2006 now U.S. Pat. No. 7,577,665 and entitled "USER CHARACTERISTIC INFLUENCED SEARCH RESULTS", U.S. application Ser. No. 11/337,112 filed on Jan. 19, 2006 and entitled "USER TRANSACTION HISTORY INFLUENCED SEARCH RESULTS", U.S. application Ser. No. 11/347,826 filed on Feb. 3, 2006 and entitled "PREVENTING MOBILE COMMUNICATION FACILITY CLICK FRAUD", U.S. application Ser. No. 11/347,825 filed on Feb. 3, 2006 now abandoned and entitled "SEARCH QUERY ADDRESS REDIRECTION ON A MOBILE COMMUNICATION FACILITY", U.S. application Ser. No. 11/347,842 filed on Feb. 3, 2006 now abandoned and entitled "MULTI-MODAL SEARCH QUERY PROCESSING", U.S. application Ser. No. 11/355,915 filed on Feb. 16, 2006 now U.S. Pat. No. 7,702,318 and entitled "PRESENTATION OF SPONSORED CONTENT BASED ON MOBILE TRANSACTION EVENT", U.S. application Ser. No. 11/387,147 filed on Mar. 21, 2006 now U.S. Pat. No. 7,912,458 and entitled "INTERACTION ANALYSIS AND PRIORITIZATION OF MOBILE CONTENT," U.S. application Ser. No. 11/413,273 filed on Apr. 27, 2006 now abandoned and entitled "CALCULATION AND PRESENTATION OF MOBILE CONTENT EXPECTED VALUE" (which claims the benefit of App. No. 60/717,151 filed on Sep. 14, 2005 and entitled "SEARCH CAPABILITIES FOR MOBILE COMMUNICATIONS DEVICES", App. No. 60/720,193 filed on Sep. 23, 2005 and entitled "MANAGING WEB INTERACTIONS ON A MOBILE COMMUNICATION FACILITY", App. No. 60/731,991 filed on Nov. 1, 2005 and entitled "MOBILE SEARCH", and App. No. 60/785,242 filed on Mar. 22, 2006 and entitled "AUTOMATED SYNDICATION OF MOBILE CONTENT"), U.S. application Ser. No. 11/414,168 filed on Apr. 27, 2006 now U.S. Pat. No. 7,676,394 and entitled "DYNAMIC BIDDING AND EXPECTED VALUE", U.S. application Ser. No. 11/414,740 filed on Apr. 27, 2006 now abandoned and entitled "EXPECTED VALUE AND PRIORITIZATION OF MOBILE CONTENT", U.S. application Ser. No. 11/382,226 filed on May 8, 2006 now abandoned and entitled "MOBILE SEARCH SUBSTRING QUERY COMPLETION", U.S. application Ser. No. 11/382,237 filed on May 8, 2006 now abandoned and entitled "IMPLICIT SEARCHING FOR MOBILE CONTENT", U.S. application Ser. No. 11/382,243 filed on May 8, 2006 now U.S. Pat. No. 8,229,914 and entitled "MOBILE CONTENT SPIDERING AND COMPATIBILITY DETERMINATION", U.S. application Ser. No. 11/382,246 filed on May 8, 2006 now abandoned and entitled "CREATION OF A MOBILE SEARCH SUGGESTION DICTIONARY", U.S. application Ser. No. 11/382,249 filed on May 8, 2006 now abandoned and entitled "MOBILE PAY-PER-CALL CAMPAIGN CREATION", U.S. application Ser. No. 11/382,257 filed on May 8, 2006 now abandoned and entitled "MOBILE SEARCH SUGGESTIONS", U.S. application Ser. No. 11/382,260 filed on May 8, 2006 and entitled "AUTHORIZED MOBILE CONTENT SEARCH RESULTS", U.S. application Ser. No. 11/382,262 filed on May 8, 2006 and entitled "INCREASING MOBILE INTERACTIVITY", U.S. application Ser. No. 11/382,618 filed on May 10, 2006 and entitled "MOBILE COMPARISON SHOPPING", U.S. application Ser. No. 11/382,637 filed on May 10, 2006 now abandoned and entitled "MOBILE SEARCH RESULT CLUSTERING", U.S. application Ser. No. 11/382,648 filed on May 10, 2006 now abandoned and entitled "MOBILE SEARCH SERVICE DISCOVERY", U.S. application Ser. No. 11/382,676 filed on May 10, 2006 now abandoned and entitled "BEHAVIORAL INSTRUMENTATION OF A MOBILE SEARCH APPLICATION", U.S. application Ser. No. 11/382,684 filed on May 10, 2006 now abandoned and entitled "MOBILE SEARCH SERVICE INSTANT ACTIVATION", U.S. application Ser. No. 11/382,690 filed on May 10, 2006 now abandoned and entitled "PHYSICAL NAVIGATION OF A MOBILE SEARCH APPLICATIONS", U.S. application Ser. No. 11/382,696 filed on May 10, 2006 now abandoned and entitled "MOBILE SEARCH SERVICES RELATED TO DIRECT IDENTIFIERS", U.S. application Ser. No. 11/383,236 filed on May 15, 2006 now abandoned and entitled "LOCATION BASED PRESENTATION OF MOBILE CONTENT", U.S. application Ser. No. 11/383,511 filed on May 16, 2006 now abandoned and entitled "MOBILE CAMPAIGN CREATION", U.S. application Ser. No. 11/422,797 filed on Jun. 7, 2006 now abandoned and entitled "PREDICTIVE TEXT COMPLETION FOR A MOBILE COMMUNICATION FACILITY," U.S. application Ser. No. 11/553,567 filed on Oct. 27, 2006 now U.S. Pat. No. 7,548,915 and entitled "CONTEXTUAL MOBILE CONTENT PLACEMENT ON A MOBILE COMMUNICATION FACILITY," U.S. application Ser. No. 11/553,587 filed on Oct. 27, 2006 now abandoned and entitled "MOBILE CONTENT CROSS-INVENTORY YIELD OPTIMIZATION," U.S. application Ser. No. 11/553,598 filed on Oct. 27, 2006 now abandoned and entitled "MOBILE PAY PER CALL," U.S. application Ser. No. 11/553,626 filed on Oct. 27, 2006 now abandoned and entitled "MOBILE WEBSITE ANALYZER," U.S. application Ser. No. 11/553,569 filed on Oct. 27, 2006 now abandoned and entitled "ACTION FUNCTIONALITY FOR MOBILE CONTENT SEARCH RESULTS," U.S. application Ser. No. 11/553,659 filed on Oct. 27, 2006 now abandoned and entitled "CLIENT LIBRARIES FOR MOBILE CONTENT," U.S. application Ser. No. 11/553,713 filed on Oct. 27, 2006 and entitled "ON-OFF HANDSET SEARCH BOX," U.S. application Ser. No. 11/553,746 filed on Oct. 27, 2006 now abandoned and entitled "COMBINED ALGORITHMIC AND EDITORIAL-REVIEWED MOBILE CONTENT SEARCH RESULTS," U.S. application Ser. No. 11/928,819 filed on Oct. 30, 2007 now abandoned and entitled "TARGETING MOBILE SPONSORED CONTENT WITHIN A SOCIAL NETWORK" (which claims the benefit of App. No. 60/946,132 filed on Jun. 25, 2007 and entitled "BUSINESS STREAM: EXPLORING NEW ADVERTISING OPPORTUNITIES AND AD FORMATS," and App. No. 60/968,188 filed on Aug. 27, 2007 and entitled "MOBILE CONTENT SEARCH"), U.S. application Ser. No. 11/928,847 filed on Oct. 30, 2007 now abandoned and entitled "SIMILARITY BASED LOCATION MAPPING OF MOBILE COMM FACILITY USERS," U.S. application Ser. No. 11/928,877 filed on Oct. 30, 2007 and entitled "USING WIRELESS CARRIER DATA TO INFLUENCE MOBILE SEARCH RESULTS," U.S. application Ser. No. 11/928,909 filed on Oct. 30, 2007 now abandoned and entitled "EMBEDDING A NONSPONSORED MOBILE CONTENT WITHIN A SPONSORED MOBILE CONTENT," U.S. application Ser. No. 11/928,937 filed on Oct. 30, 2007 now U.S. Pat. No. 8,027,879 and entitled "EXCLUSIVITY BIDDING FOR MOBILE SPONSORED CONTENT," U.S. application Ser. No. 11/928,960 filed on Oct. 30, 2007 and entitled "IDLE SCREEN ADVERTISING," U.S. application Ser. No. 11/928,990 filed on Oct. 30, 2007 and entitled "INTERACTIVE MOBILE ADVERTISEMENT BANNERS," U.S. application Ser. No. 11/929,016 filed on Oct. 30, 2007 and entitled "LOCATION BASED MOBILE SHOPPING AFFINITY PROGRAM," U.S. application Ser. No. 11/929,039 filed on Oct. 30, 2007 and entitled "USING A MOBILE COMMUNICATION FACILITY FOR OFFLINE AD SEARCHING," U.S. application Ser. No. 11/929,059 filed on Oct. 30, 2007 now abandoned and entitled "METHODS AND SYSTEMS FOR MOBILE COUPON PLACEMENT," U.S. application Ser. No. 11/929,081 filed on Oct. 30, 2007 and entitled "REALTIME SURVEYING WITHIN MOBILE SPONSORED CONTENT," U.S. application Ser. No. 11/929,096 filed on Oct. 30, 2007 and entitled "METHODS AND SYSTEMS FOR MOBILE COUPON TRACKING," U.S. application Ser. No. 11/929,105 filed on Oct. 30, 2007 now abandoned and entitled "METHODS AND SYSTEMS OF MOBILE DYNAMIC CONTENT PRESENTATION," U.S. application Ser. No. 11/929,129 filed on Oct. 30, 2007 now abandoned and entitled "MOBILE USER PROFILE CREATION BASED ON USER BROWSE BEHAVIORS," U.S. application Ser. No. 11/929,148 filed on Oct. 30, 2007 now abandoned and entitled "METHODS AND SYSTEMS OF MOBILE QUERY CLASSIFICATION," U.S. application Ser. No. 11/929,171 filed on Oct. 30, 2007 and entitled "ASSOCIATING MOBILE AND NONMOBILE WEB CONTENT," U.S. application Ser. No. 11/929,253 filed on Oct. 30, 2007 now abandoned and entitled "COMBINING MOBILE AND TRANSCODED CONTENT IN A MOBILE SEARCH RESULT," U.S. application Ser. No. 11/929,272 filed on Oct. 30, 2007 now abandoned and entitled "INTEGRATING SUBSCRIPTION CONTENT INTO MOBILE SEARCH RESULTS," U.S. application Ser. No. 11/929,297 filed on Oct. 30, 2007 now abandoned and entitled "MOBILE COMMUNICATION FACILITY USAGE AND SOCIAL NETWORK CREATION," U.S. application Ser. No. 11/929,308 filed on Oct. 30, 2007 now U.S. Pat. No. 8,195,133 and entitled "MOBILE DYNAMIC ADVERTISEMENT CREATION AND PLACEMENT," and U.S. application Ser. No. 11/929,328 filed on Oct. 30, 2007 now U.S. Pat. No. 8,131,271 and entitled "CATEGORIZATION OF A MOBILE USER PROFILE BASED ON BROWSE BEHAVIOR."

FIELD OF THE INVENTION

This disclosure relates to the field of mobile communications and more particularly to improved methods and systems for a monetization platform associated with a telecommunications network.

BACKGROUND

Online advertising driven by Web-based search engines has proven to be one of the most significant uses of computer networks such as the Internet. However, Internet-based advertising techniques are currently unable to optimally target and deliver content, such as advertisements, for a mobile communication facility because these techniques are specifically designed for the Internet and not mobile uses, and fail to take advantage of unique data assets derived from telecommunications and fixed mobile convergence networks. Therefore, a need exists for a monetization platform associated with telecommunications networks and fixed mobile convergence applications that is enabled to select and target advertising content that is available from across a plurality of advertising inventories.

SUMMARY

In embodiments, the present invention may provide a method and system for using a monetization platform to receive, analyze, select, aggregate, and deliver behavioral data and other data that may be associated with wireless subscribers, to an ad server, publisher, or some other party that may use the data for a commercial purpose (e.g., targeting mobile content for display to mobile communication facilities). Datasets used by the monetization platform may come from a plurality of sources, such as a wireless operator, publisher, or a third party source (e.g., a commercial consumer database). In embodiments, the monetization platform may associate other data, metadata, or business rules with the user behavioral data, including but not limited to an availability condition, access grant, financial consideration, or some other type of conditional grant of use. The grant of use to the behavioral, or other type of data may be conditionally determined by the monetization platform, wireless operator, or some third party (e.g., such as a commercial dataset that may be used to enrich behavioral data within the monetization platform, but carries terms of use specified by the commercial dataset provider). In embodiments, the conditional grant to use the data that is delivered by the monetization platform may be based on a financial consideration that is shared, exchanged, and/or transacted between the parties, such as a wireless operator, ad network, publisher, or some other third party, and is based at least in part on access and/or use of the data. In other cases, the conditional grant may be based on a time period for use or based on other considerations.

In embodiments, the wireless operator data, behavioral data, and other data (e.g., demographic or geographic data relating to a user of a mobile communication facility) may be accessible to a third party (e.g., an ad network, publisher, or some other content provider) through the monetization platform server. The monetization platform server may receive ad network requests, publisher requests, operator requests, or some other third party requests for mobile subscriber data (e.g., a wireless user behavioral profile, demographic profile, geographic profile, or some other type of user data). As a condition for allowing access to the data, the monetization platform may require that a financial consideration be provided by or on behalf of the requesting ad network, publisher, wireless operator, or some other party. The financial consideration may be a flat fee, a fixed amount, variable amount, impression-based (e.g., cost per thousand impression, or CPM), cost-per-click (CPC), cost-per-action (CPA), time-based, based on a shared revenue of user transactions, shared with a wireless operator whose data is being accessed, shared with a publisher, shared with an ad network, or otherwise arranged.

In embodiments, the data that may be accessed by the ad network, ad server, publisher, or third party may be stored separate from the wireless operator, or other party from which the data derives, such as in a behavioral dataset associated with the monetization platform. The monetization platform may facilitate linkage between ad network participants (e.g., publishers), wireless operators, and their subscribers (e.g. users of mobile communication facilities) to better target advertisements to subscribers. The wireless operator may collect subscriber information, including behavioral information, from interactions with mobile communication facilities, and then provide this information to the monetization platform. Publishers may collect user information, including behavioral information, from interactions between publishers' content and mobile communication facilities, and then provide this information to the monetization platform. Ad network participants may be provided contingent access to the monetization platform to gain access to the subscriber data. Once the ad network participant gains access to the subscriber information, the ad network participant may use the subscriber information to target advertisements or for some other purpose (e.g., analyzing the effectiveness of a prior ad campaign). In an example, the ad network participant may have selected subscriber information relating to a specific type of user (e.g., a sports fan) such that advertisements of interest to sports fans can be sent to the subscribers with a behavioral data history that has been categorized within the monetization platform as indicative of the user(s) being a sports fan. In other embodiments, the ad network participant may access groups of subscriber information and then perform their own analytics on the data to decide what advertisements should be matched with particular subscribers or groups of subscribers.

The wireless operator or publisher data may include user profile data which may include or reference behavioral data that relates to the user's mobile communication facility usage. The user profile data may include geographic data, demographic data, historical usage data, device and configuration data, and the like. The financial consideration derived from the access and/or use of user data provided by the monetization platform may be based on a flat fee, a fixed amount, variable amount, impression-based (e.g., cost per thousand impression, or CPM), cost-per-click (CPC), cost-per-action (CPA), time-based, based on a shared revenue of user transactions, shared with a wireless operator whose data is being accessed, shared with a publisher, shared with an ad network, or otherwise arranged. The fee may include a revenue sharing component that may be based in part on an advertising fee generated by the ad network, publisher, wireless operator, or third party. The revenue shared with the wireless operator may include a portion of the flat fee, a portion of the advertising fee, a combination of both, or other revenue sharing alternatives as may be understood. The ad network may be a performance-based ad network that may include a bidding platform that may be used to purchase an access grant to mobile users' behavioral, or other data, through the monetization platform. In embodiments, the monetization platform may include a bidding platform for the purpose of determining a financial consideration to be paid upon access to data from the monetization platform. The monetization platform bidding platform may accommodate bids from ad networks, publishers, wireless operators, and third parties and enable these entities to bid on specific user data, user data categories, user profile types, user profile segments, data aggregations, grouped user data, user data that is enriched with third party data, or some other subset or data type that is available through the monetization platform. In embodiments, an ad server and/or ad network may be associated with a publisher, a wireless operator, a website owner, a content producer, a game developer, an application developer, a videographer, a blogger, and the like.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 9 illustrates a series of screen shots associated with a search on a mobile communication facility.

FIG. 34 depicts a sample user interface for creating an ad spot within a monetization platform.

FIG. 35 depicts a sample ad types and ad providers user interface screen within a monetization platform FIG. 36 depicts a sample ad provider proxy parameters user interface screen within a monetization platform

DETAILED DESCRIPTION

The methods and systems disclosed herein relate to the domain of mobile communication facilities and to the domain of searches for content.

Figure 1:
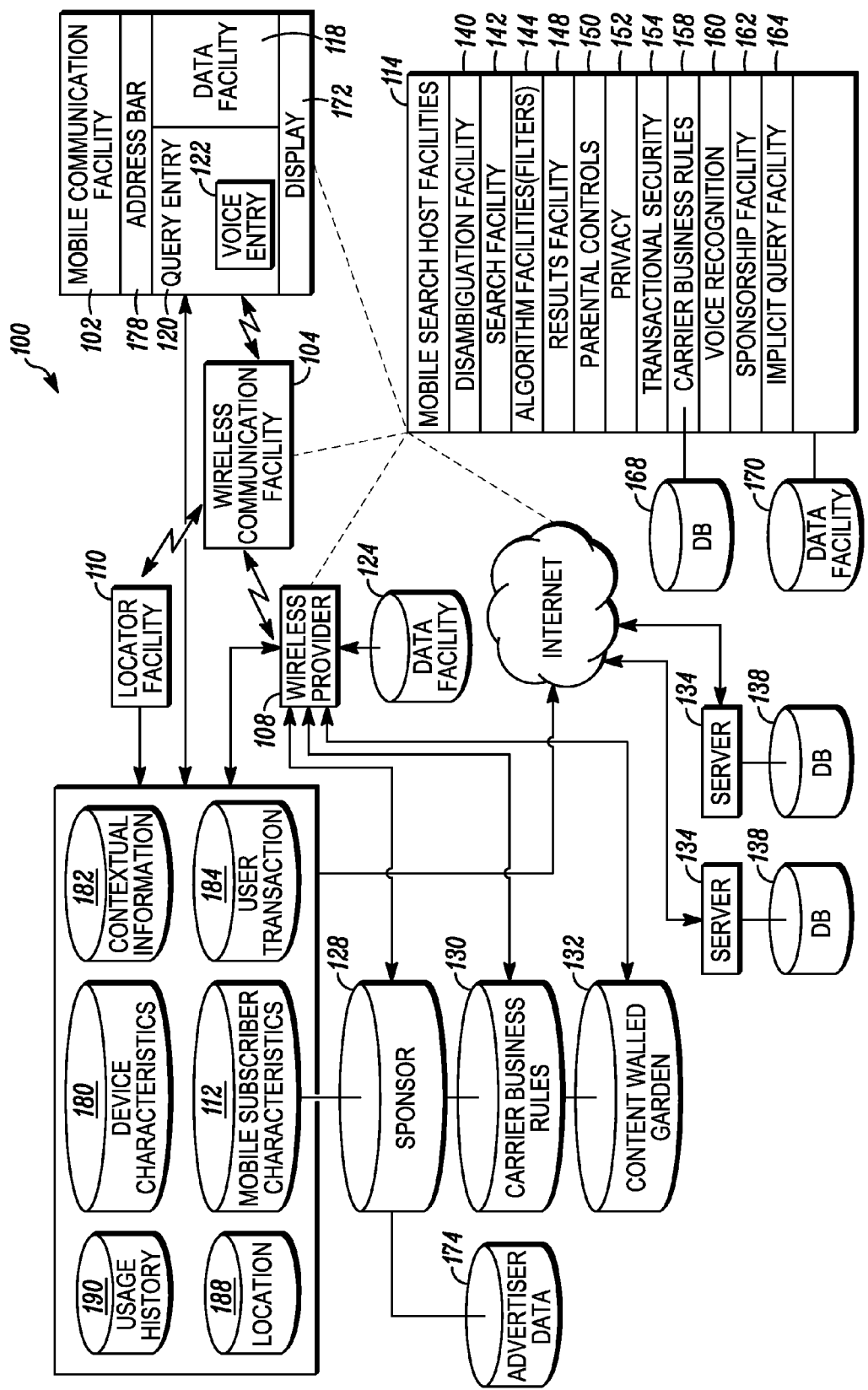
FIG. 1 illustrates a wireless platform.

FIG. 1 represents a wireless search platform 100 for facilitating the access to and integration of multiple data sources and data types for presentation on a mobile communication facility 102. The wireless search platform 100 includes a plurality of computer applications, devices, components, facilities, and systems, as well as a plurality of data facilities, including various data sources. The foregoing may be centrally located or geographically dispersed, may be locally and/or remotely interconnected, and may consist of distinct components or be integrated into combined systems. In the illustrated embodiment, the wireless search platform 100 architecture facilitates the processing of user-initiated queries entered into a query entry system 120 of a mobile communication facility 102. The mobile communication facility 102 may transmit this query to or via a wireless communication facility 104 for further processing and/or routing to data sources and/or processing facilities, such as one or more servers, such as HTTP servers or other servers that are suitable for handling data that are transmitted over computer networks. In embodiments, the wireless communication facility 104 may be linked to a locator facility 110 that generates information about the location of the user (including geographic location, proximity to other locations, network location, or other location information). The locator facility 110 may enable linkage of other information, such as information about a user query, with information about the user's geographic location at the time the query was initiated.

The wireless communication facility 104 may link directly to a wireless provider 108 such as a corporation or carrier providing the user's cellular phone service (e.g., Verizon, AT&T, Sprint, etc) or other wireless communication service. The wireless provider 108 may, in turn, have a number of proprietary databases from which it can obtain information that may be relevant to a user, such as to operate appropriately in response to a query entered by a user. For example, the wireless provider 108 may have access to a database containing carrier business rules 130 describing the proper handling of user queries. The wireless provider 108 may have access to a database containing the mobile subscriber characteristics 112 (e.g., age, address, customer history, call volumes, call histories, patterns in call histories, etc.) that, in turn, are linked to the Internet and through which it can access additional servers 134 and data sources 138. The wireless provider 108 may also have access to a "content walled garden" database 132 containing information from the wireless provider's 108 business partners from which the wireless provider 108 derives additional advertising or profit sharing revenues, such as content relating to cell phone offers, content relating to other services provided by the wireless provider, premium content that is paid for by the user, or content suitable for a mobile communication facility (such as a ringtone). The wireless provider 108 may also link the user query with sponsor information residing in a sponsor database 128 or with another data facility 124.

The wireless search platform 100 may include mobile search host facilities 114. The mobile search host facilities 114 may include one or more facilities for disambiguation 140, searching 142, algorithms/filters 144, results 148, parental controls 150, privacy 152, transactional security 154, carrier business rules 158, voice recognition 160, sponsorship 162, and/or implicit query 164, either alone or in combination. A search may be initiated on a phone idle screen (which may be coupled with one or more implicit queries), a Wireless Access Protocol ("WAP") site, a mobile storefront, or from a highlighted selection of text (e.g., from a website, email, SMS, or other format), or the search may be triggered by other website or local (e.g., cellular phone or other wireless device) activity. The mobile search host facilities 114 may link to additional databases 168 and data facilities 170. The mobile search host facilities may be accessed through the Internet, through the wireless provider 108, through the wireless communication facility 104, through other mobile communication facilities 104, or directly from the mobile communication facility 102. As indicated with the dashed lines on FIG. 1, the mobile search host facilities 114, either separately or in combination, may reside locally on the mobile communication facility 102, on the wireless communication facility 104, or on the wireless provider 108, or may be accessible externally through a network, or otherwise accessible, to perform the functions described herein.

The wireless search platform 100 illustrated in FIG. 1 may contain a mobile communication facility 102. The mobile communication facility 102 may be a device (e.g., a cellular phone, Blackberry, wireless electronic mail device, personal digital assistant, or device combining a number of these devices) utilizing a mobile communications protocol, system or technology, such as the advanced mobile phone system (AMPS), code division multiple access (CDMA), wideband code division multiple access (W-CDMA), global system for mobile communications (GSM), universal mobile telecommunications system (UMTS), integrated digital enhanced network (iDEN), and/or time division multiple access (TDMA). The mobile communication facility 102 may be a device utilizing one or more chipsets, such as the BREW chipset and/or operating system, and/or Bluetooth technologies.

In embodiments the mobile communication facility 102 may be any device capable of wireless communication, including, but not limited to a mobile phone, cell phone, satellite phone, walkie-talkie, handheld device, personal digital assistant (PDA), mobile network appliance, or an email, instant messaging, or chat device. The phone embodiment of the mobile communication facility 102 may be a cellular phone, satellite phone, a straight phone (i.e. "candy bar" phone), flip phone (i.e., "clamshell phone"). sliding top phone, wireless phone, 3G phone, global positioning system (GPS) phone, MP3 phone, music phone, or other mobile phone operating system utilizing MIDP compatible software, Symbian, or another proprietary operating system (e.g., Nokia, Sony Ericsson, Motorola, LG, Samsung, Sanyo, or Toshiba). The PDA embodiment of the mobile communication facility 102 may be a combination PDA/phone, and/or a GPS PDA, and may utilize operating systems including Palm, Windows, PocketPC, Psion, and/or PocketLinux. The mobile network appliance embodiment of the mobile communication facility 102 may be a web appliance, network appliance, or a GPS network appliance. Email, instant messaging, and chat device embodiments of the mobile communication facility 102 may include appliances, such as the Blackberry, Treo, or SideKick. The device may also, or instead, include a portable computer such as a laptop computer wireless coupled to a data network using, e.g., WiFi, WiMax, or cellular data communications.

The mobile communication facility 102 may facilitate the collection of data from data sources as a result of a query entry 120 or voice entry 122. Query entry 120 may be accomplished through the use of a numeric key pad entry, full mobile device keyboard entry (e.g., that found on a Blackberry or Treo device), partial mobile device keyboard entry (e.g., that found on a Blackberry device with only one key for every two letters), stylus/handwriting entry, bar code scanner (either 2D bar code or 3D bar code: "Quick Response Code"), or photographic entry using cellular phone-camera; through other navigational facilities (e.g., a stylus, arrow keys, scroll wheel, etc.); or through access to a computer network, such as through a physical connection (e.g., Ethernet or other network cable, wire, or the like), or through infrared, RF, Bluetooth or other wireless query entry. In embodiments, communication to the mobile communication facility may be compressed at the server and uncompressed at the mobile communication facility to accelerate data communication over a slow network.

Referring to FIG. 1, a mobile communication facility may be adapted with an address bar 178. The address bar 178 may be generated using a client application interface, for example. The address bar may be presented in a graphical user interface on a display associated with the mobile communication facility 102. The address bar 178 may be provided to allow a user to enter a URL, website, key words, search terms and the like. In embodiments, the user is presented with an address bar 178 and the user may enter a known URL (e.g. www.jumptap-.com) into the address bar. Once entered, the user may initiate a process to facilitate the connection of the mobile communication facility 102 with the website associated with the URL. For example, the process may involve searching the Internet for a website with the entered URL. Once located, the website may be loaded and displayed on a display associated with the mobile communication facility 102.

The voice entry 122 function of the mobile communication facility may be used through the speaker-receiver device of the mobile communication facility 102 or by use of the standard SMS lexicon and syntax, and it may be adaptive to individual users' voice commands and usage patterns that are stored on and accessed from the mobile subscriber characteristics database 112. The voice entry 122 function may permit voice dialing, voice memo, voice recognition, speech recognition, or other functions related to audible input.

The mobile communication facility 102 may operate using a variety of operating systems, including, Series 60 (Symbian), UIQ (Symbian), Windows Mobile for Smartphones, Palm OS, and Windows Mobile for Pocket PC's. The display type used by the mobile communication facility 102 may be a black and white LCD, grayscale LCD, color LCD, color STN LCD, color TFT/TFD LCD, plasma, LED, OLED, fluorescent backlit, LED backlit, projection, flat screen, passive matrix, active matrix, or touch screen. The screen size may be small, medium, or large. In addition, the mobile communication facility 102 may have a secondary display, such as that situated on the outside of a clamshell-type cellular phone, that is visible to the user when the primary display is not, due to the clamshell phone being closed. In embodiments the mobile communication facility 102 may have more than one secondary display.

The mobile communication facility 102 may include one or more ports, slots, or similar facilities to accommodate expansion cards, such as a MultiMediaCard (MMC), a MMC/Secure Digital (SD), an RS-MMC 3v, an RS-MMC 1.8v/MMCmobile, miniSD, TransFlash/microSD, a USB-based memory device, SIM card, or a Memory Stick Duo. The mobile communication facility 102 may also accommodate high-speed data communications by utilizing GPRS, EGPRS (EDGE), 1xRTT, 1xEV-DO r0, WCDMA (UMTS), or iDEN protocols. Additional features of the mobile communication facility 102 may include any of the following: a hard drive, GPS/location capability, GAIT, an FM radio, infrared technology, an integrated PDA, Java (J2ME), MMS, music player, poly or mono ringtone capability, predictive text entry, push-to-talk technology, ringer ID, ringer profiles, side keys, speaker phone, SyncML, text keyboard, text messaging, text messaging templates, to-do list generation, touch screen, USB ports, WiFi technology, and wireless Internet. The mobile communication facility 102 may also contain a data facility 118 for the storage of PIM data, IM logs, MMS logs, SMS logs, email logs, downloaded media, and a suggestion and results cache. The mobile communications facility 102 may include an operating system that is capable of running applications, such as multimedia applications, word processing applications, and the like.

The mobile communication facility 102 may transmit and/or receive data to/from the wireless communication facility 104, mobile subscriber characteristics database 112, and/or any of the mobile search host facilities 114 by utilizing an internal antenna, a stub antenna, a patch antenna, an antenna array, a stub/extendable antenna, or an extendable antenna. The mobile communication facility 102 may have an embedded camera enabling it to capture and transmit graphic data to the wireless communication facility 104, mobile subscriber characteristics database 112, and/or any of the mobile search host facilities 114. The resolution of the camera may be any of the following, or any other suitable camera resolution: CIF (352×288), VGA (640×480), SVGA (800×600), 1+ megapixels, 2+ megapixels, or 3+megapixels. The graphic capabilities of the mobile communication facility 102 may also include EMS picture messaging, picture ID, video capture, video calling, video messaging, PictBridge, and/or streaming multimedia.

The mobile communication facility 102 may have the hardware and/or software components enabling use of the mobile communication facility 102 via an optical mouse and/or wired mouse.

The wireless search platform 100 illustrated in FIG. 1 may contain a wireless communication facility 104. The wireless communication facility 104 may be, for example, a cellular telephone tower that routes the user's query. It may be associated with a wireless provider 108, a locator facility 110, or mobile search host facilities 114. The wireless search platform 100 may include a wireless provider 108.

The wireless search platform 100 illustrated in FIG. 1 may contain a locator facility 110 enabling the collection of geographic or other location data on users of mobile communication facilities 102. A locator facility 110 may be based upon (i) a Cell-sector System that collects information pertaining to cell and sector ID's, (ii) the Assisted-Global Positioning Satellite (A-GPS) technology utilizing a GPS chipset in the mobile communication facility 102, (iii) standard GPS technology, (iv) Enhanced-Observed Time Difference (E-OTD) technology utilizing software residing on a server and within the mobile communication facility 102 that uses signal transmission of time differences received by geographically dispersed wireless communication facilities 104 to pinpoint a user's location, (v) Time Difference of Arrival (TDOA), (vi) Time of Arrival (TOA), (vii) Angle of Arrival (AOA), (viii) TDOA-AOA, (ix) triangulation of cellular signals, (x) triangulation based on receipt of broadcast TV signals, (xi) location based on dead reckoning, (xii) location based on proximity to known locations (including locations of other mobile communications facilities 102), (xiii) map-based location, or any combination of any of the foregoing, as well as other location facilities known to those of skill in the art.

In embodiments, the mobile communication facility 102 may use a locator facility 110 (e.g. GPS system) to locate itself in its present location, or locations of interest to the user, whether explicitly stated or determined by PIM data, location history, or previous searches. In embodiments, the location may be transmitted back to the locator facility 110 for dissemination, processing, etc. Geographic information systems may also be used to determine a location point in a polygon, a location radius search, route calculation, points of interest, and/or geocoding and reverse geocoding. In embodiments, a user's location may also be self-entered into the wireless platform by the user. For example, the user may type in (or speak through a voice recognition system) an address, zip code, or other location information.

In an embodiment, a GPS system may be used as the locator facility. The GPS system consists of a group of satellites (>20) carrying atomic clocks that orbit the Earth twice a day. Earth-based observatories record orbital data related to the motion of the satellites. In order to determine global positioning, a GPS receiver (e.g. one disposed inside of the mobile communication facility) must communicate with four of the GPS satellites. The receiver computes its distance from each of the four satellites to determine its latitude, longitude, elevation, and time of day. The receiver computes the distance to each of the four satellites by calculating the difference between local time and the time the satellite signals were sent and then decodes the satellites' locations from their radio signals and an internal database. The location of the GPS receiver is located at the intersection of the four spheres created by the four satellites, where each radius is equal to the time delay between the satellite and the receiver multiplied by the speed of the radio signals. The differences permit calculation of three hyperboloids of revolution of two sheets, the intersection point of which gives the precise location of the receiver. If the elevation of the receiver is known, it is possible to compute precise location using only three satellites.

The wireless search platform 100 illustrated in FIG. 1 may contain a data facility containing mobile subscriber characteristics 112 pertaining to individual users of a mobile communication facility 102. This data may include, but is not limited to, data collected by the wireless provider 108 when an individual opens a wireless account, such as age, sex, race, religion, area code, home address, work address, billing address, credit card information, passwords, family information (e.g., mother's maiden name), birthplace, driver's license number, employer, position, annual income, income bracket, items purchased, friends and family information (including any of the foregoing types of information) and the like. The mobile subscriber characteristics facility 112 may continually, or periodically, update data for individual users, for example, bill amount(s), average bill total, payment history, on-time payment history, on-line usage amount, duration of on-line interactions, number of on-line interactions, family status and family information, number of children, shopping habits (e.g., views of or purchases of goods and services) click stream information, device type and device version, device characteristics, usage patterns (including those based on location, time of day, or other variables), device and/or subscriber unique identifiers, content viewing history, content presented for viewed by/not viewed by user, content and programs downloaded, videos, music, and audio listened to and/or downloaded, television watched, timing and duration of viewing/downloading, transaction history, and any other user or user defined characteristics. The purchase of physical goods may be facilitated by a wireless provider 108 by having the wireless provider 108 collect the user's credit card information as part of the billing cycle and adding goods transactions automatically to the wireless provider's bill to the user.

The mobile subscriber characteristics 112 database may also track data related to phone usage and location. For example, data collected could include a history of phone calls made, phone calls received, the mobile subscriber characteristics of the persons calling or called by the user, the duration of calls, a history of communications made via phone, Internet, email, instant messaging, or chat (and the entities communicated with by these technologies), history of phone calls made linked with geographic/location information at the time of each call, log of phone numbers, and a history of clicks and clickthroughs (or other keystroke or user interface equivalents thereof, including voice-initiated actions) made using the mobile communication facility 102.

FIG. 1 illustrates a advertiser database 174 associated with a sponsor database 128 according to the principles of the present invention. Advertiser database 174 may be provided by a corporation, an individual, or some other entity sponsoring results as described herein.

The wireless search platform 100 illustrated in FIG. 1 may contain mobile search host facilities 114. Within the mobile search host facility 114 there may be other facilities, including, but not limited to, a disambiguation facility 140, search facility 142, algorithm facility 144, results facility 148, parental control facility 150, privacy facility 152, transactional security facility 154, carrier business rules facility 158, voice recognition facility 160, sponsorship facility 162, and/or an implicit query facility 164. The mobile search host facility 114 may also link to another data facility 170.

The disambiguation facility 140 may complete or provide more meaning to ambiguous active user inputs. The disambiguation facility 140 may include SMS lingo translation, single word initial substring completion, multiple word substring completion, stem completion (e.g., single into plural format, verb into gerund), thesaurus lookups for homonyms or synonyms, spell check algorithms, spell check tables, phonetic spelling algorithms, phonetic spelling tables, phone number keypad to word conversion (including completion of possible substrings from number sequence), frequency-based algorithms, semantic analysis algorithms, location-based algorithms or other algorithms or facilities for reducing ambiguity as to the meaning of a query or partial query entered by a user.

The search facility 142 may initiate a search, such as by causing a query (optionally a disambiguated query) to be executed on a search facility, such as a search engine. The search engine might be a search facility that is based on Boolean search logic, categories of results, term frequencies, document frequencies, documents selected by other users who have entered similar queries, link structures of possible results, or any other known search facilities using any other known search algorithm.

A mobile search service (e.g. as disclosed herein) may be accessed by a user through a user interface of a mobile communication facility 102 such as a mobile phone, a cellular phone, satellite phone, a GSM phone or other phone type. The mobile communication facility 102 may need to be activated to access the mobile search service. A mobile communication facility 102 may be activated by a user taking an action. The action may be different for different phone embodiments of a mobile communication facility 102. For example, a flip or folding phone may be activated by unfolding or flipping open the phone. In another example, a straight phone may be activated by depressing a key on the phone keypad for a predetermined length of time. A sliding top or twist top phone may be activated by sliding or twisting open (respectively) the top to reveal a user interface of the phone. Other phone methods of activating a phone based on the phone embodiment are also possible. A phone may be activated by turning on the phone. Turing on the phone may include attaching a battery to the phone, plugging the phone into a power source such as a desktop charger or an automobile charger, switching the phone power switch, depressing a key on a phone user interface for a minimum time, and the like. A phone may be activated by unlocking the phone which may include a user entering an activation code into the phone through the phone user interface, or by speaking the activation code into the phone microphone.

Activating a phone may enable a user to have access to one or more features and functions of the phone such as making a call, answering a call, navigating menus of the user interface, using a mobile search service, and the like. Some features and functions may require a user to first activate the feature or function through the user interface, such as reviewing call history. Other features may be activated immediately when the phone is activated. As an example, a user can often immediately enter a telephone number to initiate a call without first activating a call feature of the phone.

In embodiments, a mobile search service (e.g. as disclosed herein) may be activated immediately when a phone is activated. A mobile search service, accessed through a search box of a mobile communication facility 102 user interface, may be activated at the time a phone is activated such that a user can immediately enter a search item in the search box. As an example, immediately after a user flips open a flip phone, a mobile search service search box may be presented and activated such that a query entry 120 through the user interface may be entered in the search box. To further this example, a user may flip open their flip phone and immediately enter the name of their local sports team through the phone user interface. The mobile search service may provide search results through the phone user interface. In addition to the search box receiving input from the user interface immediately after the phone is activated, the mobile search service search box may also receive voice entry 122.

The mobile search service search box and entries it is receiving may be presented on the display of the phone which may also include an indicator, controlled through the user interface, of the current state of the keypad and voice entry mode of the phone. In embodiments, the indicator may indicate when the phone is enabled to place and receive phone calls and when it is enabled to access the mobile search service. The indicator may be an aspect of the search box, or a separate indication on the display of the phone. As an example, the search box may display reduced contrast entries in the box, such as graying out the entry, when the phone state enables placing and receiving calls. In another example, the search box may include a blinking cursor at the point of entry when the phone is enabled to access the mobile search service. A phone call/search service state indicator may be beneficial when a mobile communication facility 102 has been activated such that the user interface display is active but the phone has not yet completed an initialization operation such as connecting to a wireless network. In an example, a mobile search service search box may be presented immediately upon activating the phone but may be activated in close temporal proximity, such as within 5 seconds of activating the phone.

Upon activation, the mobile search service search box may be predetermined either as a network search box, a wireless carrier's walled garden content 132 search box, or other mobile content search box. Alternatively, a user may select, through a feature of the user interface, the search box type upon activation. Alternatively, the user selection may be temporary, wherein the mobile search service search box returns to the predetermined selection the next time the phone is activated. The mobile search service search box may be related to a search vertical which may be a general search, or may be related to a vertical search of one or more of the following: ring tones, images, games, a yellow pages, weather, a white pages, news headlines, WAP sites, web sites, movie show times, sports scores, stock quotes, flight times, maps, directions, a price comparison, WIFI hotspots, package tracking, hotel rates, fantasy sports stats, horoscopes, answers, a dictionary, area codes, zip codes, entertainment, blogs, and other mobile content associated with a search vertical.

A mobile communication facility 102 may rely on a network for connection to external resources. A network may at times experience poor communication or complete lack of communication. Such an event may compromise a substantial benefit of searching for mobile content with the mobile communication facility 102. However, by managing the resources of the mobile communication facility 102 such that it retains critical, relevant, current, timely, popular, or otherwise characterized information (such as mobile content), the mobile communication facility 102 may retain at least a portion of the benefit even when the network connecting to the mobile communication facility 102 is out. Furthermore, by differentiating between content located on and off the mobile communication facility 102, and providing search boxes for both, content may be more efficiently delivered for presentation to the user.

When connected to a network, a mobile communication facility 102 may use the resources of the mobile search host facilities 114 such as the search facility 142 to execute mobile content queries. Alternatively, or cooperatively to the search facility 142, the mobile communication facility 102 may utilize an internet search facility, such as a search engine. A wireless provider 108 may also provide query search capabilities such that information available to the wireless provider 108 such as mobile subscriber characteristics 112, advertiser data 174, walled garden 132 content, and the like may be searched based on a query entered by a user on an mobile communication facility 102.

When disconnected from a network, these resources, mobile content, data, characteristics, and the like may not be available to a mobile communication facility 102 to complete a search query. Therefore a mobile communication facility 102 may include search capability and functionality to search local resources to complete a search query. The local search query functionality may supplement a network or remote search or may operate independently of the network even if the network is connected and fully operational.

Local search query functionality may also be useful for finding information that a network resource may not access. Information stored locally on the mobile communication facility 102 such as cached content, data files, configuration data, programs, deleted item, private items, and the like may be searchable from a local search query facility.

Local searching may be useful to find mobile content if the mobile content, or a reference to it, can be found locally. Therefore, providing a searchable store of mobile content may be beneficial to the effectiveness of local mobile content searching. Local storage may include any and all storage capability and facilities herein disclosed for the mobile communication facility 102 including removable storage devices that may connect to one or more external ports of the mobile communication facility 102 and data facility 118.

Information stored locally that may facilitate a local search may originate from the user or an external source. The external source may be a network as herein described. The information from the network may include mobile content that has been provided to the mobile communication facility 102 as a response to a search query, as sponsored content associated with a web page, as an RSS feed, or other reasons. The information stored locally may be the content provided to the mobile communication facility 102 or it may be header data, metadata, or search query results such a list of websites.

Maintaining the information in the local storage resources to facilitate useful and relevant responses to a search query may be performed by a cache facility as herein described. Such a cache facility may provide storage and maintenance of information retrieved from the network (such as mobile content) such that the cached information is updated from time to time to maintain its relevance and value. When the mobile communication facility 102 is not connected to a network, the local search facility may present local results to the user. However, it may record the query as entered so that when the mobile communication facility 102 is on-line again, the query can be provided to the network resources such that the information stored locally can be updated. This may facilitate maintaining the local information such that it has a relevance (because it satisfies a recent user search query) to the user.

A local search facility may also provide a more timely response to a search query than a network resource since there is no need for network communication to provide a reply to the search query. This may allow a user to review and interact with search query results while a network search is proceeding. Given that search results may change quickly at least in part due to the dynamic nature of mobile content, search results from local storage may be identified as such to the user. The local results may also be identified in other ways to facilitate a user's understanding of the results. For example, a local result that was last updated more than a minimum amount of time, such as 2 days, may be identified by highlighting the item on the mobile communication facility 102 display with a contrasting color such as yellow. If the results are older than a maximum time, such as a week, they may be highlighted with red. In this way, the user can review the query results, identify the local results, and identify the age of the local results. The user interface of the mobile communication facility 102 may offer an update results selection for local results when the facility 102 is connected to a network.

When connected to a network, and a user selects a local result, the mobile communication facility 102 may automatically use a corresponding link downloaded from the search results of the network resources. This may facilitate a user accessing the latest mobile content associated with a local search result. As an example, a user may search for nearby movie theaters to see what is playing tonight. The local search result may present a name of a movie theatre and a link to access the theatre movie listing. The link may direct the user to the current movie listing on the website instead of an older listing associated with the link stored in cache on the mobile communication facility 102.

The foregoing describes some options for integrating local information with network search results using a local search facility. An alternative to the foregoing may include the network search facility performing the search on the network resources as well as the locally stored information and mobile content on the mobile communication facility 102. By the network search facilities searching all available content, including the content on the mobile communication facility 102, the search results presented to the user will integrate local and network in a unified updated presentation.

Mobile search results, as herein described, may include one or more lists to content that are associated with the search query. A user may interact with the search results, such as selecting a result and receiving further information, through a user interface of the mobile communication facility 102. An aspect of the present invention may facilitate a user with other actions associated with a search result such as making a purchase, previewing content, saving a result, and the like. Methods and systems for facilitating these and other actions that may be associated with a search result are described below.

Action commands presented to a user of a mobile communication facility 102 may be associated with a search result based on an aspect of the search result. The action commands may be presented to the user through the user interface of the mobile communication facility 102, and the user may access the action command through a feature of the user interface. An action command may present additional search results or action commands to the mobile communication facility 102.

A mobile search platform 100 may respond to a search query from a mobile communication facility 102 by using a search facility 142 as herein described. The search results generated by the search facility 142 may include aspects such as keywords, HTML links, metadata, and the like that may be used in associating an action command with the search result. The search facility 142 may examine one or more of these aspects to determine what action command would provide the user with the best result of interacting with the search result. By example, the search facility 142 may associate a "bid" action command with a search result that includes a link to bid on an item in an on-line auction. In another example, a search result that contains keywords that provide an address may have a "map" action command associated with it.

Since search results may closely match a search query, aspects of the search query may also affect the action command associated with a search result. A search query may be broad such that a search facility 142 may return general results with general action commands. For example, a search of "guitars" may return a wide variety of results including types of guitars, concert information, guitar songs, guitar technology, on-line guitar auctions, musical instrument stores, and the like. A result to such a broad search query may have an associated action command that provides more detail about the result, thereby facilitating a user finding relevant results. Alternatively, a search query may be specific, or the search facility 142 may provide specific, relevant results to a search query. The search facility 142 may associate aspects of the search query with other information such as mobile subscriber characteristics 112, carrier business rules 130, or user search history and preferences to identify relevant results that may have a specific associated action command. A result of such a specific query may have a specific associated action command. In an example, a result associated with a specific guitar offered for sale from a local music store may have an associated "purchase" action command.

Another aspect of the search result that an action command may be based on is the source of the search result. This may include the website from which the search results was generated, the wireless service provider 108 that generated the search result, a provider of search services, the mobile communication facility 102, and the like. Each of the plurality of sources of the search result may associate an action command with a search result based on preferences, business arrangements, or other criteria that may at least be partially different for each source. The action command presented may result in the same end action by the user (such as ordering the guitar in the example above). However, the action command may direct an aspect associated with the action differently for each source. Continuing the example above of a "purchase" action command being presented to the mobile communication facility 102, a result provided by a website may include an action command to purchase the guitar directly from the manufacturer of the guitar. A result provided by a provider of search services may include an action command to purchase the guitar from an affiliate or distributor of the guitar manufacturer.

A website may include action commands to be associated with search results that match aspects of the website content. The action commands may be included in the website content, metadata, header information, HTML links, and the like. The mobile search platform 100 may identify one of the action commands included with a website to be associated with a search result based on aspects of the search query. Websites may include HTML links that result in actions such as purchases, registration, login, contact, service, repair, and the like. The search facility 142 of the mobile search platform 100 may associate an action command related to an HTML link on a website with a search result. In an example, a search query for "on-site guitar repair" may generate a search result for a guitar repair provider website that may include a link to scheduling an on-site repair. An action command to facilitate scheduling an on-site repair may be associated with the search result.

Alternatively, a website may include action commands for use with a mobile communication facility 102. The search facility 142 may include a search result with an associated action command taken from website with a mobile action commands.

The action command may be presented to the user through any aspect of the user interface of the mobile communication facility 102 herein described such as a visual display, an audio output, a vibration, an external port, and the like. Similarly, the user may interact with the action command through any aspect of the user interface of the mobile communication facility 102 herein described such as a keypad, a touch screen, microphone, external port, and the like.

An action command may be associated with each search result presented such that as each search result is selected, such as through highlighting or scrolling a displayed result, the action command associated with the selected search result is available to the user. The user may interact with the user interface of the mobile communication facility 102 in a variety of ways as herein described. In this way, the action command may be accessed by the user through a plurality of inputs, such as sequential inputs. In an example, the user may provide a first input, such as selecting a search result. This first input may make an action command associated with the selected search result available to the user such that a second user input may access the action command. The second user input may be pressing a send button on the user interface of the mobile communication facility 102 and the action may make a call. A variety of first and second user inputs as may be envisioned by one of average skill in the art are herein incorporated.

The action command may be associated with a search result through a sponsorship facility 162. The sponsorship facility 162 may associate a search result with an action command based on sponsors 128 bidding to have an action command associated with a search result. Sponsors 128 may bid to have an action command associated with a search result based on one or more aspects of the search such as an aspect of the search query, an aspect of the search result, an aspect of the mobile communication facility 102, an aspect of the user of the mobile communication facility 102, and the like. The sponsorship facility 162 may select a sponsored action command from high bidder based on a relevance of the aspects specified by the sponsor 128 with the search result. In an example, a plurality of sponsors 128 may bid to have an action command to purchase tickets to an event associated with a search result associated with the event. When a search query generates a search result associated with the event, the action command from the highest bidding sponsor 128 may be associated with the search result and presented to the mobile communication facility 102.

Alternatively, one sponsor may be offering tickets to the event, while another may be offering items associated with the event. The mobile search platform 100 may select an action command from a sponsor 128 based on a relevance to the search result over a bid amount. If the search query was directed at items associated with the event, the mobile search platform 100 may associate the action command from the item sponsor instead of the ticket sponsor with the search result.

An action command may include presenting additional information to the mobile communication facility 102. In the example above, the action command associated with the search result generated from a search query for the event may be to present a plurality of action commands to the user. At least one of the plurality of action commands may be a sponsored action command as herein described. The plurality of action commands may be presented to the mobile communication facility 102 such that the sponsored action command from the highest bidding sponsor is presented first. In a list of action commands, the sponsored action command from the highest bidding sponsor may be at the top of the list. In a sequential presentation of action commands, the sponsored action command from the highest bidding sponsor may be the first action command presented. Other orderings of presenting the sponsored action commands are possible such as based on relevance to the search result, based on location, and many other aspects associated with the mobile search platform 100. All such orderings are herein included.

Associating an action command to a search result may be performed through an action command provider that is separately associated with the mobile search platform 100. The mobile search platform 100 may provide a search result to an action command provider and receive back an action command for association with the search result. The mobile search platform 100 may provide additional information such as user demographics, mobile communication facility 102 type, mobile communication facility 102 location and other information as may be beneficial in receiving a relevant action command.

Action commands may include making a purchase, previewing content, finding content related to the search result, placing a phone call associated with the search result, mapping a location, forwarding the search result, and saving the search result. The forwarded search result may be sent to an email address. Examples of some of these action commands are now presented.

An action command associated with a search result may facilitate a user previewing content associated with the search result. In an example, a search result may be associated with a photo sharing webpage. An action command associated with the search result may be to display a thumbnail or a plurality of thumbnails of photos, thereby providing a preview of the content available on the webpage. In another example, a search result may be associated with an investment research website. The action command associated with the search result may be to download a demonstration of the website, thereby allowing a user to preview the content of the website in an annotated demonstration. In another example, a search result may be associated with an independent film producer. An action command associated with the search result may be to present a portion of one or more of the film producer's films to the mobile communication facility 102. In this way the user can preview the content (films) of the website. Similarly, audio, a book, a new clothing line, and the like may be previewed through an action command.

An action command associated with a search result may facilitate a user forwarding the search result. The search result may be forwarded through email, test message, instant message, voice mail, video mail, message broadcast, and any other for of communicating with the mobile communication facility 102 as herein described. In an example, an action command associated with any search result may be to forward the search result to another mobile communication facility 102 by email. By accessing the action command through the user interface of the mobile communication facility 102, the user may be prompted to input or select the destination name from a list of email names.

An action command associated with a search result may facilitate bidding on an item associated with the search result. In an example, a user may search for a used bicycle on an on-line auction website. The result may include one or more auction listing for a used bicycle. The action command associated with this search result may facilitate a user entering a bid for the item. The command may allow a user to enter a bid amount and password and the mobile communication facility 102 may provide any additional identifying information about the user to the on-line auction site to accept the bid An action command associated with a search result may facilitate rating the search result. In an example, the action command may accept numeric input from the mobile communication facility 102, such as a cell phone number keypad to rate the search result relevance to the search query. User rating of search results may facilitate providing search results that have greater relevance to the user. The action command may also delete a search result from the search results if the user rates it below a predetermined value, such as below 3 out of 10.

An action command associated with a search result may facilitate storing the search result. In an example, the action command may facilitate a user saving a search result such as in a favorite storage, or a follow-up list, or other storage that may be associated with the mobile communication facility 102 or the mobile search facility 100.

In embodiments, the search box may be presented upon activating the phone and the search box may be adapted to relate to a specific search methodology. For example, the search box may be adapted to provide localized or personalized (e.g. searching in relation to mobile subscriber characteristics and the like as described herein). The search box may also be adapted to target results based on time of day. For example, the search user interface may be adapted to produce localized results and the keywords, filters, algorithms or other search parameters identifying the relevant local results may change as a result of the time of day. So if the user opens his flip phone and is presented with the search box, he may perform a search and the results may be localized and they may be tailored to the time of day. At 6:00 pm the search results may pertain, at least in part, to dinner options, while a search run at 8:00 pm may relate to entertainment. In embodiments, the default search methodology preferences are settable by the user. The user may be able to set the type of search that he would like to perform as a default when presented with the search facility upon activation of the phone. The user may also be presented with options (e.g. menu options) through which he can select a new search temporary search methodology.

The algorithm facility 144 may receive a user's input in the form of a problem and evaluate that problem by applying the set of all potential solutions available within the search space. At its most basic, the algorithm facility 144 may apply naïve/ uninformed search algorithms consisting of the most intuitive solution(s) available within the search space. Alternatively, the algorithm facility 144 may also employ informed search algorithms based on heuristics that utilize intelligence about the elements of the search space in order to minimize search time and resource allocation of the algorithm facility 144. The algorithm may serve to promote or demote content for display 172 to the user based upon the frequency of queries, the frequency of clicks or clickthroughs, the velocity of queries; the site of the search launch, storefront visit, or mobile website; community tagging; mobile user scoring; or it may be based upon domain restrictions (e.g., only "espn.com").

An algorithm may be designed to create an index for information specific to the mobile communication facility 102. For example, the algorithm may look only for mobile tags (e.g., WML, xHTML-MP, MIME types, such as text, WAP, and/or WML, or mobile specific headers). An algorithm may also determine the aesthetic compatibility between the content and the capabilities of the display 172 of the mobile communication facility 102, including factors such as page width, page weight (e.g., the number of images and byte size), screen resolution and color capabilities, font types and sizes, client-side rendering capabilities, page complexity (e.g., features incompatible or specific to a mobile communication facility 102), and the like. This compatibility information may also be blended with other information, such as popularity data (e.g., WAP gateway, editorial scoring, and/or traffic market data).

The algorithm facility 144 may contain a collaborative filtering protocol, category filtering, a recommendation system and/or other process facilities for analyzing, refining, or filtering user input and/or search results. A collaborative filter may employ a two step process. During the first step, other users are identified who have similar rating patterns as those of the active user. Secondly, the ratings obtained from these similar users provide the empiric basis for predicting information of relevance to the active user. The collaborative filter can be both an inclusive and an exclusive process, gathering relevant information for the active user or removing incongruent information from the predictive information set.

A collaborative filtering protocol generally involves the collection of preference data from a large group of users. This preference data may be analyzed statistically to identify subgroups, or characteristics of subgroup members, with similar preference profiles. Various weighted average, fuzzy logic, or other techniques may be used to summarize or model a preference subgroup, and a preference function may be created using the model/summary. This function may then be used to match new users to an appropriate preference subgroup. In embodiments, such information may be collected from many individual mobile subscriber characteristic data sets, and data may be collected from many mobile communication facility users. For example, a wireless provider 108 may collect preference data from a large group of its customers. In embodiments, the data may be collected from non-mobile users and may relate to preference information collected from other on-line or off-line activities.

User preferences may be derived from user behavior or other implicit characteristics, or explicitly defined by a mobile communication facility user, or some combination of these. If users were to explicitly state their preferences (e.g. for types of restaurants, books, e-commerce, music, news, video, formats, audio, etc.), the explicit preference information may be stored in the mobile subscriber characteristic data bases associated with their phones. Users may implicitly register a preference through activity such as purchasing a product online, visiting a site on line, making a phone call from a mobile communication facility, making a phone call from another facility, viewing content, or engaging or not engaging in other activities. For example, if the user looks at a product and decides not to purchase the product, one can draw an inference that the user is not interested in the product, and this inference may be used as part of a collaborative filtering algorithm. In addition, inferences may be drawn from the types of establishments the user has been calling recently on the mobile communication facility. If he or she has been calling auto dealerships repeatedly over the past two weeks, an inference can be drawn that the user is presently looking for auto goods and/or services. Implicit preferences of users may also be collected by recording all pages that are visited by users and the frequency and/or duration of each visit. Using a binary coding scheme in which visited pages are coded "1" and unvisited pages "0," one may create user-based preference vectors and analyze statistically for both intra-user and inter-user cluster preferences or similarities. Other coding techniques may group certain sites along dimensions of commonality, with navigation behavior analyzed using any number of Euclidean or other distance and/or matching techniques. In embodiments, user preference data may be collected from within the mobile subscriber characteristics database. In embodiments, user preference data may be collected from outside of the mobile subscriber characteristics database. In embodiments, off-line behavior may also be used to characterize the preferences of the user.

An implicit mobile search query may be automatically generated from a mobile communication facility 102 based at least on one parameter in order to deliver relevant mobile content to a mobile communication facility 102, wherein the relevance may be based in part on information relating to a mobile communication facility 102.

The automatic generation of the search query may be an implicit search. This implicit search may not require user manipulation of a mobile communication facility command. For example, a user may not need to select a menu item, depress a button, select a touch screen icon, issue a voice command, or explicitly employ other commands associated with a mobile communication facility 102.

In embodiments, the automatic generation of a search query may also be accomplished by a server 134.

In embodiments, a parameter may be used to determine, in part, the relevancy of a mobile content. A parameter may be information relating to a mobile communication facility 102. This information may relate to a user characteristic. User characteristics may include a user's age, sex, race, religion, area code, zip code, home address, work address, billing address, credit information, family information, income information, birth date, birthplace, employer, job title, length of employment, and other information associated with user characteristics. For example, the user characteristic, employer, may be used to determine, in part, the relevancy of news headlines within a search result derived from an automatically generated search query of news headlines. If the user's employer was an automotive manufacturer, news headlines relating to autoworker layoffs may be determined to be more relevant than headlines relating to currency fluctuations in China, and, thus, prioritized for delivery to the user's mobile communication facility 102. Similarly, the parameter of the user's employer might also result in the generation of a search query relating to the employer's current stock price, and result in delivery of that information to the user's mobile communication facility 102.

In embodiments, a parameter may also relate to a user history, a user transaction, a geographic location, geographic proximity, a user device, a time, and or other user characteristics. For example, parameters relating to a user may include age (27), sex (male), previous user transactions (purchase of a jazz recording), and geographic location (New York City). The automatically generated search may return search results that are ranked, ordering, indexed, and or prioritized by their relevance to a user characteristic or plurality of user characteristics. In this example, the fact that the user is a young, male, located in New York City with a history of purchasing jazz recordings, may result in the prioritization of relevant content for delivery to the user's mobile communication facility 102, such as, retail establishments selling jazz recordings, retail establishments selling jazz recordings within New York City, retail establishments selling jazz recordings within walking distance of the user, and so forth.

In embodiments, a parameter may also include a mobile communication facility characteristic, which may be selected from the group consisting of display capability, display size, display resolution, processing speed, audio capability, video capability, cache size, storage capability, memory capacity, and other mobile communication facility characteristics. The information relating to a mobile communication facility 102 may be provided by a wireless operator, a wireless service provider 108, a telecommunications service provider, or other providers associated with a mobile communication facility 102. To further the previous example of the user who is a jazz aficionado, if a new video is available of a jazz artist in concert, the automatically generated query may determine whether the user's mobile communication facility 102 has appropriate video capability, and if so offer the user the opportunity to download the video.

In embodiments, relevant mobile content may be locally cached on a mobile communication facility 102. The locally cached information may be loaded prior to new content associated with a new search query. The locally cached information may be associated with an expiration, which may be a date, a time, a previous usage of the locally cached information, or other characteristics governing expiration of the locally cached information. For example, using the parameters of geographic location and time, the automatically generated search query may return results containing the current day's weather conditions for that location. These results might be locally cached on a mobile communication facility 102 with an expiration of 11:59 pm on that same day. In embodiments, the prior viewing of a cached content, such as a video, may be used to determine a permitted future use of the content. For example, a cached concert video from a jazz artist may be allowed to play five times on a mobile communication facility 102 after which time it expires and requires the user to purchase the video in order to view it again.

In embodiments, relevance may be based at least in part on a statistical association. The relevance may be a score. The statistical association may relate to an association between the mobile content and the information relating to a mobile communication facility 102. The information relating to a mobile communication facility 102 may include a user history, a user transaction, a geographic location, geographic proximity, a user device, a time, a user characteristic, or a mobile communication facility characteristic. A user characteristic may be selected from the group consisting of age, sex, race, religion, area code, zip code, home address, work address, billing address, credit information, family information, income information, birth date, birthplace, employer, job title, length of employment, and other user characteristics. A mobile communication facility characteristic may be selected from the group consisting of display capability, display size, display resolution, processing speed, audio capability, video capability, cache size, storage capability, memory capacity, and other mobile communication facility characteristics. For example, a mobile communication facility 102 may be associated with the parameters of a geographic location (San Francisco), a user history (previous calls to Chinese restaurants), and a time (7 pm). The mobile communication facility 102 may automatically generate a search query and prioritize the presentation of content based on the relevancy of the content to a restaurant, or a Chinese restaurant, or having the location of San Francisco, or being open for business at 7 pm, or some combination of these.

In embodiments, the information relating to a mobile communication facility 102 may be provided by a wireless operator, a wireless service provider 108, a telecommunications service provider, or other providers associated with a mobile communication facility 102.

In embodiments, a basic implementation of a collaborative filtering algorithm entails tracking the popularity of a product, service, business, transaction, or website by recording the total number of users in the set that rate it favorably (which may include a degree of favorability) or by recording the number of users that repeatedly visit the site. In essence, this algorithm assumes that what previous users liked, new users will like. In embodiments, a weighted averaging process is implemented to carve out subgroups of users who all highly ranked a product that has an overall unpopular rating with the overall user dataset.

A more robust collaborate filtering procedure, sometimes referred to as the K-nearest neighbor algorithm, uses a "training data set" that is based upon previous users' behavior to predict a variable of interest to members of a "target data set" comprised of new users. In addition to user preference data, the training data set may have additional predictor variables, such as might be contained in a mobile subscriber characteristics database (e.g., age, income, sex, date or place of birth, etc.). Variables of interest may include type of product purchased, amount of purchase, and so forth. For each row (single user data) in the target data set, the algorithm locates the "K" closest members of the training data set. Closeness, or distance, as used by the algorithm is generally a Euclidean Distance measure. Next, the algorithm finds the weighted sum of the variable of interest for the K nearest neighbors, where the weights are the inverse of the calculated distances. This process is then repeated for all remaining rows in the target set. From this information, models may be derived for future prediction. As the user population increases, the training data set may be updated to include new rows and thus capture any changes in user preference for use in revising the prediction model.

Other methods that may also be used successfully for statistical clustering of user preference groups include the weighted majority, Bayesian prediction, Pearson product correlation, and factor analysis.

In addition to the description of collaborative filtering summarized above, the following text may be referenced for more information relating to collaborative filtering and is incorporated herein by reference: Nakamura, A. and Abe, N., 1998. *Collaborative Filtering using Weighted Majority Prediction Algorithms in: Proceedings of ICML98*, 395-403. Morgan Kaufman Eds.

In addition to, or instead of collaborative filtering, or other preferential treatment of various information as determined by other methods, non-preferential or objective type data may be employed to further target search results about the user of a mobile communication facility 102. For example, a location of the user may be determined through a GPS system (or other location based service), and this location may be used to filter results with or without the use of a collaborative filter. In embodiments, elements such as time of day, type of device, activities associated with time of day, activities associated with location, invoice activity, and the like may be used to further refine a search. In an embodiment, such information may be used in a category style filter (i.e. a filter designed to include or exclude results based on the data). In embodiments, such information may be used by a collaborative filter algorithm. In embodiments, such information may be used to filter results without being considered in the collaborative filter algorithm.

In embodiments, data used in the process of obtaining search results, refining search queries, making corrections, making suggestions, disambiguating search queries, categorizing results, performing explicit or implicit searches, filtering, collaboratively filtering, or performing other processes defined herein may be stored in a database (e.g. a relational database). In embodiments, the data may be mined, associating, linked, extracted, or otherwise manipulated or used. For more information relating to the association and mining of such data, refer to the following document, incorporated herein by reference: *Integrating Association Rule Mining with Relational Database Systems: Alternatives and Implications*, by Sunita Sarawagi, Shiby Thomas, Rakesh Agrawal, published by the IBM Almaden Research Center.

A recommendation system may use information from a user's profile to make predictions regarding other information/products that might interest the user. Data used in the recommendation system may be obtained through the use of explicit and implicit data collection. Explicit collection refers to data collected from users who, for example, are directly rating items, ranking products, stating preferences, listing favorites or least favorites, etc. Implicit collection refers to data collected as, for example, a byproduct of user behavior, such as products viewed in an online store or products purchased. The recommendation system may compare the collected data to similar data collected from others and calculates a list of recommended items for the active user.

Suggestions may be generated for display 172 based upon each keystroke the user enters into the mobile communication facility 102. Suggestions may be cached locally on the mobile communication facility 102 and blended with the performance of server updates in order to optimize the overall performance of the wireless platform 100. Updates may also be provided to the cache memory of the mobile communication facility 102 without requiring a user keystroke. Additional suggestions may be supplied to users by ranking content based upon popularity, the frequency of query activity, frequency within content, the acceleration of the frequency of content, the frequency of purchases, the sales conversion rate, as well as any changes that occur to any of these metrics. Suggestion lists can also be derived by "de-duping" with frequent terms, such as "Tyra Banks out of 1, 2, 3," and categorizing, for instance, by title, artist, or a yellow pages-type taxonomy or other subject matter organization. The suggestions may be specific to a mobile communication facility 102, mobile subscriber characteristic 112, result facilities 148, carrier business rules 130, and/or search algorithm facilities 144. Suggestions may be dynamically displayed in a Java or BREW application. Suggestions may also be presented in a browser. For example, if a user types BR SP as their query, the responding WAP page may ask the user if they intended on entering Britney Spears or Bruce Springsteen. Then the user may click on the link of the intended query.

Recommendations may be specific to a mobile communication facility 102, mobile subscriber characteristic 112, result facilities 148, carrier business rules 130, and/or sponsorship facilities 162. Providing a recommendation to the user about other relevant content may be done either during search result display 172 or after a search item has been selected. The relationships between items may be based on transactions, searches, and query behaviors and may include cross-selling products (e.g., recording artists within the same genre) or offering users additional products and services (e.g., offering a taxi service following a user's purchase of movie tickets in an urban setting). Query classification may use a yellow pages-type taxonomy (e.g., restaurants or physicians, or for inferring that a five digit number is a postal zip code) and may be specific to a mobile communication facility 102, mobile subscriber characteristic 112, delivery facility, disambiguation facility 140, and/or parental controls 150. The wireless platform 100 may also use keyword mapping to a query classification based upon a taxonomy. For example, a user query of "screwdriver" may map onto the category "hardware." This keyword mapping may be specific to a mobile communication facility 102, mobile subscriber characteristic 112, delivery facility, disambiguation facility 140, and/or parental controls 150.

The results facility 148 may include general content and services, specific content catalogs, carrier premium content, carrier portal content, device based results, or home computer desktop search results. The general content and services provided in the results facility 148 could be podcasts, websites, general images available online, general videos available online, websites transcoded for MCF, or websites designed for mobile browser facilities. Specific content catalogs may include travel, driving directions, results displayed on a map, white and yellow page telephone directories, movie show times and reviews, comparison shopping and product reviews, weather, stock quotes, general knowledge questions, word definitions, a thesaurus, restaurant reviews and reservations, WiFi hotspot locations, horoscopes, area codes, zip codes, sports scores, flight times, fantasy sports statistics, drink recipes, pick-up lines, jokes, information within a physical store (e.g., inventory), a mobile wallet, an encyclopedia, adult content, gambling content, and FAQ's. The carrier premium content provided in the results facility 148 may include ringtones (monophonic, polyphonic, or real tones), ringback, music streaming, MP3, video, games, screensavers, images designed for cell phones, mobile books, or other mobile applications. Carrier portal content includes news, such as the current top stories, entertainment, business, technology, and finance, and sports, weather, stock quotes, and account information. Device based results provided in the results facility 148 may include messaging, such as SMS MMS and instant messaging, email, chat, PIM (address book), and monetary services for a mobile wallet. Finally, home computer desktop search results may include text documents, Portable Document Format ("PDF") documents, maps in various formats including annotated maps, or a similar facility, spreadsheets, presentations, photos and images, web pages, email, IM, and chat.

Ordering and displaying search results may be based upon a mobile communication facility 102, mobile subscriber characteristic 112, delivery facility, disambiguation facility 140, parental controls 150, search algorithm facilities 144, carrier business rules 158, and/or a sponsorship facility 162. The ordering of content for display may also be based upon the amount of content available within a category. The display 172 may be changed based upon the screen size of the mobile communication facility 102, and sounds or other multimedia content may adapt to capabilities of the mobile communication facility 102. Ordering and display of content may be organized by the type of content, the artist, the date, or concept (e.g., Jaguar as a car, or jaguar as an animal), and other categories may derive from deduction within the mobile search host facilities 114. In addition to ordering, content may be emphasized or deemphasized by weighting within the display 172. For example, weighting may occur through the use of size, motion, lack of symmetry, use of garish colors, sounds, multimedia, or other means of accenting content. For sponsored links, there may be opportunities for yield optimization (e.g., clicks multiplied by the bid cost).

The parental controls 150 function may be set up by the wireless provider 108 at the time that the user account is created. A web-based interface may be used for changing or modifying the parent controls and for entering/changing the password protection. Alternatively, the parental controls may also be managed via an interface contained within the mobile communication facility 102.

The privacy facility 152 may include one or more facilities for protecting user privacy, such as an encryption facility for encrypting sensitive user data. The privacy facility 152 may also include a facility for protecting the user from undesired content, such as unwanted commercial email, spam, spyware, viruses, or the like. A privacy facility may, for example, filter such content prior to revealing results or may, in other embodiments, suggest modified queries that are less likely to reveal a user's confidential information or that are less likely to return undesired content. A privacy facility 152 may also function in a manner similar to a secure channel, such as via VPN, with a wireless provider 108. This secure channel may permit sensitive information to be shared securely.

The transactional security facility 154 may contain additional privacy and parental control settings, transactional security settings for the protection of wireless shopping, and the management of digital rights. In embodiments such a facility may include password-based security, a public-key/private-key facility, or other suitable security protocol for ensuring the authenticity of the participants in a transaction that is executed using the mobile communications facility 102.

The carrier business rules 158 of the wireless provider 108 may be associated with, or included in, the mobile search host facilities 114. These rules may govern what content users may access (e.g., walled garden vs. non-walled garden), where within the user interface sponsor logos and links are placed, which sponsor facilities are included, rules for the inventory of advertisements, rules allowing categories of transactions by users (e.g., based on access conditions, employer controls, parental controls, or the like) and managing auctions. In the instance of duplicate information occurring in a search result, the preferred provider's content may be given priority over others.

In addition to voice recognition 122 residing on the mobile communication facility 102, it may be contained 160 within the mobile search host facilities 114 and use both software algorithms and hardware-based solutions for accurate voice recognition.

The sponsorship facility 162 stores premium content from sponsors that pay the wireless provider 108 to display this content to relevant users. Sponsors' information may link to a web site visited by the user (i.e., pay-per-click), or link to a call (i.e., pay-per-call). Sponsor information may include information that is text only, graphic information in the form of photographs, graphic art designs, or video, as well as various combinations of these. Sponsor information may also take the form of an interactive software application (i.e., a game), or special ringtones (e.g., jamtones). Sponsor information may be displayed to users based on the relation of the sponsor information and user search queries, results lists, items or categories, and the websites visited by the user. Web pages may display content for syndicated ads or links for syndicated ads. Furthermore, the wireless search platform 100 illustrated in FIG. 1 may contain the sorts of sponsor information described above in a separate database 128.

The implicit query facility 164 provides for the display of relevant content to users based on user activities other than explicit search queries. For example, in GPS data the locator facility 110 may indicate that the cell phone user is in the vicinity of a sponsor's restaurant. In addition, the clock contained in the mobile communication facility 102 and/or the wireless communication facility may indicate that it is midevening. A predictive algorithm could merge this information and make the implicit query that the user is interested in restaurants in his immediate vicinity at which he could purchase dinner, and then push content (ads, phone numbers, menus, reviews) to his mobile communication facility 102 for immediate display. Other implicit queries could similarly be based upon a user's parental controls 150, the carrier business rules 158, results facility 148, and so forth, either alone or in combination.

The wireless search platform 100 illustrated in FIG. 1 may contain a server 134 and database 138 connected to the Internet. Databases 138 connected to the wireless platform 100 over the Internet may store information, such as individual business websites with which the user transacts.

The wireless search platform 100 illustrated in FIG. 1 may contain a database storing wireless carrier business rules 130. The carrier business rules 130 may prioritize advertising content (see walled garden content 132 below) based on the financial interests of the wireless provider 108 or the importance of the sponsor 128. Additional carrier business rules 130 may include those described herein and in the documents incorporated by reference herein.

The wireless search platform 100 illustrated in FIG. 1 may contain a database storing "walled garden" content 132. Walled garden content 132 may be content from which the wireless provider 108 derives additional revenues based, for example, on user clickthroughs or content downloads (e.g. ringtones, wall paper, ringbacks, music, videos). Because of this additional revenue, the wireless provider 108, through its carrier business rules 130, may ensure that this advantageous content is given priority over search results that are equally relevant but do not have financial benefits for the wireless provider 108.

Figure 2:
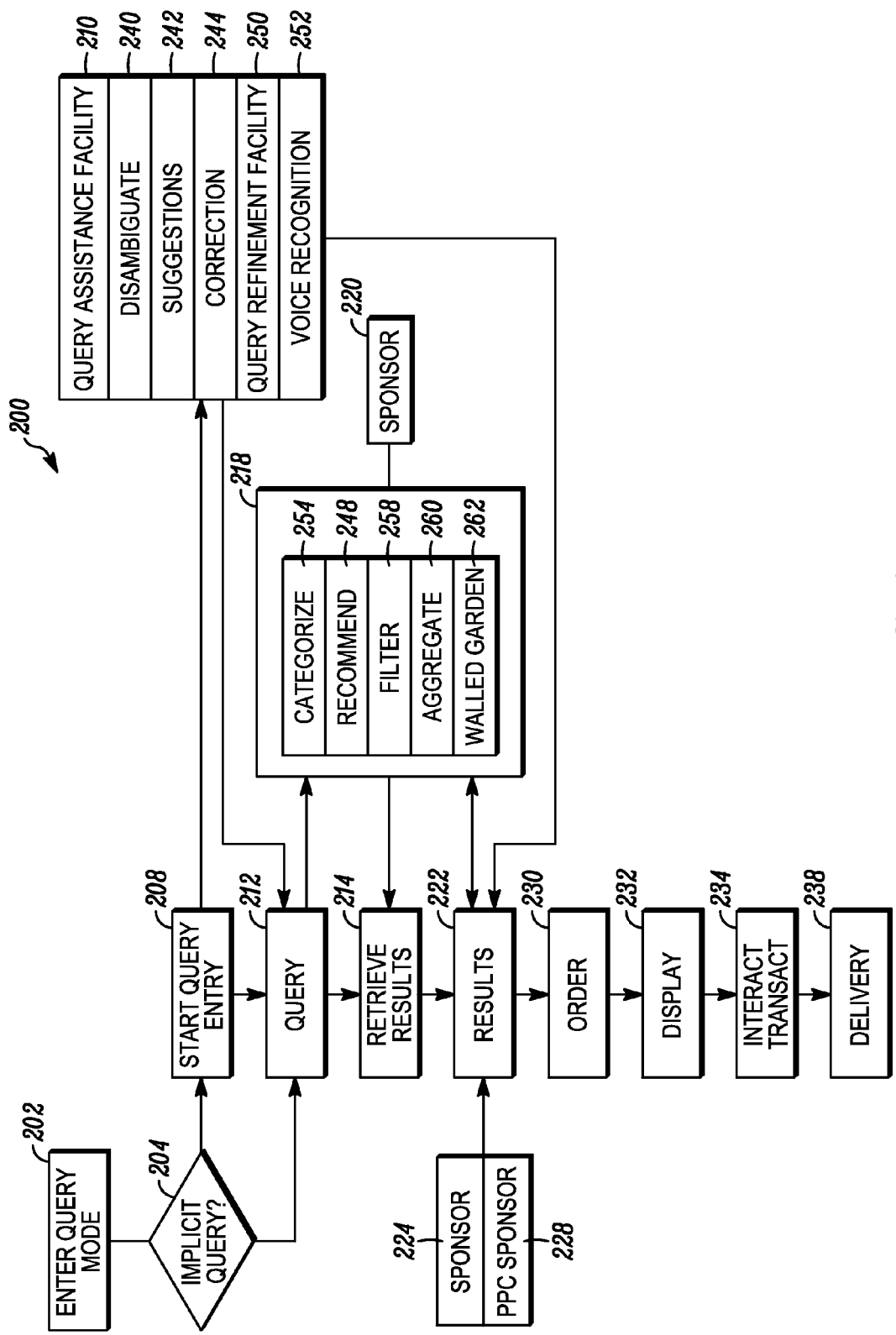
FIG. 2 illustrates a method for entering a search query, manipulating the query, and delivering search results.

FIG. 2 is a schematic diagram 200 showing a plurality of processes for handling a user query and producing a delivered result to the user. In the illustrated embodiment, the query mode 202 is entered. The query mode may be in the form of an explicit query entered by an active user, or it may be an implicit query initiated not by the user but by some characteristic related to the user and/or his behaviors (e.g., his GPS location). The start of the query entry 208 made explicitly by the user may be paired with additional information derived from a related implicit query 204. Depending on the clarity of the query entry 208, the query may need correction 244, disambiguation 240, or redirection 250. The query entry 208 may also be paired with recommendations 248, suggestions 242, or categorized 254 prior to further processing. If the start of the query entry 208 is made by voice, rather than text, it may be aligned with a voice recognition 252 program. Any or all of the processes used to optimize the search may be refined with information relating to the mobile communication facility, such as, for example, mobile subscriber characteristic information, location, time, filter algorithms, and the like.

Once the initial explicit and/or implicit query is made, the query 212 is processed and the initial results retrieved 214. Both the query 212 and the initial retrieved results 214 may undergo additional filtering 258 and aggregation 260. Walled garden content 262 and sponsored content 220 may also attach to the query 212 and present tailored results 222 to the user. The results 222 may also, in turn, trigger the posting of additional sponsor 224 messages and advertisements. Information from pay-per-click (PPC) sponsors 228 may link to the results, making it possible for the user to quickly learn about sponsors' services, phone numbers, addresses, hours of operation, sales, and so forth. If the start of the query entry 208, for example, undergoes redirection 250, it may either be routed back to the query stage 212 or immediately present the user with the results 222 based upon the query. Once results are retrieved, but prior to display 232, the content may be tested for compatibility with the user's mobile communication facility 102 by using a spider to run mock compatibility trials during which it emulates the processing characteristics of a broad array of commercially available wireless communication facilities, including the user's mobile communication facility 102 type, in order to determine the content within the result set that is compatible with the user's mobile communication facility 102.

The query results 222 may be ordered 230 prior to display 232 based, for example, upon the sponsor 224, mobile subscriber characteristics, information relating to the mobile communication facility, location, carrier rules, filter results, and/or walled garden 262 priorities. Once the results 222 are displayed 232, the user may initiate interactions/transactions 234 with the information (e.g., placing a call, click on a link, or an online order) that is then delivered 238 wirelessly through the wireless platform 100 described with regard to FIG. 1.

Referring back to FIG. 1, a wireless communication facility 104 may be an equipment enclosure, antenna, antenna support structure, and any associated facility used for the reception or transmittal of a radio frequency, microwave, or other signal for communications. An antenna may include a system of poles, panels, rods, reflecting discs or similar devices used for the transmission or reception of radio frequency signals. An antenna may be an omni-directional antenna (such as a "whip" antenna) that transmits and receives radio frequency signals in a 360-degree radial pattern, a directional antenna (such as a "panel" antenna) that transmits and receives radio frequency signals in a specific directional pattern of less than 360 degrees, or a parabolic antenna (such as a "dish" antenna), a bowl-shaped device for the reception and/or transmission of radio frequency communication signals in a specific directional pattern. Other antennae that may be included in a wireless communication facility are accessory antenna devices, such as test mobile antennas and global positioning antennas which are less than 12 inches in height or width, excluding the support structure.

One or more wireless providers 108 may mount equipment on a single wireless communication facility 104.

Other examples of devices that may comprise a wireless communication facility include a lattice tower, a wireless communication support structure which consists of metal crossed strips or bars to support antennas and related equipment, a monopole which is a wireless communication facility 104 consisting of a support structure, and related equipment, including all equipment ancillary to the transmission and reception of voice and data. Such equipment may include, but is not limited to, cable, conduit and connectors, stanchions, monopoles, lattice towers, wood poles, or guyed towers.

A wireless provider 108 may include any for-profit, non-profit, or governmental entity offering wireless communication services. A wireless provider 108 may include services utilizing a broad array of wireless technologies and/or spectra, including, but not limited to, Cellular, Advanced Wireless Services (AWS) Spectrum, Broadband PCS, Narrowband PCS, Paging, Wireless Communications (WCS), Wireless Medical Telemetry (WMTS), Specialized Mobile, Private Land Mobile, Maritime Mobile, Low Power Radio Service (LPRS), Dedicated Short Range Communications (DSRC), 218-219 MHz, 220 MHz, 700 MHz Guard Bands, Air-Ground, Amateur, Aviation, Basic Exchange Telephone, Broadband Radio Service (BRS), Citizens Band (CB), Commercial Operators License Program, Educational Broadband Service (EBS), Family Radio Service (FRS), General Mobile Radio, Industrial/Business Radio Pool, Intelligent Transportation Systems (ITS), Instructional Television Fixed (ITFS) See Educational Broadband Service, Lower 700 MHz, Medical Implant Communications (MICS), Microwave, Millimeter Wave 70-80-90 GHz, Multipoint Distribution (MDS/MMDS), Multi-Use Radio Service (MURS), Offshore, Personal Locator Beacons (PLB), Personal Radio, Public Safety, Radio Control Radio Service (R/C), and Rural services.

A locator facility may work with the mobile communication facility 102 in identifying the current geographic or other location of the mobile communication facility. A locator facility 110 may, for example, be used to locate the geographic location of a wireless device through the use of geographically-tagged personally identifiable data or personally identifiable data. Geographically-tagged personally identifiable data describes personally identifiable data that is linked to a particular location through use of location-based services. Personally identifiable data is information that can be used to identify a person uniquely and reliably, including but not limited to name, address, telephone number, e-mail address and account, or other personal identification number, as well as any accompanying data linked to the identity of that person (e.g., the account data stored by the wireless provider 108). In addition to or as an alternative to geographic location, a locator facility 110 may identify other locations, such as proximity to other users, proximity to a network location, or position relative to other users (e.g., in a line).

As described above, mobile subscriber information may be stored in an accessible form in a mobile subscriber characteristics database 112. The information may be accessible directly from a mobile communication facility 102, from the wireless provider 108, or from another user and or handler of the information. In addition, the mobile subscriber database 112 may be loaded with information relating to a mobile communication facility 102, a user of the mobile communication facility (e.g. a customer of the wireless service provider 108), and a wireless service provider 108 or other source of useful information. The mobile subscriber information may be used in conjunction with a search for information on a mobile communication facility 102. For example, the mobile subscriber information may be used to help better assess the desired search targets of a user using a mobile communication facility. In embodiments, the user may perform a search based on key words (or disambiguated, corrected, suggested or other terms as described herein), and some or all of the mobile subscriber characteristic information may be used in addition to the key words as a way of refining or customizing the search to the particular user. For example, the user's age, location, time of day, past mobile communication facility transactions (e.g. phone calls, clicks or click-throughs) may be used to predict what the user is more interested in. In embodiments, the information that is predicted as valuable may be listed at the top of the search results; they may be the only results produced or they may be highlighted in some way. The mobile subscriber characteristic information may be used in connection with an algorithm facility 144 for example. The mobile subscriber characteristic information may be used in connection with a category filter or other filter used to refine search results according to such information.

By way of another example, the mobile subscriber information stored in the mobile subscriber characteristics database 112 may be used in an implicit search as described in further detail herein. The wireless provider may gain information pertaining to the user's location, time of day, likes and dislikes (e.g. through interpretation of other transactions [e.g., phone activity or web activity] related to the mobile communication facility 102), and the wireless provider may facilitate the downloading of apparently relevant information to the mobile communication facility in anticipation of the user's desire for such information. For example, a location facility 110 may locate the mobile communication facility. The location may be associated with the time of day at which the location was obtained. The location information may be associated with the other mobile subscriber characteristic information through a phone number associated with the mobile communication facility. The location may be Harvard Square in Cambridge, Mass. The time may be 6:30 p.m. and the user may have called Chinese restaurants ten times over the past two months at about this same time. This may be determined based on previous queries or by history of phone calls that may then be reverse-searched to check for relevance to future queries.

With this information, the system may make an inference that the user is interested in dinner at a Chinese restaurant and download information pertaining to such in the area of Harvard Square. In addition, information pertaining to dinner categories or other results may be presented. In embodiments, this collection of user relevant information may be used in connection with sponsor information stored in the sponsor database 128, and some or all of the results presented to the user may be sponsored information. The sponsor information may be the result of a search result auction based on the user relevant information, or the sponsor information may be related to local restaurants wherein the sponsored link is a pay per call sponsored link, for example.

There are many ways in which the mobile subscriber characteristic information can be used in a mobile communication facility search for information, whether it is an explicit, implicit, or other form of search, and several such embodiments are presented in more detail below.

As described above, the sponsor database 128 may store sponsor information in an accessible form in the sponsor database 128 to be used in the searching for information, presentation of information, accessing of information, or other activity associated with the mobile communication facility 102. In embodiments, the sponsor information may be used to present syndicated sponsor links, advertising, content, or other information on the mobile communication facility 102.

A sponsored result may be presented to the user of a mobile communication facility 102 as a result of an auction for advertising space on the mobile communication facility 102. The auction may be keyword based, term based, phrase based, algorithm based, or some other system of associating information, a site, content, and the like with a search query or inquiry. For example, the user of a mobile communication facility 102 may conduct a network search by entering a search query, and the query, or some related form of the query (e.g., a disambiguation of the query, correction of the query, suggestion related to the query), may be processed through an auction in which the highest bidder for the auction receives an elevated right to advertise its content. The content may be presented as a sponsored link on a display associated with the mobile communication facility. The sponsored link may be highlighted, prioritized, or otherwise presented. In embodiments, the sponsored information may be presented on a site visited by the mobile communication facility user. For example, the user may click on a link other than the sponsored link. Once the website content is displayed on the mobile communication facility, information relating to the sponsored link may also be displayed, offering another chance for the user to click on the sponsored link.

In embodiments, a user of the mobile communication facility 102 may perform a search for information, or a search for relevant information may be performed in anticipation of the user desiring such information (e.g., an implicit search) and included in the results presented may be a sponsored link, content, or other information. The sponsored content may be the result of an auction (e.g., a keyword based auction, algorithm based auction, location based auction, mobile subscriber characteristics based auction, or combination auction wherein information, such as from the search query, is combined with other information, such as location or mobile subscriber characteristics), and it may be presented and displayed on a display associated with the mobile communication facility in a prioritized manner, highlighted manner, exclusive manner, or presented in some other manner.

In embodiments, sponsor information may be presented to a mobile communication facility 102 as the result of an auction. In embodiments sponsor information may be presented as a pay-per-call link or content. In a pay-per-call embodiment, there may not have been an auction for the right to post the information on the mobile communication facility 102. The information may have been presented because it appeared relevant or for some other reason. In such situations, the user of the mobile communication facility may be presented with a special phone number associated with the sponsor. When the special number is called, the receiver of the call (e.g., a vendor of goods or services) is presented with an option to receive the call and pay a commission to the poster of the information (e.g., the wireless service provider) or decline the call. In another somewhat similar scenario, the vendor may be allowed to accept the first call for free, or pay for/billed for the call later, but have to accept such charges in the future if referrals are desired. The user of the mobile communication facility 102 may store the sponsored or referred phone number in an address book of the mobile communication facility 102, and every time the number is called, the wireless service provider may be paid for the referral. In embodiments, the referral/sponsor fee may go down with use, go up with use, or remain stable with use. In embodiments, the referral/sponsor fee may change with time or other parameters. In embodiments, a pay per call number is the result of an auction process. Advertising syndication may be segmented by mobile communication facility 102, mobile subscriber characteristics 112, delivery facilities, and/or parental controls 150.

An aspect of the present invention relates to a syndication program where mobile content may be added to a website when the website is presented to a mobile communication facility (e.g. a cell phone). Such syndication may be decided by the wireless operator, wireless service provider, telecommunications provider or may be at the decision of the website owner through an opt-in process. The opt-in process may involve signing up with a wireless provider, mobile search provider, or other related entity. The opt-in process may also involve the insertion of a tag on the website. Mobile content may automatically be added to website pages for a specified URL or plurality of URLs. The addition of mobile content may be done without an indication on the page of where mobile content should be placed. A tag or other coded information may be included in the website to indicate where on the site the mobile content should be placed when delivered to a mobile communication facility. The syndication process may be context based relevancy, behavioral based relevancy or it may be based on a combination of the two techniques to associate relevant mobile content with the site. A server application (e.g. a WAP server application, WAP Gateway, Mobile Application Gateway, and the like) may automatically add mobile content to a website when delivering it to a mobile communication facility whether or not the website is tagged. The mobile content may involve a web content placement auction or other process for determining which content will be associated with keywords, topics, websites, and the like during the presentation.

Automatic syndication of mobile content to a website may be based at least in part on using contextual information associated with the website in order to determine the relevancy of mobile content that is available for syndication. Contextual information that may be associated with a website may include keywords, terms, or phases located on the website, the inbound links to the website, the outbound links from the website, click patterns and clickthroughs associated with the website (including click patterns and clickthroughs associated with sponsored content appearing on the website), metadata, website usage patterns including time, duration, depth and frequency of website usage, the website host, search verticals relating to the website, and other indicia of website context.

The contextual information relating to a website may be associated with mobile content that is available for syndication and presentation to the website based at least in part on relevance. Mobile content available for syndication may derive from a pool of mobile content sponsors participating in a contextual syndication program provided by a wireless operator, wireless service provider, telecommunications provider, mobile search provider, and the like. Alternatively, mobile content available for syndication may derive from outside of a contextual syndication program and be used for generating a mobile sponsor campaign for presentation to a potential participant in a contextual syndication program.

The relevancy of the contextual information associated with a website and the mobile context available for syndication may be indicated through the use of a relevancy score. The relevancy score may be a numerical summary of the statistical association between contextual website data parameters and mobile content parameters. The relevancy score may be a proprietary score assigned to a mobile content by a wireless operator, wireless service provider, mobile search provider, or telecommunications service provider. The contextual data parameters associated with websites may be standardized in a list. Mobile content may receive a relevancy score for each element in the contextual data parameters list. For example, a mobile content, such as a ringtone download advertisement, may receive a relevancy score for each of a plurality of websites. "Entertainment" websites may receive a higher relevancy score than the "Weather" websites. Similarly, the contextual information of an inbound link relating to "Music" may receive a higher relevancy score than an inbound link relating to "Pets." A mobile content relating to a ringtone derived from a popular Chinese-language song may receive a higher relevancy score for the contextual information of "Server Host=China" than for "Server Host=Argentina." Contextual information parameters "Keyword=Ringtone" or "Keyword=Music Download" could also be scored as highly relevant to syndicated mobile content relating to ringtones, and so forth. The relevancy scores of a syndicated mobile content may be stored in a mobile content relevance dictionary.

A program of automatically syndicating mobile content to a website may be based upon the relevance of the mobile content to the contextual information associated with the website. The automation of syndicating mobile content may be based at least in part on associating electronic information associated with a website (e.g. metadata). Contained within the metadata may be information regarding the relevance of the website's contextual data parameters with mobile content data parameters. Examples of only a few of the many examples of how a metadata may contain relevance information include: metadata indicating relevance to the website (e.g., "Ringtones"), metadata indicating the minimum relevancy score associated with a contextual data parameter that is required for syndicating a mobile content to the website, and the like. The metadata may communicate with the mobile content relevance dictionary in order to identify, receive and present relevant mobile content to a website.

In embodiments, an entity associated with a website may be able to opt into an automated syndication program. The opt-in may be done in association with a wireless operator, wireless service provider, mobile search provider, or telecommunications provider. The opt-in may be done through a self-service website, through an entity conducting the automated syndication program, through a ground mailed solicitation, phone call solicitation, through a website tag, and the like. Once an entity associated with a website has opted into the program, the automated syndication program may associate an electronic tag within the entity's website in order to commence the automated syndication. The automated syndication program may operate in conjunction with a WAP server, WAP Gateway, Mobile Application Gateway, remote server, a server that is serving pages to a mobile communication facility (e.g. phone), and the like. In embodiments, the opt-in process involves tagging the target website with a syndication indication tag. For example, a website operator may tag the website (and each of its associated pages) with a syndication indication tag indicating that it is to be syndicated when presented to a mobile communication facility (e.g. phone). The tag may also indicate the position of the mobile content on the page. Opt-in websites may choose not to insert a tag and allow the mobile content to appear automatically on the page. A server application designed for downloading the website to the mobile communication facility (e.g. a WAP server, WAP gateway, Mobile Application Gateway, and the like) may read websites looking for the syndication indication tag or may associate the website location with a database of URLs that have requested to participate (opt-in). Once the server confirms the site is to include syndicated mobile content, the server may automatically add mobile content to the website. The process of tagging the site may involve going to a wireless provider site or mobile search provider site to obtain the proper tag. In embodiments, the tag may be provided by any number of different entities or sources. For example, the tag may be provided by a third party tagging website. In embodiments, the format of the tag may be known and a site administrator may insert the tag.

The automated syndication program may be a flat fee, revenue sharing, or no-fee service program offered to an entity of a website. The automated syndication program may involve a split fee service program offered to an entity of a website in which the entity shares revenues with the wireless operator, wireless service provider, telecommunications provider, mobile search provider conducting the automated syndication program, server service provider and/or other entities involved in the transaction. Fees may be derived from sponsors of mobile content participating in the automated syndication program. The fees derived from the sponsors of mobile content, competitive bidding process, auction, flat fee service, or the like. The fee structure and bidding may be based on the relevancy score associated with a data parameter.

In embodiments, a website may be tagged for syndication and there may be no fee, a flat fee, a revenue sharing arrangement or other arrangement made when a server application syndicates the webpage. The content used to syndicate the website may have been provided through the an auction or other such arrangement and the fees received for the syndication application may be shared with a number of entities including the site owner, the wireless provider delivering the site to the mobile communication facility, the server operator and/or other entities involved in the transaction.

Alternatively, mobile content syndicated to a website may include a search box that may allow for searching the website alone or a set of content broader than the website alone.

As described above for an automatic syndication program based upon contextual information associated with a website, so too may an automatic syndication program be based upon behavioral information relating to a user of a mobile communication facility. Within an automated syndication program based upon behavioral information, the relevancy scores of mobile content may be based on a user's behavioral data parameters including, but not limited to, at least one of a user history, transaction history, geographic location, user device, time, mobile subscriber characteristic, mobile communication facility characteristic and/or other such user information as described herein. A mobile communication facility may be a phone, a mobile phone, a cellular phone, and a GSM phone.

While many of the embodiments herein have been described in connection with a syndicated website, it should be understood that the techniques apply to other forms of network content as well. For example, the techniques may be used for the syndication of a webpage, portion of a webpage, an image, video, movie, skin, graphical user interface, program interface, web content, downloadable content and other such content.

In embodiments, the carrier rules database includes information relating to search techniques, search methodologies, locations for searchable content, walled garden rules, out of garden rules, out-of-network searching rules, in-network searching rules, search result presentation rules, sponsor presentation rules, sponsor search rules, sponsor rules, content presentation rules, and other information and rules pertaining to the search, display, ordering, and/or presentation of information on the mobile communication facility 102.

Carrier business rules may provide guidance on how, for example, a search term is to be disambiguated or corrected, what search terms should be suggested as a result of an entered or submitted query, how results and in what order results should be presented, or how sponsors should be selected and or presented. The carrier business rules may provide guidance about when to search in-network databases (e.g., walled garden content 132) and when to search out-of network databases (e.g., database 138 through server 134). For example, a wireless provider 108 may want to cause users of mobile communication facilities 102 to order music, videos, ringtones, wallpaper, screensavers, and the like from an in-network database of walled garden content 132, while the wireless provider may want current news to come from an out-of-network source. The wireless provider may then set these rules and store them in a carrier business rules database 130. These rules can then be accessed by the wireless provider (or optionally from the mobile communication facility 102 or other related facility) during the search, presentation, or ordering, or other parameter according to the present invention.

A walled garden database 132 may be associated with a wireless provider and a mobile communication facility 102 according to an aspect of the present invention. The walled garden 132 refers to subset of carrier business rules 130 that determine the type of access to wireless content that a user is permitted. The walled garden may limit the scope of permitted content to a pre-defined content set that is determined by the wireless provider 108. For example, a wireless provider 108 may license content from third parties and offer the provider's subscribers a bundled package of the licensed content, while restricting access to other content. The wireless provider 108 may direct the content layout, authentication, royalty tracking and reporting, billing, quality of service, etc. through the provider's carrier business rules, or this function may be outsourced to a third party. The walled garden 132 permits a wireless provider 108 to offer its subscribers a suite of content as part of the subscriber's wireless basic account, thereby eliminating the need for the subscriber to individually pay for discrete licensed products within the licensed content package. The walled garden 132 restricts the choice of content that is available to subscribers. Typically, the wireless provider 108 is compensated for content distribution in a form of revenue split between itself and the licensed content providers.

Related to the walled garden 132 model of content distribution is the gated garden model. In the gated garden, the wireless provider 108 may create a virtual toll gate through which third parties may offer their proprietary content to the wireless provider's subscribers. In exchange, the wireless provider 108 shares in the revenues derived from its subscribers' accessing the third party content. Unlike the walled garden 132, in the gated garden model the wireless provider 108 typically does not assume responsibility for the content or customer service related to problems accessing the content.

The algorithm facility 144 may perform algorithms of all types including algorithms for combining information relating to a search, ordering results from a search, or displaying results, sponsoring results, and the like. For example, an algorithm facility may include an algorithm to define how to incorporate the mobile subscriber characteristics into a search query entered on the mobile communication facility 102. The algorithm may, for example, determine what information to use in combination with a search query, what information to use in an implicit search, what weight to provide to the various parts of the search (e.g. location receives a high weight in an implicit search), what sponsors are acceptable, how results should be ordered, how results should be displayed (e.g., highlighted), and/or determine other parameters related to the search. An algorithm facility 144 may also include sponsorship algorithms, algorithms related to auctions, algorithms related to pay per click, algorithms related to pay per call, or other algorithms related to the development of a search as described herein.

The algorithm facility 144 may be a software tool used for evaluating a number of possible solutions based upon a user query. The set of all possible solutions may be called the search space. In general, uninformed searching may employ brute force searching or "naïve" search algorithms for relatively simple, direct traversal of the search space. By contrast, informed search algorithms may use heuristics to apply knowledge about the structure of the search space during a search. Potential algorithms that may be used in the algorithm facility 144 include, but are not limited to, the uninformed search, informed search, tree search, list search, adversarial search, constraint satisfaction, genetic search, probabilistic search, simulated annealing, string search, taboo search, and/or federated search.

A parental control facility 150 may be a software-based means of restricting access to certain types of (user-defined) objectionable content. The parent control facility 150 may include multi-level and/or dynamic web filtering technology to filter and block out inappropriate content. The parental control facility 150 may link to other features of the wireless search platform 100 or mobile communication facility 102. For example, the parental control facility 150 may, upon blocking objectionable content, send an email notification or cell phone alert about inappropriate web browsing, instant messaging, and chat sessions, etc. Comprehensive log reports can summarize a child's activities. The parental control facility 150 may also include the means to control the total time that a user is permitted to use a mobile communication facility 102 or the Internet, filter web based email accounts, block objectionable pop up ads, etc.

A voice recognition facility 160 may be a software component enabling a machine or device (e.g., a cellular phone) to understand human spoken language and to carry out spoken commands. Typically, a human voice is received by the device and converted to analog audio. The analog audio may in turn be converted into a digital format using, for example, an analog-to-digital converter, which digital data may be interpreted using voice recognition techniques. Generally this is done through the use of a digital database storing a vocabulary of words or syllables, coupled with a means of comparing this stored data with the digital voice signals received by the device. The speech patterns of a unique user may be stored on a hard drive (locally or remotely) or other memory device, and may be loaded into memory, in whole or in part, when the program is run. A comparator may use, for example, correlation or other discrete Fourier transform or statistical techniques to compare the stored patterns against the output of the analog-digital converter.

The capacity of a voice recognition facility 160, such as vocabulary, speed, and length of digital samples that can be analyzed, may be constrained by hardware capabilities of the voice recognition facility 160, such as memory capacity, sampling rates, and processing speed, as well as the complexity of algorithms used for comparisons.

An implicit query facility 164 may automatically generate context-sensitive queries based on a user's current activities, characteristics, and/or the user's device characteristics. For example, the implicit query facility 164 may retrieve Internet links, music files, e-mails, and other materials that relate to an active user's query, but which the user did not specifically query. Other data linked to the user's mobile communication facility 102, for example geographic location obtained from the locator facility 110, may be used to initiate an implicit query for stores in the user's general facility that, based on the user's previous Internet usage, are of likely interest to the user. An implicit query facility may gather and download content onto the mobile communication facility 102 in anticipation of a mobile communication facility user's desire for such information. This technique of providing results in advance of the search query may be used to increase speed of content delivery, for example.

A client application interface may be associated with a mobile communication facility 102. The client application interface may be a software program operating through a processor (and operating system) on the mobile communication facility, and the program may facilitate processes used in the mobile communication facility and/or generate information through the display 172. The client application interface may perform a number of functions associated with the processes and devices as described herein. For example, the client application interface may produce the search query entry facility, operate in association with a voice activation facility, operate in association with transmission and reception circuitry on the mobile communication facility, operate in association with mobile search host facilities 114, produce a graphical user interface on the mobile communication facility, or perform other functions related to the mobile communication facility and/or systems and processes as disclosed herein. The client application interface may perform several functions, such as producing a graphical user interface on the mobile communication facility. Another function may be expanding a line item (e.g. a category, a download configuration or option, etc.) when a cursor or other interface is hovering on the item or otherwise interacting with the item. Another function may be to represent a hierarchy by a visual cue (e.g. with an arrow, multifaceted arrow, plus sign, or the like) with the sub-items appearing below when the visual cue is selected. Another function may be representing a hierarchy as line items with selection scrolling in another screen with the sub-items. Another function may be to provide instrumentation to allow for tracking of user clicks just as web pages would be tracked for click patterns. Another function may be using a camera associated with the mobile communication facility to track phone movement as a method for navigating on the screen (e.g. scrolling up/down & left/right on a picture, map, or text to facilitate selection of an item, or the like). Another function may be to provide smooth visual transitions (e.g. hierarchy screen movements and expanding line item) which may provide further visual indication, thereby increasing usage and sales. Another function may be to provide tool tips for icons. The tool tips may be presented after a predetermined hover time is achieved or there may be a visual cue near an action icon, for example. Another function may be to download suggestions in the background while cached suggestions are already displayed. Another function may be to download suggestions to display next to cached suggestions. Another function may be to cache results (e.g. operate similarly to suggestions). Another function may be to operate with preinstalled cached suggestions. Another function may be to perform software update notification, wherein the user may have the option to update. Another function may be to present notifications. Such notifications may be phased in to prevent millions of handsets from trying to update at the same time, for example. The client application interface may be designed to handle multiple mobile communication facility variations without requiring different versions of the software. The client application interface may generate a gradient shading and/or dithering to give color depth without putting a bitmap in the application. This may be provided to reduce the application size to facilitate downloads (e.g. increase speed of downloads). Another function may be to provide multi-lingual support. Another function may be to allow a user to send to a friend results or an item result (e.g. this may apply to any of the delivery facilities presented herein). Another function may be to provide pagination for results to increase page load speed and minimize network costs. Another function may be to search history stored locally to allow quick access from every list screen. The client application interface may be designed to incorporate carrier branding and the carrier branding may be in color and a logo may be presented. Another function may be to provide different data transfer modes to allow for different mobile communication facilities, carrier network speeds, user data plans, or other situations. Another function may be to provide a thin visual cue for background network activity without taking significant screen real-estate and allowing for continued interactivity of application. Another function may be to provide a skinnable search application whose arrangement and/or appearance may be customized, or the client application interface may be locally skinnable. Another function may be to provide a dynamic font selection and display based on information relating to the mobile communication facility 102. Another function may be to provide a dynamic screen reformatting based on information relating to the mobile communication facility 102. Another function may be to provide for entry of a general topic with categories and associated results displayed to allow for selection of the rest of the query without having to type in the entire query on a limited Query Entry Facility 120. Another function may be to provide or associate with a dynamic cache size based on information relating to the mobile communication facility capabilities. Another function may be to pre-download information through search experience (e.g. downloading results in background before selecting content type). Another function may be to provide high speed and low speed network communication based on changing data usage pattern or on other factors (e.g. processing more transactions in the background when the mobile communication facility is associated with a slow network). Another function may be to provide query composition using a combination of suggestions. The client application interface may perform other functions as needed on the mobile communication facility in connection with the functions and facilities outlined herein as well as other conventional functions of the mobile communication facility 102. Another function may be to use dynamic memory management, specifically using more or less memory for previous screens, pre-fetched information or cached data based on the capabilities of the device, and based on the other memory demands of the device, such as other applications or content on the phone. Another function may be to automatically update the application, with the user's permission. This particular function may be deployed in a phased manner that does not force all devices do not require updating at the same time.

In a wireless search platform 100, a mobile communication facility 102 may include a cache such as a cache memory, or a portion of a memory organized as a cache. The memory may be a hard drive, a static memory, or a non-volatile memory. The memory may be permanently installed in the mobile communication facility 102, or may be removable such as a memory card.

The cache may contain suggestions, such as mobile content, which may be accessed and presented on a display of the mobile communication facility 102 as a result of an action by a user of the mobile communication facility 102. The cached information may also be accessed and presented as a result of an action by a provider of services to the mobile communication facility 102, or by an automated application running on the mobile communication facility 102. Suggestions may be cached locally on the mobile communication facility 102 and blended with the performance of network updates to facilitate optimizing the overall performance of the wireless platform 100.

Data stored in the cache may be input directly by the user (e.g. a user name, address, search query). Alternatively the data stored in the cache may be transferred from the mobile network from a server 134, wireless provider 108, or a mobile search host facility 114. The cached data may be compressed prior to transmission to the mobile communication facility 102, and may be decompressed after receipt on the mobile communication facility 102. The data may be decompressed upon receipt, or may be decompressed as the data is accessed to be presented.

The cached data may be mobile content such as sponsored content, a sponsored link, a sponsored call, downloadable content, an audio stream, a video, a graphic element, an index such as a yellow pages or a white pages. Caching mobile content facilitates fast access and display of the content when needed to reply to a user query or input.

A client application interface of the mobile communication facility 102 may download suggestions in the background while cached suggestions are displayed. Another client application interface function may be to download and display network suggestions next to cached suggestions. The client application interface may cache search results (e.g. operate similarly to caching suggestions), or it may operate with preinstalled cached suggestions.

Suggestions, information, and mobile content to be downloaded to the mobile communication facility 102 may be generated by a server 134 or mobile search host facility 114 by ranking content based upon popularity, the frequency of query activity, frequency within content, the acceleration of the frequency of content, the frequency of purchases, the sales conversion rate, as well as any changes that occur to any of these metrics.

Suggestions may be retrieved from the cache in response to a query input by the user. If the cache cannot provide a full list of suggestions, a request may be sent to a server 134 or a mobile search host facility 114. However, a request for suggestions may be sent by the mobile communication facility 102 independent of the amount of relevant suggestions in the cache. This facilitates keeping the cached suggestions updated. These updated suggestions may be displayed along with the cached suggestions, and then the updated suggestions may be cached to speed up future suggestions. The updated suggestions may supplement or replace the previously cached suggestions. The previously cached suggestions may be replaced if the new suggestions are ranked higher.

Suggestions, content, and other information cached on the mobile communication facility 102 may be identified with a date stamp or time stamp of caching. A function of the client application interface may be to request updates to cached information based on the age of the cached information. As an example such a function may ensure that cached suggestions are updated every 48 hours or sooner.

To effectively use the cache memory resources of the mobile communication facility 102, a server may reply to a request for an update of cached suggestions with information that indicates the cached suggestions no longer rank high enough relative to other suggestions or user characteristics to continue to be stored on the mobile communication facility 102. In such an example, the client application interface may delete the appropriate cached information such that it will not appear in response to future searches or queries, freeing up the memory for other uses. Upon detecting a query to which the server indicates cached information is obsolete, the server 134 may also download new suggestions, information, content, or the like to the mobile communication facility 102 for caching.

Suggestions, mobile content, or information may be downloaded to the cache of a mobile communication facility 102 through an explicit search, or through an implicit search. An example of an explicit search includes a user entering a search query in the user interface of a mobile communication facility 102 and requesting a search. An implicit search includes search activity performed either as a result of a query by the client application interface of the mobile communication facility 102 without a user query entry, or by one or more applications running on the server 134 or the mobile search host facility 114. Implicit searches may be triggered based on a schedule, based on a change in location of a mobile communication facility 102, and based on the age of the cached information in the mobile communication facility 102 cache memory. As an example, a user's location may change such as when a user travels to a different city. This change in location may trigger an implicit search of local restaurants meeting a criteria established based on prior user behavior, perhaps including other users' behavior upon entering this location.

The presentation of information, such as cached suggestions, may be the result of user search query. If there is a matching relationship between the search query and the previously downloaded results in the mobile communication facility 102 cache, the previously downloaded results may be presented. The user may perceive this as a very fast search or a high bandwidth connection because the search results are presented from a memory of the mobile communication facility 102.

Cached suggestions may also be presented to a user even if the user cannot connect to the wireless network, enabling the user to gain access to important network information which has been cached on the user's mobile communication facility 102.

The cached information may be presented in categorized groups, in thumbnail format, or in a preview format such as an audible ring tone preview, a text excerpt, a video excerpt, or an audio file excerpt.

A client application interface may process or cause processes to occur in the background. For example, in embodiments, results may be presented to the mobile communication facility 102 as they are retrieved without waiting for the entire result set to be retrieved. In embodiments, certain results may be presented and displayed while other results are in the process of being presented or displayed. This background processing of results may increase the speed at which some results can be presented to a mobile communication facility 102. In embodiments, certain categories of results may be presented to the mobile communication facility 102 before other categories. For example, images may take longer to download, process, and/or collect as compared to ringtones, so the category of ringtones, or individual ringtones, may be presented to the mobile communication facility 102 before or while the image results or image category is presented.

Figure 3:
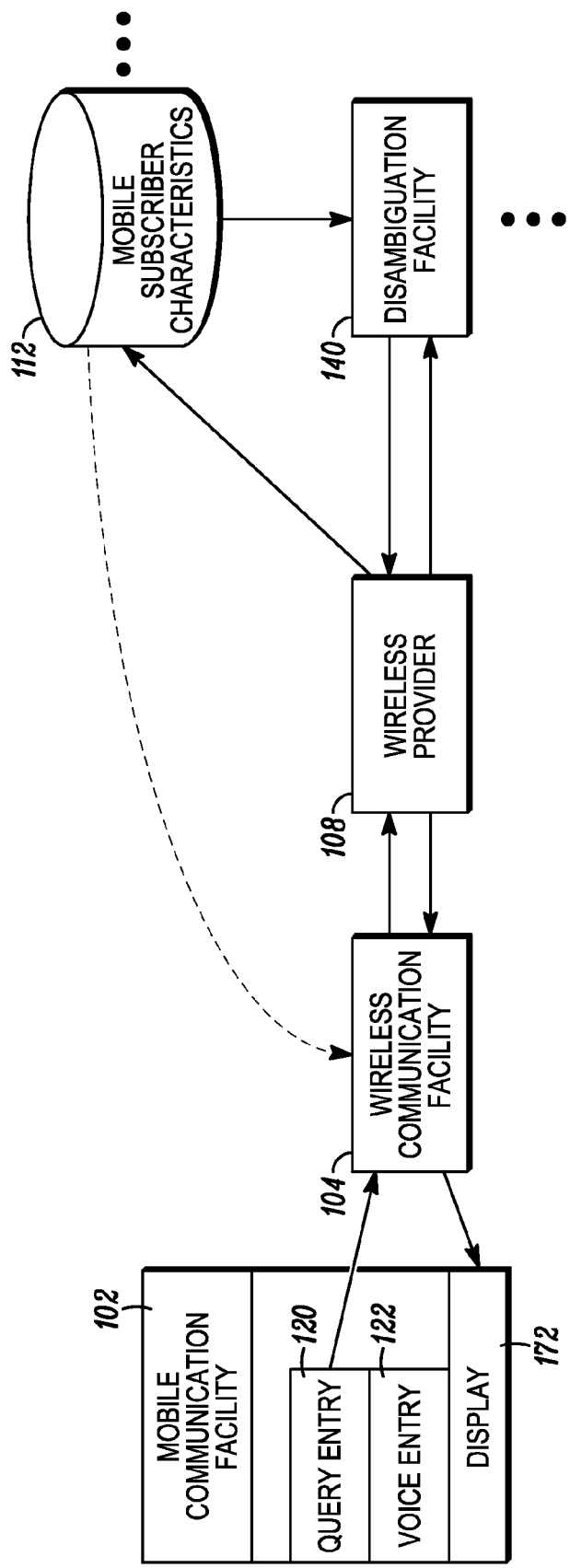
FIG. 3 illustrates sample elements involved in disambiguating a search query.

FIG. 3 illustrates a generalized disambiguation process for a disambiguation facility 140 associated with a mobile communication facility 102 and a data source, such as a mobile subscriber characteristics database 112, according to an aspect of the present invention. The disambiguation facility 140 is a means for deriving greater clarity from ambiguous user queries. As depicted in the FIG. 3 schematic, a query entry 120 may be processed through a wireless communication facility 104 and wireless provider 108 to a disambiguation facility 140. Although the example provided in FIG. 3 shows a disambiguation facility 140 linked to a mobile subscriber characteristics database 112, the disambiguation facility 140 may link to any number of other data sources (e.g., carrier business rules 130, content walled garden 132, etc.). Similarly, disambiguation may proceed through facilities other than a disambiguation facility 140 (e.g., a parent controls facility 150 or algorithm facility 144). As shown in FIG. 3, the disambiguation facility 140 may receive the query from the wireless communication facility 104 and the wireless provider 108 and link the query to information known about the user that is stored in the mobile subscriber database 112 (e.g., age, sex, past Internet usage, etc.). This additional information, coupled with the original query entry 120, may permit an unambiguous query to be processed. For example, a user may enter a query entry 120 of "Royals." This query entry 120 may be processed through the wireless communication facility 104 and a wireless provider 108 to a disambiguation facility 140 that is linked to a mobile subscriber database 112 containing, among other data, the user's residence of Kansas City, Mo. The disambiguation facility 140 may link this demographic information to the query entry 120 "Royals" and predict (i.e., disambiguate) that the user is more likely seeking information pertaining to the Kansas City Royals baseball team than information about the family of Swedish Royals. Disambiguation may include part-of-speech disambiguation, word sense disambiguation, phrase identification, named entry recognition, or full sentential parsing. Part-of-speech disambiguation refers to the process of assigning a part-of-speech tag (e.g., noun, verb, adjective) to each word in a query. By assigning the part-of-speech tag to each word, the device can draw inferences about each word by virtue of its context. For example, the word "house" may be a noun or a verb. By tagging this word with an appropriate part-of-speech tag, additional information about the user query, and its ultimate goal, may be derived. Word sense disambiguation refers to the process of sorting words that have multiple meanings. Phrase identification refers to the process of relating each word to others within a phrase to derive the context of individual words. Named entity recognition generally refers to recognition of proper nouns that refer to specific names, places, countries, etc. Full sentential parsing is the process of decomposing a sentence into smaller units and identifying the grammatical role of each and its relation to the other units. These and other techniques may be employed within the disambiguation facility 140 to infer a user's intended meaning for a search or search string.

Figure 4:
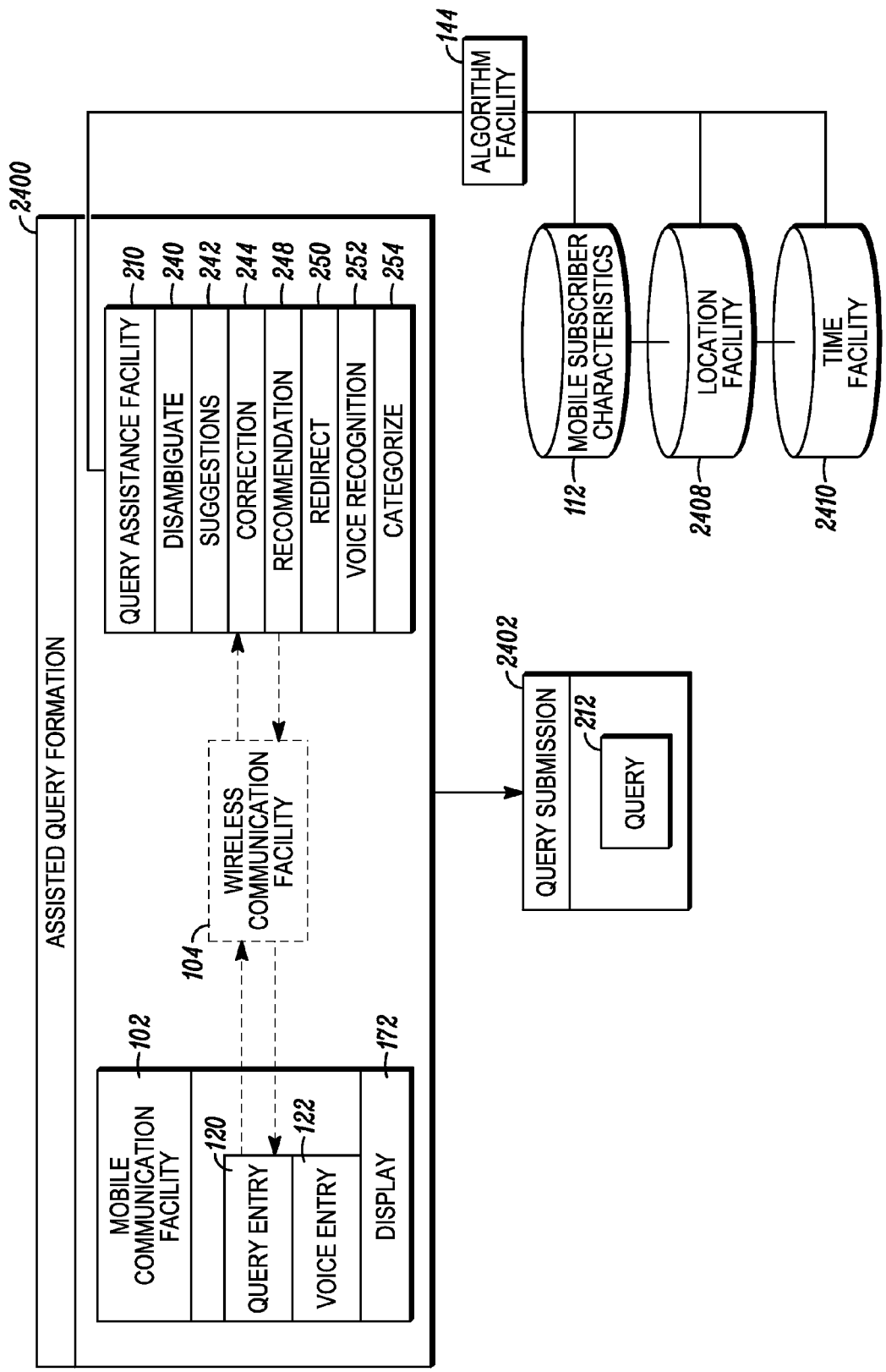
FIG. 4 illustrates a generalized method for disambiguating a search query.

FIG. 4 depicts an interactive process between the mobile communication facility 102 and the query assistance facility 210 that may be used for assisted query formation 2400. Once a user submits a query entry 120 to the mobile communication facility 102, a process of correction 244 may be necessary for assisted query formation 2400 that is sufficient to yield intelligible and useful result set(s). This process may occur on the client side 102 and/or within the mobile communication facility 104. As part of the correction 244 process, information specific to the type of mobile communication facility 102 may be used; for example, if the device has unique delivery capabilities, the query may need correction in order to derive a result set compatible with these capabilities. Information stored in the mobile subscriber characteristics database 112, location information 2408, or time information 2410 may also be used with the correction 244 process.

For example, a user may provide a query entry 120 "Coltrain" that is sent through a wireless communication facility 104 so that the query assistance facility 210 may begin. Because the query assistance facility 210 is linked to other data sources, as part of the correction 244 process, information from the filter algorithm facility 144 may be linked to the query entry 120 to provide more information to be used in the process of producing a more useful search query. In this example, the user's filter algorithm facility 144 may use information such as a history of online purchases, product names, numbers, purchase amounts, and purchase dates and times. Within the databases associated with the filter algorithm facility 144 there may be a history of many recent purchases of compact discs recorded by the saxophonist, John Coltrane. Because the original user query entry 120, "Coltrain" is not a known word, the query assistance facility 210 may predict a correction 244, taking into account user-specific data contained in the purchase history of the filter algorithm facility 144, such as that the user seeks information pertaining to "Coltrane," as opposed to "Coal Train" or "Soul Train," etc. In various embodiments, or particular user searches within one embodiment, the query assistance facility 210 may involve one of these additional data facilities, a plurality of the data facilities, or none of the data facilities.

It is possible that a user's query entry 120 returns a null result set or an improbable result set. In this case, the search facility, in conjunction with the mobile communication facility 102, could automatically trigger correction 244 and iteratively cycle through alternative query entries 120 until a non-null or higher probability result set is delivered.

In embodiments, additional recommendations may be made following a user's query entry based upon the information related to the mobile communication facility. For example, mobile subscriber characteristics, carrier business rules, or sponsor information, in conjunction with the query entry, may suggest relevant recommendations for the user. The recommendations may be paired with the query entry search results or presented prior to, or following, the display of the search results.

A user's prior search activities and search results may also be used to create recommendations for the user. Prior search activities may include transactions, search queries, visits to websites, and other acts initiated by the user on the mobile communication facility. The geographic location of the mobile communication facility may foster recommendations including, but not limited to, sponsor information (e.g. products and services) in the user's current geographic vicinity. The current time may be used independently or in conjunction with other information to create user recommendations. For example, the independent fact that it is noon, may create recommendations for restaurants serving lunch. This information may be further filtered by the location of the mobile communication facility to recommend only those restaurants that are in the user's immediate vicinity and further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation, food, theater, sports, entertainment, movies, corporations, work, banks, post offices, mail facilities; location of and directions to gas stations, taxis, buses, trains, cars, airports, baby sitters, and other service and goods providers such as drug stores, drive through restaurants, bars, clubs; times of movies and entertainment; news; and local information.

Various aspects of the assisted query formation 2400 may be activated or de-activated under user or provider control. For example, a user with a particular search, such as a phone number for a particular individual, may wish to suppress corrections or suggestions that might be generated with assisted query formation 2400, which might otherwise try to replace a correct, but unusual, name spelling with more conventional or popular subject matter. Thus in one aspect, a user interface for an assisted query formation system may include controls for selectively activating various ones of the tools available to the system. The tools may include, for example, the recommendations, predictions, disambiguations, categorizations, and the like discussed above. In another aspect, a service provider such as the wireless provider 108 or mobile communication facility 102 described above may offer selected ones of the tools as value-added services that may be provided to select customers, such as full-service or premium customers, or offered on an a la carte basis individually or in packages. In such embodiments, query assistance may be requested by a customer using, e.g., a web site, cellular phone data access, or telephone voice access, and may be requested on a subscription basis, such as recurring monthly, or on a daily or per search basis.

Figure 5:
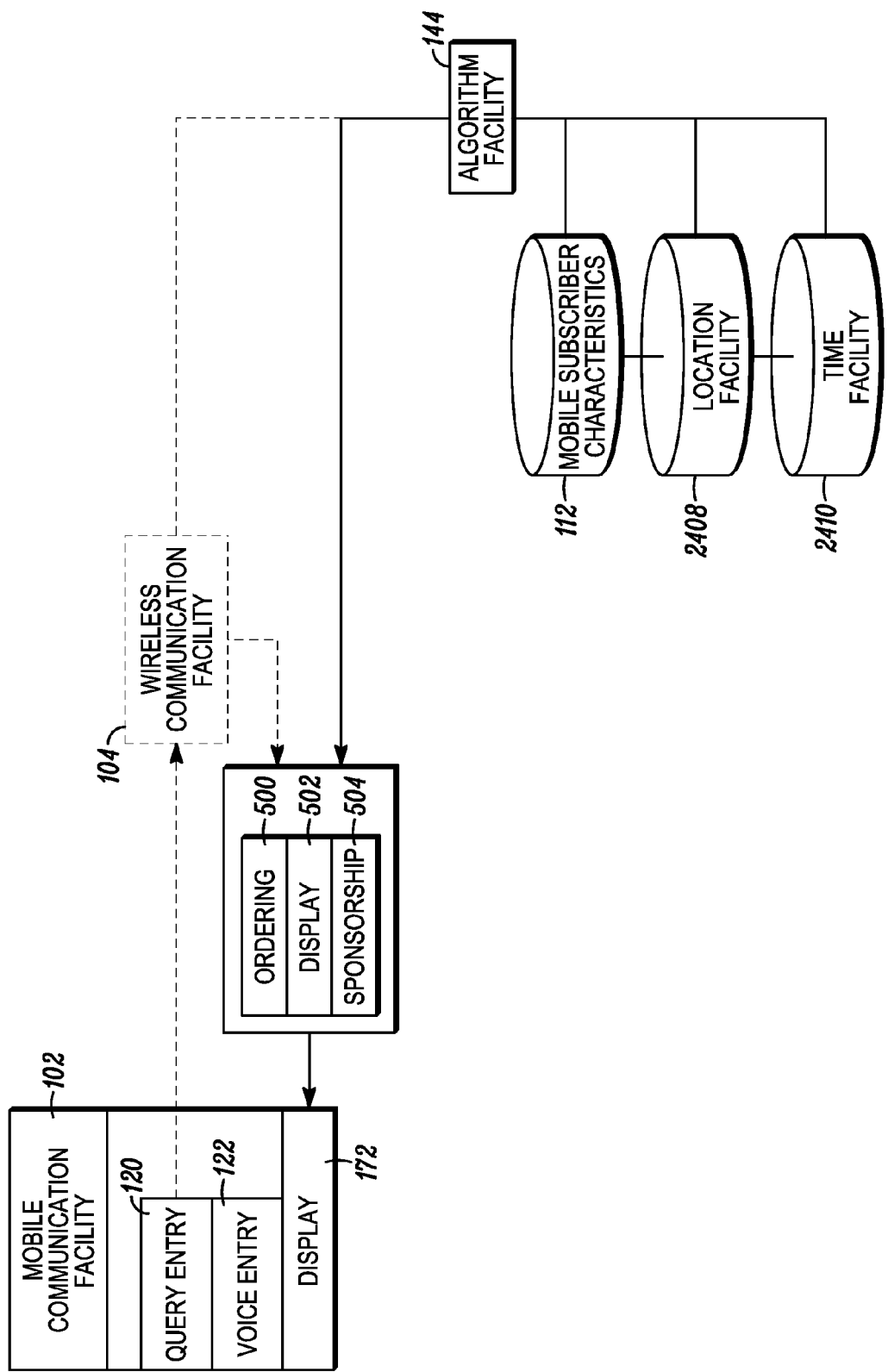
FIG. 5 illustrates a generalized method for ordering, displaying, and adding sponsorship information to search results.

FIG. 5 shows a generalized process for the ordering 500, displaying 502, and sponsorship 504 prioritization of query results based upon the association of a query entry 120 with additional data sources, such as a mobile subscriber characteristics database 112, a filter algorithm facility 144, a location database 2408, and/or a time data 2410. The ordering 500, display 502, and sponsorship 504 prioritization may involve one of these additional data facilities, a plurality of the data facilities, or none of the data facilities as appropriate.

In embodiments, the methods and systems disclosed herein can be adapted to provide an optimized search based on mobile subscriber characteristics 112, including any of the characteristics 112 described herein and in the documents incorporated by reference herein. Thus, these methods and systems may include providing a search function adapted for a mobile device and adapting the search function based on characteristics of the subscriber of the mobile device, wherein the subscriber characteristics are derived at least in part from a mobile subscriber data facility that is maintained by a carrier of mobile device services.

In embodiments the adapted search function may be an implicit query, an active query, a disambiguation action, a retrieval function, a filtering function, a presentation function, a routing function, or another function or action related to initiation, processing, or completion of a search or presentation of search results.

In one embodiment the search function is adapted based on age. The age-adapted search function may be an implicit query, an active query, a disambiguation action, a retrieval function, a filtering function, a presentation function, a routing function, or another function or action relating to the initiation, processing, or completion of a search. For example, a mobile communication facility 102 may have an implicit query 204 running, so that upon viewing a user interface of the mobile communication facility 102, the user sees results of a query that is automatically pre-formulated for the user. The implicit query 204 may be based on the age of the user, such as running the query most frequently run by persons of similar age on the same day. For example, a teenager might have an implicit query 204 that relates to a music group or movie, an adult might have an implicit query that relates to major new headlines, and a retired person might have an implicit query that relates to information relevant to financial markets. An age-adapted search function may also operate in connection with an active query; for example, a given query may return results that are age-appropriate, age-filtered, age-ranked, or age-disambiguated. For example, entering "Pink" might return results for Pink Floyd if the user is over age 30, while it might return results for the female artist Pink if the user is under 30. A user might be prompted to resolve such an ambiguity, or the ambiguity might be automatically resolved for the user. Thus, an age-adapted search function may be provided for a mobile communication facility. In embodiments, the age of the user may be obtained from a mobile subscriber data facility that stores mobile subscriber characteristics 112.

In one embodiment the search function is adapted based on gender. The gender-adapted search function may be an implicit query, an active query, a disambiguation action, a retrieval function, a filtering function, a presentation function, a routing function, or another function or action relating to the initiation, processing, or completion of a search. Gender may be determined by reference to a database that stores mobile subscriber characteristics 112, such as a database of a carrier of wireless services. A gender-adapted search function may, for example, inform an implicit query 204, such as presenting results of the searches that are most popular for that gender for that day. Similarly, results may be disambiguated by a disambiguation process 240 that is informed by gender. For example, the search process might run a query on a database of female-oriented sites if the user is female while running a query on male-oriented sites if the user is male. Similarly, a disambiguation process 240 may filter results based on gender. For example, a query such as "uprights" might return results for vacuum cleaners for a female user while returning results for football kickers for a male user.

In one embodiment the search function is adapted based on ethnicity. The ethnicity-adapted search function may be an implicit query, an active query, a disambiguation action, a retrieval function, a filtering function, a presentation function, a routing function, or another function or action relating to the initiation, processing, or completion of a search. For example, an implicit query 204 may generate results that are most popular among members of an ethnic group. A search or query formation process may search for results that relate to a targeted ethnic group. A disambiguation process 240 (either upon query formation or upon result retrieval or presentation) may disambiguate based on ethnicity. For example, a query related to "paris" might return results for Paris, France, for a French person, while returning results for Paris Hilton for an American. Ethnicity information may be obtained from a database of mobile subscriber characteristics 112, or it might be entered by the user in the user interface.

In one embodiment the search function is adapted based on religion or cultural affinity. The religion-adapted search function may be an implicit query, an active query, a disambiguation action, a retrieval function, a filtering function, a presentation function, a routing function, or another function or action relating to the initiation, processing, or completion of a search. The information may be obtained from a mobile subscriber characteristics 112 database, either obtained by a carrier based on application or transactions, or inferred based on past behavior or searches of the user. The religion-adapted search function may, for example, run implicit queries that are most popular among members of the same religious affiliation. A religion-adapted disambiguation facility may disambiguate queries based on religious affiliation. For example, a query for "Muhammed" might return information about the prophet for members of Islamic religions, while it might return information about the boxer for those who don't have religious affiliations.

In one embodiment the search function is adapted based on area code. The area code-adapted search function may be an implicit query, an active query, a disambiguation action, a retrieval function, a filtering function, a presentation function, a routing function, or another function or action relating to the initiation, processing, or completion of a search. For example, a user with a given area code could receive implicit query results based on other searches by members of the same area code. Also, queries may be disambiguated or results filtered, sorted, or presented based on area code (or other location information). For example, a user entering "Paris" in the 270 area code might receive results for Paris, Tenn.; a user entering "Paris" in the 310 area code might receive results for Paris, Hilton; and a user entering the same word in the 617 area code might receive results for Paris, France.

In one embodiment the search function is adapted based on home address. The address-adapted search function may be an implicit query, an active query, a disambiguation action, a retrieval function, a filtering function, a presentation function, a routing function, or another function or action relating to the initiation, processing, or completion of a search. As with the area code-adapted search function example above, the implicit query, disambiguation, or results can be varied based on the location of the user's home address (information that can be obtained from, for example, a carrier's database of mobile subscriber characteristics 112).

In one embodiment the search function is adapted based on work address. The work-address-adapted search function may be an implicit query, an active query, a disambiguation action, a retrieval function, a filtering function, a presentation function, a routing function, or another function or action relating to the initiation, processing, or completion of a search. For example, a user may see results of an implicit query 204 that is the same as other queries from the user's employer, such as press releases that mention the employer. A disambiguation facility 240 may resolve ambiguity (including with help of the user) based on work address. For example, a user with a work address at a location of General Electric might receive search results on that company when entering the term "light" in a search engine, while a user with a different work address might receive results relating to lighting products. Again, the work address information may be obtained from a database of mobile subscriber characteristics 112, such as maintained by a carrier of wireless services.

In one embodiment the search function is adapted based on billing address. The billing-address-adapted search function may be an implicit query, an active query, a disambiguation action, a retrieval function, a filtering function, a presentation function, a routing function, or another function or action relating to the initiation, processing, or completion of a search. The billing address information may be obtained from a database of mobile subscriber characteristics 112, such as may be maintained by a carrier of wireless services. The billing-address-adapted search function may, for example, present implicit query results similar to those of other users with the same billing address (such as queries relevant to the business enterprise that exists at that billing address). Similarly, queries may be disambiguated or results filtered, sorted, presented, or routed based on billing address. For example, a user with a billing address at a location of a large company may be presented with results that relate to that company, while a user with a residential address as the billing address may receive results that are tailored to users in the general area of that location.

In embodiments, information about the user's home address, area code, billing address, or other location information may be combined with information about a user's current location as determined by a location facility 110, such as to determine whether a user is in proximity to the user's home or workplace. If so, a user may receive query results suitable for one of those environments (such as receiving work-related information while at work and consumer information while at home). If the user is far from home and work, then the user may receive (by implicit query, or as a result of a search) results that are pertinent to travel in the location where the user is located, such as hotel, car rental, and restaurant information. Similarly, an away-from-home user may have an implicit query formed, or a partial query disambiguated, based on the user's status as a traveler. For example, a partial entry for "hot" might return shopping bargains for a user close to home, while it might return hotels for a user who is traveling.

In one embodiment the search function is adapted based on credit card information. The credit card information-adapted search function may be an implicit query, an active query, a disambiguation action, a retrieval function, a filtering function, a presentation function, a routing function, or another function or action relating to the initiation, processing, or completion of a search. The credit card information may be obtained from a database of mobile subscriber characteristics 112 or from a credit card provider. The information may include information relating to current balances, credit limits, or the like. For example, an implicit query may present results based on the available credit balance for a user, such as presenting searches or results for expensive goods for a user who has a low balance and high credit limit, while presenting searches or results for financial counselors for users who have high balances and low credit limits.

In one embodiment the search function is adapted based on passwords. The password-adapted search function may be an implicit query, an active query, a disambiguation action, a retrieval function, a filtering function, a presentation function, a routing function, or another function or action relating to the initiation, processing, or completion of a search. Thus, a mobile search facility may include a password-protected search capability, such as allowing searches for certain types of content only if the user enters the correct password. For example, walled garden content like ringtones or video clips might be available only if the user enters a password that is stored in the database of mobile subscriber characteristics 112.

In one embodiment the search function is adapted based on family information (e.g., mother's maiden name, number of siblings, marital status, or the like). The family information-adapted search function may be an implicit query, an active query, a disambiguation action, a retrieval function, a filtering function, a presentation function, a routing function, or another function or action relating to the initiation, processing, or completion of a search. For example, an implicit search may be running that presents searches or results that are similar to those recently run by family members or friends of the user. A disambiguation process 240 may operate based on family information, such as resolving ambiguity in queries based on searches conducted by family members, or based on the status of the family. Similarly, results may be filtered, sorted, presented, or routed based on family information. For example, a search for the term custody might lead to results on child custody for a divorced user, while it might reveal information on trust and custody accounts for a married user.

In one embodiment the search function is adapted based on birthplace. The birthplace adapted search function may be an implicit query, an active query, a disambiguation action, a retrieval function, a filtering function, a presentation function, a routing function, or another function or action relating to the initiation, processing, or completion of a search. Thus, an implicit search based on birthplace may include searches or results that are similar to those of other users with the same birthplace or users currently located in proximity to the birthplace. Similarly, results may be filtered or queries disambiguated based on birthplace. For example, entering "derby" may retrieve results relating to horse racing for users born in Kentucky, while it may retrieve results relating to hats for users born elsewhere.

In one embodiment the search function is adapted based on driver's license information. The license-information-adapted search function may be an implicit query, an active query, a disambiguation action, a retrieval function, a filtering function, a presentation function, a routing function, or another function or action relating to the initiation, processing, or completion of a search. License information may include age and address information, which may be used as contemplated by the various age- and location-based search function examples provided herein. License information may also include height, weight, hair color, eye color, vision status, and the like. For example, a user may be presented results that are similar to those of persons of similar appearance.

In one embodiment the search function is adapted based on employment data. The position-adapted search function may be an implicit query, an active query, a disambiguation action, a retrieval function, a filtering function, a presentation function, a routing function, or another function or action relating to the initiation, processing, or completion of a search. The employment data may be obtained from a database of mobile subscriber characteristics 112, such as that maintained by a carrier of wireless services. The employment data may, for example, indicate a user's status as an officer of a company, as an employee of a certain type (e.g., sales and marketing, supply chain management, finance, human resources, or the like) or level (e.g., associate, manager, vice-president, etc.), length of employment, or other status. For example, an implicit query 204 may present results similar to those for searches run by users holding similar positions in other companies. Similarly, a query may be disambiguated, or a result retrieved, sorted, filtered, presented, or routed, based on the user's position. For example, a sales manager entering "incentive" might receive information on promotions related to his employer's products, while a human resources manager might receive information relating to employee incentive stock options.

In one embodiment the search function is adapted based on employer. The employer-adapted search function may be an implicit query, an active query, a disambiguation action, a retrieval function, a filtering function, a presentation function, a routing function, or another function or action relating to the initiation, processing, or completion of a search. An employer-adapted implicit query may show results similar to those for other searches run by employees of the same employer on the same day or in recent days. An employer-adapted disambiguation facility may resolve ambiguities as to the query or results based on the status of the employer, and an employer-adapted search function may retrieve, sort, present, or route results based on employer characteristics, such as obtained from a database of mobile subscriber characteristics 112. For example, a user whose employer is the United States Patent Office might receive information on processing patents in response to a query on "application", while a Microsoft employee might receive information on software applications in response to the same query.

In one embodiment the search function is adapted based on annual income. The annual income adapted search function may be an implicit query, an active query, a disambiguation action, a retrieval function, a filtering function, a presentation function, a routing function, or another function or action relating to the initiation, processing, or completion of a search. Annual income may be obtained from a database of mobile subscriber characteristics 112, such as that maintained by a carrier of wireless services. An implicit query 204 may thus present results that are for searches by incomes of similar annual income, or searches that are designed to fit the demographic characteristics for that annual income. For example, middle-income individuals may be presented results for mid-sized, value-based cars, while high-income individuals may be presented results for luxury items, vacations, or the like. A disambiguation facility 240 may resolve ambiguities about queries, and a search function may retrieve, sort, present, or route results based on annual income. For example, a query for "boat" might run a query or reveal results for commuter boat schedules for individuals of middle income but might run a query or reveal results for yachts for high-income individuals.

As with annual income-adapted searches, in one embodiment the search function is adapted based on income bracket. The income-bracket adapted search function may be an implicit query, an active query, a disambiguation action, a retrieval function, a filtering function, a presentation function, a routing function, or another function or action relating to the initiation, processing, or completion of a search.

In one embodiment the search function is adapted based on items purchased. The items-purchased-adapted search function may be an implicit query, an active query, a disambiguation action, a retrieval function, a filtering function, a presentation function, a routing function, or another function or action relating to the initiation, processing, or completion of a search. Items purchased may be obtained from a database maintained by a carrier, such as showing transactions made using a mobile communication facility 102. For example, implicit queries may be run and results presented based on transaction history, such as presenting results for peripherals and software applications for individuals who have recently purchased a computer, or the like. Similarly, queries may be disambiguated, or search results retrieved, sorted, presented, or routed based on items purchased by a user. For example, a user who has recently purchased a car and who enters "car" in a user interface may receive information about registering the car, obtaining insurance, or the like, while a user who has recently shopped for, but not purchased, a car may receive results showing ratings of cars.

In one embodiment the search facility 142 is adapted based on friends and family information (including any of the foregoing types of information as stored in a database of mobile subscriber characteristics 112). The friend-and-family information-adapted search facility may be an implicit query 204, an active query, a disambiguation action, a retrieval function, a filtering function, a presentation function, a routing function, or another function or action relating to the initiation, processing, or completion of a search. For example, a user may be presented implicit query 204 results similar to those of family members or friends. A user query may be disambiguated, or search results retrieved, sorted, presented, or routed based on friends and family information. For example, a user entering "sister" in a user interface may receive results obtained by a sister's most recent searches, while a user who does not have friends and family might receive results relating to nuns.

In one embodiment the search facility 142 is adapted based on bill amount(s). The bill-amount-adapted search facility may be an implicit query 204, an active query, a disambiguation action, a retrieval function, a filtering function, a presentation function, a routing function, or another function or action relating to the initiation, processing, or completion of a search. For example, a user whose bill is declining may be presented with offers to obtain more mobile services, while a user whose bill is very high might receive information about making choices that will reduce the cost of wireless services.

In one embodiment the search facility 142 is adapted based on average bill total. The average bill-adapted search facility may be an implicit query 204, an active query, a disambiguation action, a retrieval function, a filtering function, a presentation function, a routing function, or another function or action relating to the initiation, processing, or completion of a search. For example, a user whose current bill exceeds the average may be presented with results relating to saving money, while a user whose current bill is less than the average may be presented with opportunities to purchase other services or content, such as walled garden content 132.

In one embodiment the search facility 142 is adapted based on payment history. The payment-history-adapted search facility may be an implicit query 204, an active query, a disambiguation action, a retrieval function, a filtering function, a presentation function, a routing function, or another function or action relating to the initiation, processing, or completion of a search. For example, a user who is up-to-date on payments may receive offers for additional services, while a user who is delayed may receive reminders or may receive results that relate to managing debt. Similarly, users whose payment histories are favorable may be presented with results that relate to more expensive goods and services.

In one embodiment the search facility 142 is adapted based on on-time payment history. The on-time payment-history adapted search function may be an implicit query 204, an active query, a disambiguation action, a retrieval function, a filtering function, a presentation function, a routing function, or another function or action relating to the initiation, processing, or completion of a search. For example, users with very good records of making payments on time may be presented with more favorable offers, such as incentives or promotions, based on the prediction that their payment histories will continue to be favorable.

In one embodiment the search facility 142 is adapted based on on-line usage amount. The on-line usage amount-adapted search facility may be an implicit query 204, an active query, a disambiguation action, a retrieval function, a filtering function, a presentation function, a routing function, or another function or action relating to the initiation, processing, or completion of a search. The usage amount may be obtained from a database maintained by a wireless service provider. On-line usage amount may be used to generate implicit query 204 results. For example, heavy users may be presented with results similar to other heavy users (such as more specialized types of results), while less heavy users may be presented with more general results, such as news headlines. Queries may be disambiguated, or results retrieved, sorted, presented or routed, based on on-line usage amount. For example, a heavy on-line user entering "blog" may be sent to the day's most popular blogs, while a light user might be presented with more general results describing the blogging phenomenon.

In one embodiment the search facility 142 is adapted based on duration of on-line interactions. The duration-adapted search facility may be an implicit query 204, an active query, a disambiguation action, a retrieval function, a filtering function, a presentation function, a routing function, or another function or action relating to the initiation, processing, or completion of a search. For example, in an implicit query 204, a user with a history of long interactions may be presented with a more complex or extensive result set, while a user with a history of short interactions may be presented only with basic information. Similarly, a disambiguation facility 240 or a search facility 142 that retrieves, sorts, presents, or routes results may do so based on duration of on-line interactions. For example, a user whose interactions are long may be presented with long articles, scientific research, or the like, while a user with shorter duration interactions may be presented only with news headlines or the like. Similarly, for example, a short-duration user entering "football" may receive a list of the day's scores, while a long-duration user may receive articles on football.

In one embodiment the search facility 142 is adapted based on number of on-line interactions. The interaction-adapted search facility may be an implicit query 204, an active query, a disambiguation action, a retrieval function, a filtering function, a presentation function, a routing function, or another function or action relating to the initiation, processing, or completion of a search. For example, in an implicit query 204, a user with a history of many interactions may be presented with more results, while a user with few interactions may be presented only with the most pertinent results. Similarly, a disambiguation facility 240 or a search facility 142 that retrieves, sorts, presents, or routes results may do so based on number or frequency of on-line interactions, such as indicated by a database of a wireless provider 108. For example, a user whose interactions are many may be presented with long result sets, while a user with fewer interactions may be presented only with the most relevant results. Similarly, for example, a frequent user entering "Peter" may receive only information relating to uses of that name in the day's news, while a less frequent visitor might receive more general results, ranging from Peter the Great to Pete Townsend to Peter Rabbit.

In one embodiment the search facility 142 is adapted based on family status and family information. The family-information adapted search facility may be an implicit query 204, an active query, a disambiguation action, a retrieval function, a filtering function, a presentation function, a routing function, or another function or action relating to the initiation, processing, or completion of a search. For example, an implicit search may present results about dating or relationships to a single user, while a married user may receive results relating to child rearing. Similarly, a disambiguation process 240 or a search facility 142 that retrieves, sorts, presents, or routes results may use family status and family information. For example, a single user entering "love" may receive results relating to dating and relationships, while a married user might receive information relating to anniversaries.

In one embodiment the search facility 142 is adapted based on number of children. The number-of-children-adapted search facility may be an implicit query 204, an active query, a disambiguation action, a retrieval function, a filtering function, a presentation function, a routing function, or another function or action relating to the initiation, processing, or completion of a search. The number of children may be obtained from a database of mobile subscriber characteristics 112, such as that maintained by a wireless provider 108. An implicit query 204 may run based on number of children. For example, a childless user may receive results based on other factors, while a user with four children might receive implicit query 204 results that relate to childrearing or to educational funding products. Similarly, queries may be disambiguated, or results returned, sorted, presented, or routed based on number of children. For example, a user with children entering the term "cold" might receive health-related information relating to outbreaks of the common cold, while a user with no children might receive general weather information.

In one embodiment the search facility 142 is adapted based on shopping habits (e.g., views of or purchases of goods and services made with a technology like Mobile Lime). The shopping-habit-adapted search facility may be an implicit query 204, an active query, a disambiguation action, a retrieval function, a filtering function, a presentation function, a routing function, or another function or action relating to the initiation, processing, or completion of a search. For example, a user who shops frequently for music may be presented with music-oriented content in implicit query 204, while the implicit query may present different items to other users whose shopping habits are different. Similarly, queries may be disambiguated, or results returned, sorted, presented, or routed, based on shopping habits. For example, a frequent book purchaser may be presented with Stephen King books upon entering "King" in a query interface, while a frequent music purchaser may be presented with results related to Elvis Presley.

In one embodiment the search facility 142 is adapted based on click stream information. The click stream-adapted search facility may be an implicit query 204, an active query, a disambiguation action, a retrieval function, a filtering function, a presentation function, a routing function, or another function or action relating to the initiation, processing, or completion of a search. The click stream information may be stored on the mobile communication facility 102 or in a remote location, such as a database or server maintained by a wireless provider 108 or an entity operating on behalf of a wireless provider 108. A click stream-adapted search function may run implicit queries 204 based on past behavior, such as running queries for new cars if the user has recently viewed cars with the mobile communications facility 102. Similarly, queries may be disambiguated, or results returned, sorted, presented, or routed, based on click stream information. For example, a user entering a partial URL into a query facility may be directed to a recently visited web site, while another user would be directed to a process for resolving ambiguity. Click stream information may be used to infer a wide range of behaviors and characteristics. Thus, the other embodiments described herein may take place in combination with deriving one or more mobile subscriber characteristics 112 from click stream information. For example, if click stream information shows that a user has visited twenty female-oriented sites, then the information can be used to infer the gender of the user, after which various embodiments of gender-adapted search functions described herein are enabled.

In one embodiment the search facility 142 is adapted based on device type. The device type-adapted search facility may be an implicit query 204, an active query, a disambiguation action, a retrieval function, a filtering function, a presentation function, a routing function, or another function or action relating to the initiation, processing, or completion of a search. For example, implicit queries may be run to retrieve results that are suitable for the type of device and filter out other results. For example, if a mobile communications facility 102 does not have a video rendering capability, then video-related results can be filtered out of the process. Similarly, queries may be disambiguated, or results retrieved, sorted, presented, or routed based on device type. For example, a user may be presented with results of walled garden content 132 that is consistent with a device. Upon entering a query, a user may receive results that are filtered to include content items that are viewable/downloadable for the device and to exclude other content. Device type, which may be obtained from the database of mobile subscriber characteristics 112, may also be used to infer other items. For example, a particular device may be most popular with a particular age or gender of users, in which case the results can be adapted in a manner similar to that described in connection with the age-adapted search function described herein.

In one embodiment the search facility 142 is adapted based on device version. The device version-adapted search facility may be an implicit query 204, an active query, a disambiguation action, a retrieval function, a filtering function, a presentation function, a routing function, or another function or action relating to the initiation, processing, or completion of a search. The device version may be retrieved from a database of mobile subscriber characteristics 112, such as that maintained by a wireless provider 108. For example, implicit queries may be run to retrieve results that are suitable for the particular version of a device and filter out other results. For example, if a mobile communication facility 102 does not have a video rendering capability, then video-related results can be filtered out of the process. Similarly, queries may be disambiguated, or results retrieved, sorted, presented, or routed based on device version. For example, a user may be presented with results of walled garden content 132 that is consistent with the correct version of a device. Upon entering a query, a user may receive results that are filtered to include content items that are viewable/downloadable for the version of the device and to exclude other content. Device version, which may be obtained from the database of mobile subscriber characteristics 112, may also be used to infer other items. For example, a particular device version may be most popular with a particular age or gender of users, in which case the results can be adapted in a manner similar to that described in connection with the age-adapted search function described herein.

In one embodiment the search facility 142 is adapted based on device characteristics. The device characteristics-adapted search facility may be an implicit query 204, an active query, a disambiguation action, a retrieval function, a filtering function, a presentation function, a routing function, or another function or action relating to the initiation, processing, or completion of a search. The device characteristics may be retrieved from a database of mobile subscriber characteristics 112, such as that maintained by a wireless provider 108. Characteristics may include the type of device, applications running on the device (e.g., capability to show photos, render video, play music, or the like). For example, implicit queries may be run to retrieve results that are suitable for the particular characteristics of a version of a device and filter out other results. For example, if a mobile communications facility 102 does not have a photo imaging capability, then photo-related results can be filtered out of the process. Similarly, queries may be disambiguated, or results retrieved, sorted, presented, or routed based on device characteristics. For example, a user may be presented with results of walled garden content 132 that is consistent with the correct characteristics of a device. Upon entering a query, a user may receive results that are filtered to include content items that are viewable and/or downloadable for the characteristics of the device and to exclude other content. For example, a user with a device that plays .mp3 files may receive music files upon entering a query for "bruce", while a user without music capabilities may receive web search results related to Bruce Springsteen. Device characteristics, which may be obtained from the database of mobile subscriber characteristics 112, may also be used to infer other items. For example, particular device characteristics may be most popular with a particular age of user or gender, in which case the results can be adapted in a manner similar to that described in connection with the age-adapted search function described herein.

In one embodiment the search facility 142 is adapted based on usage patterns (including those based on location, time of day, or other variables). The usage-pattern-adapted search facility may be an implicit query 204, an active query, a disambiguation action, a retrieval function, a filtering function, a presentation function, a routing function, or another function or action relating to the initiation, processing, or completion of a search. For example, if a user frequently searches for restaurants on weekends, then an implicit query 204 may run restaurant searches on weekends. Similarly, the same query (e.g., "rest" may return restaurant-related results on weekends, while revealing results related to restructured text during work hours (particularly if the usage pattern indicates that the user is a software engineer). Thus, a disambiguation process 240 or a search facility 142 to retrieve, sort, present, or route results may use usage patterns to accomplish those functions. Usage patterns may be obtained from a database of mobile subscriber characteristics 112, such as that maintained by a wireless provider 108. A wide range of usage patterns may be used to assist with formation of queries (implicit and explicit) and with retrieval and organization of results. The algorithm facility 144 may include one or more modules or engines suitable for analyzing usage patterns to assist with such functions. For example, an algorithm facility 144 may analyze usage patterns based on time of day, day of week, day of month, day of year, work day patterns, holiday patterns, time of hour, patterns surrounding transactions, patterns surrounding incoming and outgoing phone calls, patterns of clicks and clickthroughs, patterns of communications (e.g., Internet, email and chat), and any other patterns that can be discerned from data that is collected by a wireless provider 108 or Internet service provider. Usage patterns may be analyzed using various predictive algorithms, such as regression techniques (least squares and the like), neural net algorithms, learning engines, random walks, Monte Carlo simulations, and others. For example, a usage pattern may indicate that a user has made many work-related phone calls during a holiday (such as by determining that the user was located at work and making calls all day). Such a user may be presented preferably with content that is related to a vacation, such as showing hotels, rental cars, or flight promotions in an implicit query 204, or preferentially presenting such items in response to explicit queries (including disambiguating partial queries or ambiguous queries). For example, such a user might receive hotel information in response to entering the partial query "hot," while another user receives weather information. In one such embodiment the search facility 142 is adapted based on phone usage. The phone usage-adapted search facility 142 may be an implicit query 204, an active query, a disambiguation action, a retrieval function, a filtering function, a presentation function, a routing function, or another function or action relating to the initiation, processing, or completion of a search.

In one embodiment the search facility 142 is adapted based on device and/or subscriber unique identifiers. The identifier-adapted search facility may be an implicit query 204, an active query, a disambiguation action, a retrieval function, a filtering function, a presentation function, a routing function, or another function or action relating to the initiation, processing, or completion of a search. Here, as with usage-pattern-adapted search functions, the identifier may be used to identify the user in the search facility 142, allowing targeted queries, disambiguation, and results.

In one embodiment the search facility 142 is adapted based on content viewing history. The viewing-history-adapted search facility may be an implicit query 204, an active query, a disambiguation action, a retrieval function, a filtering function, a presentation function, a routing function, or another function or action relating to the initiation, processing, or completion of a search. Viewing history may be obtained by a local facility on the mobile communication facility 102, such as a database or cache on a cellular phone, or it may be obtained at a central facility, such as an Internet server, or a central office for phone services. Such data may be retrieved, for example, from a database of mobile subscriber characteristics 112. Viewing history may be analyzed, in embodiments, by an algorithm facility 144, such as to infer behavior based on content viewing patterns. In embodiments viewing history may include content viewed using a mobile communication facility 102. In other embodiments viewing history may include history with respect to other content provided by the same entity that is the wireless provider 108. For example, such a provider may provide television content via DSL or cable, Internet content to a home, or other content. Viewing histories for all such content may be analyzed to assist with improving search functions, including assisting with development of implicit queries, resolving ambiguities with explicit queries, and retrieving, sorting, filtering, presenting, and routing search results. For example, if a database of mobile subscriber characteristics 112 shows that a particular viewer watched the first six episodes of "24" but missed the seventh episode, then a search for the element "24" may retrieve online sources for the seventh episode, while another user entering a similar query might receive general information about the show or information about 24-hour fitness centers. Viewing history should be understood to encompass all types of interactions with content, such as downloading, listening, clicking through, sampling or the like, including all types of content, such as text, data, music, audio, sound files, video, broadcast content, and the like.

In one embodiment the search facility 142 is adapted based on content presented for viewed by/not viewed by user. The declined-content-adapted search facility may be an implicit query 204, an active query, a disambiguation action, a retrieval function, a filtering function, a presentation function, a routing function, or another function or action relating to the initiation, processing, or completion of a search. Information about declined content may be obtained from a database of mobile subscriber characteristics 112, such as that maintained by a wireless provider 108, which may also be a provider of various other content sources that have been presented and declined (such as by explicitly declining an option to view content or by implicitly declining—ignoring—the content, such as upon repeated opportunities to view it). Wireless providers 108 frequently have access to such viewing histories, because the same carriers also provide television, Internet, and other content sources. Declined content can be analyzed, with an algorithm facility 144, to assist with forming implicit queries, resolving explicit queries, and with retrieving, sorting, filtering, presenting, and routing results. For example, if a user has consistently declined, or failed to view, music-oriented programming content (whether on a cellular phone, TV, or Internet), then a query for the term "U2" might return information on Soviet-era spy planes, notwithstanding that for other users such a query would return content related to the rock group U2. As in analysis of usage patterns, a wide range of algorithms, including learning algorithms, regression analyses, neural nets, and the like may be used to understand patterns in declined content that assist with handling queries and results.

In one embodiment the search facility 142 is adapted based on content and programs downloaded. The download-history-adapted search facility may be an implicit query 204, an active query, a disambiguation action, a retrieval function, a filtering function, a presentation function, a routing function, or another function or action relating to the initiation, processing, or completion of a search. Downloaded content and programs may be determined from a database of mobile subscriber characteristics 112, such as based on cellular phone usage, television viewing, Internet usage, email usage or the like. Such content and programs may be analyzed and used in the manner described above for usage pattern-adapted search functions. In one such embodiment the search facility 142 is adapted based on videos, music, and audio listened to and/or downloaded. Again, the content-action-adapted search facility may be an implicit query 204, an active query, a disambiguation action, a retrieval function, a filtering function, a presentation function, a routing function, or another function or action relating to the initiation, processing, or completion of a search. In another such embodiment the search facility 142 is adapted based on television watched. The television viewing-adapted search facility may be an implicit query 204, an active query, a disambiguation action, a retrieval function, a filtering function, a presentation function, a routing function, or another function or action relating to the initiation, processing, or completion of a search. In another such embodiment the search facility 142 is adapted based on television subscriptions. The subscription-adapted search facility may be an implicit query 204, an active query, a disambiguation action, a retrieval function, a filtering function, a presentation function, a routing function, or another function or action relating to the initiation, processing, or completion of a search. In one such embodiment the search facility 142 is adapted based on timing and duration of viewing/downloading. The view/download timing- and duration-adapted search facility may be an implicit query 204, an active query, a disambiguation action, a retrieval function, a filtering function, a presentation function, a routing function, or another function or action relating to the initiation, processing, or completion of a search.

In embodiments, the search facility 142 may be a high-volume, scalable, redundant search engine specifically tuned for mobile content. The engine may be implemented in Java and deployed in a two-tier architecture in which the presentation logic runs on web servers which format the results returned by passing the actual search requests off to search servers. Search servers may use proprietary algorithms that blend results from full-text metadata indices with results from 3rd-party (partner) APIs. The search engine may be accessed via a query API. A query is a set of words, possibly restricted to specific fields, coupled with restrictions on content type, category, and format.

In embodiments, the search facility 142 may use a ranking algorithm which incorporates a number of features, including one or more of full-text relevance (using, e.g., term frequency/inverse document frequency or "TFIDF", or variants and enhancements thereto), word order and proximity scores, number of words matching scores (with thresholds), popularity (overall and within-demographic), editorial boosts, and field-by-field boosts. The wireless provider 108 may control the editorial boosts.

In an aspect of the invention, mobile content may be reviewed to generate a relevance that can be used to determine if the content should be presented to a mobile communication facility 102. The relevance may alternatively be used to determine if at least some portion of content presented to the mobile communication facility 102 should be presented to the user of a mobile communication facility 102. Mobile content may relate to one or more of blogs, sports, gambling, social networking, travel, news, community, education, product, service, government, and the like. In an example, mobile content that relates to gambling may be prevented from being presented to a mobile communication facility 102 that is being used by a government employee.

The review of mobile content may be an algorithmic review. The algorithmic review may include a review of inbound links to the mobile content, outbound links from the mobile content, text of the mobile content, keywords of the mobile content, a link structure of the mobile content, metadata associated with the mobile content, and other aspects of mobile content that may be herein described.

Outbound links in the mobile content may be reviewed to determine a relevance as part of an algorithmic review. Outbound links may link to mobile content that has been blacklisted, whitelisted, or not yet reviewed. An outbound link to blacklisted content may be edited such that the link presented to the mobile communication facility 102 is disabled. Alternatively the link may not be presented to the mobile communication facility 102. If an outbound link is to whitelisted mobile content, it may be included in content presented to the mobile communication facility 102. A review of mobile content with outbound links to blacklisted content may result in the reviewed mobile content to be blacklisted.

If an outbound link of reviewed mobile content points to mobile content that has not yet been reviewed, the outbound link may be followed such that the linked content may be reviewed. If the linked content is determined to be inappropriate or blacklisted, then the mobile content containing the outbound link may be blacklisted.

Text in the mobile content may be reviewed to determine relevance as part of an algorithmic review. Text may be parsed and compared to a list of words and phrases to determine relevance. Text may also be processed using language processing techniques such as those employed by Microsoft Natural Language Processor to derive a context of the text. The derived context may be compared to known contexts to determine relevance. A variety of known search algorithms may be applied in an algorithmic review of mobile content text to determine relevance of the text. Techniques such as word stubbing, word aliasing, misspelling variants, and the like may also be applied to an algorithmic review of mobile content text.

Mobile content keywords or metadata may be reviewed to determine relevance as part of an algorithmic review. Keywords and/or metadata may represent critical aspects of the content because they may be visible to search engines and web crawlers. As an example, a website that contains one or more keywords associated with radical political activism may be detected by an algorithmic review seeking these keywords. The website may be blacklisted, whitelisted, or assigned a relevance score based on these keyword matches.

A relevance as generated from a review of mobile content may be represented by a score such as a number within a range. The range of relevance scores may extend from whitelisted content to blacklisted content with the relevance score indicating the degree to which the mobile content contains aspects that prevent it from being whitelisted. Blacklisted mobile content may be prevented from being presented to the mobile communication facility 102. Whitelisted mobile content may be allowed to be fully presented to the mobile communication facility 102.

A relevance score may be a composite of a review of one or more aspects of the mobile content. For example, each aspect may be reviewed and assigned a value such as 0 for a whitelisted aspect and 1 for a blacklisted aspect. In an example with 10 aspects of a website reviewed, a first mobile content with a relevance score of 2 may indicate mobile content with few aspects that may not be whitelisted while a second mobile content with a relevance score of 8 may indicate mobile content that has a high percentage of blacklisted aspects. A user may identify a maximum relevance score associated with mobile content to be presented to the mobile communication facility 102. In this example, if a user set a maximum relevance score for presentation of mobile content to 4, the first mobile content would be presented while the second mobile content would not be presented. Additionally, the user may indicate a maximum relevance score associated with content to be whitelisted for presentation to the mobile communication facility 102. If the user sets a maximum relevance score for whitelisting to 2, then the first mobile content would be whitelisted. However, if the user set the maximum relevance score for whitelisting to 1, both the first and the second mobile content would not be whitelisted.

A user of a mobile communication facility 102 may identify a policy or preference associated with determining which mobile content may be presented to a mobile communication facility 102. A wireless provider 108 may apply this personal policy or preference when reviewing mobile content for presentation to the user's mobile communication facility 102. As an example, a personal policy or preference may identify foreign language mobile content to be excluded from search results to be presented to the mobile communication facility 102.

A wireless provider 108 may have a content policy that determines appropriateness for mobile content to be presented to mobile communication facilities 102. The content policy may allow a user of a mobile communication facility 102 to select one or more aspects of appropriateness to be applied to mobile content presented to the user's mobile communication facility 102. As an example, a user may select an aspect of appropriateness associated with adult matter. In the example, mobile content with adult matter would be prevented from being presented to the mobile communication facility 102. Therefore content that is determined to be inappropriate may not be presented to the mobile communication facility 102 through the wireless provider 108.

Editorial review of mobile content may be combined with algorithmic review. Editorial review may identify aspects of mobile content, such as links, images, video, audio, and other aspects. Mobile content may be presented to a mobile communication facility 102 based on a relevance that is determined by a combined algorithmic and editorial review. Editorial review of mobile content may be performed by the wireless provider 108 or some other entity. Editorial review may also include substitutions that may improve the usefulness of a mobile communication facility 102. In an example, links to websites with relevant content that is not appropriate for presentation to a particular mobile communication facility 102 due to its display characteristics may be replaced by links to websites with relevant content that are appropriate for presentation to the mobile communication facility 102.

In embodiments, the search facility 142 may be optimized for mobile input methods by using, for example, partial word matching, suggestions, and mobile communication facility 102 compatibility. Partial word matching coupled with popularity scoring may provide the best possible results for the user. Partial word matching may also work for multiple word phrases. Thus, a search for "ro st" may suggest results matching "Rolling Stones". A suggestion is a recommended search string. For example, for the query string "piz" a suggestion could be "pizza". Suggestions may permit users to enter the wanted search terms with the fewest number of characters. Suggestions may be provided by the engine and cached locally for performance enhancement.

In embodiments, the mobile communication facility 102 may customize the search engine results to the capabilities of the mobile communication facility 102. For example, the search engine may not present search results that are inappropriate for the device (e.g., a ringtone that is incompatible). When compatibility information cannot be determined, results that require particular hardware or software may receive lower rankings or scores. The recommendation engine may also, or instead, use the device type as one of the attributes when calculating recommendations.

In embodiments, content may be segregated such that the search facility 142 may take contextual cues based on where the user enters the search experience. For example, users entering search from the ringtone area may receive ringtone-restricted results. In addition, the wireless provider 108 may have multiple content partners and may wish to restrict the search to certain content partners in certain situations. For example, the wireless provider 108 may wish to provide a search box in an entertainment section which only searches content from a specific partner, where a search box in the travel section would search different content. The search facility 142 may limit results to a specific partner or set of partners.

The mobile content may, from the perspective of the wireless search platform 100, originate from a webpage. In this disclosure, the term webpage should be interpreted as broadly as possible, to include all instances, formats, types, and variants of data. Thus, a webpage may, for example and without limitation, comprise an HTML or DHTML file; a result provided to a computing device by a Web service, such as via SOAP or RPC-XML; information received via an RSS feed; data received via an e-mail protocol such as IMAP, POP3, or SMTP; content received via a peer-to-peer information sharing facility; an SMS message; a table in a relational database, or an entry therein; any information that may be received by, produced by, presented by, and/or adapted to be presented by the mobile communications facility 102; and so forth. A webpage identifier may identify the webpage. For example and without limitation, this identifier may be a name; a URL; a URI; a DOI; a permalink; a message identifier; a unique identifier; a globally unique identifier; a temporary identifier; a persistent identifier; and the like.

The first step in the method for indexing mobile content may comprise finding a webpage that contains the content. The finding process may be performed once, periodically, from time to time, in response to a manual input, automatically, and so forth. In embodiments, an instance of the additional or remote server 134 may provide the finding process and/or the webpage. Generally, any computing facility associated with the wireless search platform 100 may provide the finding process and/or the webpage. In cases where the finding process involves a manual input, the provider of the finding process may both have a human user and provide a user interface to the user, wherein this user provides the manual input via this user interface. A concrete and tangible end result of finding the webpage may be receiving one or more webpage identifiers at the provider of the finding process.

In embodiments, the finding process may comprise spidering. An autonomous agent or software agent may provide the spidering. This agent may be a web crawler, a web spider, an ant, and the like. For example, spidering may begin with the agent retrieving a webpage at a known URL. That webpage may contain hyperlinks or reference to other webpages. Spidering may continue with the agent retrieving the other webpages, which may also contain hyperlinks or references to other webpages. Spidering may continue with the agent retrieving those webpages may likewise be processed by the agent. Many other examples and embodiments of spidering will be appreciated from this disclosure and such examples and embodiments are intended to be encompassed by the present invention.

In embodiments, the finding process may include processing gateway data (e.g. WAP gateway data, mobile server gateway data, server gateway data, and/or wireless provider gateway data). Gateway data may be associated with a WAP gateway, or other such facility, the wireless communication facility 104, the additional or remote server 134, or any other server or facility associated with the wireless search platform 100. The gateway data may include any message that is communicated between the mobile communication facility 102 and a facility, server, or data source, wherein during the communication the message is converted between a WAP data format and an HTTP data format, for example. The gateway data may also include any data associated with a WAP gateway. Such data may without limitation be associated with a configuration, an uptime, a capability, a network, a protocol, the wireless provider 108, the wireless communication facility 104, the mobile communication facility 102, the mobile search host facility 114, the additional or remote server 134, and so forth. It should be appreciated that some or all of the information that is received or transmitted by the finding process may be the WAP gateway data. Thus, finding the webpage that contains the content may be achieved by processing the WAP gateway data.

In embodiments, the finding process may comprise self-submission. A provider of the webpage may submit an identifier of the webpage to the provider of the finding process. This self-submission may involve a manual input, with the user of the webpage provider entering a webpage identifier for the webpage into the provider's user interface. Alternatively, the self-submission may be automatic, with the webpage provider automatically submitting the webpage identifier to the provider of the finding process. Additionally or alternatively, the provider of the webpage may submit a set of identifiers. For example, the set may comprise a site map, which may include identifiers of a plurality of webpages associated with a Web site. The provider of the webpage may provide any of these webpages. The set of identifiers may be represented in a flat arrangement; a hierarchical arrangement; a relational arrangement; an object-relational arrangement; or any other arrangement. Without limitation, the set of identifiers may be embodied as a flat file, an XML file, or any other file or representation of data. Many other examples of self-submission will be appreciated.

In certain embodiments of the finding process that include self-submission, a payment may be associated with providing the webpage identifier or set of webpage identifiers to the provider of the finding process. In particular, an enterprise or business entity that is associated with the provider of the webpage may provide the payment to an enterprise or business entity that is associated with the provider of the finding process. This payment may be a one-time payment to allow unlimited submissions; a one-time payment to allow a certain number of submissions; a per-use payment that occurs each time a submission is made and that may vary depending upon an aspect of the submission; a periodic or subscription-oriented payment to allow unlimited submission during a limited period of time; a periodic or subscription-oriented payment to allow a certain number of submissions during a limited period of time; and so forth. The payment may be optional, required, prepaid, delayed, complete, partial, credited, debited, negotiated, fixed in amount, dynamic in amount, and so forth. In one example, the payment may be related to a paid inclusion service creates an index of mobile content, wherein the mobile content originates from webpages that are identified in submissions that are associated with a payment.

After the finding process receives the webpage identifier, the finding process may note the mobile content originating from the identified webpage. This noting may include determining and storing a URI, a MIME type, a file size, a resolution, a fidelity, a compression format, a file format, a digital rights management (DRM) restriction, or any other feature or aspect of the mobile content. A concrete and tangible result of this noting may be a mobile content profile, which is a data element that includes indications of these features and aspects.

The mobile content may be a sponsored link, a sponsored call, a downloadable instance of content, an audio stream, a video file, a video stream, a graphic element, a result of a search query, and so forth. In the case that the content is the result of a search query, the search query may be initiated by the mobile communication facility 102, which may without limitation a type of phone, mobile phone, cellular phone, GSM phone, and the like.

The next step in the method for indexing mobile content may comprise determining compatibility of the mobile content based upon the type of the mobile communication facility 102. Determining compatibility may be provided by a determining process of the method for indexing mobile content. The determining process may be performed when mobile content is found, in serial with the finding process. In this case, a step in the finding process may provide to the determining process the mobile content profile associated with the mobile content. Alternatively, the determining process may be performed from time to time, no sooner than when individual items are found but otherwise in no particular temporal relation to the finding process. In this case, a step in the finding process may place into a queue the mobile content profile associated with the mobile content. From this queue, a step in determining process may retrieve the mobile content profile. In embodiments, an instance of the additional or remote server 134 may provide the determining process. Generally, any computing facility associated with the wireless search platform 100 may provide the determining process. The computing facility (or additional or remote server 134) that provides the determining process may or may not be the same facility or server 134 that provides the finding process.

The determining process may compare the mobile content profile to capabilities and properties associated with the type of mobile communication facility 102. These capabilities and properties may be related to the mobile content profile or to elements thereof. The capabilities and properties may be embodied as a data element, which may be provided by the additional or other server 134; its database 138; the wireless provider data facility 124; the additional data facility 170; the data facility 118; or any other data facility, computing facility, or element of the wireless search platform 100. When comparing the mobile content profile to the capabilities and properties, the determining process may test to see if all of the capabilities and properties match the mobile content profile.

If the result of this test is negative, the determining process may test to see if there exists a method for adapting a kind of mobile content that is associated with the profile into a second kind of mobile content that is associated with a second profile, wherein the second profile does match all of the capabilities and properties. If the result of this test is also negative, then the determining process may return a negative result. Otherwise, the determining process may return an affirmative result. When applicable, the affirmative result comprises a code or other indication of the method for adapting the content. In any case, the affirmative result comprises the mobile content profile. A concrete and tangible result of the determining process is the returned result.

The capabilities and properties that are related to the mobile content profile may be associated with a MIME type. The MIME type may conform to RFC 1521, RFC 1522, RFC 1550, RFC 1590, RFC 1847, RFC 2045, RFC 2046, RFC 2049, RFC 2387, RFC 3023, or any subsequent RFC that obsoletes these RFC, all of which are hereby included by reference. The MIME type may indicate that the mobile content is comprises any of the past, present, or future IANA registered MIME media types, including those that have been requested but not approved, all of which may be described at the Web site located at http://www.iana.org/assignments/media-types/, the content of which is hereby included by reference. In embodiments, the MIME type may indicate a content type of text/vnd.wap.wml or text/HTML.

The capabilities and properties that are related to the mobile content profile may be associated with a mobile communication facility identifier, such as a browser identification string; a mobile subscriber characteristic; or user agent string. In embodiments, the user agent string may be a textual or binary representation of a brand and/or model identifier of the mobile communication facility 102; a name and/or version of an application; a name and/or version of a host operating system; a host operating language; a compatibility flag; a version token; a platform token; and the like.

In embodiments, the browser identification string may identify a Web browser or WAP-enabled application in the mobile communication facility 102; the mobile subscriber characteristic may be a call history of a mobile subscriber who is associated with the mobile communication facility 102; the user agent string may identify a user agent (such as an e-mail agent or client) in the mobile communication facility 102; the name and/or version of an application may be those of an application in the mobile communication facility 102; the name and/or version of a host operating system may be those of the operating system in the mobile communication facility 102; the compatibility flag, version token, and platform token may be structural elements of the user agent string.

The capability and properties that are related to the mobile content profile may be associated with a Wireless Universal Resource File (WURFL), or any criterion specified therein; a browser; an operating system; an element of usability; and the like.

In embodiments the element of usability may be a W3C mobile content standard; support of XHTML; adherence to a metadata guideline (which may be related to a title, a description, a keyword, and so on); a text emphasis rule (which may be related to a bolded text element, an italicized text element, an underlined text element, and so on); an image use guideline (which may be an image height, an image width, an image resolution, a number of images within a plurality of images, image formatting, a sequential image download order of a set of images, and so forth); a page weight rule (which may relate to reducing a total page size to ten or fewer kilobytes, reducing table size, reducing text by removing comments associated with a page, minimizing page formatting by inserting a tab or space or paragraph delimiter, shortening a file name, shortening a CSS class name, shortening a CSS ID name, and so forth); and so on.

The final step in the method for indexing mobile content may comprise producing an index of the mobile content. Producing the index may be provided by an index production process of the method for indexing mobile content. The index production process may be performed when the determining process returns an affirmative result, in serial with the determining process. In this case, a step in the determining process may provide to the index production process the affirmative result. Alternatively, the index production process may be performed from time to time, no sooner than when the determining process returns the affirmative result but otherwise in no particular temporal relation to the production process. In this case, a step in the determining process may place into a queue the affirmative result. From this queue, a step in index production process may retrieve the affirmative result. In embodiments, an instance of the additional or remote server 134 may provide the index production process. Generally, any computing facility associated with the wireless search platform 100 may provide the index production process. The computing facility (or additional or remote server 134) that provides the index production process may or may not be the same facility or server 134 that provides the finding process or the determining process.

Based at least in part upon the affirmative result, the index production process may automatically generate an index of the mobile content that is associated with the mobile content profile of the affirmative result. In various embodiments, for example and without limitation, this data element may represent or be associated with a hash value, a priority, a relevancy, a market, a categorization, a classification, a rating, a grading, a ranking, a designation, an assessment, an evaluation, an appraisal, a mark, a score, a value, a reference, a color, a code, an icon, a position, a preference, a suggestion, a hint, a clue, a cross-reference, an alternate embodiment of the mobile content associated with the mobile content profile, a reference to such an embodiment, a reference to a Web service that provides such an embodiment, an alternate URI for the URI of the mobile content profile, a position in a hierarchy, a hierarchy, a compatibility flag, a flag, a tag, a keyword, a translation, a transliteration, a synonym, an antonym, a homonym, a measurement, a usage statistic, a popularity, a peer review, a point rating (such as on a ten-point scale), a star rating (such as on a five-star scale), a value, a future value, a past value, an estimate, a projection, a layman's term, a term of the art, a colloquialism, a preferred name, a nickname, a formal name, a source, a destination, a location, a time, a date, a creator, a modifier, a size, a file size, a resolution, a hue, an color, an intensity, a bit depth, a file type, a protocol, a requirement, an item, an action, a location, a reason, a method, and so forth.

A plurality of indexes may be generated. In some embodiments, the indexes may be ordered based upon the value of the index. In one example, the value is a rank and the indexes are ordered based upon the rank.

The index of the mobile content may be stored in a database or a data facility such as and without limitation any of the database or data facilities associated with the wireless search platform 100. The index of the mobile content may be stored in a unified or distributed fashion. The index of the mobile content may be replicated, archived, compressed, decompressed, transmitted, received, interpreted, processed, utilized, or otherwise associated with any of the elements of the wireless search platform 100. In one example, the index of the mobile content may represent relevant information that is provided to a user of the mobile communication facility 102 in response to a query submitted by or on behalf of this user.

It should be appreciated that numerous embodiments of the process for indexing content are possible. These embodiments without limitation include a single instance of a monolithic computer program that implements the entire method of indexing mobile content, including all of the processes thereof, multiple instances of the monolithic computer program, perhaps arranged in a load-balancing or failover configuration; an instance of each of a number of modular computer programs, wherein each computer program implements some but not all processes but when taken in the aggregate the computer programs implement all of the processes; at least one instance of each of the modular computer programs, wherein multiple instances of the same program are arranged in load-balancing or failover configuration; an instance of each of the modular computer programs, wherein the instances reside on the same facility or server 134; an instance of each of the modular computer programs, wherein some or all of the instances reside on different facilities or servers 134; at least one instance of each of the modular computer programs, wherein the instances reside on the same facility or server 134; at least one instance of each of the modular computer programs, wherein some or all of the instances reside on different facilities or servers 134; multiple instances of the monolithic computer program that reside on the same facility or server 134; multiple instances of the monolithic computer program, wherein some or all of the instances reside on different facilities or server 134; and so forth.

In embodiments web content is presented to mobile communication facilities based at least in part on the compatibility of the mobile content with the mobile communication facilities. The compatibility may be determined through an examination of information relating to the mobile communication facility (e.g. mobile subscriber characteristics, information stored by the wireless provider, or information stored locally on the mobile communication facility). Once information relating to the mobile communication facility is determined a comparison between the information relating to the mobile communication facility and the mobile content may be determined. In the event the mobile content is deemed compatible, the mobile content may be delivered to the mobile communication facility. The delivery of the mobile content may be the result of an auction for the placement of content to the mobile communication facility where the advertiser sponsoring the content pays for delivery of compatible content. This methodology may be used to improve the projected conversion rate of the mobile content because of its likely compatibility.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

In embodiments, the transaction history data may enumerate specific behavior for specific users. This may be used to compute popularity information and be used as an input to the recommendation engine. This data feed may be used whether or not the content index is built via regular data feeds or by spidering. A common format for this information is the Apache Log Format.

In embodiments, full-text relevance may compute a TFIDF metric in which the frequency of words within the overall item set influences the relevancy score. In embodiments, "stop words" may be used to improve search result relevancy. Stop Words may be words which do not contribute to the overall ranking of a document and are not searched, or not used in query formulation. The search facility 142 that does not use stop words explicitly may nonetheless specify certain words that influence relevance less than others. In embodiments, the search facility 142 may use query analysis to identify specific verticals with specific queries in certain contexts. Thus, it may be possible for a search for "ice cream" to prefer local listing results to general web pages.

In one embodiment the search facility 142 is adapted based on services purchased from a carrier (e.g., phone lines, television packages, wireless services, DSL, cable services, broadband services, data services, and other services). The carrier-services-adapted search facility may be an implicit query 204, an active query, a disambiguation action, a retrieval function, a filtering function, a presentation function, a routing function, or another function or action relating to the initiation, processing, or completion of a search. Such information may be retrieved from a database of mobile subscriber characteristics 112, such as that stored by a wireless provider 108 who may also be a provider of various other services. The other services may be analyzed, such as by an algorithm facility 144, to infer information about a user's intent when executing a search facility 142, including for presenting implicit queries, resolving ambiguous queries, or retrieving, sorting, filtering, presenting, or routing results. For example, if a user has DSL, has purchased a premium sports television package, and has bookmarked sports-related sites, then the user may be presented with implicit queries that retrieve sports results for that day. Similarly, upon entering "Jason", such a user might receive results on the Red Sox or Jason Varitek, while another user might receive information about the Friday the 13th series of movies, or the JASON foundation. Again, the algorithm facility 144 may use a wide range of techniques, including simple category-based inferences, learning algorithms, neural nets, regression analysis and other statistical techniques, or the like to draw inferences about how purchasing various services relates to query formation. Such techniques may include collaborative filtering techniques (as described elsewhere herein and in the documents incorporated by reference herein) for determining how a user's preferences align with other users having similar characteristics.

In one embodiment the search facility 142 is adapted based on transaction history. The transaction history-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on history of phone calls made using, for example, the telephone numbers or identities of called parties, or portions of telephone numbers such as area codes or exchanges. The call history-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on phone calls received using, for example, the telephone numbers or identities of called parties, or portions of telephone numbers such as area codes or exchanges. The calls-received-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on the mobile subscriber characteristics 112 of the persons calling, or called by, the user. This may include, for example, usage patterns, usage plans, mobile device type, firmware, capabilities, and so forth, as well as demographic and other information concerning the parties, to the extent that it is available, and as described generally above. The characteristic-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on the duration of calls. The call-duration-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on a history of communications made via phone. The communications-history-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on Internet usage. This may include, for example, histories of URLs or specific IP addresses, as well as topical or semantic information concerning same. The Internet-usage-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on email usage. The email usage-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on instant messaging. This adaptation (and other adaptations discussed herein) may be based on such usage specific to a particular device, a particular time of day, a particular day of the week, a particular season, or the like, or may be based on all traffic associated with the user, regardless of other factors. The IM-usage-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on chat (and the entities communicated with by these technologies). The chat usage-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on history of phone calls made linked with geographic/location information at the time of each call. The location- and call history-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on log of phone numbers. The phone number log-adapted search facility may be an implicit query 204, an active query, a disambiguation action, a retrieval function, a filtering function, a presentation function, a routing function, or another function or action relating to the initiation, processing, or completion of a search.

In one embodiment the search facility 142 is adapted based on history of clicks and clickthroughs (or other keystroke or user interface equivalents thereof, including voice-initiated actions). The user-action-history adapted search facility may be an implicit query 204, an active query, a disambiguation action, a retrieval function, a filtering function, a presentation function, a routing function, or another function or action relating to the initiation, processing, or completion of a search.

Figure 6:
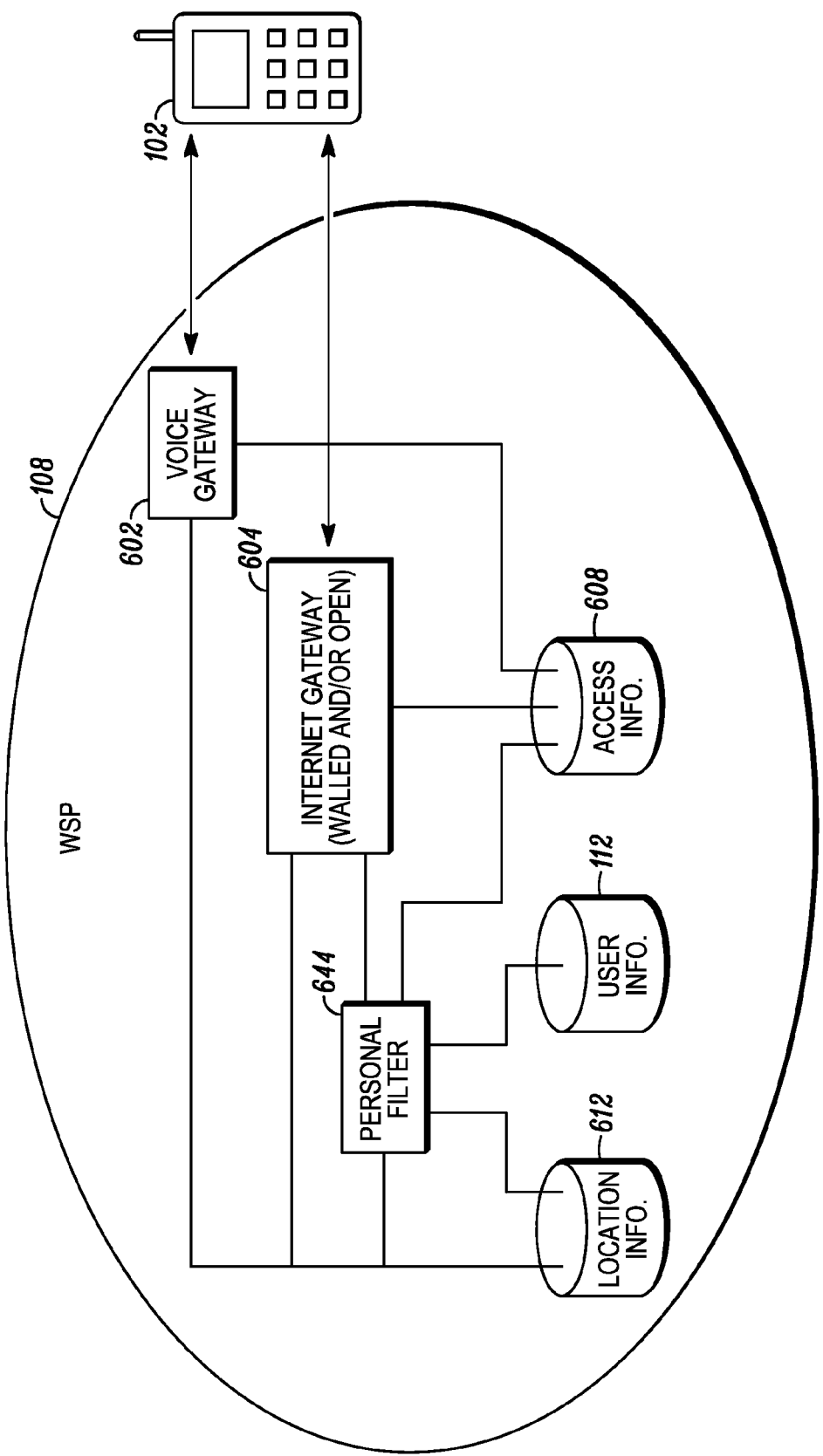
FIG. 6 illustrates a mobile communication search facility.

FIG. 6 illustrates a mobile communication search facility according to the principles of the present invention. In this embodiment, the wireless provider 108 facilitates voice access from the mobile communication facility 102 through a voice gateway 602. The voice gateway 602 may be a telecommunication router for example. Information pertaining to what voice calls have been made or received by the mobile communication facility 102 may be stored in access information database 608. Once the voice access information is stored in the access information database 608, the information may be retrieved by the personal filter 644, and the personal filter 644 may also process the voice activation information to gain more information about the access. For example, the personal filter 644 may perform a reverse phone number process on calls received by or made from the mobile communication facility 102 to determine information about the establishments and individuals called. Such information may also be matched with the time of day the call was made, the duration of the call, who initiated the call, etc. The information relating to voice calls may be further processed or inferences may be made from the information indicating user preferences. For example, if the user is making calls most days at lunch time to take out restaurants, one may infer that the user is going to make more calls to take out places for lunch. Likewise, if the user has made ten phone calls to different new car dealers in the past two weeks, an inference may be made that the user is in the market for a car. The information may also be used in connection with a collaborative style filter (a process within the personal filter 644) to predict future behavior or likes and dislikes based on other people's similar behaviors.

Access information may also be collected based on internet activities through an internet gateway 604. Search queries, click-throughs, and the like may be tracked and stored in an access database 608 for retrieval from the personal filter 644. As with the voice information, the web interaction data may be manipulated, and predictions of future behavior, likes, and dislikes may be made. In the monitoring of internet behavior, in garden and out of garden activities may be tracked.

Location information and time of day information may also be tracked and stored in a location information database 612. As with the voice information and the web interaction information, the location and time of day information may also be used by the personal filter 644.

User information (also referred to as mobile subscriber characteristics) 112, such as personal information or information used to set up the user account with the wireless provider 108, may be kept in a database that is accessible by the personal filter 644.

The personal filter 644 may receive a search query from a mobile communication facility 102, extract information from each of the databases 612, 112, and 608, process all of the information through an optimization algorithm, and perform an optimized search for results. Likewise, results may be obtained, and the personal filter 644 may be used to process the results, along with the other mobile communication related information, and produce filtered results to the mobile communication facility 102.

While the databases 612, 112, and 608 are illustrated as separate databases, it should be understood that these may be combined into one or more databases, such as a relational database. While the personal filter 644 is illustrated as residing in the wireless provider 108 domain, it should be understood that the personal filter 644 may reside elsewhere, including on the mobile communication facility 102 or in another related facility.

Figure 7A:
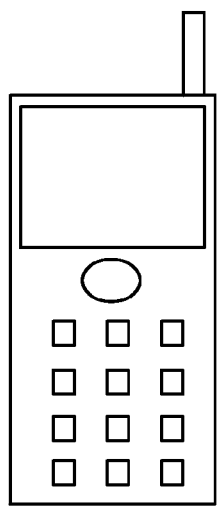
FIG. 7A illustrates a mobile communication facility.
Figure 7B:
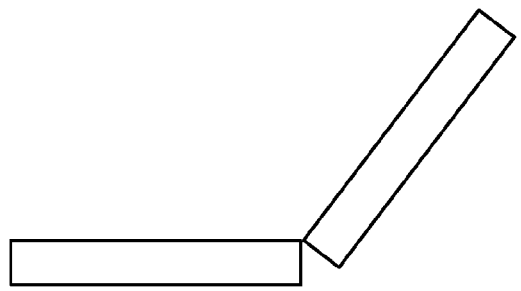
FIG. 7B illustrates a folding mobile communication facility.
Figure 7C:
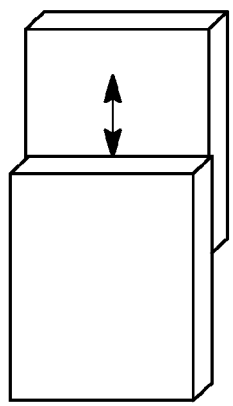
FIG. 7C illustrates a mobile communication facility with parts that slide relative to each other

FIGS. 7A-7C illustrate various form factors of mobile communication facilities that may be used with the systems described herein. FIG. 7A illustrates a candy bar or open faced fixed cell phone. FIG. 7B illustrates a flip phone and FIG. 7C illustrates a slide phone.

Figure 8C:
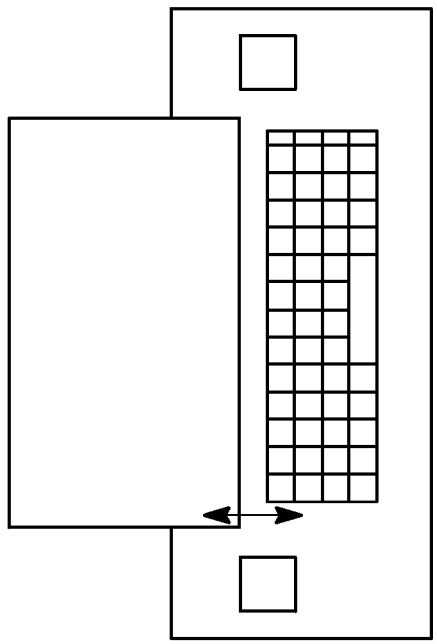
FIG. 8C illustrates a mobile communication facility with a keyboard and flip-up screen.
Figure 8B:
FIG. 8B illustrates a mobile communication facility with a screen and keypad.
Figure 8A:
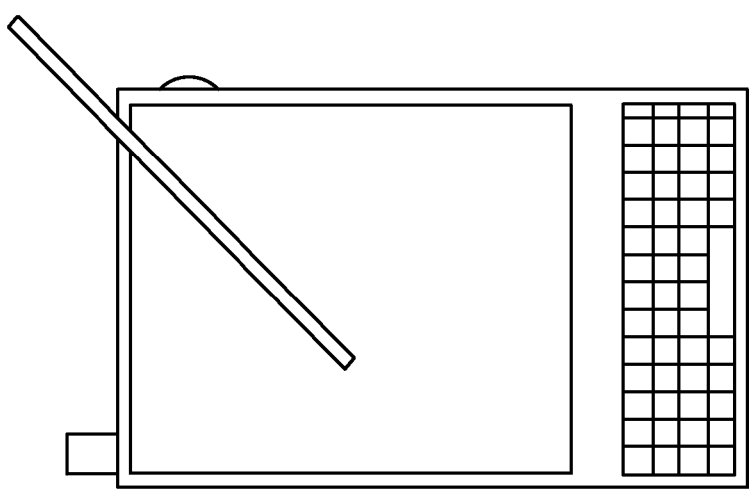
FIG. 8A illustrates a mobile communication facility with an associated stylus.
Figure 10A:
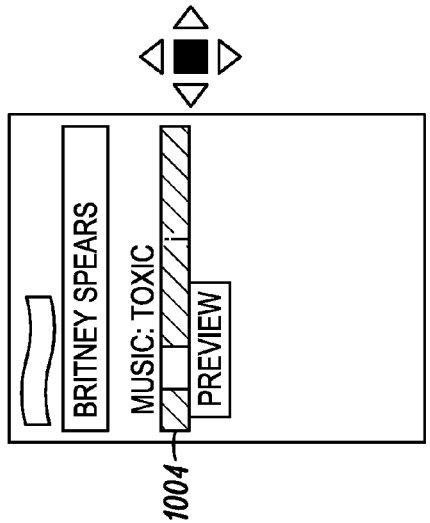
FIG. 10 illustrates screen shots associated with a mobile communication facility.
Figure 10B:
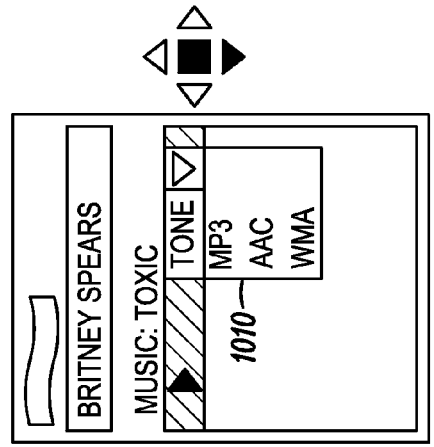
Figure 10C:
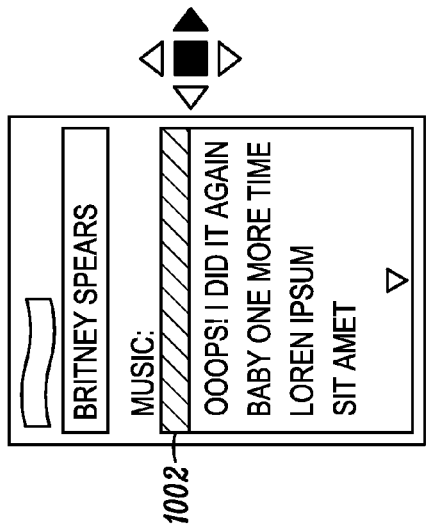
Figure 10D:
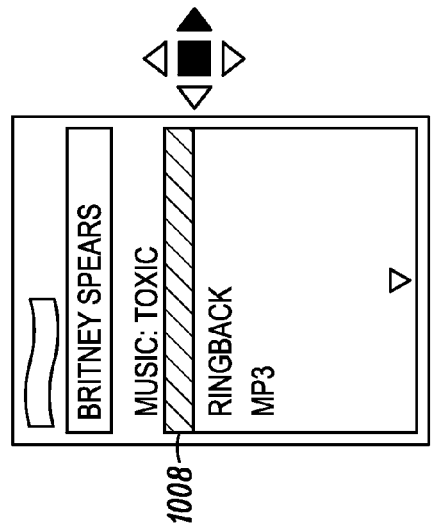

FIGS. 8A-8C illustrate various form factors of mobile communication facilities that may be used with the systems described herein. FIG. 8A illustrates a PDA phone with a touch screen and a full QWERTY keyboard. FIG. 8B illustrates a PDA phone with a two-letter-per-key keypad. FIG. 8C illustrates a slide-up phone revealing the keypad.

FIGS. 9A-9D illustrate a progression of user interface screens 900 associated with a search on a mobile communication device 102. The user interface screens may be generated by the client application interface described above. Beginning with the screen shot shown in FIG. 9A, a query entry facility 120 is provided. The screen may be labeled with a logo 902 and a suggestion box 908 may be provided. As an example based upon this interface, an abbreviated search query "Br Sp" may be typed into the search query entry facility 120. A disambiguation facility 140 (not shown in this figure) may operate in conjunction with a personal filter 644 (not shown in this figure) to disambiguate the partially entered terms. In addition, a suggestion facility may be operational (not shown in this figure) such that suggestions to the partially entered search query are presented in the suggestion box 908. In the event that the first page of suggestions does not include the desired search query, more results may be displayed by activating the down arrow 924. A navigation facility 910 may be provided (e.g. a multi-directional joystick style keypad on the face of the mobile communication facility 102, a touch screen, keypad, or the like). The navigation facility 910 may be used (shown in the down position as indicated by the darkened arrow) to highlight "Britney Spears." Once "Britney Spears" is highlighted 911 (FIG. 9B), the navigation facility 912 may be used to select (as indicated by the darkened center square) and expand the category (as indicated by the darkened right side arrow). Once the suggestion "Britney Spears" is selected and expanded, categories of search results 914 (FIG. 9C) may be presented.

In embodiments, a user of the wireless search platform 100 may enter a query into a mobile communication facility 102. As the user is entering this query, a method of the wireless search platform 100 processes the portion of the query that the mobile communication facility 102 has received. This processing may take into account a context that is associated with the query. Based upon this processing, the wireless search platform 100 creates an ordered list of expected search queries that may be associated with a search vertical. The ordered list may be ordered, based at least in part, on a factor, such as an information relating to a mobile communication facility, a user characteristic, a user history, a user transaction, a geographic location, a user device, a time, and or a mobile communication facility characteristic. The ordering based on a factor may be performed based at least in part on a relevancy (e.g., a relevancy score) or some other value that may be used to express the association between a mobile content and a factor. The ordered list may be used as a suggestion dictionary in order to present suggested search queries to a user of a mobile communication facility.

For example, a user located in Boston in the evening may wish to locate a French restaurant. The user may enter the search vertical "Restaurants" on a mobile communication facility, and type "French" into the search box associated with this search vertical. The wireless search platform 100 may use factors associated with the mobile communication facility in order to determine which of the possible suggestions that are located in the suggestion dictionary may be appropriate for this user's search query. These factors may include: "Time=8 pm," "Location=Boston," The suggestion dictionary may have relevancy scores assigned to mobile content within the search vertical "Restaurants" based at least in part on the relevance of each to "Time" and "Boston." A restaurant located in Boston may be assigned a high relevance. A restaurant located in Missouri may be assigned a low relevance. Similarly, a restaurant that is open for business at 8 pm may be assigned a high relevance, whereas a restaurant not serving customers at 8 pm may be assigned a low relevance. Relevancy scores may also be combined in order to determine a cumulative relevance which takes into account a plurality of factors associated with the mobile communication facility and the pluralities association with a mobile content. Continuing the previous example, the ordered list of content for presentation to the user that is derived from the suggestion dictionary may rank the following restaurants in descending cumulative relevance to the user: (i) a restaurant in Boston that is open at 8 pm; a restaurant in Boston not open at 8 pm. The platform may either omit entirely restaurants that are not in Boston (and, hence, of minimal relevance to the user), or present them very low in the hierarchy of presented search results. Many other examples and embodiments of the method and system of presenting an ordered list of suggested search queries will be appreciated from this disclosure and such examples and embodiments are intended to be encompassed by the present invention.

Information regarding the current location of a mobile communication facility 102 may be used by a mobile search application for receiving search results that include mobile content relating to that location. As the mobile communication facility 102 enters a second location, the mobile search results may be updated based at least in part on the second location information and used to present search results relating to the second location. In embodiments, a mobile search application may include tracking a mobile communication facility, presenting search results based at least in part on a first location, and presenting updated search results based at least in part on a second location.

Mobile content may be a sponsored content, a sponsored link, a sponsored call, a downloadable content, an audio stream, a video, or a graphic element. The search request may be initiated by a mobile communication facility 102, including a phone, mobile phone, cellular phone, and or a GSM phone.

In embodiments, the location of the mobile communication facility 102 may be determined according to a unique identifier associated with the mobile communication facility 102. A unique identifier may include, but is not limited to, a phone number, an area code of a phone number, a billing address, and or a postal zip code of a billing address.

In embodiments, the location of the mobile communication facility 102 may be determined according to the location coordinates of a particular mobile communication facility 102. The location coordinates may be determined through GPS, triangulation, and or WiFi triangulation. The location may also be determined by a user-entered location or a plurality of locations, such as geographic regions including one or more states, or one or more cities.

In embodiments, the location of the mobile communication facility 102 may be determined by a distance from a specified location.

For example, a user of a mobile communication facility 102 may initiate a text search query titled "restaurant" from a first location. The wireless provider, wireless operator, and or telecommunications provider may locate the mobile communication facility 102 based upon information relating to the user's mobile communication facility 102. The user's home address may be on Hanover St. in Boston, Mass. A GPS location, triangulation, and or WiFi triangulation may indicate that the user is currently in the vicinity of Hanover St. in Boston, Mass. The user may be located a specific distance from cell towers located in Boston that are congruent with the user being in the vicinity of Hanover St. in Boston, Mass. Alternatively, the user may self-enter his current location as being Hanover St. Using this location information, the search results that pertain to restaurants that are on or near Hanover St. in Boston, Mass. may be presented exclusively or in priority to other restaurants that are distant from Hanover St. Continuing this example, later in the evening the user has now moved to a second location and would like to find a restaurant for dinner. Again a text entry of "restaurant" is entered into the query entry facility 120 of the mobile communication facility 102. Using one or all of the same means of determining the location of the mobile communication facility 102 described above, the search results may now display information regarding restaurants that are in the vicinity of the user's second location.

In embodiments, a mobile search application disclosed herein may include receiving a location of a mobile communication facility and presenting search results to the mobile communication facility based on a predicted future location. The location of the mobile communication facility may be determined by a predicted future location that is based at least in part on a relationship of prior locations. The relationship of the locations may be used to predict a travel trajectory. The travel trajectory may be coupled with information regarding time. The timing of the residence in the future locations, and their relationships, may be used to predict a travel speed that is, in turn, used to predict a time of arrival at a predicted future location. The predicted time of arrival at a predicted future location may be used to pre-load mobile content to a cache of the mobile communication facility for display upon arrival at the future predicted location, or its vicinity.

In embodiments, the location of the mobile communication facility may be determined based at least in part on as association with a route. A route may be a street, highway, railroad track, subway track, bus route, flight path, recreational course, and the like. A route may be established by repetition and associated with a user of a mobile communication facility. Such a repeated route may include, but is not limited to, a commute to a workplace, a commute form a workplace to a client's workplace, a commute to a friend's residence, a commute to a family member's residence, a commute to a place of business (e.g., a grocery store), and the like.

For example, a person traveling on an interstate highway may wish to find a restaurant at an upcoming exit. A wireless platform 100 may be able to record the location of a mobile communication facility 102, using any of the methods described above, at time intervals to establish a travel line or trajectory that the user of the mobile communication facility 102 is currently on. This trajectory may be compared to known routes, such as those described above. Here the route of the user may match an interstate highway route. This information may be used to predict the future locations of the mobile communication facility. Because the location is taken at a time interval, this information may be combined with the distance traveled between locations in order to predict a speed of travel. The predicted speed, coupled with the predicted future location, may enable the search results for "restaurant" entered by the interstate traveler to present exclusively or in priority, those restaurants that are along the route on which the user is traveling. Because the direction of travel is also known, those restaurants that may be close to the traveler in terms of distance, but whose exit the traveler has already passed may be excluded or given a lower priority due to the greater difficultly involved in returning to them rather than simply visiting a restaurant located at an upcoming exit.

In embodiments, the predicted time of arrival at a predicted future location may be used to pre-load mobile content to a cache of the mobile communication facility for display upon arrival at the future predicted location, or its vicinity.

The ordering of the generated search queries may be based at least in part on information relating to the mobile communication facility 102. The information relating to a mobile communication facility 102 may be a user characteristic selected from the group consisting of age, sex, race, religion, area code, zip code, home address, work address, billing address, credit information, family information, income information, birth date, birthplace, employer, job title, length of employment, and the like. Alternatively or additionally, the information may be a user history, a user transaction, a geographic location, a user device, a time, a mobile communication facility characteristic, provided by a wireless operator, provided by a wireless service provider, provided by a telecommunications service provider. The mobile communication facility characteristic may be selected from the group consisting of display capability, display size, display resolution, processing speed, audio capability, video capability, cache size, storage capability, memory capacity, and the like.

The mobile communications facility 102 may comprise a phone, a mobile phone, a cellular phone, a GSM phone, and so forth. The information relating to a mobile communication facility 102 may be provided by a wireless operator, a wireless service provider 108, a telecommunications service provider, and the like It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

In alternate embodiments, a user may provide a query entry as a barcode, image, scanned value, or any other input that may be received by the query entry system 120. In this case, a query may comprise one or more barcodes, one or more images, one or more scanned values, and/or one or more other values. As the query entry is being provided, the query entry system 120 receives a sequence of barcodes, images, scanned values, and other values. In this case, the "substring query entry" will be understood to be those things that have been received by the query entry system 120.

In embodiments, a method or system of the wireless search platform 100 may access the mobile search suggestion dictionary as the user of the wireless communication facility 102 provides the query. Here, accessing the mobile search suggestion dictionary is directed at creating a list of expect search queries associated with the query entry, which may be provided to the wireless search platform 100 via a client application running on the mobile communication facility 102 that is associated with the query entry system 120. The client application may include a search application, a location-based search application, a WAP application, a mobile application, or any other application associated with the mobile communication facility 102. In other embodiments, a method of the wireless search platform 100 may access the mobile search suggestion dictionary when the user has finished providing the query. In any case, the method or system receives an expected search query from the mobile search suggestion dictionary. This may take into account not just the query entry, but also a factor associated with that entry. In embodiments, this may be a search vertical, which may be a classification within a taxonomy of content. The factor may be a time, date, location, or any other temporal, geographic, physical, or conceptual context, an information relating to a mobile communication facility, a user characteristic, a user history, a user transaction, a user device, and or a mobile communication facility characteristic. By taking the factor(s) into account, the method or system may extract expected search queries from the mobile search suggestion dictionary that are associated with both the factor(s) and the mobile content relating to the query entry. This, in turn, yields suggested search queries that are associated with the same context as the substring query entry that the user is providing.

The search vertical may be associated with a taxonomy of content and may be a general search or related to a search, ringtones, images, games, yellow pages, weather, white pages, news headlines, WAP sites, web sites, movie showtimes, sports scores, stock quotes, flight times, maps, directions, a price comparison, WiFi hotspots, package tracking, hotel rates, fantasy sports stats, horoscopes, answers, a dictionary, area codes, zip codes, entertainment, blogs, and so forth.

The ordering of the list of expected search queries may be based on a factor, such as a search query popularity or information relating to a mobile communication facility 102.

The information relating to a mobile communication facility 102 may be a user characteristic selected from the group consisting of age, sex, race, religion, area code, zip code, home address, work address, billing address, credit information, family information, income information, birth date, birthplace, employer, job title, length of employment, and the like. Alternatively or additionally, the information may be a user history, a user transaction, a geographic location, a user device, a time, a mobile communication facility characteristic, provided by a wireless operator, provided by a wireless service provider, provided by a telecommunications service provider. The mobile communication facility characteristic may be selected from the group consisting of display capability, display size, display resolution, processing speed, audio capability, video capability, cache size, storage capability, memory capacity, and the like.

The suggested search query may be associated with a human language; may be associated with a handset; may be associated with an input box; may be associated with a mobile communication facility type; may be a WAP query; a Java letter sequence; a BREW letter sequence; and so forth. The human language may, without limitation, be English, Spanish, German, French, Italian, Portuguese, Japanese, Chinese, Russian, Hindi, Urdu, and so forth. The input box may, without limitation, be an address box, a name box, an email box, a text box, a numeric box, an alphanumeric box, a search engine, a song name box.

The mobile communication facility may be a phone, a mobile phone, a cellular phone, a GSM phone, or any other form of tethered or wireless communications device.

The presentation of a suggested search query or a list thereof may be initiated by a query entry, a substring query entry, voice query, or by characters entered into a client application.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a wireless search platform and/or a computer in a number of ways, or all of the functionality may be integrated into a dedicated, standalone device or other hardware. All such permutations and combinations are intended to fall within the scope of the present disclosure.

It will also be appreciated that means for performing the steps associated with the processes described above may include any of the hardware and/or software described above. In another aspect, each process, including individual process steps described above and combinations thereof, may be embodied in computer executable code that, when executing on one or more computing devices, performs the steps thereof.

FIGS. 10A-10D illustrate several more screen shots in a progression of screen shots associated with a search from a user interface of a mobile communication facility 102. A search result is selected 1002, in this case a song related to Britney Spears; once the song is selected, the user may be presented with options of delivery. For example, the user may be provided with a preview option 1004 to sample the song. The user may also be presented with an option relating to the content, indicating the content use 1008, so it can be properly formatted, installed, and associated with the appropriate application(s) or device(s), and/or the user may be presented with an option of different file types 1010.

In embodiments, results may be presented to the mobile communication facility 102 as they are retrieved without waiting for the entire result set to be retrieved. In embodiments, certain results may be presented and displayed while other results are in the process of being presented or displayed This background processing of results may increase the speed at which some results can be presented to a mobile communication facility 102. In embodiments, certain categories of results may be presented to the mobile communication facility 102 before other categories. For example, images may take longer to download, process, and/or collect as compared to ringtones, so the category of ringtones, or individual ringtones, may be presented to the mobile communication facility 102 before or while the image results or image category is being locally loaded for presentation.

Figure 11:
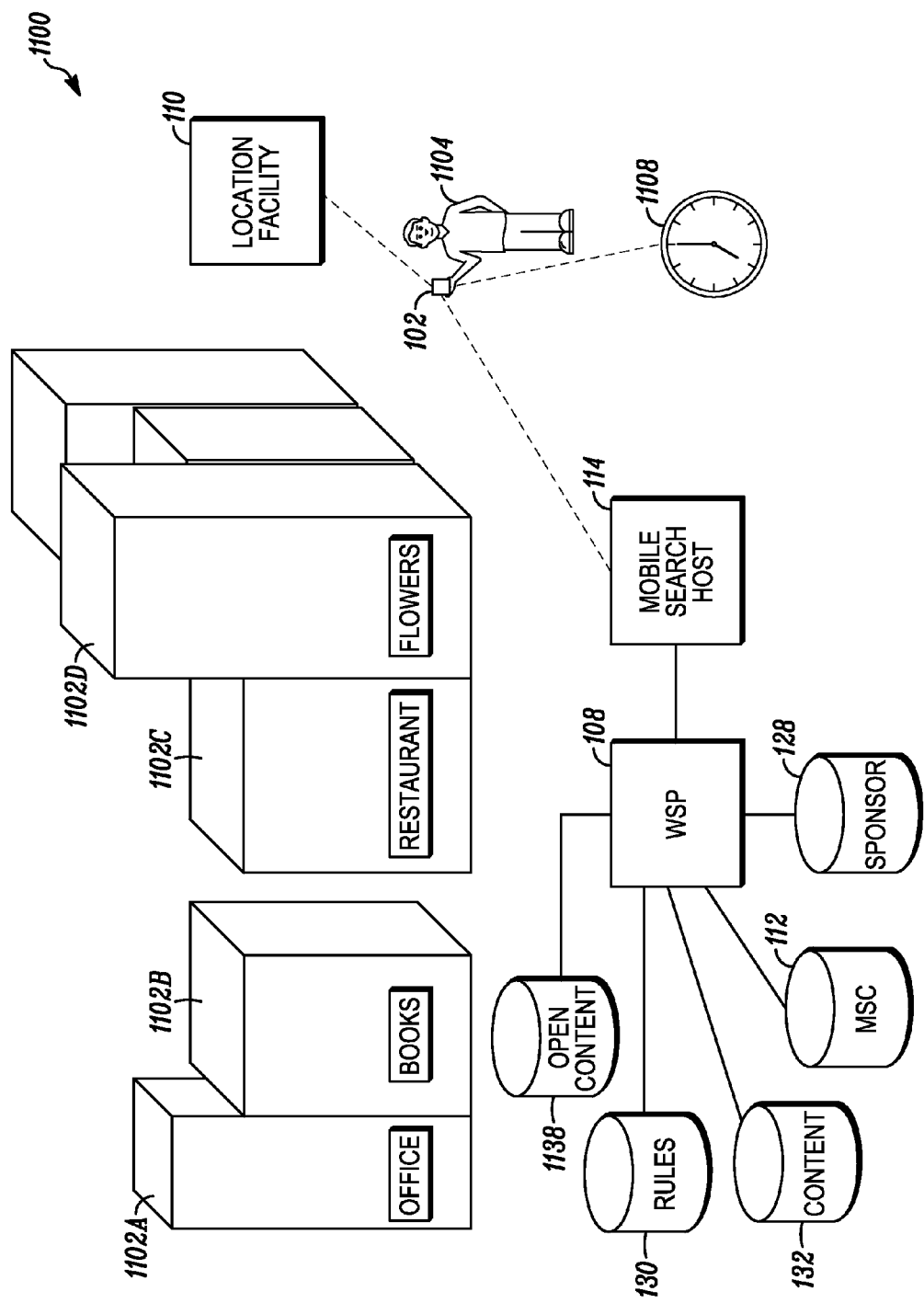
FIG. 11 illustrates a method of obtaining relevant search results for a user and displaying the results on a mobile communication facility.

FIG. 11 illustrates a scenario where a user 1104 of a mobile communication facility 102 would like to obtain relevant search results through the use of his mobile communication facility 102. Prior to making the search, there is already information relating to his presence, his person, his calling habits, his web habits, other people's habits, information relating to inferences about other people's behavior when presented with options, and other information that may be used in the development of results to this particular user 1104. For example, the user may be connected with a wireless service provider 108 either directly or through another facility. By interacting with the wireless service provider 108, the user can obtain information through the internet, such as open content 1138, information within the confines of the wireless provider's 108 domain, walled garden content 132, carrier rules 130, mobile subscriber characteristic (MSC) information 112, sponsor information 128, time of day (e.g. either local time, or time related to another region), and location information as indicated by or provided through a location facility 110. Any or all of this information may be processed through a personal filter (e.g. a collaborative filter) within the mobile search host facility 114 to refine a search query or refine (filter) results before they are presented to the user 1104 on the mobile communication facility 102.

As described in connection with FIG. 1, the mobile search host facility 114 may include algorithm facilities or filters 144 (e.g. a collaborative filter; also referred to herein as a "personal filter"). The personal filter 144 may be used in conjunction with a search query entered and transmitted from the mobile communication facility 102 along with information from one of the associated databases and/or its location information. The personal filter 144 may use an algorithm that predicts the desired results based on information collected from other searchers (e.g. collaborative filtering), as well information relating to the user (e.g. mobile subscriber characteristic information from database 112, or location information).

An implicit search scenario associated with the illustration of FIG. 11 could be as follows. The person 1104 is walking down the street at 7:00 p.m. The location of the mobile communication facility 102 is assessed using a GPS system (i.e. in association with the location facility 110). The location is then stored. An implicit search is initiated either because it is the time of day for the periodic implicit search, because user habits indicate the user is going to be looking for results soon, because there are advertisers interested in pushing an advertisement, there is a local sale, there is an activity nearby, or there are other temporal, activity based, or other reasons to initiate the implicit search. Once the search is initiated, the stored location information may be transmitted to a mobile search host facility. The mobile host search facility 142 may also collect information from other associated sources (e.g. the mobile subscriber characteristics database 112, the sponsor information database 128, carrier rules 130). The mobile search host facility is now prepared to perform a search based on the personal filter in the mobile search host facility 114 in conjunction with the user's location, time of day, and/or other information relating to the several data sources available to the mobile search host facility 114 (e.g. the mobile subscriber characteristics database 112, the sponsor data base 128, the content 132, the carrier rules 130, and the open web content 1138). All of the information may indicate that this is the general time when the user 1104 eats dinner, so the mobile search host facility 114 may provide results to the mobile communication facility 102 that pertain to dinner. In these results, a sponsor may have participated in a search marketing auction in an attempt to get his information onto the user's mobile communication facility 102. For example, a restaurant located in a building 1102C may be the high bidder on a keyword auction related to dinners within five miles of another building 1102C where the user 1104 is located, so the information the restaurant wanted sponsored and displayed on the mobile communication facility 102 will be displayed if the user 1104 interacts with the restaurant information presented. The information may not be presented until the user decides to look at search results, which may not ever happen. If the user 1104 does not interact with the sponsored result that was downloaded to the mobile communication facility 102, the sponsor may or may not have to pay a fee to the wireless provider 108 for the sponsored content. If the user 1104 does interact with the restaurant information that was downloaded on the mobile communication facility 102, the restaurant may or may not have to pay a fee to the wireless provider 108.

To continue with this implicit search scenario, the user may enter into a results mode or search mode on the mobile communication facility 102. In a results mode, results may appear without the need for a search. In this mode, the user may simply be presented with information that he may be interested in, given all of the prior information that is known about him (e.g. location, time of day, and mobile subscriber information). In a search mode, the user may enter a search query, and, if there is a relationship between the search query and the previously downloaded results, the previously downloaded results may be presented. The user may perceive this as a very fast search or a high bandwidth connection because the search results are presented from local memory.

The previously downloaded results presented may include a sponsored link from the restaurant, and the user may activate the sponsored link (e.g. by clicking on it). Once activated, or clicked or interacted with, the user may be presented with information relating to the restaurant. The information may include contact information (e.g. phone, address, email, URL) as well as a description of the restaurant. The user may be presented with a general section of the restaurant's website or a space tailored for the user 1104. For example, the restaurant may present users with a coupon or other sale if they arrive at the restaurant within a predetermined time. Knowing they are in the area and knowing the volume of restaurant traffic, the restaurant may be able to offer a more targeted sale offer.

Likewise, the bookstore in a building 1102B may want to advertise to the user 1104 because he is in the area and has some history of searching amazon.com and the like. The restaurant may have signed up to participate in an auction for mobile communication facility 102 advertising space relating to people in the area of the building 1102B, within the hours the store is open, where the people have a history of activities related to the purchase of books (e.g. searching amazon.com, purchasing books on-line, or are frequent travelers).

A flower shop in a building 1102D may employ similar techniques to target suitable users in the area.

While embodiments involving implicit searching have been described in connection with FIG. 11, it will be appreciated that the same or similar techniques may be applied to explicit searches. For example, the user 1104 may be in the area of an office building 1102A and may be looking for the office building 1102A. The user 1104 may enter a search query with the name of the office building 1102B, and the name of the office building may be combined with the user's location and time of day to better target search results for the user.

An explicit search scenario associated with the illustration of FIG. 11 could be as follows. The person 1104 is walking down the street at 7:00 p.m. The location of the mobile communication facility 102 is assessed using a GPS system (i.e. in association with the location facility 110). The location is then stored. An explicit search is initiated by the user 1104. Once the search is initiated, the stored location information may be transmitted to a mobile search host facility. The mobile host search facility 142 may also collect information from other associated sources (e.g. the mobile subscriber characteristics database 112, the sponsor information database 128, or carrier rules 130). The mobile search host facility is now prepared to perform a search based on the personal filter in the mobile search host facility 114 in conjunction with the user's location, time of day, and other information relating to the several data sources available to the mobile search host facility 114 (e.g. the mobile subscriber characteristics 112 database 112, the sponsor data base 128, the content 132, the carrier rules 130, and the open web content 1138). The search may be performed in conjunction with the personal filter and other relevant filtering information to obtain results. In these results, a sponsor may have participated in a search marketing auction in an attempt to get his information onto the user's mobile communication facility 102. For example, the restaurant located in a building 1102C may be the high bidder on a keyword auction related to dinners within five miles of the building 1102C, so the information the restaurant wanted sponsored and displayed on the mobile communication facility 102 will be displayed if the user 1104 interacts with the restaurant information presented. If the user does not interact with the sponsored result that was downloaded to the mobile communication facility 102, the sponsor may or may not have to pay a fee to the wireless provider 108 for the right to post. If the user 1104 does interact with the restaurant information that was downloaded on the mobile communication facility 102, the restaurant may or may not have to pay a fee to the wireless provider 108.

The downloaded results presented may include a sponsored link from the restaurant, and the user may activate the sponsored link (e.g. by clicking on it). Once activated, or clicked or interacted with, the link may present the user with information relating to the restaurant. The information may include contact information (e.g. phone, address, email, URL) as well as a description of the restaurant. In one embodiment, the information may include a form or active control (such as a button) for making reservations. The user may be presented with a general section of the restaurant's website or a space tailored for the user 1104. For example, the restaurant may present the user with a coupon or other sale if he or she arrives at the restaurant within a predetermined time. Knowing they are in the area and knowing the volume of restaurant traffic, the restaurant may be able to offer a more targeted sale offer.

Likewise, the bookstore in a building 1102B may want to advertise to the user 1104 because he is in the area and has some history of searching amazon.com and the like. The restaurant may have signed up to participate in an auction for mobile communication facility 102 advertising space relating to people in the area of the building 1102B, within the hours the store is open, where the people have a history of activities related to the purchase of books (e.g. searching amazon.com, purchasing books on-line, is a frequent traveler).

In embodiments, search results are presented to the user 1104 on the mobile communication facility 102 that are targeted to the user based on information relating to the user, the mobile communication facility 102, the location, and/or other information as described herein in conjunction with a personal filter. In embodiments, the information is also used to better target advertising, and sponsored advertisements may be provided to the mobile communication facility 102 through a pay for auction advertisement scheme. Such a scheme could be similar to the desktop featured Google AdWords and AdSense by Google, Inc. of Mountain View, Calif.

By way of another example made in connection with FIG. 11, the user 1104 may receive a search result that includes a pay per call link, where the vendor associated with the call (typically the company being called) pays a fee when receiving a call through the pay per call number. For example, the user 1104 may search for results related to flowers and receive back a phone number and possibly other contact information for the flower shop in building 11102D. The link may have been provided as a result of processing a search through a process involving a personal filter in conjunction with information relating to the user, the mobile communication facility 102, and/or the mobile subscriber characteristic information (as indicated in the implicit search example and the explicit search example illustrated in connection with FIG. 11). Once the user activates the phone number for the flower shop, the flower shop may be able to receive the call for a fee, or reject the call.

A wireless search platform 100 may use the keywords from a mobile communication facility 102 search query, and information stored in the wireless search platform 100, to display user-relevant sponsored mobile content on the mobile communication facility. Information stored in the wireless search platform 100 may include personal user information, user patterns of behavior with the mobile communications facility, characteristics of the mobile communications facility, and the like. Access to such user information, in combination with the keyword content of the search query, may increase the relevance of mobile content delivery to users, and increase the probability of user interaction with the sponsored mobile content. The sponsored mobile content may be displayed on the mobile communication facility 102 with a phone number to enable the user to place a call to the number in order to learn more about the displayed content, make a purchase, or carry out some other call-based activity. User interaction may then be tracked, and service providers may then charge the sponsors of the mobile content, and/or the users of the service, as a source of revenue on a per-interaction basis.

Sponsored mobile content may be an advertisement or some other form of sponsored content. Advertisements may relate to services provided by the sponsors of the wireless search platform 100, such as new cell phone models, additional services, accessories, and the like; or consumer products, such as electronics, household items, cars, beauty aids, and the like; or for other purchases such as real estate, college tuition, time-shares, vacations, and the like. Other forms of sponsored content may be political advertisements, religious messages, community programs, and the like. Sponsored content may be associated with a bid process. The wireless search platform 100 may use information gathered about the user, along with keywords in the search query to determine what mobile content would be most relevant to the user.

Relevance to the user may be based at least in part on the keywords in the search query. Examples of relevance to keywords may be a search query for a car show resulting in an advertisement for a car, or a search query for treatment of sun burn resulting in an advertisement for sun tan lotions, or a search query for information for ski conditions resulting in an advertisement for time-share condominiums in the mountains, or a search query for election results resulting in a sponsored content for a political party, and the like.

In embodiments, relevance to the user may be based at least in part on the information relating to the mobile communication facility, including user characteristics such as age, sex, race, religion, area code, zip code, home address, work address, billing address, credit information, family information, income information, birth date, birthplace, employer, job title, length of employment, and alike; user history, such as past interactions with mobile content, web sites visited, phone usage types, and alike; user transactions for purchases and services; geographic location; time of day and time of usage; mobile communication facility characteristics, such as display capability, video capability, cache size, storage capability, memory capacity, and alike; or other such information. Examples of relevance to information relating to the mobile communication facility may include a search query for a car show resulting in an advertisement for a sports car, because personal information about the user indicates that a sports car may be more relevant to the user because the user is young and male with an income that could afford a sports car; or a search query for treatment of arthritis resulting in an advertisement for an electric convertible bed, because information about the user indicates that the user is elderly, and the user has been also recently searching for sleeping aids and has been placing calls from hospitals; or a search query about interior design resulting in sponsored content for a university program for interior design, because information about the user indicates that the user is young, female, living at home, and has recently been searching and visiting universities, furthermore, the relevant advertisement that is selected may be presented on a mobile communication facility in a higher resolution format, because the user's mobile communication facility characteristics indicate that the user's mobile phone is newer model that can accept the higher resolution format of the advertisement.

When the user is persuaded to call the phone number provided by the mobile content, the user may click on a hyperlink to make the call, manually dial the number, enter the number into the mobile communication facility using a voice command, or use some other method to call the number provided.

A hyper-link may involve clicking a hyper-linked phone number on the displayed content, or a hyper-linked image on the displayed content. The user may choose to store the displayed phone number for subsequent use, or dial the phone number manually. When the user places the call, the wireless search platform 100 may then store and track the interaction for subsequent billing to the sponsoring agent. The sponsored mobile content may require the user to pay a fee for placing the call. Examples of user-fee calls may be stock information, fan club updates, sports tips, and alike. In the case of user-fee calls, the wireless search platform 100 may directly bill the user's account as a part of the service provided to the sponsoring service.

Another example of a mobile pay-per-call interaction may be a user whose information stored in the mobile search platform 100 shows they are 42 years old, male, married, with three young children, and owns a house. The user's mobile communication facility 102 information shows that the user's device is older, and only capable of processing lower resolution mobile content. In addition, recent user activity shows search queries for toys. The user then inputs a new search query for tent rentals. The mobile search platform's 100 database indicates that it is also summertime. Given this information, the mobile search platform 100 shows a high relevance for supplies to support an outside birthday party for young children. The mobile search platform 100 than delivers an advertisement to the user's mobile communication facility 100 for an inflatable water slide from a local party rental store. The advertisement is displayed in a lower resolution format to coincide with the user's device capabilities. A phone number is provided in the advertisement that the user may now store for later use, click on to call immediately, dial manually, and so on. When the user places the call, the mobile search platform 100 tracks the interaction and directs charges to the party rental store for the user interaction with the displayed phone number.

Another example of a mobile pay-per-call interaction may be a user whose information stored in the mobile search platform 100 shows they are 18 years old, female, and living at home. The user's mobile communication facility 102 information shows that the user's device is new and capable of displaying video content. In addition, recent user activity shows search queries calling for information about members of various rock bands, and downloads of rock videos. The user then inputs a new search query for information about members of the Dave Matthew's Band. Given this information, the mobile search platform 100 shows a high relevance for advertisements for new music and concerts for rock bands. The mobile search platform 100 then delivers an advertisement to the user's mobile communication facility 100 for tickets to a local Dave Matthew's concert. The mobile content is delivered as a short music video, with audio and text that highlights the concert's date and time, and that tickets are still available. The mobile content indicates a hyperlink, with a phone number, to get more information about the purchase of concert tickets. The user may now store the mobile content for later retrieval, or connect immediately for more information. When the user places the call, the mobile search platform 100 may track the interaction and directs charges to the agency selling the concert tickets for the user interaction with the displayed phone number. The mobile search platform 100 may also direct charges to the user's mobile account as a service charge for purchasing the tickets using the mobile pay-per-call functionality.

In embodiments of the present invention, methods and systems may include presenting a link in a user interface of a mobile communication device, where the link is configured to link to a commercial item that is available via a computer network, thus enabling a party to sponsor the link. The link may be to an item of goods or services for sale, to a promotion, to a content item, to an advertisement, or to other material of a commercial provider, such as a vendor of goods or services. The link may, for example, be to an item on an electronic commerce site, to an auction site, to a reverse auction site, to a news site, to an information site, or to other content on a computer network, such as web content, content located on other networks, or the like. The link may include or be associated with various e-commerce features, such as those enabling single click purchasing, bidding, targeted advertising, instant purchasing (e.g., "buy it now"), tracking of clicks or transactions, tracking of referrals, affiliate program features, or the like. In embodiments the link is a sponsored link that is presented to a user on the user interface of a mobile communication facility 102, such as a cell phone. The sponsored link may be presented in association with an implicit query 204 (and may be related to such a query). The sponsored link may be presented in response to entering an explicit query (or partial entry of such a query). The sponsored link may be presented upon making of a telephone call or other action of a user of the mobile communication facility 102. The sponsored link may be presented upon retrieval of results, sorting of results, filtering of results, presentation of results, or routing of results, such as in response to a search facility 142 that is executed in response to a query.

In embodiments the right to sponsor a link is obtained via a bidding process among a plurality of candidate sponsors. The bidding process may be automated, whereby a bid (or a reserve bid, reserve price, or the like) is automatically compared to other bids made by other candidate sponsors for a link in an auction format. In other embodiments bids need only meet a required price in order to be accepted. An algorithm facility 144 may determine what link or links relate to "winning" bids for sponsoring particular links. Bids can be for presenting links at a particular position in the user interface, at a particular point in a navigation sequence (such as on a home page, on a search screen, after a call has been made, after a transaction has been executed, after navigation to a particular screen, upon presentation of an implicit query 204, upon entry of an explicit query, upon retrieval of results, upon routing of results, and/or upon consummation of a transaction, or the like). Bids can be made for associating a link with particular content, such as particular forms of queries, particular results, or particular content items. For example, a sponsor who sells golf equipment might bid to sponsor links whenever an implicit or explicit query uses the terms "golf," "tee," or "par," while a sponsor who sells video content might seek to sponsor links when a query uses the terms "movie," "film," "cinema" or "show." In embodiments a bidding process may occur in close proximity in time to the presentation of the link.

In embodiments, an advertisement may be presented to a mobile communication facility based at least in part on receiving a webpage request from the query facility of a mobile communication facility, receiving information associated with the mobile communication facility, and associating at least one advertisement with a webpage at least in part based on the information relating to the mobile communication facility. For example, a user of a mobile communication facility may initiate a search query for "Sonny Rollins." The potential search results that may be presented to the user's mobile communication facility may include advertisements and websites for CD's of Sonny Rollin's music, videos of his performances, etc. Information about the mobile communication facility (e.g., its video streaming capabilities) may be used in order to determine which of the advertisement/webpage results may be presented successfully to the user's mobile communication facility. This information may, in turn, be used to pair webpages and advertisements that are each capable of presenting in the display of the user's mobile communication facility.

In certain embodiments, the right to sponsor the link is obtained via an auction, which may be an online auction.

In embodiments a link may be associated with a disambiguated version of a query, so that a link appears only after the relevancy of a query has been assessed.

In embodiments a sponsored link may be associated with a result that is retrieved via a search that is executed using the mobile communication device 102. For example, a link for a camera vendor may appear only when one of the highest-ranked search results uses the words "digital camera."

In embodiments, the sponsored link may be associated with the sorting of results that are retrieved via a search facility 142 that is executed using the mobile communication device. For example, a link may be sponsored (including after a bidding process) only if associated results are ranked sufficiently high after they are sorted (such as being sorted as a result of a ranking or disambiguation process).

In embodiments, a sponsored link may be associated with the filtering of results that are retrieved via a search facility 142 that is executed using the mobile communication device. For example, the sponsored link may only appear after certain types of results have been filtered out. For example, a sponsor of travel to Paris, France, might bid to sponsor a link only in situations where results relating to Paris Hilton have been filtered out before results are presented to the user.

In embodiments a sponsored link may be associated with the presentation of results that are retrieved via a search facility 142 that is executed using the mobile communication device. For example, if certain results are modified or filtered, such as based on the capability of a particular device to present certain content, a sponsored link may be sponsored only for situations where relevant results can be presented on the mobile communications facility. For example, a sponsor may bid to sponsor links to instructional videos for yoga, but only for presentation on devices that are capable of rendering sample video.

In embodiments a sponsored link may be associated with the routing of results that are retrieved via a search facility 142 that is executed using the mobile communication device. For example, if an algorithm facility 144 includes rules for routing certain types of results, a sponsored link may be associated with the execution of such rules. For example, rules related to parental controls 150 may route content or messages to parents if children appear to be attempting to access inappropriate content. A sponsored link may allow a provider of parental control software or services to present a link that is associated with the routed results.

In embodiments, a link may be provided to a commercial item of a party who has not yet sponsored the link. The party may then be offered the opportunity to sponsor the continued presentation of the link. In embodiments, the offer to continue to sponsor the link may be presented to a commercial entity contemporaneously with or upon a user's execution of the link. In embodiments such an offer may include an invitation for the commercial entity to participate in an auction or bidding process for continued sponsorship of the link or for sponsorship of at least one additional link.

In embodiments, the link to a commercial entity may include a phone number for a provider of the commercial item. In embodiments, the phone number may be a dedicated phone number, which, when called by a user, conveys an intermediate message to the commercial entity that includes an offer to continue the link in exchange for an agreement by the commercial entity to pay some consideration, which may be a sponsored link basis, an auction basis, a pay per call basis, or the like.

In embodiments, a generalized process may be used for disambiguating a user query entry 120 by pairing the query information with at least one element from the mobile subscriber characteristics database 112. Once the user submits a query entry 120 via the mobile communication facility 102, the query is wirelessly routed to the wireless communication facility 104 and then to the wireless provider 108. The wireless provider 108 may then abstract data stored in the mobile subscriber characteristics database 112 that is relevant to the user query entry 120. Relevance may be based upon semantic similarities, temporal factors, and geographic and/or demographic congruence between the substance of the query entry 120 and that found in the mobile subscriber characteristics database 112. Once this information is linked, the disambiguation facility 140 may carry out operations to elucidate the probable best meaning of the user's query entry 120 and route the result(s) back through the wireless provider 108 and wireless communication facility 104 to the mobile communication facility 102 for display 172 to the user.

Representative elements that may be stored within the mobile subscriber characteristics database 112 include location, personal information relating to a user, web interactions, email interactions, messaging interactions, billing history, payment history, typical bill amount, time of day, duration of on-line interactions, number of on-line interactions, family status, occupation, transactions, previous search queries entered, history of locations, phone number, device identifier, type of content previously downloaded, content previously viewed, and sites visited.

Similarly, the query entry 120 may be disambiguated based upon characteristics of the user's mobile communication facility 102 (e.g., unique phone number, device identifier, or other unique identifier), information stored within the mobile communication facility 102 (e.g., information stored in the memory of the device), or information stored on a database associated with a server.

In embodiments, mobile search host facilities 114 may be used for providing mobile communications facility 102 users additional relevant result set(s) based upon a query entry 120. For example, the mobile communication facility 102 may have a cache of memory wherein salient information is stored, such as aspects of the mobile communication facility 102, the user's profile, and a user behavioral history (e.g., phone calls, websites visited, search queries, frequency of queries, frequency of downloading content, rate changes in the frequency of events, and frequency of purchases).

This information may be automatically refreshed and transferred, at set temporal intervals, from the mobile communication facility 102 to the wireless communication facility 104, and then on to either the user's wireless provider 108 or directly to the mobile search host facilities 114. Within the mobile search host facilities 114, the query content may be filtered by an algorithm facility 144 that scrutinizes the query content for the purpose of providing the user additional suggestions in the result set(s). For example, the frequency of terms used by the user in the query entry 120 may be used by the algorithm facility 144 to suggest related results based upon similar frequency indexing of key words or upon the popularity of query terms and results. As the user amends his query entry 120, the cache may implicitly transfer the content to the mobile search host facilities 114 for real time processing within the disambiguation facility 140, search facility 142, or other facility within the mobile host search facilities 114.

Additional facilities within the mobile search host facilities 114 may be used to add meaningfulness to the query entry 120. For example, the disambiguation facility 140 may categorize the query entry 120 based upon key words, word frequency, and/or word combinations, thereby enabling the resulting categories, such as title, artist, and yellow page-type categories. Carrier business rules 158, parental controls 150, and a sponsorship facility 162 may also be used to generate suggestions for these and related search query and/or result set(s).

An interactive process between the mobile communication facility 102 and the disambiguation step 240 (referring to FIG. 2) may be used for unambiguous query formation 200. Once a user submits a query entry 120 to the mobile communication facility 102, a process of correction 244 may be necessary or helpful for unambiguous query formation 200 that is sufficient to yield intelligible and useful result set(s). As part of the correction 244 process, information specific to the type of mobile communication facility 102 may be used; for example, if the device has unique delivery capabilities, the query may need correction in order to derive a result set compatible with these capabilities. Information stored in the mobile subscriber characteristics database 112 or parental controls facility 150 may also be integral to the correction 244 process. In embodiments, the search engine may automatically suggest corrections for common misspellings, including those which are unique to the mobile experience (e.g., "2nite")

A user's query entry 120 may return a null result set or an improbable results set. In this case, the search facility 142, in conjunction with the mobile communication facility 102, could automatically trigger correction 244 and iteratively cycle through alternative query entries 120 until a non-null or higher probability result set is delivered.

In embodiments, items which have been more recently added or updated may receive a ranking priority indicative of their freshness.

In embodiments, additional recommendations may be made following a user's query entry 120 based upon the information related to the mobile communication facility 102. For example, mobile subscriber characteristics 112, carrier business rules 130, or sponsor information, in conjunction with the query entry 120, may suggest relevant recommendations for the user. The recommendations may be paired with the query entry 120 search results or presented prior to, or following, the display of the search results.

A user's prior search activities and search results may also be used to create recommendations for the user. Prior search activities may include transactions, search queries, visits to websites, phone calls, and/or other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, classifications of search categories may be presented that relate to the search query on a display associated with the mobile communication facility 102.

In embodiments, a query entry 120 may be mapped to a taxonomy of query categories and classification schema (e.g., the yellow pages phone book taxonomy).

In embodiments, results may be retrieved based on submitting a query entry 120 in conjunction with information relating to the mobile communication facility 102. This information may include the mobile subscriber characteristics 112, carrier business rules 130, and sponsor information. The additional information stored in these databases may form search parameters that limit the search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the query entry 120 based at least in part on information relating to the mobile communication facility 102. This information may include mobile subscriber characteristics 112, a search algorithm facility 144, parental controls 150, carrier business rules 130, and/or sponsor information. Ordering results related to a query entry 120 based on sponsor information may be done by associating sponsors with key words used in query entries, and/or associating query entries with sponsor content. When a query entry 120 matches a sponsor's keyword(s) or content, that sponsor's information may be prioritized in the search result display, highlighted, or otherwise given superiority over other content related to the query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the addition of multimedia content to the results display, such as adding graphics, audio, or a video stream.

Query results may also be ordered, at least in part, based on the capabilities of the mobile communication facility 102, wherein the capability is an audio, visual, processing, or screen capability.

In embodiments, a query entry 120 may be made by producing predictive text based, at least in part, on information relating to the mobile communication facility 102, such as mobile subscriber characteristics 112, a search algorithm facility or personal filter 144, parental controls 150, carrier business rules 130, or sponsorship information. Additionally, predictive text may be based on the mobile communication facility's SMS conversion and/or keypad sequence conversion. Additionally, T9 errors may be corrected. For example, if a user seeks "Britney" and dials 2748639. T9 may interpret that as "Argumenw" instead.

In embodiments, a voice-based query entry 120 may be associated with information relating to the mobile communication facility 102, such as voice interpretation based, at least in part, on SMS conversion.

In embodiments, an auction may be associated with a query entry 120. Performing the auction may involve using information relating to the mobile communication facility 102, for example, mobile subscriber characteristics 112, a search algorithm facility or personal filter 144, parental controls 150, or carrier business rules 130. The result set(s) display may prioritize or highlight sponsor results.

In embodiments, a search query may be entered on a mobile communication facility 102 and results presented on a screen associated with the mobile communication facility 102, and a transaction may be performed in association with a sponsored link, where the transaction may occur by the user clicking on a sponsored link or engaging in a commercial transaction, such as purchasing downloadable content.

In embodiments, aggregated content may be presented to the mobile communication facility 102. Content may be aggregated through a spider, including, for example, ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first, or extraction from content type sites first, where the content was aggregated in relation to information relating to the mobile communication facility 102.

In embodiments, spiders may be used to determine the compatibility between content and the capabilities of mobile communication facilities. For example, a spider may present to a content provider as a particular type of mobile communication facility in order to detect the level of compatibility between that type of mobile communication facility and the content offered by the content provider. Furthermore, a content provider, such as a mobile storefront, may provide different content for each type or class of mobile communication facility. The spider may be able to present to the content provider and determine the associations between a given provider's content classes and types or classes of mobile communication facilities.

In embodiments, spiders may be able to determine the compatibility of content with mobile communication facility types by detecting webpage content qualities that are specific to a type or class of mobile communication facility (e.g., HTML tags, color depth, number of images, size of images, etc). Once the compatibility data is compiled by a spider, the data may be stored in a database and used in conjunction with a search engine to optimize content presentation by sending only compatible content, or the most compatible content available, to the mobile communication facility from which the search query is sent.

Mobile content may require certain capabilities to be enabled on a mobile communication facility 102 for proper presentation of the mobile content to the user. However, at least some of the certain capabilities may not be available on all mobile communication facilities 102. Without proper presentation to the user, mobile content may lack value or interest to the user. It may alternatively cause an inconvenience for the user such as a presentation error, or may cause malfunction of the mobile communication facility 102. The malfunction may include improper actions in response to a user interacting with the mobile content through the mobile communication facility 102 user interface. Such a malfunction may result in a variety of downstream issues for the user as the improper response may include changes in the mobile communication facility 102 configuration, interface, or other aspects.

Aspects of mobile content may be analyzed with respect to compatibility with a mobile communication facility 102. Each aspect may also be ranked based on one or more measures of compatibility. As an example, an aspect of mobile content may involve a rudimentary function of wireless communication. Such an aspect may be ranked based only on meeting a minimum degree of compatibility. In another example, an aspect of mobile content that enables advanced capabilities if they are present in a mobile communication facility 102 may be ranked only for mobile communication facilities 102 that have the capabilities. Other aspects of the mobile content may be ranked for all mobile communication facilities 102.

Measures of mobile content compatibility may vary based on criteria such as mobile communication facility 102 manufacturer, or product line. For example, an aspect of mobile content that is directed toward a specific manufacturer or product line or even model number, such as a BIOS upgrade, may be unranked for use on mobile communication facilities 102 from other manufacturers.

A mobile content rank may include any and all rankings of aspects of the mobile content. The rankings of aspects of the content may be combined in a variety of ways including adding the rankings to generate a mobile content rank total. Each aspect may be weighted such that all aspects may not contribute equally to the total rank. A mobile content rank total may represent a single aspect rank.

Mobile content ranking may also provide an indication of the extent of compatibility based on a ranking range (such as 1 to 10). Alternatively, ranking may provide a binary yes or no measure of compatibility. The ranking may be associated with a specific mobile communication facility 102 model number such that a mobile content may have a plurality of rankings. In an example, a model A of a mobile communication facility 102 may support a subset of features present in a first mobile content, while model B supports all of the features present. In comparison with other mobile content, the first mobile content may be ranked higher than other mobile for model B, while other mobile content may be ranked higher than the first mobile content for model A.

A wireless provider 108 may use mobile content rankings for selecting mobile content to be provided to a mobile communication facility 102. Compatible mobile content may allow a user to interact with the content and thereby increase the chance of the user responding positively to the sponsored content. If the mobile content is not compatible or has poor compatibility, the user may not be able to interact with the content at all. Therefore, mobile content that has greater compatibility with a mobile communication facility 102 may have greater value to the wireless provider 108 because a content sponsor may pay a higher commission for delivering such content than for delivering content that has little or poor compatibility.

Mobile content may include features such as video and audio in a basic format that may be properly displayed on a wide variety of mobile communication facilities 102. However these features may also be adapted in mobile content such that mobile communication facilities 102 with capabilities that support the adapted video may offer the user more satisfaction, reduce time and frustration, or simply enable viewing the video.

Analyzing mobile content may include examining the source of the mobile content such as the HTML source. Syntax and constructs of the source may reveal information about aspects of the mobile content that may be compared to features or aspects of a mobile communication facility 102. Such a comparison may yield an assessment of the compatibility of the mobile content with the mobile communication facility 102. For example, links within the source of the mobile content that link to certain types of data files (such as video, audio, and the like) may indicate the need for certain capabilities in the mobile communication facility 102 to properly present the mobile content. Syntax of the mobile content source may represent specific functions or commands to resources of a mobile communication facility 102. These commands, and/or the arguments included with the commands may be compared to a list of commands and/or arguments supported by a mobile communication facility 102 resulting in analysis of compatibility.

Links and other references to mobile content may also provide information regarding compatibility. While the music file format MP3 is a standard and an iPod supports MP3 formatted files, music files provided on-line by the vendor for the iPod, are not fully compatible with the MP3 standard. This results in these files being incompatible with other vendor's mobile communication facilities 102 that support MP3 files. By examining the links to determine a potential owner of the mobile content, compatibility may be determined.

Links in mobile content may reference other portions of the mobile content and as such the link may not include a file type or owner. Therefore analyzing other aspects of the mobile content may provide a measure of compatibility. One such aspect is the size of the mobile content. A portion of the memory facility 118 on a mobile communication facility 102 may provide storage for mobile content. However the amount of mobile content that can be stored in a mobile communication facility 102 may be limited. Therefore, a measure of compatibility between mobile content and a mobile communication facility 102 may be the size of the mobile content. Mobile content that supports streaming to the mobile communication facility 102 for presentation to the user may overcome content storage limitations in mobile communication facilities 102 with small content storage capacity.

Mobile content may include metadata that may describe or include properties of the mobile content. The metadata may include information such as size, type of content (audio, video, and the like), specific features supported (such as streaming), and the like. Analysis of mobile content may be based, at least in part, on an examination of the metadata. The metadata may include rankings of compatibility with a variety of mobile communication facilities 102. The rankings may be generated by the owner of the content or by a third party such as a wireless provider 108.

Rankings of mobile content may be stored in one or more of the memory facilities of the mobile search platform 100. To ensure the rankings are up to date, the mobile content may be analyzed from time to time and the rankings may be updated. This analysis may be automated by processing the content with a computer program adapted to analyze mobile content. The computer program may execute on a server 134 as herein disclosed.

A mobile communication facility 102 may receive a ranking for mobile content along with the mobile content such that the mobile communication facility 102 may use the ranking to determine if the mobile content should be presented. The determination may be based, at least in part, on user preferences regarding presentation of ranked mobile content. The determination may also be based, at least in part, on a preference of the mobile content owner as it may be provided in the mobile content or the mobile content metadata. While a user may choose to allow the presentation of mobile content that has poor compatibility with an mobile communication facility 102, the content owner may prefer that the content not be presented to the user rather than the content being poorly presented to the user. The mobile content presentation resources (display resource, audio resource, and the like) of the mobile communication facility 102 as herein disclosed may evaluate any or all of the mobile content, the rankings, the metadata, user preferences, owner preferences and the like to make a determination of presentation.

In embodiments, a sponsored link may be displayed on a display associated with a mobile communication facility 102 that allows a vendor associated with the sponsored link to selectively receive a connection or receive search results (including a sponsored phone number) where an economic transaction takes place when the sponsored number is at least one of those called and answered.

In embodiments, content may be delivered to a mobile communication facility 102 based at least in part on information relating to the mobile communication facility 102, and later content may be produced as the result of a search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance following one or more search query entries on a mobile communication facility 102. The report may contain information relating to search result quality, keyword management, and revenue generation, and it may be segmented by the type of mobile communication facility 102 used.

In embodiments, a query entry 120 may be made in a search box of a mobile communication facility 102 where the search box is presented on an idle screen.

In embodiments, a search query may be entered into a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a relationship may be generated between a query entry 120 and at least one mobile subscriber characteristic. The mobile subscriber characteristics 112 may include location, personal information, history of the user's web interactions, and or other characteristics, which may also be used in combination with other data concerning the subscriber, the mobile device, and so forth.

In embodiments, a relationship may be generated between a query entry 120 and the location of a mobile communication facility 102 using a location-based service. The relationship may be between at least one query entry 120 and the location and a time of day. Location may be provided by a GPS system or a cell phone triangulation service.

In embodiments, results may be produced based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be processed through a results facility 148 in which the results facility 148 is associated with information derived from the mobile communication facility 102, such as mobile subscriber characteristics 112 information.

In embodiments, a search query may be disambiguated on the mobile communication facility 102. Disambiguation may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, a query entry 120 on a mobile communication facility 102 may be, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 on a mobile communication facility 102 may be processed in association with information relating to the mobile communication facility 102. This information may reside locally on the mobile communication facility 102, or it may be stored remotely, for example, in a mobile subscriber characteristics 112 database.

In embodiments, a query entry 120 may be processed on a mobile communication facility 102 that provides a parental control facility to regulate the results produced on the mobile communication facility 102. The parental controls 150 may be regulated through a server application or through the mobile communication facility 102.

Content that is available for viewing on a mobile communication facility 102 may include adult content that may be restricted for presentation only to a subset of users through the use of an authorization process. In one aspect, an authorization process for enabling or restricting the presentation of adult content may include receiving a search request, receiving information relating to a mobile communication facility, and determining, based at least in part on information relating to a mobile communication facility 102, if the mobile communication facility is authorized to receive a type of mobile content relating to the search request. Mobile content may be a sponsored content, a sponsored link, a sponsored call, a downloadable content, an audio stream, a video, a graphic element, or other form of adult content. Mobile content may be a blended content which combined non-adult and adult content. The search request may be initiated by a mobile communication facility, including a phone, mobile phone, cellular phone, and or a GSM phone.

In embodiments, adult content, such as pornographic content, gaming content, gambling content, lottery content, or other mobile content appropriate for adults may be restricted by monitoring information relating to a mobile communication facility 102 that is the intended recipient of such content. The information relating to a communication facility may be a user characteristic, such as age. The user characteristic may be selected from the group consisting of age, sex, race, religion, area code, zip code, home address, work address, billing address, credit information, family information, income information, birth date, birthplace, employer, job title, and length of employment. The user characteristic may be stored in a mobile subscriber characteristics database. The information relating to a mobile communication facility may also include a user history, user transaction, a geographic location, a user device or a time. The information relating to a communication facility may be provided by a wireless operator, a wireless service provider, and or a telecommunications provider.

In embodiments, the information relating to a communication facility may be mobile content authority information. The mobile content authority information may be derived from a mobile subscriber characteristic database 112. The mobile content authority information may be logged per an administrator's request.

In embodiments of the method and system, the determination if a mobile communication facility is authorized to receive a type of mobile content may be based at least in part on information relating to a user of a mobile communication facility. For example, a user of a mobile communication facility 102 may enter the text query entry 120 of "gambling." Information relating to the mobile communication facility 102 that may be stored in a mobile subscriber database 112 may indicate that the user has an age of 30 years. Because this age exceeds that age of maturity, the adult content related to gambling may be authorized to present to the user's mobile communication facility 102. Alternatively, a user characteristic such as age may be used to set an authority information in advance of a user's request for adult content. For example, in the previous example the user had an age in excess of the age of maturity. This information may permit a general authorization for this user to access adult content on the mobile communication facility 102 that is associated with the user, regardless of whether a search request for mobile content has been received. This authorization may be made by a wireless operator, wireless provider, telecommunications provider, an individual (e.g., a parent), or any other party interested in determining the content that is authorized to present to a mobile communication facility.

In embodiments, an authorization to view adult content may be used by an individual to set an authorization using a logged administrator's request. For example, a parent may want to ensure that their child is not able presented adult content on a mobile communication facility 102. The parent may be able to serve as an administrator of the child's phone and log onto an authorization facility that may be maintained by a wireless operator, wireless provider, and or a telecommunications provider, and the like. Once logged onto the authorization facility, the parent may be presented with a menu of content types and set a unique authorization level for each content type. For example, such a menu may include a taxonomy. Such a taxonomy may include, but is not limited to, a set of search verticals, such as, "sports," "weather," "blogs," "gambling," "news," "pornography," "health," "food," and so forth. Within such as taxonomy a parent may be able to select to authorize or not authorize the presentation of content from that search vertical, or category, to the child's mobile communication facility 102.

In embodiments, an authorization facility may have key words that an administrator can accept or block from a search query entered into the query entry facility 120 of the child's mobile communication facility 102. For example, an administrator may block a query entry facility from accepting query entries that include keywords that are commonly associated with adult content, such as, gambling terms of art like "team parlay" or "betting line," explicit references common to pornography, terms associated with lotteries, such as "power ball," "pick 3," and the like.

In embodiments, an authorization facility may combine elements of a taxonomy-based authorization with a keyword-base authorization. For example, an administrator may choose to block the presentation of search results derived from a search query naming genitalia which are related to the search vertical "pornography," but permit search results to present which are derived from the search vertical "Health."

In embodiments, a query entry 120 may be processed on a mobile communication facility 102 that provides a privacy facility 152 associated with the mobile communication facility 102 to protect a user from loss of personal or other sensitive information relating to the search query.

In embodiments, a query entry 120 may be processed on a mobile communication facility 102 that provides a transactional security facility 154 associated with the mobile communication facility 102, in which the transactional security facility 154 is adapted to enable secure transactions associated with the query entry 120. The transactional security facility 154 may involve the protection of privacy 152 and may be operated in association with parental controls 150 or digital rights management.

In embodiments, a query entry 120 may be processed in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be processed on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link, presented as text, as a picture, as a video, or as an interactive application. Content may be formatted for the mobile communication facility 102 and relate to webpage content or links for syndicated advertisements.

In embodiments, a query entry 120 may be disambiguated on a mobile communication facility 102 and a related query suggested based, in part, on information relating to a mobile communication facility 102. The information relating to the mobile communication facility 102 may be the frequency of queries, frequency of downloading content, rate changes in the frequency of events, and frequency of purchases. This information may be stored locally, on the mobile communication facility 102 in the device cache, or remotely. The cache may be updated during inactive search periods.

Disambiguation may occur by suggesting additional queries based upon the frequency of terms used in the initial query entry 120 or upon the category of terms used (e.g., title, artist, or yellow pages taxonomy). Suggestions may be updated following the entry of new keystrokes on the mobile communication facility 102. Disambiguation may also be based upon information contained in a mobile subscriber characteristics 112 database, the type of mobile communication facility 102 used to make the query, carrier business rules 130, a search algorithm facility 144, a term frequency algorithm (based upon the popularity of results or query terms), or parental controls 150.

In embodiments, a disambiguated query entry 120 may be corrected based, in part, on information relating to the mobile communication facility 102 (e.g., device capabilities), mobile subscriber characteristics 112, or parental controls 150. During disambiguation, if no results are received from the search facility 142, the query may be corrected automatically prior to displaying the results. If the received result from the search facility 142 is estimated as unlikely, the mobile communication facility 102 may present an indication of this result on its display, for example, the LCD screen of a cellular phone.

In embodiments, a query entry 120 may be disambiguated on a mobile communication facility 102 by making recommendations based, in part, on information relating to the mobile communication facility 102, such as the subscriber characteristics, carrier business rules 130, or sponsor information. The recommendation may be presented in coordination with presentation of the search results, in the same display as the search results, or prior to, or following, the presentation of the search results.

Disambiguating a query entry 120 on a mobile communication facility 102 may also occur by providing recommendations based upon the relationship between prior search activity and search results developed from the query entry 120. Prior search activity may include transactions, searches, or other query behavior. Carrier business rules 130 may also be used to disambiguate a query entry 120, as may the location of the mobile communication facility 102, the time of day, the time of a query entry 120, or personal filters (e.g., a collaborative filter). For example, the pairing of location and time of day information may offer recommendations to a user that is looking for transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, a query entry 120 may be disambiguated on a mobile communication facility 102 and classifications presented of search categories related to the disambiguated search query on a display associated with the mobile communication facility 102.

In embodiments, a query entry 120 may be disambiguated on a mobile communication facility 102 by mapping the disambiguated search query to a query classification of category taxonomies (e.g., the yellow pages taxonomy).

In embodiments, a query entry 120 may be disambiguated on a mobile communication facility 102 by retrieving results based on the disambiguated search query in conjunction with information relating to the mobile communication facility 102, such as mobile subscriber characteristics 112, carrier business rules 130, or sponsor information. Sponsor information may be used to determine the display parameters of the results. For example, results may be prioritized, highlighted, or restricted based upon sponsor information. Sponsor information may derive, in part, from a sponsor auction in which competitive bidding takes place to determine what sponsor information is associated with keywords that may be used in users' query entries.

In embodiments, a search query may be disambiguated on a mobile communication facility 102 by ordering the results based, in part, on information relating to the mobile communication facility 102, such as mobile subscriber characteristics 112, a search algorithm facility 144, parental controls 150, carrier business rules 130, or sponsorship information. Disambiguation based on sponsor information may be done by using the sponsor of the key word used in the query entry 120 or the sponsor of the resulting search content. The sponsored content may be prioritized or highlighted for display. Sponsor information used for this prioritizing may result from an auction in which sponsors bid for the right for their content to be associated with certain keywords that may be used in users' query entries.

Other disambiguation ordering rules may be related, in part, to the amount of content within a result category, the carrier business rules 130, mobile subscriber characteristics 112, a search algorithm facility 144, a personal filter, parental controls 150, sponsorship information, or the capabilities of the mobile communication facility 102, such as display screen size or audio, visual, or processing capabilities.

In embodiments, a query entry 120 may be disambiguated on a mobile communication facility 102 by producing predictive text based, in part, on information relating to the mobile communication facility 102, such as the carrier business rules 130, mobile subscriber characteristics 112, a search algorithm facility 144, a personal filter, parental controls 150, or sponsorship information. The predictive text may involve SMS conversion or keypad sequence conversion and may be based, in part, on a custom generated dictionary derived from information relating to the mobile communication facility 102.

In embodiments, an ambiguous voice query entry 120 may be disambiguated on a mobile communication facility 102 where the interpretation of the voice is based, in part, on information relating to the mobile communication facility 102, is based on weighted probabilities relating to a user, or is based on SMS conversion.

In embodiments, a query entry 120 may be disambiguated on a mobile communication facility 102 by performing an auction related to the query, where the results are based, in part, on the auction. Auction results may be used to prioritize the display of sponsor results or to highlight information from high-bidding sponsors. Performance of the auction may be based in part on mobile subscriber characteristics 112, a search algorithm facility 144, a personal filter, parental controls 150, or carrier business rules 130.

In embodiments, a query entry 120 may be disambiguated on a mobile communication facility 102 by presenting results on the screen of the mobile communication facility 102 and performing a transaction in association with a sponsored link. An economic transaction may arise from the user clicking on a sponsored link or purchasing downloadable content.

In embodiments, a query entry 120 may be disambiguated on a mobile communication facility 102 by presenting aggregated content to the mobile communication facility 102. Aggregation may occur through the use of a spider. Aggregated content may include ringtone content, music content, or video content. A spider may also be used to determine the compatibility between the available content and the capabilities of the user's mobile communication facility 102. Compatibility may be determined through mock mobile communication facility 102 trials during which the spider extracts results from sites on a preferred basis (based upon WAP compatible content or content type).

In embodiments, a query entry 120 may be disambiguated on a mobile communication facility 102 by selecting a sponsored link for display on the mobile communication facility 102 and allowing a vendor associated with the sponsored link to selectively receive a connection. Alternatively, a query entry 120 may be disambiguated by receiving search results that include a sponsored phone number, and an economic transaction takes place when the sponsored number is called and answered.

In embodiments, disambiguated content may be delivered to a mobile communication facility 102 based, in part, on information relating to the mobile communication facility 102. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance and, in turn, based in part on one or more disambiguated search query entries on a mobile communications facility. The report may contain information relating to search result quality, keyword management, and revenue generation, and it may be segmented by the type of mobile communication facility 102 used.

In embodiments, a query entry 120 may be disambiguated in a search box of a mobile communication facility 102 where the search box is presented on an idle screen.

In embodiments, a query entry 120 may be disambiguated that is entered into a query entry 120 facility on a mobile communication facility 102.

In embodiments, a query entry 120 may be disambiguated in a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a relationship between a query entry 120 and at least one mobile subscriber characteristic may be disambiguated. The mobile subscriber characteristics 112 may include location, personal information, history of the user's web interactions, or a plurality of characteristics, such as location and the time of day.

In embodiments, a query may be disambiguated by generating a relationship between a query entry 120 and the location of a mobile communication facility 102 using a location-based service. The relationship may be between at least one query entry 120 and the location and a time of day. Location may be provided by a GPS system or a cell phone triangulation service.

In embodiments, results may be disambiguated based at least in part on a disambiguated query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a disambiguated query entry 120 may be processed through a results facility 148 where the results facility 148 is associated with information derived from the mobile communication facility 102, such as mobile subscriber characteristics 112 information.

In embodiments, a search query may be disambiguated on the mobile communication facility 102. Disambiguation may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, a query entry 120 may be disambiguated on a mobile communication facility 102 where the query is at least in part processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be disambiguated on a mobile communication facility 102 that processes the query in association with information relating to the mobile communication facility 102. This information may reside locally on the mobile communication facility 102, or it may be stored remotely, for example, in a mobile subscriber characteristics 112 database.

In embodiments, a query entry 120 may be disambiguated on a mobile communication facility 102 that provides a parental control facility to regulate the results produced on the mobile communication facility 102. The parental controls 150 may be regulated through a server application or through the mobile communication facility 102.

In embodiments, a query entry 120 may be disambiguated on a mobile communication facility 102 that provides a privacy facility 152 associated with the mobile communication facility 102 to protect a user from loss of personal or other sensitive information relating to the search query.

In embodiments, a query entry 120 may be disambiguated on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a disambiguating query entry 120 may be processed in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be disambiguated on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, pay-per-click and pay-per-call program integration onto mobile communication facilities 102 may enable a wireless provider 108 to deliver targeted, keyword-based ads and content to mobile users searching for specific goods and services at the precise moment a user expresses a need. Pay-per-click advertising, often referred to as "search engine marketing" or "keyword advertising," operates on the principle of pay-for-performance; through this channel, advertisers may pay only for the "clicks," or web site visits, they receive through their text-based advertisement. Businesses may place their ads for specific search phrases (or "keywords") that best describe their company or products. Advertisers generally use several different keywords for their ads, trying to maximize the number of searches for which they will appear (e.g., Sony may try to advertise for the search phrases "DVD player," "Television," "Mobile phone," etc.). Search engine marketing operates through a real-time auction-based pricing model in which advertisers "bid" to appear for their relevant keywords. The advertiser's position, or rank, in the paid listings is determined by the bid price, with the top position going to the highest bidder. Given the wide range of popularity for keywords, competition varies drastically for keywords; bid prices for the most popular keywords are driven up as they attract more advertisers. Keyword competition may be driven by several factors, including: a product's average sale price, customer acquisition cost, and number of competitors. Advertisers may create their own ads through a self-service or sales-assisted web interface. Examples of web-based pay-per-click products include Google AdWords, Yahoo! Search Marketing, MIVA and Lycos InSite™ AdBuyer.) When creating an ad, the advertiser may supply information, such as, an ad title, URL, description, and/or website URL. Pay-Per-Call advertising combines search functionality 142 with live on-the-phone interaction, resulting in a powerful marketing opportunity for local businesses.

Pay-per-call advertising operates on the same principle as pay-per-click, in that advertisers "bid" to appear in specific search results or directory categories, and are charged only when a consumer who sees their ad places a call to the advertiser's listed phone number (a system-generated toll-free number that redirects the user to the company's true number). An advertiser's position in the list of paid results is determined by the bid amount, with the highest bid yielding the top position. Unlike traditional search advertising, however, Pay-per-call advertising may be able to tap into the uniquely high level of user "intent," by connecting qualified mobile consumers directly with businesses—at the exact moment they are searching for specific goods and services. Pay-per-call listings may be presented above traditional directory or "yellow pages" results.

In embodiments, third-party pay-per-call inventory may be supplied to in the form of XML feeds, each of which returns specific results data on a per-query basis about the keyword match, the advertiser and ad information, bid price, and geographic filter settings. This information may then be parsed and packaged in a result set stacked on top of "natural" yellow page listings. A yield optimization algorithm may be used to ensure that each query is answered with a relevant and monetizable set of paid content. The yield optimization algorithm considers several variables to determine placement and rank simultaneously, including, relevancy, geography, click-through/call-through rate, and bid price. Relevancy may be, in part, determined by the query string including keyword, location, and ultimately demographic/behavioral factors that may be matched to information supplied in the advertisement and/or the assigned business categories. For geography, it may be possible to present only those businesses serving the respective geographical areas (zip code, city, state) as specified by the advertiser. The algorithm for the click-through/call-through rate may also consider the frequency with which users actually place the call to the advertiser in determining best query match. Bid price refers to the placement and rank of a given advertisement as determined, in part, by the amount paid by the advertiser.

In embodiments, advertisers may create and manage their mobile search pay-per-click advertising campaigns through a user interface that permits ad creation, selection of keywords to associate with the ad(s), and/or service area(s) in which to make the ad accessible, and place a bid for the service. For example the advertiser may begin by entering the ad creative content, including the ad title, a "Landing page" URL/address (page to which user will be brought—not displayed), the "Display" URL/address (address to be displayed in ad), and an ad description (1-2 lines; for display in ad). The advertiser may then enter keywords (search phrases) for which the ad should appear. There may be several ways of entering the keywords, including: manual entry (the advertiser may type/copy the keywords manually), use of a keyword suggestion tool/thesaurus (advertisers can view synonyms or related keywords, along with estimated monthly search volume and top bids), and/or bulk upload (advertisers may upload keywords in bulk when dealing with a high volume of keywords). Finally, the advertiser may wish that the ad(s) target only a subset of users, such as, only users residing in a particular geographic region, meeting a set of demographic user characteristics, and/or users with a particular mobile communication facility 102.

Once an advertiser has selected one or more of the above criteria, the advertiser may then set a specific, or maximum, price that they are willing to pay for a click through to their web site. Bids may be for each keyword associated with a given ad, or any other criterion, or combination of criteria used by the advertiser to target the placement of their ad(s). Bids may be placed individually by keyword, or an advertiser can apply one bid price across all new keywords for the new ad. Advertisers will also be able to view the top bids for each keyword directly through the user interface, in order to gauge keyword competition and to ensure their ad appears in the desired position. The bidding process may also include "Auto-Bid" functionality that allows the platform to manage an advertiser's bids directly. For instance, by specifying the desired position for the ad and a maximum amount that an advertiser is willing to pay for each click, the advertiser may allow the system to monitor the competitive landscape and adjust the advertiser's bids to pay only the minimum that is required to secure the desired spot (up to but not exceeding the specified maximum).

In embodiments, advertisers may create and manage their mobile search pay-per-call advertising campaigns through a user interface that permits ad creation, selection of details to associate with the ad(s), and/or service area(s) in which to make the ad accessible, and place a bid for the service. The advertiser may begin by entering the general contact information for the business, including: the business name, mailing/contact address, phone number (number where advertiser wishes to receive call; ad may display system-generated toll-free number), and/or the ad description. The advertiser may also enter additional pieces of information and functionality pertaining to each ad, including: setting the daily callable hours/schedule (the advertiser may specify a time of day when it wants an ad to appear), upload company logo to appear with ad, enter coupon information (e.g., the advertiser may set campaign-specific discounts for users who reach a specific ad. The advertiser may then enter keywords (search phrases) in response to which the ad should appear. There may be several ways of entering the keywords, including: manual entry (the advertiser may type/copy the keywords manually), use of a keyword suggestion tool/thesaurus (advertisers can view synonyms or related keywords, along with estimated monthly search volume and top bids), and/or bulk upload (advertisers may upload keywords in bulk when dealing with a high volume of keywords). The advertiser may choose that the ad(s) target only a subset of users such as users residing in a particular geographic region, meeting a set of demographic user characteristics, and/or having particular types of a mobile communication facility 102. Advertisers may set the specific price they will be charged whenever they receive a call through the pay-per-call system. They may have the ability to view in real-time competitors' prices per category in order to ensure their ad appears in the desired position and to optimize their performance.

In embodiments, keyword sales sponsored listings (both pay-per-click and pay-per-call) may go through an administrative and editorial review to ensure an ad pertains to the business and the categories selected by the advertiser, and that the ad will be deemed appropriately relevant by a yield optimization algorithm.

In embodiments, pay-per-click and pay-per-call advertisements may be priced as "pay-for-performance," in that the advertiser is charged only for those calls successfully placed through the mobile communication facility 102 interface. It may be possible to configure the platform such that advertisers are not charged for repeat calls, short calls (e.g., a wrong number or other unintentional call), and/or hang-ups or disconnections. In addition to flat per-call charges, some specific calls (e.g., calls exceeding a given time threshold) may be subject to overage fees.

A mobile content website may contain web pages including text. The text may be unrelated to navigation or activation links on the web page, yet may provide valuable insight into the value and purpose of the website. Alternatively the text may be related to navigation links which, when clicked by a user or search engine, may open a different web page within the mobile content website (an internal link). Text may be related to navigation links which, when clicked by a user or search engine may open a web page outside of the mobile content website (an external link). The text may also be related to action links such as links for ordering products, enrolling in email lists, viewing videos, selecting one or more options, and the like.

The various texts on a mobile content website may include terms (words, phrases, expressions, and the like) which are relevant in one or more ways to the product, service, business, function, or purpose of the mobile content website. If the text is presented in substantially complete sentences, it may also include terms which, while important to the readability of the text, are not relevant to the mobile content website. The text may also include terms that are relevant to one or more action links (such as ordering, or a user name input window, and the like), yet may not provide substantially valuable insight into the value or purpose of the mobile content website.

Another text aspect associated with a mobile content website is the inbound links to the website on other website pages. These in-bound links and their associated text may also include terms that are highly relevant to the value and/or purpose of the mobile content website.

Yet another text aspect associated with the mobile content website is a telephone listing. A phone number listing, in a white or yellow pages, or other directory such as an on-line directory, may also include terms (and contact information) relevant to the mobile content website.

Sponsors of mobile content websites may be desirous of promoting their websites to mobile communication users. Mobile communication users may be desirous of learning about the mobile content website, so they may use a mobile search service to help them identify websites in which they may be interested. A technique used by search services, particularly those associated with websites, is to match keywords input by a user to relevant terms associated with websites. Therefore a sponsor may prefer to have a method or system to analyze their mobile content website to identify relevant terms, and perhaps rank the terms to identify the most popular or useful terms. A sponsor may further use the analysis system or method to improve website text such that relevant terms more closely match popular or useful keywords.

In embodiments, a method or system may be used to analyze a mobile content website to identify keywords that represent relevant terms used on the mobile content website. As an example, an automated system may process each page of the mobile content website counting terms in the text, resulting in counts of each term on the website. Further processing through one or more filters for filtering out common terms (such as prepositions) may result in a count of unique, relevant terms in the text. Further processing the words into groups such as those terms related to action links, internal links, external links, and the like may result in an analysis of relevant terms of a mobile content website. The result may be summarized as a report and may be presented to the sponsor.

In embodiments, a mobile content website may be periodically analyzed for changes in content for purposes of assessing the relevance of keywords previously generated. For example, a sponsor may update a website to such an extent that the website content that was previously associated with keywords is no longer reliable (i.e., the updated content and existing keywords no longer have high relevancy). When this occurs, the system may send an alert to the sponsor indicating that the relevance of the keywords is reduced and may recommend revising the keywords being financed in the marketing program.

In embodiments, a search query may be suggested by correcting the suggested search query based, in part, on information relating to a client device. Once a user receives a suggested query entry 120, a process of correction may be necessary for unambiguous query formation that is sufficient to yield intelligible and useful result set(s). As part of the correction process, information specific to the type of mobile communication facility 102 may be used; for example, if the device has unique delivery capabilities, the suggested query may need correction in order to derive a result set compatible with these capabilities. Information stored in the mobile subscriber characteristics 112 database or parental controls 150 facility may also be integral to the correction process.

It is possible that a suggested query returns a null result set or improbable results set. In this case, the search facility 142, in conjunction with the mobile communication facility 102, could automatically trigger correction and iteratively cycle through alternative suggested queries until a non-null or higher probability result set is delivered.

In embodiments, additional recommendations may be made following a suggested query entry 120 based upon the information related to the mobile communication facility 102. For example, mobile subscriber characteristics 112, carrier business rules 130, or sponsor information, in conjunction with the suggested query entry 120, may suggest relevant recommendations for the user. The recommendations may be paired with the suggested query entry 120 search results or presented prior to, or following, the display of the search results.

A user's prior search activities and search results may also be used to create recommendations for the user. Prior search activities may include transactions, search queries, visits to websites, and other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, classifications of search categories may be presented related to the suggested search query on a display associated with the mobile communication facility 102.

In embodiments, a suggested query entry 120 may be mapped to a taxonomy of query categories and classification schema (e.g., the yellow pages phone book taxonomy).

In embodiments, results may be retrieved based on submitting a suggested query entry 120 in conjunction with information relating to the mobile communication facility 102. This information may include the mobile subscriber characteristics 112, carrier business rules 130, and sponsor information. The additional information stored in these databases may form search parameters that limit the suggested search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the suggested query entry 120 based at least in part on information relating to the mobile communication facility 102. This information may include mobile subscriber characteristics 112, a search algorithm facility 144, parental controls 150, carrier business rules 130, and/or sponsor information. Ordering results related to a suggested query entry 120 based on sponsor information may be done by associating sponsors with key words used in suggested query entries and/or associating suggested query entries with sponsor content. When a suggested query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the option to add multimedia content to the results display, such as graphics, audio or a video stream.

Suggested query results may also be ordered, in part, on the capabilities of the mobile communication facility 102, wherein the capability is an audio, visual, processing, or screen capability.

In embodiments, a query entry 120 may be suggested by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, a query entry 120 may be suggested by associating a voice-based query entry 120 with information relating to the mobile communication facility 102, such as voice interpretation based, at least in part, on SMS conversion.

In embodiments, an auction may be associated with a suggested query entry 120. Performing the auction may involve using information relating to the mobile communication facility 102, such as mobile subscriber characteristics 112, a search algorithm facility 144, a personal filter, parental controls 150, or carrier business rules 130. The result set(s) display may prioritize or highlight sponsor results.

In embodiments, a search query may be suggested on a mobile communication facility 102, results presented on a screen associated with the mobile communication facility 102, and a transaction performed in association with a sponsored link, where the transaction may occur by the user clicking on a sponsored link or engaging in a commercial transaction, such as purchasing downloadable content.

In embodiments, a search query may be suggested by presenting aggregated content to the mobile communication facility 102. Content may be aggregated through a spider, for example ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a query entry 120 may be suggested by displaying a sponsored link on a display associated with a mobile communication facility 102 that allows a vendor associated with the sponsored link to selectively receive a connection or receive search results (including a sponsored phone number) wherein an economic transaction takes place when the sponsored number is at least one of those called and answered.

In embodiments, content may be delivered to a mobile communication facility 102 based at least in part on information relating to the mobile communication facility 102 and later produce content as a result of a suggested search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102. For example, it may be cached locally with the cache memory and blended with server updates and/or periodically updated in the background (i.e., without requiring user keystrokes) according to the time of day and/or changes in location of the mobile communication facility 102.

In embodiments, a wireless carrier report may be generated based upon the click through performance following one or more suggested search query entries on a mobile communications facility. The report may contain information relating to search result quality, keyword management, or revenue generation, and it may be segmented by the type of mobile communication facility 102 used.

In embodiments, a query entry 120 may be suggested in a search box of a mobile communication facility 102 where the search box is presented on an idle screen.

In embodiments, a search query may be suggested related to a query entered on a mobile communication facility 102, where the suggestion is a plurality of suggestions that may be presented on a display associated with the mobile communication facility 102.

In embodiments, a query entry 120 may be suggested that is entered into a query entry 120 facility on a mobile communication facility 102.

In embodiments, a search query may be suggested into a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a search query may be suggested by generating a relationship between a query entry 120 and at least one mobile subscriber characteristic. The mobile subscriber characteristics 112 may include location, personal information, history of the user's web interactions, or a plurality of characteristics, such as location and the time of day.

In embodiments, a search query may be suggested by generating a relationship between a query entry 120 and the location of a mobile communication facility 102 using a location-based service. The relationship may be among at least one query entry 120 and the location and a time of day. Location may be provided by a GPS system or a cell phone triangulation service.

In embodiments, a query may be suggested by producing results based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be suggested by processing a query entry 120 through a results facility 148 where the results facility 148 is associated with information derived from the mobile communication facility 102, such as mobile subscriber characteristics 112 information. Suggested queries and their corresponding results may adapt to changes in the popularity rank of content, the frequency of queries regarding content, acceleration/deceleration in query activity associated with content, frequency of purchases, high/low sales conversion rate, and any change in these measures associated with content. Content may also be "de-duped" with frequent terms, such as "Tyra Banks out of 1, 2, 3," and categorized by title, artist, and/or a yellow pages taxonomy.

In embodiments, a search query may be suggested on the mobile communication facility 102. Disambiguation of the suggested query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, query entries may be suggested on a mobile communication facility 102 where an original search query related to the suggested search query is, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be suggested on a mobile communication facility 102 that processes the suggested query in association with information relating to the mobile communication facility 102. This information may reside locally on the mobile communication facility 102, or it may be stored remotely, for example, in a mobile subscriber characteristics 112 database.

In embodiments, a query entry 120 may be suggested on a mobile communication facility 102 that provides a parental control facility to regulate the results produced on the mobile communication facility 102 based. The parental controls 150 may be regulated through a server application or through the mobile communication facility 102.

In embodiments, a query entry 120 may be suggested on a mobile communication facility 102 that provides a privacy facility 152 associated with the mobile communication facility 102 to protect a user from loss of personal or other sensitive information relating to the search query.

In embodiments, a query entry 120 may be suggested on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a query may be suggested by processing a query entry 120 in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information 112.

In embodiments, a query entry 120 may be suggested on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, additional recommendations may be made following a corrected query entry 120 based upon the information related to the mobile communication facility 102. For example, mobile subscriber characteristics 112, carrier business rules 130, or sponsor information, in conjunction with the query entry 120, may suggest relevant recommendations for the user. The recommendations may be paired with the corrected query entry 120 search results or presented prior to, or following, the display of the search results.

A user's prior search activities and search results may also be used to create recommendations for the user. Prior search activities may include transactions, search queries, visits to websites, and other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products that may be used independently or in relationship to one another, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.) By combining such information, cross-selling opportunities may exist between products (e.g., recording artists of a similar genre), as well as better targeting new products to users based on predicted needs (e.g., recommending a taxi service when a user purchases movie tickets).

In embodiments, classifications of search categories may be presented related to the corrected search query on a display associated with the mobile communication facility 102.

In embodiments, a corrected query entry 120 may be mapped to a taxonomy of query categories and classification schema (e.g., the yellow pages phone book taxonomy).

In embodiments, results may be retrieved based on submitting a corrected query entry 120 in conjunction with information relating to the mobile communication facility 102. This information may include the mobile subscriber characteristics 112, carrier business rules 130, and sponsor information. The additional information stored in these databases may form search parameters that limit the corrected search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the corrected query entry based at least in part on information relating to the mobile communication facility 102. This information may include mobile subscriber characteristics 112, a search algorithm facility 144, parental controls 150, carrier business rules 130, and/or sponsor information. Ordering results related to a corrected query entry based on sponsor information may be done by associating sponsors with key words used in corrected query entries and/or associating corrected query entries with sponsor content. When a corrected query entry matches a sponsor's keyword(s) or content, that sponsor's information may be prioritized in the search result display, highlighted, or otherwise given superiority over other content related to the suggested query entry. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio or a video stream.

Corrected query results may also be ordered, at least in part, on the capabilities of the mobile communication facility 102, wherein the capability is an audio, visual, processing, or screen capability.

In embodiments, the mobile communication facility 102 may be able to display certain Internet content without having to launch a WAP browser. In such cases, content may be directly displayed. Such content may optionally receive a preferential ranking, particularly on devices with relatively slow processing of WAP content.

In embodiments, content may be recommended in relation to a search query on a mobile communication facility 102 where the recommendation is presented in classifications of search categories. The recommendation may optionally specify the category rather than particular results.

In embodiments, an auction may be performed related to a search query. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, alternative content may be recommended that is related to search results received through a mobile communication search, and a transaction related to the alternative content may be performed. The transaction may occur by the user clicking on a sponsored link or engaging in a commercial transaction, such as purchasing downloadable content.

In embodiments, recommendations of alternate content may be aggregated in relation to search results associated with a mobile communication search query. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for extraction from a WAP compatible content site first or extraction from content type sites first, where the content was aggregated in relation to information relating to the mobile communication facility 102.

In embodiments, alternate content may be recommended that is related to search results associated with a mobile communication query 120, where the content is associated with outbound pay per call marketing.

In embodiments, content may be downloaded that is related to information associated with a mobile communication facility 102 by making a recommendation of alternate content related to the downloaded content. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance of recommended alternate content. The report may contain information relating to search result quality, keyword management, or revenue generation, and it may be segmented by the type of mobile communication facility 102 used.

In embodiments, alternative content may be recommended in relation to an open web search result on a mobile communication facility 102. The alternative content may be ringtones, music, video, and downloadable content or purchasable downloadable content.

In embodiments, a query may be entered in a query entry 120 facility associated with a mobile communication facility 102 and present recommended alternative content relating to results received.

In embodiments, content may be recommended in relation to search results associated with a mobile communication facility 102 query, where the alternative content is based at least in part on mobile compatible page rank. The mobile compatible page rank may derive from the page's compatibility with the screen, processing capability of the mobile communication facility 102, or upon the complexity of the page(s).

In embodiments, alternative content may be recommended in relation to search results associated with a mobile communication facility 102 query, where the alternative content is provided by a data facility (e.g., a WAP facility or a carrier facility).

In embodiments, content may be recommended in relation to search results associated with a mobile communication facility 102 query, where the recommendation is, in part, related to a mobile subscriber characteristic. The mobile subscriber characteristics 112 may include location, personal information, history of the user's web interactions, phone calls, or a plurality of characteristics, such as location and the time of day.

In embodiments, an action bar may provide functionality to be performed on an item on both the results listing page and the results detail page. These actions may include: buy, preview, call, and more information. With the exception of more information, which displays the item details page, the actions may be available both on the result listings page as well as the item details page. Pressing left and right inside the action bar moves focus between actions. Pressing up and down moves focus from the action bar to whatever item is above or below. Pressing select may execute the action or display a confirmation screen. If a confirmation screen is displayed, pressing select may then execute the action and pressing left may return to the previous screen.

In embodiments, the search history may provide a means of navigating to the results of specific queries that have been performed in the past. Pressing select on a search history item may perform a search query with the elements of the original search and display the results.

In embodiments, there may be application background activity performed, such as a throbber, suggestions, results, previews, and a hint-of-the-day and/or other promotional material. A throbber refers to a graphical notification to the user that data traffic is occurring and that the screen will change as more content is received. In general, a throbber indicates data retrieval in the following ways: On the suggestion screen, the throbber may run until all suggestions are fully downloaded; on the results categories screen until the full list of categories have been received; on a results listing screen the throbber may run until all results, minus previews, are downloaded. The throbber may also run while an audio or video preview is being downloaded once the user has selected the Preview action from the Action Bar.

Suggestions may be retrieved from the cache on text entry input. If the cache cannot provide a full list of suggestions, a request may be sent to the server. These updated suggestions may then be cached to speed up future suggestion queries. Independent of the suggestions retrieved from the cache and server are the suggestions provided by searching the Personal Information Manager (PIM) data. This may include Contacts, Events, and Notes entries. The suggestion cache may also be updated during idle time by asking the server for an updated set of suggestions to store in the cache. Idle time may be defined as any point at which the application is running but not making other HTTP requests.

Results may be downloaded when the user requests the list of results. The results may come in two parts, a categories header and the results body. The header may be parsed first to show users the categories in which their results will return, and then each result entry placed into one or more of those categories.

Previews may be downloaded in one of two ways: a direct user request (e.g. the user pressing play on a preview), or pre-fetching after the result stream has ended. If the user has not directly requested the preview to be downloaded, the throbber may not be animated and the user may have no indication that the preview is being fetched in the background.

The hint-of-the-day or other promotional content may be downloaded during idle time of the application. This content may consist of text and/or images that are saved to the phone's memory for display on the next time the application launches.

In embodiments, content may be downloaded to a mobile communication facility 102 based, in part, on information relating to the mobile communication facility 102, classifying a search query, and displaying the results within the search query class(es). The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance of classified search queries on a mobile communications facility. The report may contain information relating to search result quality, keyword management, or revenue generation, and it may be segmented by the type of mobile communication facility 102 used.

In embodiments, a query entry 120 may be classified on a mobile communication facility 102 that is based, in part, on an interaction with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a query entry 120 may be mapped on a mobile communication facility 102 based in part on a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be a link presented as text, as a picture, as a video, or as an interactive application. Content may be formatted for the mobile communication facility 102 and relate to webpage content or links for syndicated advertisements.

In embodiments, the results of a search query may be retrieved and entered on a mobile communications facility and the results ordered and displayed on a mobile communication facility 102 associated with the mapped query. This information may include mobile subscriber characteristics 112, a search algorithm facility 144, parental controls 150, carrier business rules 130, and/or sponsor information. Results related to a mapped query entry based on sponsor information may be ordered by associating sponsors with key words used in query entries and/or associating query entries with sponsor content. When a mapped query entry matches a sponsor's keyword(s) or content, that sponsor's information may be prioritized in the search result display, highlighted, or otherwise given superiority over other content related to the suggested query entry. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio, or a video stream.

Results based on a mapped search query may also be ordered, in part, on the capabilities of the mobile communication facility 102, wherein the capability is an audio, visual, processing, or screen capability.

In embodiments, the results of a query entry 120 may be retrieved by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, a search query may be entered on a mobile communication facility 102 using voice recognition and retrieve results based on the search query.

In embodiments, results may be retrieved based, in part, on a search query entered on a mobile communications facility, where a portion of the results is based on an auction for search marketing. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, the results of a search query may be retrieved on a mobile communication facility 102 based, in part, on information relating to the mobile communication facility 102, and a transaction may be performed in relation to the received results. The transaction may occur by the user clicking on a sponsored link or engaging in a commercial transaction, such as purchasing downloadable content. The transaction may also be a non-economic transaction.

In embodiments, a plurality of results may be retrieved based, in part, on a search query entered on a mobile communications facility and the results aggregated. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, results may be retrieved based, in part, on a search query entered on a mobile communications facility and associated with at least one result within the search results with an outbound PPC.

In embodiments, content may be retrieved relating to information associated with a mobile communication facility 102 before a search query relating to the information is entered. This search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to retrieved results based, in part, on a search query entered on a mobile communications facility. The report may contain information relating to search result quality, keyword management, or revenue generation, and it may be segmented by the type of mobile communication facility 102 used.

In embodiments, a search query may be entered in a search box on a mobile communication facility 102 and the search query associated with mobile communication information. The retrieved results may be based at least in part on a search query entered on a mobile communications facility.

In embodiments, results may be retrieved based, in part, on a search query entered on a mobile communications facility and, in part, based on mobile communication facility 102 information.

In embodiments, a query may be entered in a search query entry facility 120 and associate the query with mobile communication information. The retrieved results may be based, in part, on a query and based, in part, on the mobile communication information.

In embodiments, a search query may be processed through a search algorithm facility 144 and mobile communication optimized results retrieved based at least in part on the search query. The search query may be entered on a mobile communications facility, where the results are optimized based on information relating to the mobile communication facility 102.

In embodiments, results may be retrieved based, in part, on a search query entered on a mobile communications facility and based, in part, on a mobile subscriber characteristic. The mobile subscriber characteristics 112 may include location, personal information, history of the user's web interactions, or a plurality of characteristics, such as location and the time of day.

In embodiments, results may be retrieved based, in part, on a search query entered on a mobile communications facility and based, in part, on a location based service. The relationship may be among at least one query entry 120 and the location and a time of day. Location may be provided by a GPS system or a cell phone triangulation service.

In embodiments, a search query may be processed and entered on a mobile communication facility 102 through a filter algorithm facility 144. The retrieved results may be based, in part, on a filter algorithm, where the filter algorithm uses information related to the mobile communication facility 102. The algorithm facility 144 may be a collaborative filter where the search is an open web search, or it may be a recommendation system.

In embodiments, results may be retrieved from a results facility 148 based, in part, on a search query entered on a mobile communications facility. The results facility 148 may be associated with information relating to the mobile communication facility 102, such as mobile subscriber characteristics 112 information.

In embodiments, a mobile browser facility may be used in the process of retrieving results from a results facility 148, where the results facility 148 is adapted to produce results related to carrier premium content and an open web search. Carrier premium content may include ringtones, ringbacks, downloaded content, or purchased content. The results facility 148 may also be adapted to produce results related to a mobile communication facility 102, such as subscriber characteristic information.

In embodiments, results may be retrieved based, in part, on a search query entered on a mobile communications facility. The results may be, in part, related to information associated with a query processed through a disambiguation facility 140. Disambiguation of the mapped query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be retrieved based, in part, on a search query entered on a mobile communications facility using a voice recognition facility 160. The original search query may be entered through a voice recognition facility 160 residing on the mobile communication facility 102. Alternatively, the voice recognition facility 160 may reside on a remote server or in part on the mobile communication facility 102 and in part on a server.

In embodiments, results may be retrieved based, in part, on a search query entered on a mobile communications facility, where the results are, in part, related to information associated with the mobile communication facility 102. This information may reside locally on the mobile communication facility 102 or it may be stored remotely, for example in a mobile subscriber characteristics 112 database.

In embodiments, results may be retrieved based, in part, on a search query entered on a mobile communication facility 102 that provides a parental control facility to regulate the results produced on the mobile communication facility 102 based. The parental controls 150 may be regulated through a server application or through the mobile communication facility 102.

In embodiments, results may be retrieved based, in part, on a search query on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, results may be retrieved based, in part, on a search query entered on a mobile communication facility 102, and the results may be associated with a transaction security facility to enable secure transactions associated with the classification. The transactional security facility 154 may be adapted to enable secure transactions associated with the query. The transactional security facility 154 may involve the protection of privacy 152 and may be operated in association with parental controls 150 or digital rights management.

In embodiments, results may be retrieved based, in part, on a search query in association with carrier business rules 130. Carrier business rules 130 may include walled garden results, presenting out of garden content, sponsor information, or auctions. Information relating to the mobile communication facility 102 may be mobile subscriber characteristic information.

In embodiments, results may be retrieved based, in part, on a search query entered on a mobile communication facility 102 based, in part, on a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, results may be ordered and displayed based on a search query by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, results may be ordered and displayed by associating a voice-based query entry 120 with information relating to the mobile communication facility 102, such as voice interpretation based, at least in part, on SMS conversion.

In embodiments, results may be ordered and displayed based, in part, on a search query entered on a mobile communications facility, where a portion of the results is based on an auction for search marketing. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, results may be ordered and displayed based, in part, on a search query on a mobile communication facility 102 and the results presented on a screen associated with the mobile communication facility 102, and a transaction may be performed in association with a sponsored link, where the transaction may occur by the user clicking on a sponsored link or engaging in a commercial transaction, such as purchasing downloadable content.

In embodiments, results may be ordered and displayed on the mobile communication facility 102 and the results aggregated by relating to a search query for display on a mobile communication facility 102. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, results may be ordered and displayed based, in part, on a search query entered on a mobile communications facility and associated with at least one result within a search result relating to the query with an outbound PPC.

In embodiments, content may be retrieved relating to information associated with a mobile communication facility 102 before a search query relating to the information is entered. Following the entry of the search query the information may be ordered and displayed. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to the ordering of results retrieved on a mobile communications facility. The report may contain information relating to search result quality, keyword management, or revenue generation, and it may be segmented by the type of mobile communication facility 102 used.

In embodiments, a search query may be entered in a search box on a mobile communication facility 102, the search query associated with mobile communication information, and results ordered and displayed based, in part, on a search query entered and based, in part, on the mobile communication information.

In embodiments, results may be ordered and displayed based, in part, on a search query entered on a mobile communications facility and, in part, based on mobile communication facility 102 information.

In embodiments, a query may be entered in a search query entry 120 facility, the query associated with mobile communication information, and the results ordered and displayed based, in part, on a query and based, in part, on the mobile communication information.

In embodiments, a search query may be processed through a search algorithm facility 144 and mobile communication optimized results retrieved based, in part, on the search query, where the optimized results are optimized based on information relating to the mobile communication facility 102. The information relating to the mobile communication facility 102 may be screen size, screen shape, processing capability, processing speed, audio system, visual system, aural system, mobile subscriber characteristics 112, and location.

In embodiments, search results may be received from a delivery facility and the results ordered and displayed on a display associated with a mobile communication facility 102, where the ordering is made in association with information relating to the mobile communication facility 102. The information relating to the mobile communication facility 102 may be screen size, screen shape, processing capability, processing speed, audio system, visual system, aural system, mobile subscriber characteristics 112, and location.

In embodiments, results may be ordered and displayed on a mobile communication facility 102 display based on at least one mobile subscriber characteristic. The mobile subscriber characteristics 112 may include location, personal information, history of the user's web interactions, or a plurality of characteristics, such as location and the time of day.

In embodiments, search results may be ordered and displayed on a mobile communication facility 102 display based on the location of a mobile communication facility 102 using a location-based service. The relationship may be among at least one query entry 120 and the location and a time of day. Location may be provided by a GPS system or a cell phone triangulation service.

In embodiments, a search query may be processed and entered on a mobile communication facility 102 through a filter algorithm facility 144 and order the results based, in part, on the filter algorithm, where the filter algorithm uses information related to the mobile communication facility 102. The algorithm facility 144 may be a collaborative filter where the search is an open web search, or it may be a recommendation system.

In embodiments, results may be ordered from a results facility 148 based, in part, on a search query entered on a mobile communications facility. The results facility 148 may be associated with information derived from the mobile communication facility 102, such as mobile subscriber characteristics 112 information.

In embodiments, a mobile browser facility may be used in the process of ordering and displaying results from a results facility 148. The results facility 148 may be adapted to produce results related to carrier premium content and an open web search. The results facility 148 may also be associated with information derived from the mobile communication facility 102, such as mobile subscriber characteristics 112 information.

In embodiments, results may be ordered based, in part, on a search query entered on a mobile communications facility. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be ordered based, in part, on a search query entered on a mobile communication facility 102 through a voice recognition facility 160 residing on the mobile communication facility 102. Alternatively, the voice recognition facility 160 may reside on a remote server or in part on the mobile communication facility 102 and in part on a server.

In embodiments, results may be ordered based, in part, on a search query entered on a mobile communication facility 102 where the results are based, in part, on information stored in a data facility associated with the mobile communication facility 102. This information may reside locally on the mobile communication facility 102, or it may be stored remotely, for example in a mobile subscriber characteristics 112 database.

In embodiments, results may be ordered and displayed based, in part, on a search query entered on a mobile communication facility 102 that provides a parental control facility to regulate the results produced on the mobile communication facility 102. The parental controls 150 may be regulated through a server application or through the mobile communication facility 102.

In embodiments, results may be ordered and displayed based, in part, on a search query entered on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, results may be ordered and displayed based, in part, on a search query entered on a mobile communication facility 102 and associate the results with a transaction security facility to enable secure transactions associated with the results. The transactional security facility 154 may be adapted to enable secure transactions associated with the query classification. The transactional security facility 154 may involve the protection of privacy 152 and may be operated in association with parental controls 150, digital rights management, or identity protection.

In embodiments, results may be ordered and displayed based, in part, on a search query entered on a mobile communications facility in association with carrier business rules 130. Carrier business rules 130 may include walled garden results, presenting out of garden content, sponsor information, or auctions. Information relating to the mobile communication facility 102 may be mobile subscriber characteristic information.

In embodiments, results may be ordered and displayed based, in part, on a search query entered on a mobile communication facility 102 associated with a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query may be entered on a mobile communication facility 102 using voice recognition and an auction for search marketing performed that is associated with the search query. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, a search query may be entered on a mobile communication facility 102 using voice recognition and a transaction made in association with results received based at least in part on the search query. The transaction may occur by the user clicking on a sponsored link or engaging in a commercial transaction, such as purchasing downloadable content or performing a non-economic transaction.

In embodiments, a search query may be entered on a mobile communication facility 102 using voice recognition and the results aggregated based, in part, on the search query. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a search query may be entered on a mobile communication facility 102 using voice recognition and an activity performed in relation to outbound PPC marketing based at least in part on the search query.

In embodiments, results may be downloaded to a mobile communication facility 102 based at least in part on information relating to the mobile communication facility 102 and, later, a search query entered using voice recognition to receive the results. Following the predictive text step, the results may be presented on a display associated with the mobile communication facility 102. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to predicting text associated with a search query entered through voice recognition on a mobile communication facility 102. The report may contain information relating to search result quality, keyword management, revenue generation, and it may be segmented by the type of mobile communication facility 102 used.

In embodiments, a search query may be entered on a mobile communication facility 102 using voice recognition. The voice activation may be activated using a search box entry, button, or other suitable activation technique. The voice recognition facility 160 may include a query entry 120 facility. The search query may be processed through a search algorithm facility 144, a delivery facility, and/or any other facility suitable for processing searches as described herein. The search query may be associated with a mobile subscriber characteristic. The mobile subscriber characteristics 112 may include location, personal information, history of the user's web interactions, or a plurality of characteristics, such as location and the time of day.

In embodiments, a search query may be entered on a mobile communication facility 102 using voice recognition, where the search query is associated with a location as determined by a location based service. The relationship may be among at least one query entry 120 and the location and a time of day. Location may be provided by a GPS system or a cell phone triangulation service.

In embodiments, a search query may be entered on a mobile communication facility 102 using voice recognition and associating the search query with a filter algorithm facility 144. The algorithm facility 144 may be a collaborative filter where the search is an open web search, or it may be a recommendation system.

In embodiments, a search query may be entered on a mobile communication facility 102 using voice recognition and the search query presented to a results facility 148.

In embodiments, a search query may be entered on a mobile communication facility 102 using voice recognition and the search query processed using a mobile browser facility.

In embodiments, a search query may be entered on a mobile communication facility 102 using voice recognition, where the search query is processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search query may be entered on a mobile communication facility 102 using voice recognition facility 160 residing on the mobile communication facility 102. Alternatively, the voice recognition facility 160 may reside on a remote server or in part on the mobile communication facility 102 and in part on a server.

In embodiments, a search query may be entered on a mobile communication facility 102 using voice recognition, where the voice recognition process uses information relating to the mobile communication facility 102 that may reside in a data facility. This information may reside locally on the mobile communication facility 102, or it may be stored remotely, for example in a mobile subscriber characteristics 112 database.

In embodiments, a search query may be entered on a mobile communication facility 102 using voice recognition, where the search query is associated with a parental control parameter. The parental controls 150 may be regulated through a server application or through the mobile communication facility 102.

In embodiments, a search query may be entered on a mobile communication facility 102 using voice recognition, where the search query is associated with a privacy 152 parameter. The privacy facility 152 may be adapted to protect information during a transaction.

In embodiments, a search query may be entered on a mobile communication facility 102 using voice recognition, where the search query is associated with a security facility. The transactional security facility 154 may be adapted to enable secure transactions associated with the query classification. The transactional security 154 facility may involve the protection of privacy 152 and may be operated in association with parental controls 150, digital rights management, or identity protection.

In embodiments, a search query may be entered on a mobile communication facility 102 using voice recognition, where the search query is associated with a carrier business rule. Carrier business rules 130 may include walled garden results, presenting out of garden content, sponsor information, or auctions. Information relating to the mobile communication facility 102 may be mobile subscriber characteristic information.

In embodiments, a search query may be entered on a mobile communication facility 102 using voice recognition, wherein the search query is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, an auction for search marketing may be performed related to a presentation of sponsored content on a mobile communication facility 102, where the sponsored content is adapted to be associated with a transaction. The transaction may occur by the user clicking on a sponsored link or engaging in a commercial transaction, such as purchasing downloadable content or performing a non-economic transaction.

In embodiments, an auction for search marketing may be performed related to a presentation of sponsored content on a mobile communication facility 102, wherein the sponsored content is related to aggregated content. Content, for example ringtone content, music content, or video content, may be aggregated through a spider, and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, an auction for search marketing may be performed related to a presentation of sponsored content on a mobile communication facility 102, where the sponsored content is related to PPC marketing.

In embodiments, an auction for search marketing may be performed related to a presentation of sponsored content on a mobile communication facility 102; the sponsored content may be downloaded to the mobile communication facility 102 and, later, a search performed wherein the sponsored content is then presented. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to auctions for search marketing related to a presentation of sponsored content on a mobile communication facility 102. The report may contain information relating to search result quality, keyword management, revenue generation, and it may be segmented by the type of mobile communication facility 102 used.

In embodiments, an auction for search marketing may be performed related to a presentation of sponsored content on a mobile communication facility 102, where the auction is related at least in part to a search query entered in a search box on a mobile communication facility 102.

In embodiments, an auction for search marketing may be performed related to a presentation of sponsored content on a mobile communication facility 102.

In embodiments, an auction for search marketing may be performed related to a presentation of sponsored content on a mobile communication facility 102, where the auction is, in part, based on a search query entered on the mobile communication facility 102.

In embodiments, an auction for search marketing may be performed related to a presentation of sponsored content on a mobile communication facility 102, where the auction is, in part, related to a search algorithm facility 144. The search algorithm facility 144 may produce a search algorithm, and the search algorithm may be provided to an auction facility.

In embodiments, an auction for search marketing may be performed related to a presentation of sponsored content on a mobile communication facility 102, where auction results are provided through a delivery facility associated with the mobile communication facility 102.

In embodiments, an auction for search marketing may be performed related to a presentation of sponsored content on a mobile communication facility 102, wherein the auction is associated with a mobile subscriber characteristic. The mobile subscriber characteristics 112 may include location, personal information, history of the user's web interactions, or a plurality of characteristics, such as location and the time of day.

In embodiments, an auction for search marketing may be performed related to a presentation of sponsored content on a mobile communication facility 102, where the auction is associated with a location as determined by a location based service. The relationship may be among at least one query entry 120 and the location and a time of day. Location may be provided by a GPS system or a cell phone triangulation service.

In embodiments, an auction for search marketing may be performed related to a presentation of sponsored content on a mobile communication facility 102, where the auction is associated with a filter algorithm facility 144. The algorithm facility 144 may be a collaborative filter where the search is an open web search, or it may be a recommendation system.

In embodiments, an auction for search marketing may be performed related to a presentation of sponsored content on a mobile communication facility 102, where the results produced by the auction are presented to the mobile communication facility 102 through a results facility 148.

In embodiments, an auction for search marketing may be performed related to a presentation of sponsored content on a mobile communication facility 102, where the auction results are presented to the mobile communication facility 102 through a mobile browser facility.

In embodiments, an auction for search marketing may be performed related to a presentation of sponsored content on a mobile communication facility 102, where the auction is the result of a query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, an auction for search marketing may be performed related to a presentation of sponsored content on a mobile communication facility 102, where the auction is the result of a query processed through a voice recognition facility 160 residing on the mobile communication facility 102. Alternatively, the voice recognition facility 160 may reside on a remote server or in part on the mobile communication facility 102 and in part on a server.

In embodiments, an auction for search marketing may be performed related to a presentation of sponsored content on a mobile communication facility 102, where the auction is performed in coordination with information relating to the mobile communication facility 102 that resides in a data facility. This information may reside locally on the mobile communication facility 102, or it may be stored remotely, for example in a mobile subscriber characteristics database 112.

In embodiments, an auction for search marketing may be performed related to a presentation of sponsored content on a mobile communication facility 102, where the auction is associated with a parental control parameter. The parental controls 150 may be regulated through a server application or through the mobile communication facility 102.

In embodiments, an auction for search marketing may be performed related to a presentation of sponsored content on a mobile communication facility 102, where the auction is associated with a privacy 152 parameter.

In embodiments, an auction for search marketing may be performed related to a presentation of sponsored content on a mobile communication facility 102, where the auction is associated with a security facility. The transactional security 154 facility may be adapted to enable secure transactions associated with the query classification. The transactional security facility 154 may involve the protection of privacy 152 and may be operated in association with parental controls 150, digital rights management, or identity protection.

In embodiments, an auction for search marketing may be performed related to a presentation of sponsored content on a mobile communication facility 102, where the auction is associated with a carrier business rule. Carrier business rules 130 may include walled garden results, presenting out of garden content, sponsor information, or auctions. Information relating to the mobile communication facility 102 may be mobile subscriber characteristic information.

In embodiments, an auction for search marketing may be performed related to a presentation of sponsored content on a mobile communication facility 102, where the auction is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a transaction may be made on a mobile communication facility 102, where the transaction is related to aggregate results relating to mobile communication information. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, an action may be performed relating to PPC marketing on a mobile communication facility 102, wherein the PPC marketing is related to mobile communication information.

In embodiments, a transaction may be made on a mobile communication facility 102, wherein the transaction is related to content previously downloaded to the mobile communication facility 102 in anticipation of a search. The search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to transactions made on a mobile communication facility 102. The report may contain information relating to search result quality, keyword management, revenue generation, and it may be segmented by the type of mobile communication facility 102 used.

In embodiments, a transaction may be made on a mobile communication facility 102, where the transaction is related to results associated with mobile communication information and related in part, to a query entered in a search box associated with the mobile communication facility 102.

In embodiments, a transaction may be made on a mobile communication facility 102, where the transaction is, in part, related to mobile communication information, such as mobile subscriber characteristic information.

In embodiments, a transaction may be made on a mobile communication facility 102, where the transaction is, in part, related to a query entered in a query entry 120 facility and, in part, related to mobile communication information, such as mobile subscriber characteristic information.

In embodiments, a transaction may be made on a mobile communication facility 102, where the transaction is, in part, related to result obtained through a search algorithm facility 144. The search algorithm facility 144 may use mobile communication information in the performance of a search. For example, the search algorithm facility 144 may produce a search algorithm and provide it to an auction facility.

In embodiments, a transaction may be made on a mobile communication facility 102, where the transaction is at least in part related to a delivery facility type.

In embodiments, a transaction may be made on a mobile communication facility 102, where the transaction is at least in part related to a mobile subscriber characteristic. The mobile subscriber characteristics 112 may include location, personal information, history of the user's web interactions, or a plurality of characteristics, such as location and the time of day.

In embodiments, a transaction may be made on a mobile communication facility 102, where the transaction is associated with a location as determined by a location based service. The relationship may be among at least one query entry 120 and the location and a time of day. Location may be provided by a GPS system or a cell phone triangulation service.

In embodiments, a transaction may be made on a mobile communication facility 102, where the transaction is associated with a filter algorithm facility 144. The algorithm facility 144 may be a collaborative filter where the search is an open web search, or it may be a recommendation system.

In embodiments, a transaction may be made on a mobile communication facility 102, where results produced by the auction are presented to the mobile communication facility 102 through a results facility 148.

In embodiments, a transaction may be made on a mobile communication facility 102, where the transaction at least is processed through the mobile communication facility 102 through a mobile browser facility.

In embodiments, a transaction may be made on a mobile communication facility 102, where the transaction is at least in part related to a result of a query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a transaction may be made on a mobile communication facility 102, where the transaction is a related to a query processed through a voice recognition facility 160 residing on the mobile communication facility 102. Alternatively, the voice recognition facility 160 may reside on a remote server or in part on the mobile communication facility 102 and in part on a server.

In embodiments, a transaction may be made on a mobile communication facility 102, where the transaction is performed in coordination with information relating to the mobile communication facility 102 that may reside in a data facility. This information may reside locally on the mobile communication facility 102, or it may be stored remotely, for example in a mobile subscriber characteristics database 112.

In embodiments, a transaction may be made on a mobile communication facility 102, where the transaction is associated with a parental control parameter. The parental controls

150 may be regulated through a server application or through the mobile communication facility 102.

In embodiments, a transaction may be made on a communication facility, where the transaction is associated with a privacy 152 parameter.

In embodiments, a transaction may be made on a mobile communication facility 102, where the transaction is associated with a security facility. The transactional security facility 154 may be adapted to enable secure transactions associated with the query classification. The transactional security facility 154 may involve the protection of privacy 152 and may be operated in association with parental controls 150, digital rights management, or identity protection.

In embodiments, a transaction may be made on a mobile communication facility 102, where the transaction is associated with a carrier business rule. Carrier business rules 130 may include walled garden results, presenting out of garden content, sponsor information, or auctions. Information relating to the mobile communication facility 102 may be mobile subscriber characteristic information.

In embodiments, a transaction may be made on a mobile communication facility 102, where the transaction is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a vendor may be selected in association with a sponsored link and the sponsored link presented in association with aggregated results. The vendor may be presented with an option of receiving further leads, such as phone or web leads.

In embodiments, results may be aggregated in association with a mobile communication facility 102, the aggregated results downloaded to the mobile communication facility 102, and the aggregated results presented to a user of the mobile communication facility 102 as a result of a search query entered following the download. The search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to aggregated results presented on a mobile communication facility 102. The report may contain information relating to search result quality, keyword management, revenue generation, and it may be segmented by the type of mobile communication facility 102 used.

In embodiments, a search query may be entered in a search box on a mobile communication facility 102, the aggregated results associated with the search query, and aggregated results presented on the mobile communication facility 102. The aggregated results may be presented in an aggregated form that includes a high level descriptor that may be activated to reveal the results. Activation may be a link. A second set of results may also be aggregated and presented on the mobile communication facility 102. The second aggregated results may be presented associated with high level descriptors.

In embodiments, results may be aggregated and the aggregated results categorized into a plurality of aggregated results, where the plurality of aggregated results are presented on a mobile communication facility 102.

In embodiments, an aggregation facility may be associated with a query entry 120 facility of a mobile communication facility 102, where the aggregation facility is adapted to present categorized aggregated results. The mobile communication facility 102 may be adapted to facilitate selection of the categorized aggregated results and reveal individual results within the aggregated results. Facilitation may involve the presentation of a link.

In embodiments, a search query may be produced in association with a search algorithm facility 144, the results retrieved based on the search query, and the results aggregated into categories for presentation on a mobile communication facility 102.

In embodiments, content may be delivered from a delivery facility, the content aggregated into categories, and the categories presented on a mobile communication facility 102.

In embodiments, at least one mobile subscriber characteristic may be used as a parameter for aggregating search results into categories. The mobile subscriber characteristics 112 may include location, personal information, history of the user's web interactions, or a plurality of characteristics, such as location and the time of day.

In embodiments, location as determined by a location based service may be used as a parameter for aggregating search results into categories. Location may be provided by a GPS system or a cell phone triangulation service.

In embodiments, a search query may be produced in association with a filter algorithm facility 144, the results aggregated in association with the search query, and the aggregated results presented on a mobile communication facility 102. The algorithm facility 144 may be a collaborative filter where the search is an open web search, or it may be a recommendation system. The aggregated search results may be filtered through an algorithm facility 144 and the results presented on a mobile communication facility 102.

In embodiments, results may be aggregated and produced by a results facility 148 and the aggregated results presented on a mobile communication facility 102, where the results facility 148 operates in association with information relating to the mobile communication facility 102. Information relating to the mobile communication facility 102 may be mobile subscriber characteristics 112 information.

In embodiments, results may be aggregated into categories of results and the categories of results presented through a mobile browser facility.

In embodiments, results may be aggregating based, in part, on a search query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be aggregated based, in part, on a search query processed through a voice recognition facility 160 residing on the mobile communication facility 102. Alternatively, the voice recognition facility 160 may reside on a remote server or in part on the mobile communication facility 102 and in part on a server.

In embodiments, results may be aggregated based at least in part on information relating to the mobile communication facility 102, where the information resides in a data facility. This information may reside locally on the mobile communication facility 102, or it may be stored remotely, for example in a mobile subscriber characteristics 112 database.

In embodiments, search results may be aggregated into categories, where the aggregation is based at least in part on a parental control parameter and the aggregated results presented on a mobile communication facility 102. The parental controls 150 may be regulated through a server application or through the mobile communication facility 102.

In embodiments, search results may be aggregated into categories, where the aggregation is based at least in part on a privacy 152 control parameter and the aggregated results presented on a mobile communication facility 102.

In embodiments, search results may be aggregated into categories, where the aggregation is associated with a transaction security facility and the aggregated results presented on a mobile communication facility 102. The transactional security 154 facility may be adapted to enable secure transactions associated with the query classification. The transactional security 154 facility may involve the protection of privacy 152 and may be operated in association with parental controls 150, digital rights management, or identity protection.

In embodiments, search results may be aggregated into categories, where the aggregation is based at least in part on carrier business rules 130 and the aggregated results presented on a mobile communication facility 102. Carrier business rules 130 may include walled garden results, presenting out of garden content, sponsor information, or auctions. Information relating to the mobile communication facility 102 may be mobile subscriber characteristic information.

In embodiments, search results may be aggregated into categories, where the aggregation is based at least in part on a sponsor facility and the aggregated results presented on a mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a wireless carrier report may be generated in relation to implicit search results. The report may contain information relating to the success of the implicit search (e.g., based upon click activity and related searches), search result quality, keyword management, revenue generation, and it may be segmented by the type of mobile communication facility 102 used.

In embodiments, a result may be downloaded to a mobile communication facility 102, where the result is selected based, in part, on information relating to the mobile communication facility 102. Following this, a search may be performed on the mobile communication facility 102 and the results presented in response to the search entered in a search box on a mobile communication facility 102. The information relating to the mobile communication facility 102 may be mobile subscriber characteristic information, such as location and time of day or a user interface. The user interface may be adapted to facilitate a user's selection of what type of results to download or further adapted to facilitate the selection of at least one of keywords and other information to select the results to download automatically.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a search algorithm facility 144. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a delivery facility. Following this, a search may be performed on the mobile communication facility 102 and the results presented in response to the search entered in a search box on a mobile communication facility 102.

In embodiments, a result may be downloaded to a mobile communication facility 102, wherein the result is selected based at least in part on information relating to a mobile subscriber characteristic. Following this, a search may be performed on the mobile communication facility 102 and the results presented in response to the search entered in a search box on a mobile communication facility 102. The mobile subscriber characteristics 112 may include location, personal information, history of the user's web interactions, or a plurality of characteristics, such as location and the time of day.

In embodiments, a result may be downloaded to a mobile communication facility 102, where the result is selected based, in part, on information relating to a location as determined by a location based service. Location may be provided by a GPS system or a cell phone triangulation service. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a filter algorithm facility 144. The algorithm facility 144 may be a collaborative filter where the search is an open web search, or it may be a recommendation system. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a results facility 148. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102. The presentation may be facilitated by a mobile browser facility.

In embodiments, a result may be downloaded to a mobile communication facility 102, where the result is selected based at least in part on information relating to the mobile communication facility 102. Following this, a search may be performed on the mobile communication facility 102 and the results presented in response to the disambiguated search. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a result may be downloaded to a mobile communication facility 102, where the result is selected based, in part, on information relating to the voice recognition facility 160 of the mobile communication facility 102. Following this, a search may be performed on the mobile communication facility 102 and the results presented in response to the search. The voice recognition facility 160 may reside on the mobile communication facility 102, on a remote server, or, in part, on a mobile communication facility 102 and, in part, on a remote server.

In embodiments, a result may be downloaded to a mobile communication facility 102, where the result is selected based, in part, on information relating to the mobile communication facility 102. This information may reside locally on the mobile communication facility 102, or it may be stored remotely, for example in a mobile subscriber characteristics 112 database. Following this, a search may be performed on the mobile communication facility 102 and the results presented in response to the search In embodiments, a result may be downloaded to a mobile communication facility 102, where the result is selected based, in part, on information relating to a parental control parameter. The parental control parameter may be regulated through a server application or through the mobile communication facility 102. Following this, a search may be performed on the mobile communication facility 102 and the results presented in response to the search.

In embodiments, a result may be downloaded to a mobile communication facility 102, where the result is selected based, in part, on information relating to a privacy 152 parameter.

In embodiments, a result may be downloaded to a mobile communication facility 102, where the result is selected based, in part, on information relating to the mobile communication facility 102. A search may be performed on the mobile communication facility 102 and the result associated with a transactional security facility 154. The transactional security 154 facility may involve the protection of privacy 152 and may be operated in association with parental controls 150, digital rights management, or identity protection.

In embodiments, a result may be downloaded to a mobile communication facility 102, where the result is selected based at least in part on information relating to carrier business rules 130, a search performed on a mobile communication facility 102, and the result presented in response to the search. Carrier business rules 130 may include walled garden results, presenting out of garden content, sponsor information, or auctions. Information relating to the mobile communication facility 102 may be mobile subscriber characteristic information.

In embodiments, a result may be downloaded to a mobile communication facility 102, where the result is selected based at least in part on information relating to a sponsor facility, a search performed on a mobile communication facility 102, and the result presented in response to the search. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query may be entered in a search box on a mobile communicating facility and a syndicated advertising result produced. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a search query may be entered in a query entry 120 facility on a mobile communication facility 102 and a syndicated advertising result produced. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising results are produced in association with a search algorithm facility 144. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a delivery facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with mobile subscriber characteristic information. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The mobile subscriber characteristics 112 may include location, personal information, history of the user's web interactions, or a plurality of characteristics, such as location and the time of day.

In embodiments, a syndicated advertising result may be produced on a mobile communication facility 102, where the syndicated advertising result is produced in association with a location as determined through the use of a location based service. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Location may be provided by a GPS system or a cell phone triangulation service.

In embodiments, a syndicated advertising result may be produced on a mobile communication facility 102, where the syndicated advertising result is produced in association with a filter algorithm facility 144. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The algorithm facility 144 may be a collaborative filter where the search is an open web search, or it may be a recommendation system.

In embodiments, a syndicated advertising result may be produced on a mobile communication facility 102, where the syndicated advertising result is produced in association with a results facility 148. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a mobile browser facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a search query processed through a disambiguation facility 140. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a syndicated advertising result may be produced on a mobile communication facility 102, where the syndicated advertising result is produced in association with a query entered through a voice recognition facility 160. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The voice recognition facility 160 may reside on the mobile communication facility 102, on a remote server, or, in part, on a mobile communication facility 102 and, in part, on a remote server.

In embodiments, a syndicated advertising result may be produced on a mobile communication facility 102, where the syndicated advertising result is produced in association with information relating to the mobile communication facility 102. The information relating to the mobile communication facility 102 may be stored in a data facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. This information related to the mobile communication facility 102 may reside locally on the mobile communication facility 102, or it may be stored remotely, for example in a mobile subscriber characteristics 112 database.

In embodiments, a syndicated advertising result may be produced on a mobile communication facility 102, where the syndicated advertising result is produced in association with a parental control parameter. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The parental control parameter may be regulated through a server application or through the mobile communication facility 102.

In embodiments, a syndicated advertising result may be produced on a mobile communication facility 102 where the syndicated advertising result is produced in association with a privacy facility 152. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The privacy facility 152 may be adapted to provide secure search transaction and secure economic transactions.

In embodiments, a syndicated advertising result may be produced on a mobile communication facility 102, where the syndicated advertising result is associated with a transactional security 154 facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The transactional security 154 facility may involve the protection of privacy 152 and may be operated in association with parental controls 150, digital rights management, or identity protection.

In embodiments, a syndicated advertising result may be produced on a mobile communication facility 102, where the syndicated advertising result is produced in association with a carrier's business rules. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Carrier business rules 130 may include walled garden results, presenting out of garden content, sponsor information, or auctions. Information relating to the mobile communication facility 102 may be mobile subscriber characteristic information.

In embodiments, a syndicated advertising result may be produced on a mobile communication facility 102, where the syndicated advertising result is produced in association with a sponsor facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query entry 120 facility may be associated with a mobile communication facility 102 where the search query entry 120 facility is further associated with information relating to the mobile communication facility 102, such as mobile subscriber characteristic information.

In embodiments, a search algorithm facility 144 may be associated with a mobile communication facility 102 where the search algorithm facility 144 is further associated with information relating to the mobile communication facility 102.

In embodiments, a results delivery facility may be associated with a mobile communication facility 102 where the delivery facility is further associated with information relating to the mobile communication facility 102.

In embodiments, a search may be performed on a mobile communication facility 102, where the search is at least in part based on a mobile subscriber characteristic. The mobile subscriber characteristics 112 may include location, personal information, history of the user's web interactions, or a plurality of characteristics, such as location and the time of day.

In embodiments, a search may be performed on a mobile communication facility 102, where the search is at least in part based on a location as determined by a location based service. Location may be provided by a GPS system or a cell phone triangulation service.

In embodiments, a search may be performed on a mobile communication facility 102, where the search is, in part, based on a location as determined by a location based service. Location may be provided by a GPS system or a cell phone triangulation service. A search may also be performed on a mobile communication facility 102, where the search is at least in part based on a filter algorithm facility 144. The algorithm facility 144 may be a collaborative filter where the search is an open web search, or it may be a recommendation system.

In embodiments, a results facility 148 may be associated with a mobile communication facility 102, where the results facility 148 is adapted to produce results, in part, based on information relating to the mobile communication facility 102.

In embodiments, a mobile browser facility may be associated with a mobile communication facility 102, where the mobile browser facility is adapted to facilitate the selection of results, in part, based on information relating to the mobile communication facility 102.

In embodiments, a disambiguation facility 140 may be associated with a mobile communication facility 102. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a voice recognition search query entry 120 facility may be associated with a mobile communication facility 102. The voice recognition facility 160 may reside on the mobile communication facility 102, on a remote server, or, in part, on a mobile communication facility 102 and, in part, on a remote server.

In embodiments, a data facility may be associated with a mobile communication facility 102, where the data facility stores information relating to the mobile communication facility 102 and the data facility is adapted to be accessed in relation to providing search results to the mobile communication facility 102. The data facility may reside locally on the mobile communication facility 102, or it may be stored remotely, for example in a mobile subscriber characteristics 112 database.

In embodiments, a parental control facility may be associated with a mobile communication facility 102. The parental control parameter may be regulated through a server application or through the mobile communication facility 102.

In embodiments, a privacy facility 152 may be associated with a mobile communication facility 102. The privacy facility 152 may be adapted to provide secure search transactions and secure economic transactions.

In embodiments, a transactional security facility 154 may be associated with a mobile communication facility 102, where the transactional security facility 154 is adapted to provide secure transactions associated with search results obtained on the mobile communication facility 102. The transactional security facility 154 may involve the protection of privacy 152 and may be operated in association with parental controls 150, digital rights management, or identity protection.

In embodiments, a carrier business rule facility may be associated with a mobile communication facility 102, where the carrier business rule facility is adapted to be accessed in the process of providing search results to the mobile communication facility 102. Carrier business rules 130 may include walled garden results, presenting out of garden content, sponsor information, or auctions. Information relating to the mobile communication facility 102 may be mobile subscriber characteristic information.

In embodiments, a mobile communication facility 102 may be located through the use of a location based service and the location used in association with a filter algorithm facility 144 to perform a search. The algorithm facility 144 may be a collaborative filter where the search is an open web search, or it may be a recommendation system.

In embodiments, a mobile communication facility 102 may be located through the use of a location based service and the location used in association with a result facility to obtain search results.

In embodiments, a mobile communication facility 102 may be located through the use of a location based service and the location used in association with a mobile browser facility to obtain search results.

In embodiments, a mobile communication facility 102 may be located through the use of a location based service and the location used in association with a disambiguation facility 140 to obtain search results. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a mobile communication facility 102 may be located through the use of a location based service and the location used in association with a voice recognition facility 160 to obtain search results. The voice recognition facility 160 may reside on the mobile communication facility 102, on a remote server, or, in part, on a mobile communication facility 102 and, in part, on a remote server.

In embodiments, a mobile communication facility 102 may be located through the use of a location based service and the location used in association with a data facility to obtain search results. The data facility may reside locally on the mobile communication facility 102, or it may be stored remotely, for example, in a mobile subscriber characteristics 112 database.

In embodiments, a mobile communication facility 102 may be located through the use of a location based service and the location used in association with a parental control facility to obtain search results. The parental control parameter may be regulated through a server application or through the mobile communication facility 102.

In embodiments, a mobile communication facility 102 may be located through the use of a location based service and the location used in association with a privacy facility 152 to obtain search results. The privacy facility 152 may be adapted to provide secure search transactions or secure economic transactions.

In embodiments, a mobile communication facility 102 may be located through the use of a location based service and the location used in association with a search facility 142 to obtain a search result, where the search result is associated with a transactional security 154 facility. The transactional security 154 facility may involve the protection of privacy 152 and may be operated in association with parental controls 150, digital rights management, or identity protection.

In embodiments, a mobile communication facility 102 may be located through the use of a location based service and the location used in association with a carrier business rule to obtain search results. Carrier business rules 130 may include walled garden results, presenting out of garden content, sponsor information, or auctions. Information relating to the mobile communication facility 102 may be mobile subscriber characteristic information.

In embodiments, a mobile communication facility 102 may be located through the use of a location based service and the location used in association with a sponsor facility to obtain search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a filter algorithm facility 144 may be associated with a mobile communication facility 102 and the filter algorithm facility 144 may be used in the process of obtaining a search result.

In embodiments, a filter algorithm facility 144 may be associated with a mobile browser facility and the filter algorithm facility 144 used in the process of obtaining a search result.

In embodiments, a filter algorithm facility 144 may be associated with a mobile communication facility 102 and a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a filter algorithm facility 144 may be associated with a mobile communication facility 102 and a voice recognition facility 160. The voice recognition facility 160 may reside on the mobile communication facility 102, on a remote server, or, in part, on a mobile communication facility 102 and, in part, on a remote server.

In embodiments, a filter algorithm facility 144 may be associated with a mobile communication facility 102 and a data facility. The data facility may reside locally on the mobile communication facility 102, or it may be stored remotely, for example, in a mobile subscriber characteristics 112 database.

In embodiments, a filter algorithm facility 144 may be associated with a mobile communication facility 102 and a parental control facility. The parental control parameter may be regulated through a server application or through the mobile communication facility 102.

In embodiments, a filter algorithm facility 144 may be associated with a mobile communication facility 102 and a privacy facility 152. The privacy facility 152 may be adapted to provide secure search transactions or secure economic transactions.

In embodiments, a filter algorithm facility 144 may be associated with a mobile communication facility 102 and a transactional security facility 154. The transactional security facility 154 may involve the protection of privacy 152 and may be operated in association with parental controls 150, digital rights management, or identity protection.

In embodiments, a filter algorithm facility 144 may be associated with a mobile communication facility 102 and a carrier business rule. Carrier business rules 130 may include walled garden results, presenting out of garden content, sponsor information, or auctions. Information relating to the mobile communication facility 102 may be mobile subscriber characteristic information.

In embodiments, a filter algorithm facility 144 may be associated with a mobile communication facility 102 and a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a mobile browser facility may be associated with a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a mobile browser facility may be associated with a voice recognition facility 160, and the mobile browser facility may be used in the process of obtaining search results. Additionally, a filter algorithm facility 144 may be used in the process of obtaining results. The voice recognition facility 160 may reside on the mobile communication facility 102, on a remote server, or, in part, on a mobile communication facility 102 and, in part, on a remote server.

In embodiments, a mobile browser facility may be associated with a data facility, where information relating to a mobile communication is stored in an associated data facility. The data facility may reside locally on the mobile communication facility 102, or it may be stored remotely, for example in a mobile subscriber characteristics 112 database.

In embodiments, a mobile browser facility may be associated with a parental control facility, and the mobile browser facility may be used in the process of obtaining search results. The parental control parameter may be regulated through a server application or through the mobile communication facility 102.

In embodiments, a mobile browser facility may be associated with a privacy facility 152, and the mobile browser facility may be used in the process of obtaining search results. The privacy facility 152 may be adapted to provide secure search transactions or secure economic transactions.

In embodiments, a mobile browser facility may be associated with a transactional security facility 154. The transactional security facility 154 may involve the protection of privacy 152 and may be operated in association with parental controls 150, digital rights management, or identity protection.

In embodiments, a mobile browser facility may be associated with a carrier business rules facility 130. Carrier business rules 130 may include walled garden results, presenting out of garden content, sponsor information, or auctions. Information relating to the mobile communication facility 102 may be mobile subscriber characteristic information.

In embodiments, a mobile browser facility may be associated with a sponsor facility, and the mobile browser facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a disambiguation facility 140 may be associated with a voice recognition facility 160 and a mobile communication facility 102, and a disambiguation facility 140 or algorithm facility 144 may be used in the process of obtaining search results. The voice recognition facility 160 may reside on the mobile communication facility 102, on a remote server, or, in part, on a mobile communication facility 102 and, in part, on a remote server.

In embodiments, a disambiguation facility 140 may be associated with a data facility, where information relating to a mobile communication facility 102 is stored in the data facility. The data facility may reside locally on the mobile communication facility 102 or it may be stored remotely, for example in a mobile subscriber characteristics 112 database.

In embodiments, a disambiguation facility 140 may be associated with a parental control facility and a mobile communication facility 102, and the disambiguation facility 140 may be used in the process of obtaining search results. The parental control parameter may be regulated through a server application or through the mobile communication facility 102.

In embodiments, a disambiguation facility 140 may be associated with a privacy facility 152 and a mobile communication facility 102, and the disambiguation facility 140 may be used in the process of obtaining search results. The privacy facility 152 may be adapted to provide secure search transactions or secure economic transactions.

In embodiments, a disambiguation facility 140 may be associated with a transactional security facility 154 and a mobile communication facility 102, and the disambiguation facility 140 may be used in the process of obtaining search results. The transactional security facility 154 may involve the protection of privacy 152 and may be operated in association with parental controls 150, digital rights management, or identity protection.

In embodiments, a disambiguation facility 140 may be associated with a carrier rules facility and a mobile communication facility 102, and the disambiguation facility 140 may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a disambiguation facility 140 may be associated with a sponsor facility and a mobile communication facility 102, and the disambiguation facility 140 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a voice recognition facility 160 may be associated with a data facility, where information relating to a mobile communication facility 102 is stored in the data facility, and the voice recognition facility 160 is used in the process of obtaining search results. The data facility may reside locally on the mobile communication facility 102, or it may be stored remotely, for example, in a mobile subscriber characteristics 112 database.

In embodiments, a voice recognition facility 160 may be associated with a parental control facility and a mobile communication facility 102, and the voice recognition facility 160 may be used in the process of obtaining search results. The parental control parameter may be regulated through a server application or through the mobile communication facility 102.

In embodiments, a voice recognition facility 160 may be associated with a privacy facility 152 and a mobile communication facility 102, and the voice recognition facility 160 may be used in the process of obtaining search results. The privacy facility 152 may be adapted to provide secure search transactions or secure economic transactions.

In embodiments, a voice recognition facility 160 may be associated with a transactional control facility and a mobile communication facility 102, and the voice recognition facility 160 may be used in the process of obtaining search results. The transactional security facility 154 may involve the protection of privacy 152 and may be operated in association with parental controls 150, digital rights management, or identity protection.

In embodiments, a voice recognition facility 160 may be associated with a carrier business rules facility 130 and a mobile communication facility 102, and the voice recognition facility 160 may be in the process of obtaining search results. Carrier business rules 130 may include walled garden results, presenting out of garden content, sponsor information, or auctions. Information relating to the mobile communication facility 102 may be mobile subscriber characteristic information.

In embodiments, a voice recognition facility 160 may be associated with a sponsor facility and a mobile communication facility 102, and the voice recognition facility 160 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a parental control facility may be associated with a privacy 152 facility and a mobile communication facility 102 and use the parental control facility in the process of obtaining search results. The privacy facility 152 may be adapted to provide secure search transactions or secure economic transactions.

In embodiments, a parental control facility may be associated with a transactional security facility 154 and a mobile communication facility 102, and the parental control facility may be used in the process of obtaining search results. The transactional security facility 154 may involve the protection of privacy 152 and may be operated in association with parental controls 150, digital rights management, or identity protection.

In embodiments, a parental control facility may be associated with a carrier business rules facility 130 and a mobile communication facility 102, and the parental control facility may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a parental control facility may be associated with a sponsor facility and a mobile communication facility 102, and the parental control facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a privacy facility 152 may be associated with a transactional security 154 facility and a mobile communication facility 102, and the privacy facility 152 may be used in the process of obtaining search results. The transactional security facility 154 may involve the protection of privacy 152 and may be operated in association with parental controls 150, digital rights management, or identity protection.

In embodiments, a privacy facility 152 may be associated with a carrier business rules 130 facility and a mobile communication facility 102, and the privacy facility 152 may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a privacy facility 152 may be associated with a sponsor facility and a mobile communication facility 102, and the privacy facility 152 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, mobile communication facility 102 compatible content may be identified by tracking a plurality of web interactions from a mobile user device and storing information pertaining to the web interaction in a database, where at least a portion of the information comprises identification of the mobile device. The prediction of compatibility of the mobile communication facility 102 with content related to the web interaction may be based, in part, on how many interactions there were in the user's past. Content may be a download, program, file, executable file, zipped file, compressed file, audio, and video. A web interaction may be a click on a hyperlink, an indication to download content, and/or an indication to download a program. Prediction includes a prediction of compatibility when the number of interactions exceeds one or when the number of interactions exceeds two, and it may be further based on the time of each interaction. The identification of the mobile communication facility 102 may be, in part, based on an associated phone number that is also associated with a user. A mobile communication facility 102 may be a cell phone, satellite phone, PDA, combination PDA/cell phone, web device, and/or web appliance.

In embodiments, a method of determining mobile communication facility 102 compatible content may include tracking a plurality of mobile communication facility 102 interactions with network content. Information may be stored pertaining to the web interactions in a database, where a portion of the information comprises identification of at least one mobile communication facility 102 from the plurality of mobile communication facilities and predicts the compatibility of the mobile communication facility 102 with the network content based, in part, on how many content interactions there were. The prediction of compatibility of the mobile communication facility 102 with content related to the web interaction may be based, in part, on how many interactions there were in the user's past. Content may be a download, program, file, executable file, zipped file, compressed file, audio, and video. A web interaction may be a click on a hyperlink, an indication to download content, and/or an indication to download a program. Prediction includes a prediction of compatibility when the number of interactions exceeds one or when the number of interactions exceeds two, and it may be further based on the time of each interaction. The identification of the mobile communication facility 102 may be, in part, based on an associated phone number, that is also associated with a user. A mobile communication facility 102 may be a cell phone, satellite phone, PDA, combination PDA/cell phone, web device, and/or web appliance.

In embodiments, a method of determining mobile communication facility 102 compatible content may include identifying a mobile communication facility 102 by its association with a phone number, identifying a first network content interaction of the mobile device, and identifying a second network content interaction of the mobile device, wherein the second interaction is associated with the first interaction. The prediction of compatibility of the first network content with the mobile communication facility 102 may be based, in part, on the existence of the second interaction. The first interaction may be downloading content from a website, interacting with a website, downloading a program, viewing video (streaming video or downloading a video file), or listening to audio (streaming audio or downloaded audio files or music).

In embodiments, a method of providing a mobile communication facility 102 compatible content may include collecting click histories from a plurality of mobile content users, analyzing the click histories for repeat user visits, analyzing the repeat user visits for type of mobile communication facility 102 used, and generating a list of repeat user visited sites on corresponding mobile communication facilities to create a compatibility list. The type of mobile communication facility 102 may be identified, in part, from an associated phone number. The click histories may be collected by the wireless provider 108, processed as a batch, processed in real-time, or processed in quasi-time. This method may be used to develop a user specific content compatibility list which may be stored on the user's mobile communication facility 102 or stored on a server.

In embodiments, a method for providing only device compatible search results to a mobile communication facility 102 may include deriving compatibility from web interactions of similar mobile communication facilities.

In embodiments, a method for providing verified device search results compatible with a mobile communication facility 102 may include verified device compatible results that are highlighted on a user interface of the mobile communication facility 102.

In embodiments, a method for locating a mobile communication facility 102 may include providing a personal search filter, searching for information on a network using the mobile communication facility 102, or providing results based, in part, on the mobile communication facility 102 location and the personal search filter. The personal search filter may reside within the mobile communication facility 102, on a server, or on a network (e.g., the Internet). A personal search filter may be a collaborative filter and may also include at least two sub filters, such as filters related to personal information, business information, selectable filters, or filters based, in part, on the time of day or time of year. Personal filters may be configurable to include a local services search engine, a local product search engine, a business search engine, personal search engine, travel search engine, financial search engine, news search engine, video search engine, music search engine, and/or restaurant search engine. The mobile communication facility 102 may be a cell phone, satellite phone, PDA, combination PDA/cell phone, web device, and web appliance. The mobile communication facility 102 may include an SMS search interface, a voice recognition search interface, or wireless applications protocol. The search may be performed, in part, through a carrier website or through a carrier partner's website.

In embodiments, a method may be used for searching for network content using a mobile communication facility 102, where the mobile communication facility 102 connects to a network through a wireless communications service provider and is provided search results. A portion of the search results may be from an open network search and another portion of the search results may be based on content controlled by the wireless communications service provider. Search results may be provided in a predetermined order, where the predetermined order places the search results based on content controlled by the wireless communications service provider first. The method may also include highlighting the search results based on content controlled by the wireless provider 108, where the highlighted results are provided first. The content controlled by the wireless communications service provider may include ringtones, video, music video, music, music formatted for download, and video games. The content may be transcoded for wireless communication facilities in general or for specific wireless communication facilities. Transcoded content may be highlighted on a user interface of the wireless communication facility 104. The method may also include highlighting the open network search results and highlighting sponsor links, where the sponsored links are paid inclusion links (e.g., resulting from a competitive bid auction process). A mobile communication facility 102 may be a cell phone, satellite phone, PDA, combination PDA/cell phone, web device, and/or web appliance.

In embodiments, a method may be used for providing walled garden search results and open network search results to a mobile communication facility 102 as a result of a search performed on the mobile communication facility 102. The walled garden search results may be highlighted and listed prior to other content. The walled garden search results may include provider content that is not included within an initial amount of content provided from the open network search results, where the provider content includes music, games, video, ringtones, downloads, or other content adapted for purchase.

In embodiments, a method of optimizing search results for mobile users may include tracking the on-line interactions of a mobile communication facility 102, where the tracking involves, in part, identifying an identification number associated with the mobile communication facility 102, generating a filter based, in part, on the tracked on-line interactions, and applying the filter to a search performed on the mobile communication facility 102. The identification number may include a phone number. The tracked on-line information may include tracking clicks, clickthroughs, queries, clicks following queries, WAP sites visited, WAP portals visited, information reviewed from a DEC directory (e.g., a carrier's catalog), information reviewed from a billing history associated with a user, information about payment methods, purchases, payment timing, timing of online interactions and/or the location, and speed and direction of the mobile communication facility 102 at the time of the online interaction.

Filters may include a collaborative filter, personal filter, a filter generated through a click analysis, a filter based, in part, on carrier information associated with a mobile communication facility 102, a filter based on payment method for a carrier service (e.g., pre-payment or post-payment), a filter based on the type of mobile communication facility 102 used (cell phone, PDA, etc.), and/or a filter based on demographics. Filters may also be generated, in part, based upon information specific to a user's mobile communication facility 102, for example whether it has address book information, SMS logs, email logs, or IM logs. The descriptive information stored regarding the mobile communication facility 102 may include the cost of the facility and information about whether it has a music player as a primary function, a video player as a primary function, an instant messenger or chat facility as a primary function, and whether it is a type that is marketed to a particular customer demographic (e.g., children, young adults, adults).

In embodiments, the mobile communication facility 102 may be able to update an address book. For example users may add white pages and business listings to their address book. Businesses may be charged an additional fee for the permanent adding of a listing to a local address book.

The interactions of the mobile communication facility 102 may be tracked and stored on a server, where the stored information is transferable between carriers. Similarly, filters may be stored on a server in a manner that permits their transfer between carriers and/or between mobile communication facilities.

In embodiments, the presence of an application on a mobile communication facility 102 may be enhanced by working with the wireless provider 108.

In embodiments, mobile wallet/billing-on-behalf-of may be enabled to allow users to make purchases at paid search and shopping comparison vendors.

In embodiments, data feed files may be pushed by the wireless provider 108 to a provided FTP location. This may trigger the feed processing. Data feed files may be pulled from a wireless provider-supplied FTP location. This may be done on a predefined schedule.

In embodiments, deck content may be used for indexing via spidering. Spidering is the process of traversing web pages, WAP pages, or other online content in an automated fashion and extracting relevant content. A spider may start at one or more root nodes and traverse the links from those pages following a set of rules. Spidering may occur on a predefined schedule and may be invoked manually when requested by the wireless provider 108. The wireless provider 108 may also request a manual spidering run if an immediate update is necessary, or if specific links or locations are identified for additional searching. A spider may traverse a WAP deck and retrieve the necessary metadata from which a search index is built. If the WAP page for a content item enumerates comprehensive mobile communication facility 102 compatibility information, the information may be retrieved and indexed. If the WAP pages are restricted to only handsets which are compatible, the spider may emulate each known mobile communication facility 102 type to derive compatibility information.

For a WAP deck search, the wireless provider 108 may provide one or more entry points to the spider. This may be a list of one or more URLs representing content roots. The wireless provider 108 may provide the necessary access privileges to the WAP pages. This may entail providing information about private headers (e.g., X-Request) that may be supplied with the HTTP requests for authentication purposes or configuring the mobile application gateway such that a spider may pass through.

In embodiments, data received from the wireless provider 108 via a data feed or spidering may be maintained on equipment which is not accessible to unauthorized personnel. Thus, this data may not be directly accessible to end users. Metadata may be extracted, and indexes prepared, from this data, which may in turn be deployed in a production environment for use with services.

In embodiments, quality assurance of the platform may be attained through unit tests, integration tests, automated regression tests for resolved issues, and/or manual testing of mobile communication facilities 102. Testing of the platform servers may be accomplished though automated testing or manual testing. Continuous testing may be used during the development stage of a project. Release qualification testing may be used when a release has entered code-freeze. A process of continuous testing may ensure that behavioral changes are intentional and that quality does not degrade over time. This may be accomplished through a combination of development policies and automated testing. Each class in the server may have unit test coverage written and maintained by developers. A specific unit test may not need to be written for each and every method since some are too small to require it and some may be difficult to test in isolation. Some or all of the individual components may be tested in isolation. Unit tests may include several groups, such as, smoke tests (a limited set of tests intended to test the most important features and run in a small amount of time), exhaustive tests (a larger set of tests intended to test all areas of the product fully), and performance tests (a set of tests that take longer to run due to the nature of the tests being performed).

In embodiments, to assist identification of quality issues a continuous build process may be used. Before each submission of code change to source control, developers may run the set of smoke tests and fix any unit tests that have been broken (if those changes are expected and desired). An automated build machine process may watch for changes in the source control system and initiate a smoke test build anytime it notices changes that have not been tested. This process may act as a consistency check for the checked-in source code. Failures in this build may be considered emergencies and may be fixed immediately by the developer who introduced the failure. Another automated build process may build the server and run the exhaustive and regression unit test suites on scheduled intervals. Failures in this automated build are may be sent to the developers who have made changes since the previous run so that issues are known about as quickly as possible. Additional automated builds include: code coverage (compute and calculate coded coverage metrics), code analysis (check for questionable code constructs and style), and performance unit test suite (run the long running performance unit tests).

In embodiments, the platform 100 may render to all versions of WAP (and CHTML or iMODE) through the use of the WALL/WURFL toolkit which detects the phone version from the user and then renders appropriately. The WAP site may take advantage of capabilities of newer WAP versions and therefore render differently on different WAP versions. Testing may be used to verify that the WAP appears and functions appropriately on different phone versions. Minimal acceptance testing may be used on previously untested phones to evaluate the phone and to locate bugs. Minimal acceptance testing may also be used on phones that have previously passed full acceptance testing after small WAP site changes. Full acceptance testing may be run on mobile communication facilities 102 that have not previously passed full acceptance testing or after major WAP changes. Testing may include, but is not limited to, the following steps: verify basic page layout, verify that the numbering is correct, that the table or list is laid out properly, and that the link traversal is correct, check that the content item names are indented correctly, verify that the Artist Name is in the correct location, verify that search term matches are highlighted, check that the colors of links are correct, follow every link and validate that page (Full Test Only), and verify the numeric access keys work. The testing protocols may include the use of emulators, profilers, debuggers, and/or network monitors.

In embodiments, search metric and business reporting may include report interpretation and product recommendations based on search data patterns and behavior. Custom reports and alternative delivery options may also be available. A search summary report may provide roll up data to view the search usage across all platforms (e.g., mobile web search, gateway error traffic and paid search). The report may include total volume, day and time of day reporting, and usage of each search system. A search volume report may indicate intraday and intraweek search volume to monitor mobile search usage. A search query stream report may detail each query and the number of times the query is sent to the search engine during the period. This report may be used for understanding the overall search behavior of the user population. An emerging queries report may indicate queries that are rapidly accelerating or decelerating in volume. This report may be used for merchandising purposes and for identifying the content, products, or services to source and promote to the user base.

In embodiments, a WAP usage report may detail the WAP search site usage patterns available in aggregate, by phone model, and by content provider (when more than one content provider is indexed.) A WAP usage report may contain the following data elements: # of Searches, # of times the search engine has at least one result, average # of results for each search, # of times each content category responds to a search, # of clicks per search result page, # of pages viewed per search, # of unique users, # of sessions, session length in time, session length in page views, total # of page views, and/or the conversion rate from search to content purchase.

In embodiments, application usage reports may detail the application usage in the aggregate and by phone model and by content provider (when more than one content provider is indexed. The report may contain the following data elements: # of searches, # of times the search engine has at least one result, average # of results for each search, # of times each content category responds to a search, # of clicks per search result page, # of pages viewed per search, # of unique users, # of sessions, session length in time, session length in page views, total # of page views, and/or the conversion rate from search to content purchase.

In embodiments, a paid search performance report may provide the performance of the paid search engine directly in response to request from the system. Reports may be segmented between WAP and application usage and include: # of requests to paid search database, # matches, match rate—% of time a paid listing is available, fill rate—% of paid listings requested that are filled by the paid search engine, click-through rate, average cost-per-click, clicks per advertiser, gross revenue per advertiser, total gross revenue, total net revenue In embodiments, application adoption reports may detail the adoption of the downloadable application during the period, including # of promotional impressions served, # of clicks to learn more, # of downloads, and the # of active applications.

In embodiments, service metrics reports may detail and summarize data regarding the operation of servers, including, average requests per second, peak requests per second, requests/second distribution, maximum request size, and/or the average response time.

In embodiments, for each report type the wireless provider 108 may request different levels of specificity for different purposes, for example, executive summaries that present a small amount of data in an aggregated way intended to give a high-level overview; a detailed summary that presents a larger set of data aggregated to provide more detailed information. This type of report may be used in circumstances where the wireless provider 108 wants analysis of the raw data and provided with digested information; and/or transaction logs that present raw data collected. This type of report may be used when the wireless provider 108 would like to do its own analysis.

In embodiments, reports may be formatted using raw line-based log file (mostly used for transaction logs), XML, HTML (formatted by applying XSL to the XML), and/or plain text (formatted by applying XSL to the XML).

In embodiments, reports may be delivered using email, where the wireless provider 108 provides an email address. The subject of the message may include the name of the report and a timestamp. Reports may also be delivered by FTP, where the wireless provider 108 provides a host name, user name, password, and directory name. Reports are then delivered as file drops into the given directory. The filenames include the name of the report, a timestamp and sequence number.

An aspect of the present invention relates to providing useful responses to information entered into an address bar 178 of a mobile communication facility when the information does not properly correspond with an existing URL or other website reference. In embodiments, a user of a mobile communication facility may enter information into an address bar 178 on the mobile communication facility and the information may be a misspelled URL, an unknown URL, or the like. In other situations, the user may have been entering search terms rather than a URL thinking the address bar 178 was the search query entry facility. There are many reasons that misinformation may be entered into an address bar 178 on a mobile communication facility and embodiments of the present invention serve to provide a user with useful information even after entering such misinformation.

In embodiments, misinformation entered into the address bar of a mobile communication facility may be a wrong URL, a mis-typed URL, may not correspond with a presently active webpage, may be a broken link, missing page, or other information that cannot be matched with a website, URL, or other site indication.

Figure 12:
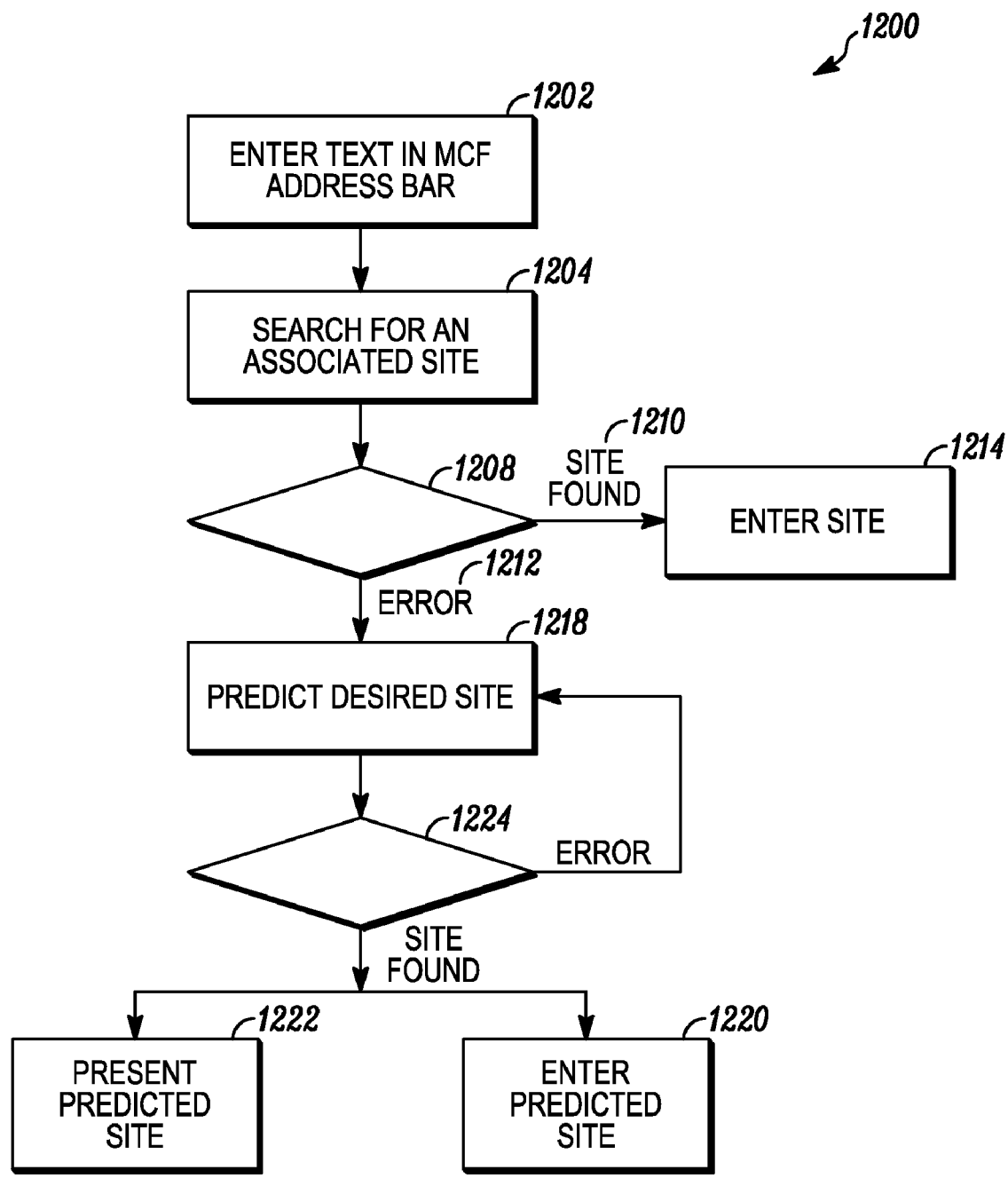
FIG. 12 illustrates a website prediction process based on misinformation entered in a mobile communication facility address bar.

FIG. 12 illustrates a prediction process associated with misinformation entered into an address bar 178 of a mobile communication facility 102. In this prediction process, a user may enter text into an address bar 178 of a mobile communication facility 1202. After entering the text, the user may initiate a search for the URL associated with the text 1204.

Following the search request, the mobile communication facility may produce the related site 1214 or an error may be produced 1212 if the URL is not found or is otherwise unavailable. When the error 1212 is returned, a facility designed for the prediction of the desired site 1218 may be employed. The site prediction facility may reside in the mobile communication facility, in the wireless provider, or in another related facility, for example.

The prediction associated with step 1218 may be based on a disambiguation facility (e.g. as described herein in connection with FIG. 1), a correction facility (e.g. as described herein in connection with FIG. 1), or other facility designed to predict what site the user intended to visit. For example, the text entered into the address bar 178 may have been correctly associated with a URL except for the fact that the ".com" was not included, it was mistyped, misspelled, or the true extension was ".net" or it otherwise included erroneous extension information. A prediction facility associated with step 1218 may go through a process of including or replacing extensions to find associated web sites. As another example of misinformation included in the address bar 178, the text may have included mistyping and the like associated with the prefix (e.g. typing "wwe." instead of "www." or entering a comma instead of a period before the URL). A prediction facility associated with step 1218 may go through a process of including or replacing the prefix information to find associated websites. As yet another example of misinformation included in the address bar 178, the user may have misspelled the URL, entered an abbreviated URL, entered search terms instead of a URL or the like. A prediction facility associated with step 1218 may go through a process of spell checking and correcting the text with what is perceived as the intended target site. In the course of predicting and correcting the text to associate the mis-directed text entry, the prediction facility may use other techniques for aiding the user (e.g. those described in connection with correcting, disambiguating, and otherwise aiding the user in better targeting search query, as described herein in connection with FIG. 1).

Once a site is predicted through step 1218, the predicted site may be entered 1220 and presented 1222 on the mobile communication facility 102. The process of predicting the desired site 1218 may also involve predicting and then searching for the predicted site 1224. If the predicted site does not exist or respond, a prediction facility associated with the prediction step 1218 may refine the prediction and search again. This process may be undertaken several times until a predicted site is located or until the process times out due to some preset timeout period, for example.

In embodiments, a process for predicting the desired site from misinformation entered into an address bar 178 of a mobile communication facility may involve the steps of predicting the desired site 1218 after receiving an indication 1212 that no site exists or responds to the misinformation. The prediction 1218 may involve correction, disambiguation or other such techniques as described herein. For example, the prediction may involve using information related to the mobile communication facility (e.g. mobile subscriber characteristic information) to assist the disambiguation or correction of the misinformation. Once a prediction is made, the prediction may be tested 1224 (e.g. a search for a related URL may be conducted), the prediction may be presented to the user as a suggestion 1222, or the site associated with the prediction may be entered and presented 1220, for example.

Figure 13:
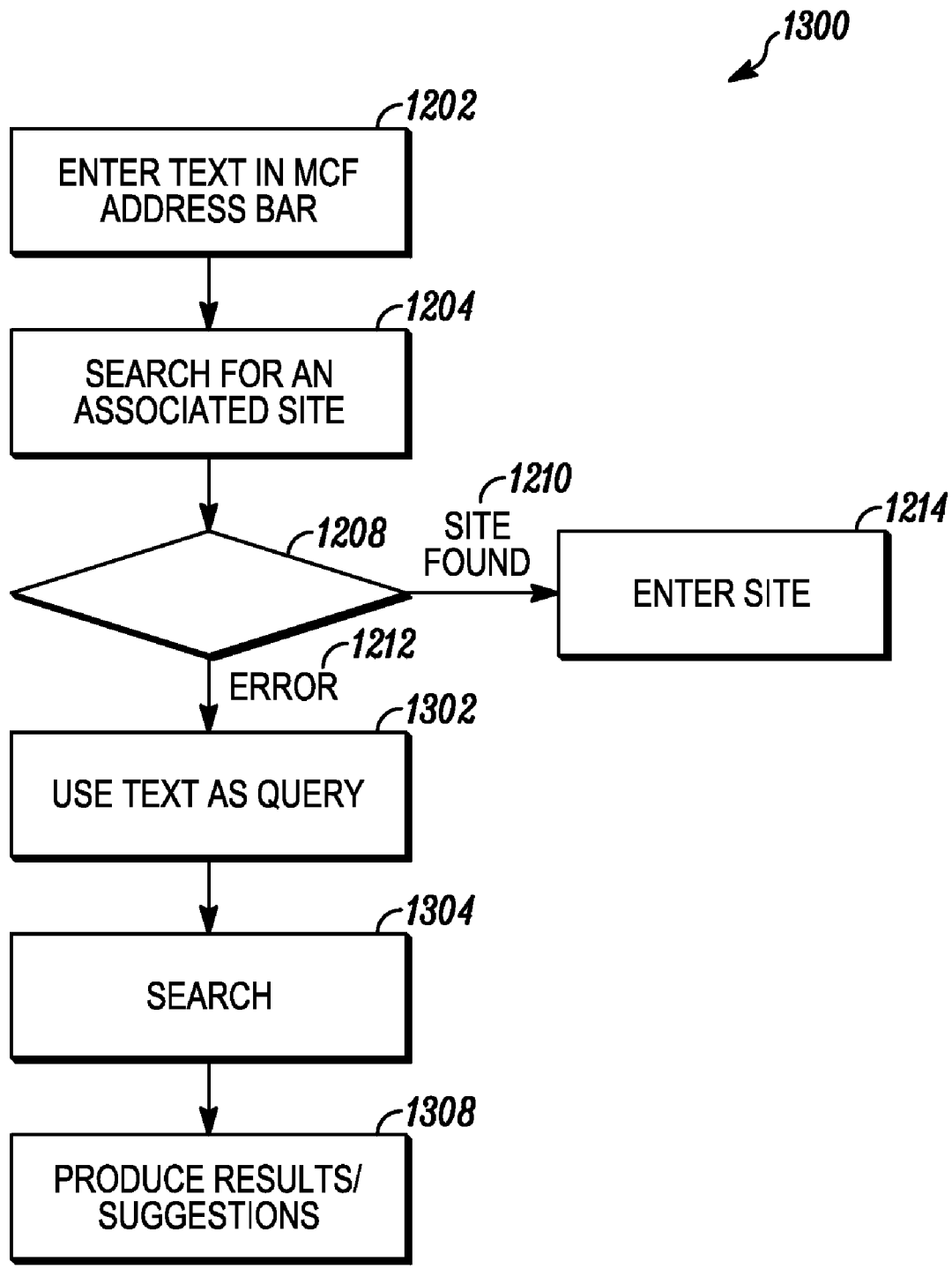
FIG. 13 illustrates a search query process based on misinformation entered in a mobile communication facility address bar.

FIG. 13 illustrates a search process 1300 based on misinformation 1300 entered into an address bar 178 associated with a mobile communication facility 102. In this search process, a user may enter text into an address bar 178 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the searching for the desired site or other information relating to the entered text may be employed. The site search facility may reside in the mobile communication facility, in the wireless provider, or in another related facility, for example.

Once an error 1212, or other indication the desired site is unavailable, is produced, the text entered into the address bar 178 may be used as a search query 1302 (e.g. in a similar fashion as if the text were entered into a search query facility as described in connection with FIG. 1). For example, the text may be disambiguated if it is ambiguous; it may be corrected (e.g. the spelling may be checked and corrected); or suggestions related to the query, disambiguated query, or corrected query may be produced for the user. Once the search query, corrected search query or disambiguated search query is determined, it may then be used to perform a search for results 1304. The search may produce results and or produce suggestions or other related information 1308. For example, as disclosed in connection with other embodiments herein (e.g. in connection with FIG. 1), the search results or suggestions may be produced in coordination with information relating to the mobile communication facility 102 (e.g. mobile subscriber characteristic information). In embodiments, an algorithm facility 144 (e.g. as illustrated in connection with FIG. 1) may be used in connection with information relating to the mobile communication facility to better predict what the user is looking for.

In embodiments, a process for searching for information relating to misinformation entered into an address bar 174 of a mobile communication facility may involve the steps of producing a search query from the text entered in the address bar 1302 after receiving an indication 1212 that no site exists or responds to the misinformation. The search query 1302 may involve correction, disambiguation or other such techniques as described herein. For example, the development of the search query may involve using information related to the mobile communication facility (e.g. mobile subscriber characteristic information) to assist the disambiguation or correction of the misinformation. Once a search query is made, search results and or suggestions and or recommendations or other information relating to the text entered in the address bar 178 may be presented to the user on the mobile communication facility.

Figure 14:
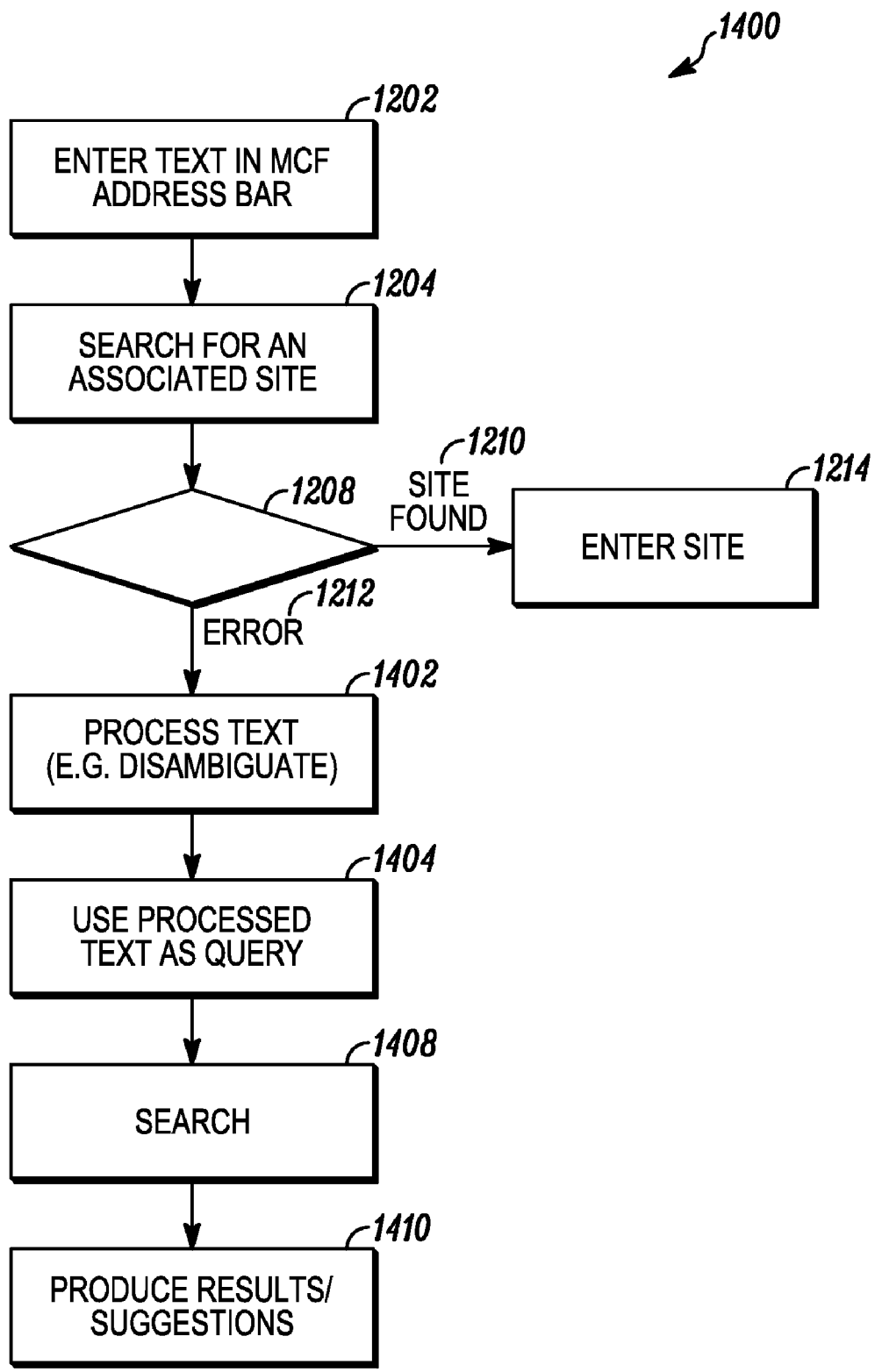
FIG. 14 illustrates a search query process based on misinformation entered in a mobile communication facility address bar.

FIG. 14 illustrates a processed search query process 1400 based on misinformation entered into an address bar 178 associated with a mobile communication facility 102. In this search process, a user may enter text into an address bar 178 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the searching for the desired site or other information relating to the entered text may be employed. The site search facility may reside in the mobile communication facility, in the wireless provider, or in another related facility, for example.

The text entered from the address bar 178 may be processed 1402 through a disambiguation facility, correction facility, or other facility adapted to modify the text into a form more appropriate for a search on the mobile communication facility. The processed query may then be used as a search query 1404 and a search may be performed 1408. Results, suggestions, and or other information pertaining to the processed query may be produced and displayed 1410 on a display associated with the mobile communication facility 102.

Figure 15:
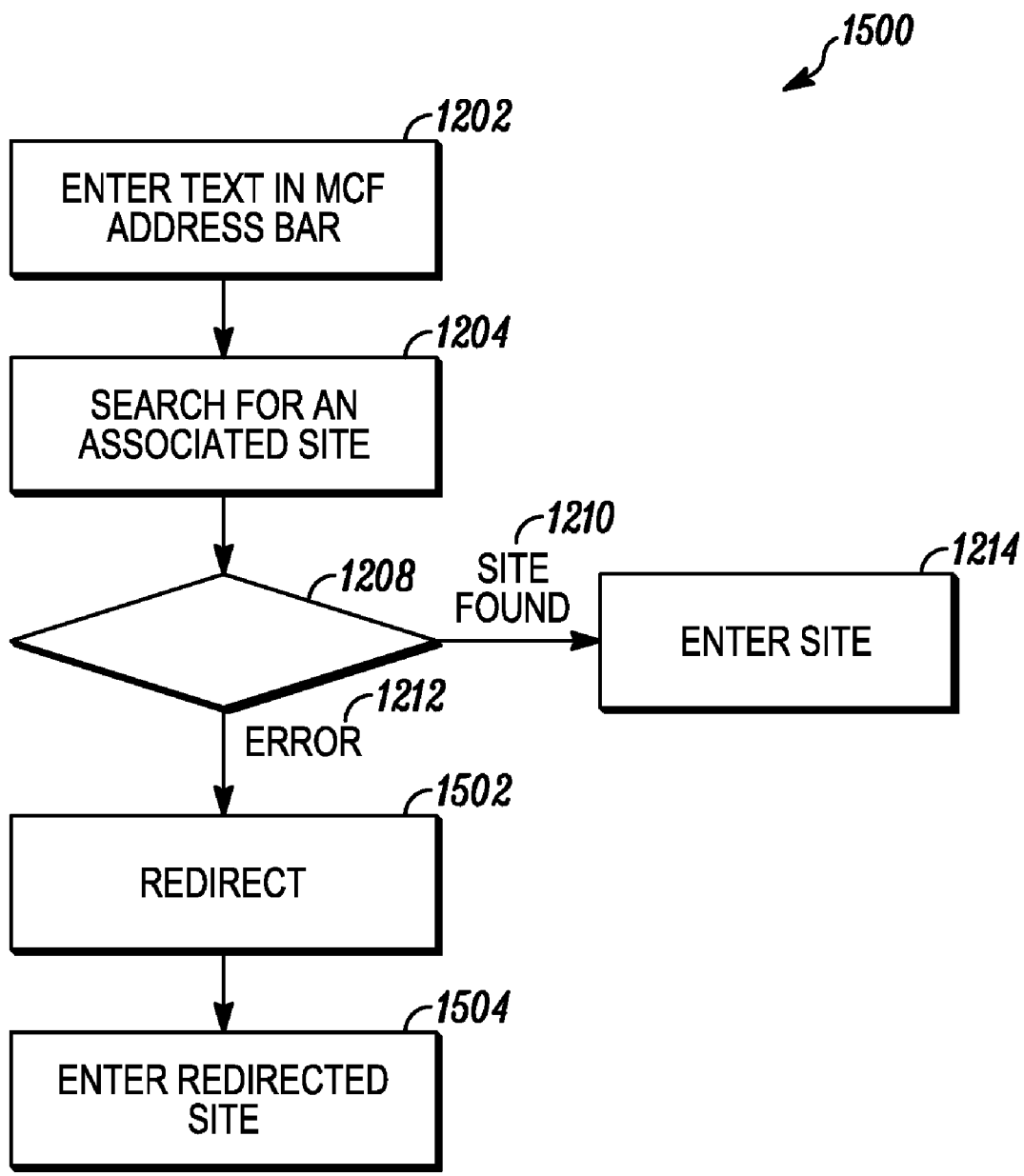
FIG. 15 illustrates a redirection process based on misinformation entered in a mobile communication facility address bar.

FIG. 15 illustrates a redirection process 1500 based on misinformation entered into an address bar 178 associated with a mobile communication facility 102. In this redirection process, a user may enter text into an address bar 178 of a mobile communication facility 1202. After entering the text, the user may initiate a search for the URL associated with the text 1204. Following the search request, the mobile communication facility may produce the related site 1214 or an error may be produced 1212 if the URL is not found or is otherwise unavailable. When the error is returned, a facility designed for the searching for the desired site or other information relating to the entered text may be employed. The site search facility may reside in the mobile communication facility, in the wireless provider, or in another related facility, for example.

Following the error, or other indication that the site is unavailable, 1212, a redirected site may be chosen 1502. The redirection 1502 may be based on a table, algorithm, or information relating to the originally unavailable site indicating the correct site. For example, the unavailable site may produce information indicating there is a related site. A referenced URL may be provided for example. Given this redirection information, the mobile communication facility may be redirected to the new site 1504.

In embodiments, information relating to the mobile communication facility may be used to redirect the user to a redirected site. For example, a user may misspell a URL and information relating to the mobile communication facility may indicate what the user intended to enter. For example, mobile characteristic information may contain information showing that the user has recently viewed a site with a very similar URL to the mistyped URL entered and the previously visited site may be presented to the user. In embodiments, an indication that the URL as entered was unavailable may also be presented to the user indicating a process of suggesting alternatives was used.

In embodiments, the redirection, search, text processing, results presentation, suggestions or other methods of managing information entered into the address bar of a mobile communication facility may be aided through an algorithm facility 144. The algorithm facility 144 may use information relating to the mobile communication facility 102 in the process of determining what information the user is most interested in. The algorithm facility may be a collaborative filter or personal, for example, and the filter may use information from the mobile characteristics database in the process of delivering user targeted results.

Another aspect of the present invention relates to processing errors related to search queries and address queries entered on a mobile communication facility. In embodiments, the error processing may be accomplished through software on the mobile communication facility. In embodiments, the error processing may be accomplished through software remote from the mobile communication facility (e.g. on a server associated with a wireless provider 108 or associated with the wireless communication facility 104). In embodiments, the error processing may be done using software processing in part on the mobile communication facility and in part on a platform remote from the mobile communication facility.

Figure 16:
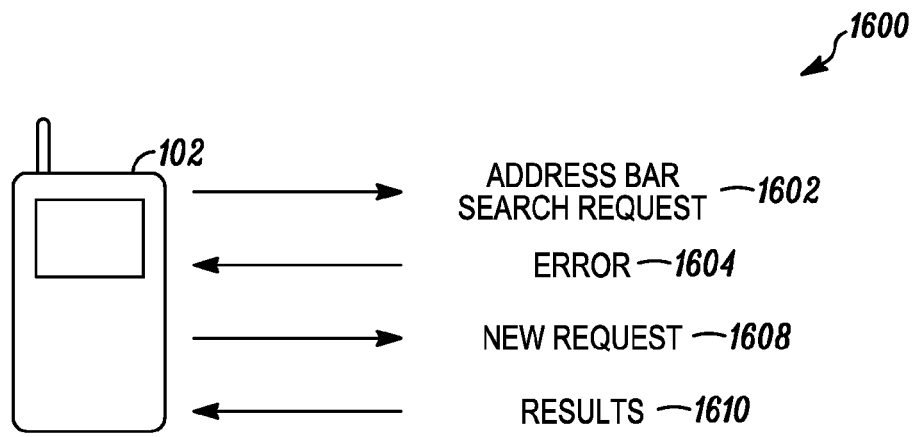
FIG. 16 illustrates a mobile communication process for managing misinformation entered in a mobile communication facility address bar.

FIG. 16 illustrates an error processing method 1600 wherein the error processing is performed, at least in part, on the mobile communication facility 102. In this embodiment, the mobile communication facility may be used to communicate an address search request (e.g. associated with an address entered into an address search bar on the mobile communication facility) to a server facility 1602. The server may be a server associated with a wireless provider for example. In the event there is no such address or URL located, or the located address is inactive or otherwise produces an error, an error 1604 may be produced in the mobile communication facility indicating such. This error may be a similar error to that described in connection with FIGS. 12-15 as error 1212.

Once an error 1604 or the like is produced, the software platform on the mobile communication facility 102 may respond to the error in a variety of ways (e.g. the error processing associated with FIGS. 12-15). For example, as indicated in connection with FIGS. 12-15, the software on the mobile communication facility 102 may predict a desired site 1218, use the text as a search query 1302, further process the text entered 1402, redirect the mobile communication facility to another website 1502 or otherwise perform a process in response to the error 1604. Following the error processing, the mobile communication facility may generate and communicate an additional request for information 1608. This may be similar to the requests for information described in connection with FIGS. 12-15. For example, a request to enter a newly predicted website (e.g. as described in connection with FIG. 12) may be made. Following the request to enter the newly predicted website, an error or the like may be produced and the process may be re-executed 1224. Ultimately, the mobile communication facility 102 may receive an indication of the predicted site or the predicted site may be presented 1610. As another example, the new request 1608 may be formed as a search query, or a processed query (e.g. disambiguated) intended to be fed into a search engine, as described in connection with FIGS. 13-14. As yet another example, the new request 1608 may be a redirected request as described in connection with FIG. 15. It should be noted that a user may intend to place a search query into the location box intentionally.

Figure 17:
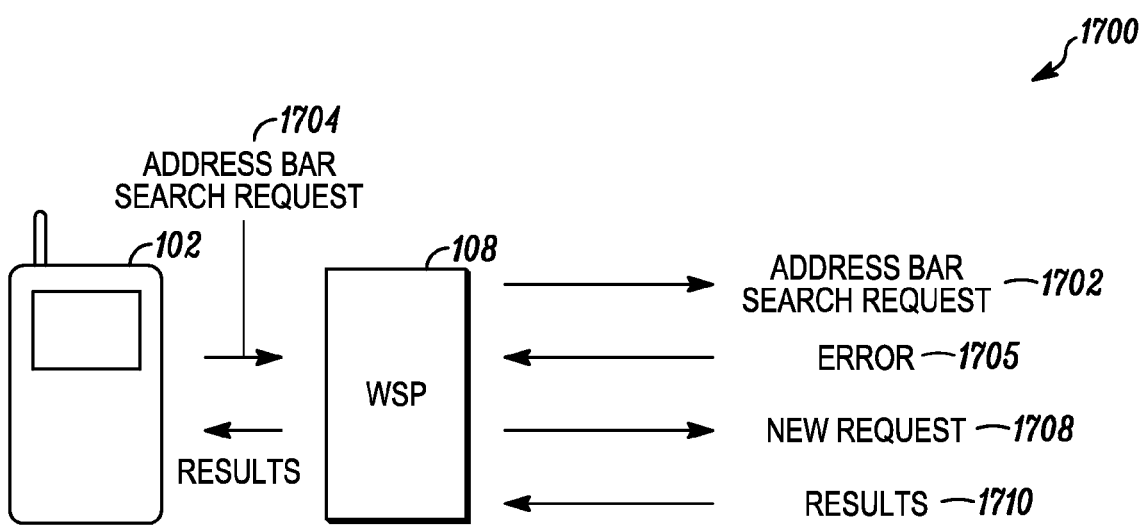
FIG. 17 illustrates a mobile communication process for managing misinformation entered in a mobile communication facility address bar, wherein at least a portion of the management is provided in association with a wireless provider.

FIG. 17 illustrates an error processing process 1700 wherein the error processing is performed, at least in part, remote from the mobile communication facility 102. In this embodiment, the mobile communication facility may be used to communicate an address search request 1704 (e.g. associated with an address entered into an address search bar on the mobile communication facility) to a server facility associated with a wireless service provider (WSP) 108. The server may be a server under the control of the wireless provider or it may be otherwise associated, for example. In the event there is no such address or URL located, or the located address is inactive or otherwise produces an error, an error 1705 may be produced at the server associated with the wireless provider 108 indicating such. This error may be a similar error to that described in connection with FIGS. 12-15 as error 1212.

Once an error 1705 or the like is produced, the software platform on the server associated with the wireless provider 108 may respond to the error in a variety of ways (e.g. the error processing associated with FIGS. 12-15). For example, as indicated in connection with FIGS. 12-15, the software on the server may predict a desired site 1218, use the text as a search query 1302, further process the text entered 1402, redirect the mobile communication facility to another website 1502 or otherwise perform a process in response to the error 1705. Following the error processing, the server may generate and communicate an additional request for information 1708. This may be similar to the requests for information described in connection with FIGS. 12-15. For example, a request to enter a newly predicted website (e.g. as described in connection with FIG. 12) may be made. Following the request to enter the newly predicted website, an error or the like may be produced and the process may be re-executed 1224. Ultimately, the mobile communication facility 102 may receive an indication of the predicted site or the predicted site may be presented 1710. As another example, the new request 1708 may be formed as a search query, or a processed query (e.g. disambiguated) intended to be fed into a search engine, as described in connection with FIGS. 13-14. As yet another example, the new request 1708 may be a redirected request as described in connection with FIG. 15.

An aspect of the present invention relates to providing sponsored links. In embodiments a sponsor may be provided with an interface to allow it to enter sponsor information, such as bidding information, content to be presented in the event a bid is won, contact information, device compatible information, profiles the sponsor is targeting, locations the sponsor is targeting and the like. For example, a sponsorship facility 162 (e.g. as described in connection with FIGS. 1 and 2) may be adapted with a sponsorship entry facility. The sponsorship facility 162 may perform other functions in connection with providing sponsored links on a mobile communication facility as well. For example, the sponsorship facility 162 may facilitate a bidding process and/or present the sponsored content to the mobile communication facility. In embodiments, information relating to the mobile communication facility (e.g. mobile subscriber characteristic information) may be used in the sponsored link process.

Figure 18:
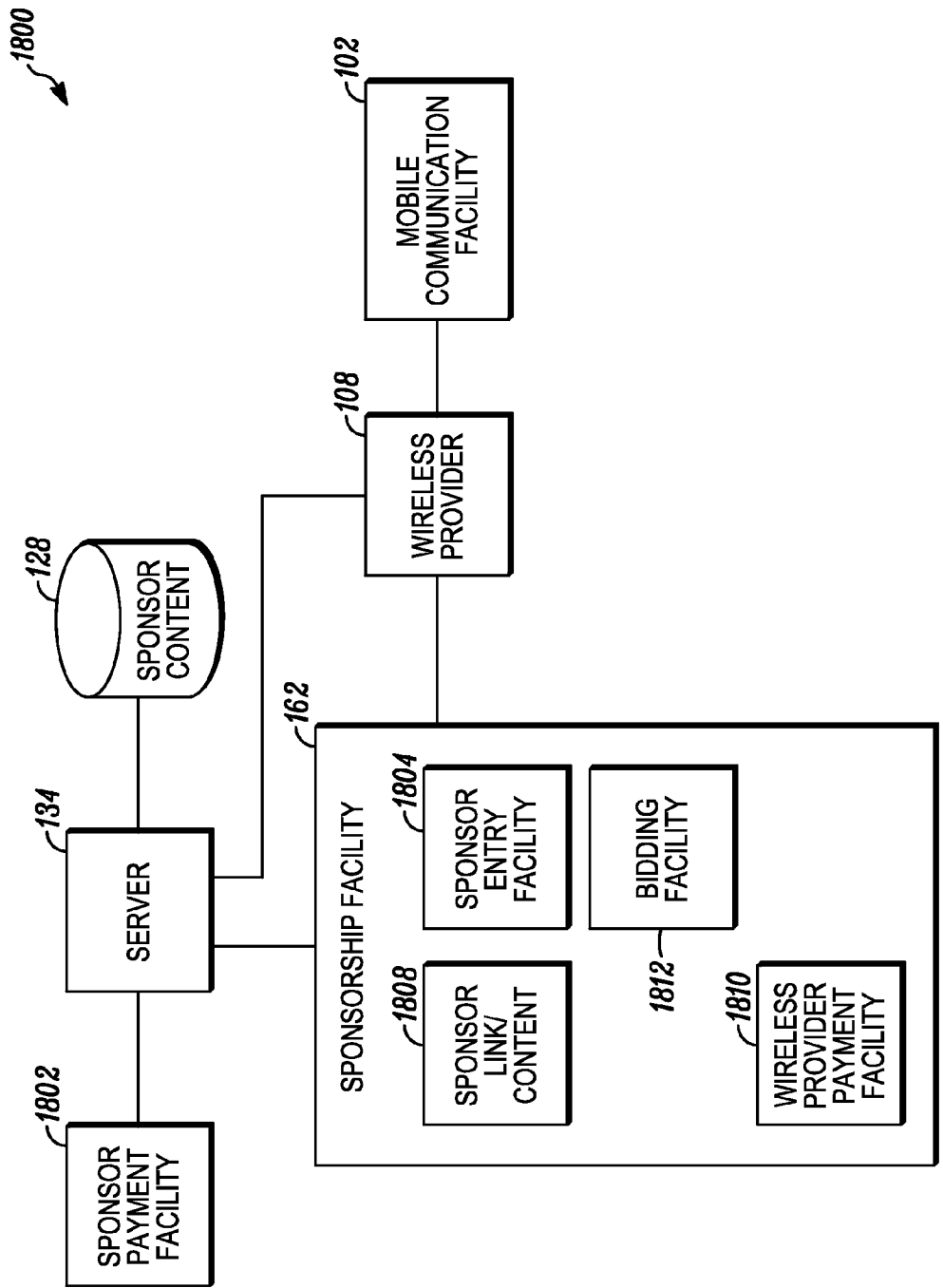
FIG. 18 illustrates a sponsored links platform.

FIG. 18 illustrates a sponsored content facility 1800 wherein a mobile communication facility 102 is in communication with a wireless provider 108. The sponsorship facility 162, which may be part of a mobile search host facility 114, includes a sponsor entry facility 1804 where a sponsor may begin the process of entering information relating to sponsored content, bids, search criteria and the like. The sponsorship facility 162 may include a bidding facility 1812 to handle a bidding process between several sponsors; a payment system 1810 to handle payment transactions associated with the sponsored content; and a sponsored link/content facility 1808 adapted to direct and/or provide the sponsored content. A sponsor may be associated with a server 134 application that is adapted to access sponsored content database 128 and a sponsor's payment facility 1802.

In embodiments, the sponsor may enter a bidding process to provide certain sponsored content to a mobile communication facility 102 through a sponsor entry facility 1804. The sponsor may provide bid information (such as max bids for certain keyword matches), content information, compatibility information and the like. Once the sponsor has entered the sponsor process through the sponsor entry facility 1804, it may be in a position to display the sponsored content on a mobile communication facility in exchange for a bid amount. A user may enter a search query on the mobile communication facility 102, the query may be transmitted to a bidding facility 1812 where a bidding process may take place to determine which sponsor's content is going to be provided to the mobile communication facility 102. The bidding process may result in the award of certain sponsored content 128 as identified in the awardee's information it originally indicated during the entry process. For example, the sponsor may have indicated that upon an award, a link or other content 1808 should be presented to the mobile communication facility.

A sponsor may present the mobile communication facility 102 with purchasable content and a user may purchase the content through the mobile communication facility 102 and make payment for the content through the wireless provider 108. For example, the content may be a downloadable ringtone, music file, video file, wall paper, or the like. The sponsor may elect to provide billing for such content through the wireless provider billing facility 1810. This may provide a convenient, secure, and/or trusted user transaction. The user may be comfortable in purchasing the content through his wireless provider as it may provide more of an appearance that it is provided from a known source. This may generate more of a 'walled garden' feel from the user's perspective while allowing the user to search for and/or receive such content on the open web. When the sponsor allows for payment of the content through the wireless provider payment facility 1810, the wireless provider 108 may receive a portion of the user's payment (or some other compensation) in return for the billing service.

In embodiments, the sponsor payment facility 1802 may be used to pay for sponsored links that were awarded and/or presented to a mobile communication facility 102. For example, once sponsored content is awarded and/or presented to the mobile communication facility 102, the bidding facility 1812 may request payment for the bid amount from the sponsor payment facility 1802. The sponsor payment facility 1802 may then process payment to the wireless provider payment facility 1810, for example.

Figure 19:
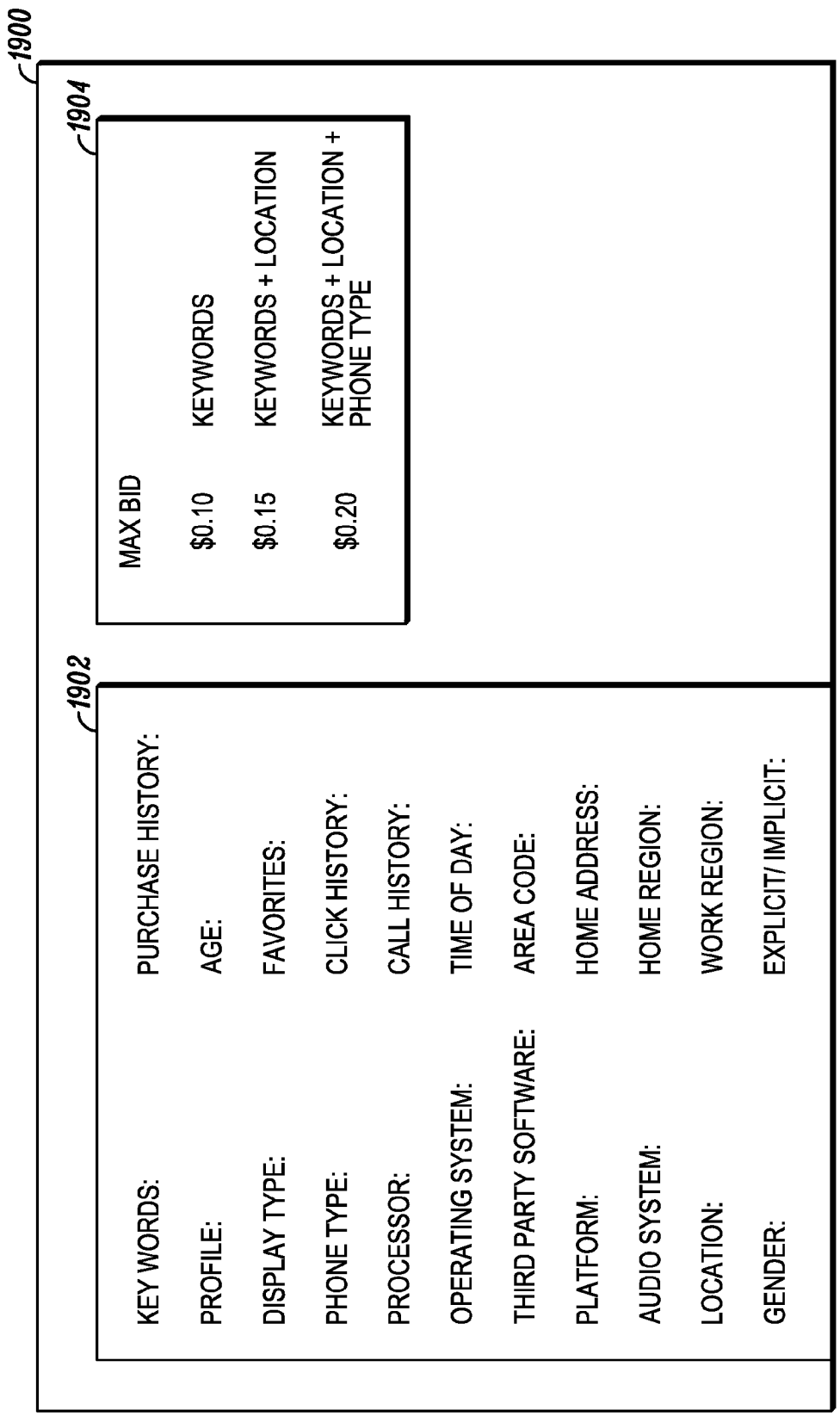
FIG. 19 illustrates a sponsor entry facility user interface.

FIG. 19 illustrates a sponsor entry facility user interface 1900 that may be provided to a sponsor when the sponsor interacts with the sponsor entry facility 1804. The user interface 1900 may include a criteria entry facility 1902 where the sponsor may enter criteria that are important to its bid for placing sponsored content. For example, the criteria entered in the criteria entry facility 1902 may relate to key words, phrases, terms, lingo, SMS codes, user profile, mobile communication facility display type, mobile communication facility type, phone type, mobile communication facility, mobile communication facility processor type or capability, mobile communication facility operating system, mobile communication facility third party software, mobile communication facility platform characteristics, mobile communication facility audio system, location, user gender, user purchase history, user age, favorites, click history, call history, time of day, day of year, mobile communication facility area code, user home address, home region, work address, work region, mobile subscriber characteristics and the like.

The user interface 1900 may also include a bid entry facility 1904. The bid entry facility may provide a sponsor with the ability to enter bid amounts and corresponding bid criteria. For example, a maximum bid amount may be associated with criteria such as keyword relevancy match. In embodiments the maximum bid may be associated with simple matching criteria (e.g. such as matching a keyword) or it may be associated with a more complicated sting or weighted string of terms, events, or characteristics. For example, while a sponsor may provide a maximum bid of $0.10 for a keyword match, it may provide a bid of $0.15 for a combination of keyword and location, or $0.20 for a combination of keyword, location and phone type. As another example, the sponsor may bid $0.15 for a bid associated with a location and time of day if the search is an implicit search. While certain illustrations of bid criteria associated with bid amounts have been provided, it should be understood that the criteria matching may be any type of matching including without limitation weighted function matching, algorithm-based matching or any other type of rule-based, algorithmic, heuristic, or other matching.

In embodiments, a sponsor desirous of presenting its content on a mobile communication facility may be presented a plurality of menu formats with which to create sponsor content including, but not limited to, advertisements, promotional notices, offers, and so on. For example, the menu system may provide a sponsor an entry menu within which it may be possible for the sponsor to create a title for sponsor content, include an URL, street address, phone number, or other contact information. It may be possible to enter additional descriptive text, by line, by paragraph, and/or page.

In embodiments, a sponsor desirous of presenting its content on a mobile communication facility may be presented a plurality of menu formats with which to select the types of mobile communication facilities on which the sponsor would like to present the sponsor content. For example, the sponsor may wish to select a subset of mobile communication facility models that are best suited for presentation of the sponsor's content due to technological requirements for the content to optimally present. A sponsor may choose to present only on mobile communication facility models that are associated with other user characteristics that the sponsor would like to target (e.g., a cell phone model known to have high usage among college students).

In embodiments, a sponsor desirous of presenting its content on a mobile communication facility may be presented a plurality of menu formats with which to select the mobile communication facility platform and/or software types on which the sponsor would like to present the sponsor content. For example, a sponsor may have content that requires a Java-enabled device. Therefore, it may be desirable for the sponsor to select to present its content only on those mobile communication facilities that are Java-enabled.

In embodiments, a sponsor desirous of presenting its content on a mobile communication facility may be presented a plurality of menu formats from which to select key words and/or key phrases to associate with the sponsor's information. The menus may present individual words, lists of words, and/or phrases for which a sponsor may enter a bid amount. The bid amount may be a specific price, a price range, or a maximum price that the sponsor is willing to pay in order to have its content associated with the language.

In embodiments, a sponsor desirous of presenting its content on a mobile communication facility may be presented with keyword suggestions based upon keywords entered and/or selected by the sponsor. For example, a thesaurus may be employed to automatically present sponsors with additional keywords that are related to the keywords in which a sponsor manifests an interest in bidding.

In embodiments, a sponsor desirous of presenting its content on a mobile communication facility may be presented a plurality of menu formats from which to select geographic variables to associate with the sponsor's information. The menus may present individual area codes, city names, state names, country names, location entered by a user and/or be based upon GPS information derived from a location facility. Geographic information may also be presented in relation to other mobile subscriber characteristics. For example, a sponsor in the hotel business may be interested in having its content present to only those users that are outside of their hometown and/or normal work region.

In embodiments, a sponsor desirous of presenting its content on a mobile communication facility may be presented a plurality of menu formats from which to select demographic variables to associate with the sponsor's information. The menus may present individual demographic variables contained in the mobile subscriber characteristics database, such as, age, sex, race, address, income, billing history, purchase history, and so forth.

In embodiments, sponsors' content may be displayed on a mobile communication facility in a descending rank order based upon the sponsors' bid amounts.

In embodiments, sponsors' content may be displayed on a mobile communication facility in a descending rank order based upon the amount of shared revenue derived from sponsors.

In embodiments, sponsors' content may be displayed and/or ordered on a mobile communication facility 102 based at least in part on using time as a criteria.

In embodiments, sponsors' content may be displayed and/or ordered on a mobile communication facility 102 based at least in part on a mobile subscriber characteristic, such as, the user, device type, geography, transaction, and/or history.

In embodiments, sponsors' content may be displayed and/or ordered on a mobile communication facility 102 based at least in part on the relevancy of the sponsored content. For example, relevancy may be based upon the information contained in a sponsor's content and keywords entered by a user in a query entry facility 120. Relevancy may be based upon the sponsor's content and mobile subscriber characteristics, such as, user, device type, geography, transaction, and/or history.

In embodiments, sponsors' content may be displayed and/or ordered on a mobile communication facility 102 based at least in part on a grouping or aggregation of mobile subscriber characteristics. For example, sponsors' content may be displayed on the basis of users' age ranges (e.g., 20-30 year olds).

In embodiments, the amounts payable as a result of the sponsor billing process may be processed within the billing system of a wireless provider. For example, when the sponsor enters a wireless provider's bidding system it may enter into an agreement with the wireless provider such that any presented sponsored content is paid for. The payment may come directly from the sponsor to the wireless provider, for example. In embodiments, a user of the mobile communication facility may interact with sponsored content (e.g. click on a sponsored line) and make a transaction within the sponsored content (e.g. the user may purchase a music download, ringtone, wall paper or the like). In such embodiments, the purchase price of the purchased content may appear on the user's wireless provider bill, as opposed to being billed from the sponsor.

In embodiments, mobile communication facility users may be classified on a combination of mobile subscriber characteristics, device type, location, behavioral history, transaction history, or other parameters and the resulting classes presented in a menu format to sponsors for bidding. For example, it may be possible to statistically model the user characteristics within a population of a wireless provider's customer base that are most likely to purchase tickets for a Caribbean cruise. Once this model is known, all customers with approximately the profile described by the model could be grouped in a "Caribbean Cruisers" category. This category may then be included in a menu system, along with other categories, and presented to sponsors for bidding. Swimwear companies, sunglass companies, etc. may have an increased interest in bidding for access to the Caribbean Cruisers category because of the increased probability that users in this category have a need for their products. Summary of the many characteristics (variables) used in the model into a single category may make the bidding process less time-consuming to sponsors and may constitute a proprietary product. Furthermore, the statistical model may be continually updated to accommodate changing user preferences.

In embodiments, a sponsor's website may be evaluated to determine the frequency of the appearance of key words and/or key phrases. Once the keyword and/or key phrase frequency is known, a site relevancy score may be derived indicating the relevance of keywords to the content of a sponsor's website. This relevancy score may then be used to assist sponsors in their bidding, making it easier for sponsors to focus their finances on keywords and/or key phrases with the greatest relevancy to their content.

In embodiments, the behaviors of mobile communication facility users may be automatically collected and the bid values in the bidding system adjusted to reflect user behaviors. For example, user calls, clicks, clickthroughs, purchases, and yield optimization may be automated and used to change the value of minimum or maximum bid values associated with a keyword.

In embodiments, an editorial review process may be used to evaluate the appropriateness of sponsors' selections of criteria with which to associate their content. For example, it may be inappropriate to have a sponsor associate adult content with keywords commonly associated with the interests of children. The editorial process may assist in locating and remedying such incongruities.

In embodiments, an automated spidering tool may be used to periodically monitor changes in sponsors' content and determine the reliability of the sponsor links. For example, a sponsor may update a website to such an extent that the sponsor's content that was previously associated with keywords through a bidding process is no longer reliable (i.e., the content is no longer located where the links direct a user). When this occurs, the system may send an alert to the sponsor indicating that the reliability of the sponsor content links is insufficient. They may serve to improve the overall reliability of the system.

Figure 20:
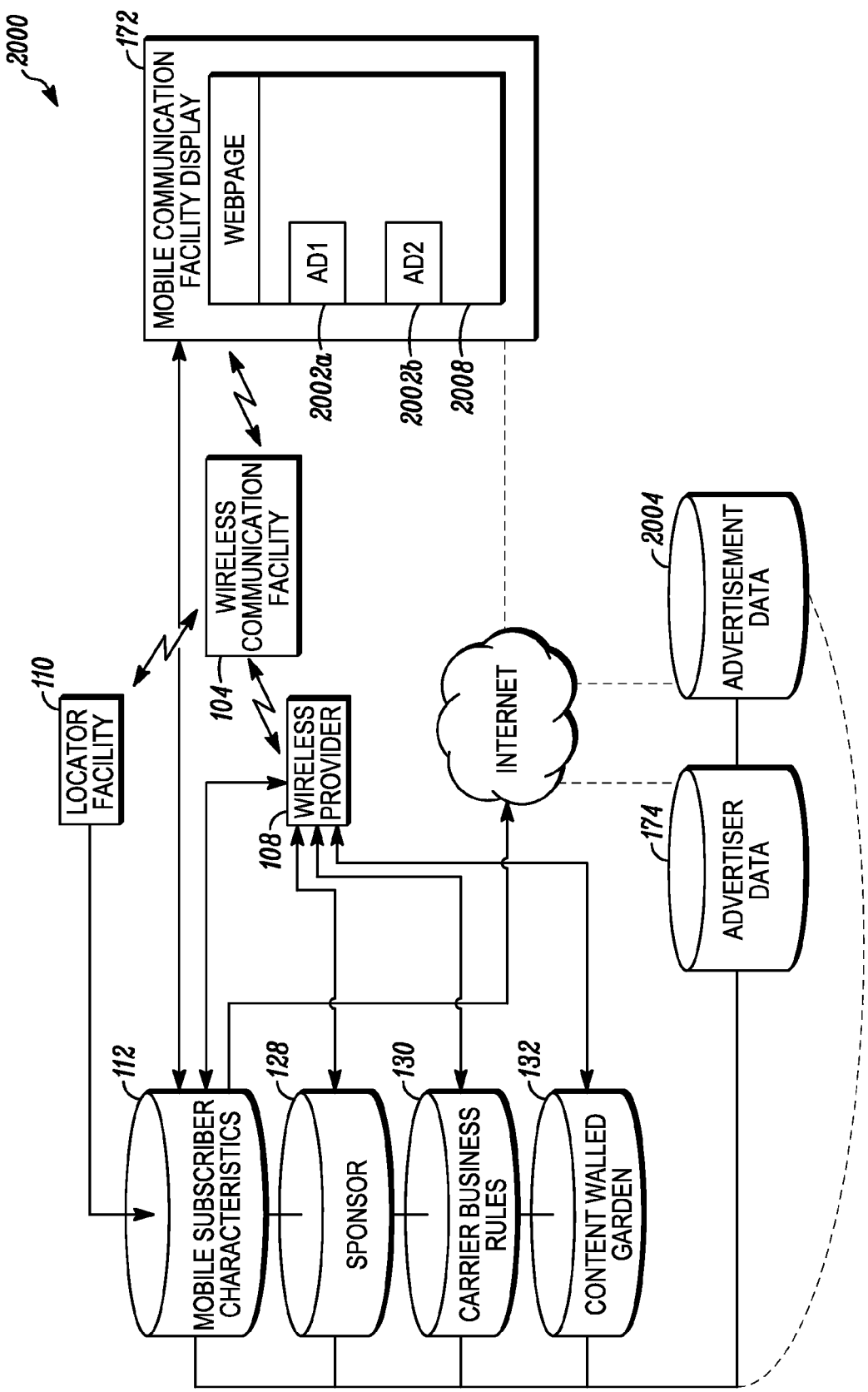
FIG. 20 illustrates a process for mobile advertisement syndication.

As illustrated in FIG. 20, an advertisement 2004 may be presented to a mobile communication facility 102 based at least in part on receiving a webpage request from the query facility of a mobile communication facility, receiving information associated with the mobile communication facility, and associating at least one advertisement 2002a with a webpage at least in part based on the information relating to the mobile communication facility. For example, a user of a mobile communication facility may initiate a search query consisting of an explicit text query spelling a musician's name. The potential search results that may be presented to the user's mobile communication facility display 172 may include advertisements 2002a, 2002b and websites for the musician's CD's, videos of his performances, etc. Alternatively, a mobile communication facility user may enter an address request (e.g., an internet URL) requesting a specific website devoted to a musician. This address request may in turn be associated with advertisements and other websites related to the musician's CD's, videos of his performances, etc. Information about the mobile communication facility (e.g., its video streaming capabilities) may be used in order to determine which of the advertisement/webpage 2008 results may be presented successfully to the user's mobile communication facility 102. This information may, in turn, be used to pair webpages and advertisements 2004 that are each capable of presenting in the display of the user's mobile communication facility 102.

In embodiments 2000, an implicit query may be received from a user of a mobile communication facility and used at least in part to derive associations with advertisements 2004. For example, mobile subscriber characteristics 112, carrier business rules 130, or mobile communication facility information, in conjunction with time, location, or similar situation, may suggest relevant advertisement-webpage 2008 pairing recommendations for the user. The recommended advertisements 2002 may be paired with webpages presented prior to, during, or following, the display of the advertisement 2002 results. A content request may be made by an implicit query request based at least in part on a mobile subscriber characteristic 112. For example, a user's mobile subscriber characteristics 112 may include the user's date of birth. Thus, an implicit query may be generated on the user's birthday in order to cull advertisements 2004 related to celebration of a birthday, discounts for customers on their birthdays, etc. A content request may be made an implicit query request based at least in part on a characteristic of a user's mobile communication facility. For example, if a mobile communication facility type is associated with a demographic (e.g., age), an implicit query may be initiated to cull advertisements 2004 of probable relevance to the user of that mobile communication facility type.

In embodiments, a user's prior search activities and search results may also be used to create implicit query requests for the user. Prior search activities may include transactions, search queries, visits to websites, and other acts initiated by the user on the mobile communication facility 102. The geographic location of the mobile communication facility 102 may foster implicit queries including, but not limited to, products and services in the user's current geographic vicinity. The current time may be used independently or in conjunction with other information to create implicit queries. For example, the independent fact that it is noon, may initiate an implicit query for restaurants serving lunch. As with the above restaurant example, similar processes for generating meaningful recommendations may be applied to other services and products, including, transportation, food, theater, sports, entertainment, movies, corporations, work, bank, post office, mail facility, gas, directions, locations, location, navigation, taxi, bus, train, car, airport, baby sitter, service provider, goods provider, drug store, drive through, bar, club, movie times, entertainment times, news, and local information.

In embodiments, an advertisement 2002 may be presented to a mobile communication facility display 172 based at least in part on information relating to mobile subscriber characteristics 112. This information may include a user's individual demographic variables contained in the mobile subscriber characteristics database 112, such be age, sex, race, religion, an area code, zip code, a home address, a work address, a billing address, credit information, family information, income range, birth date range, birthplace, employer, job title, length of employment, an affiliation or other such information as described herein. The mobile subscriber characteristic 112 may be associated with a personal filter. The mobile subscriber characteristic may be used in conjunction with a collaborative filter. The mobile subscriber characteristic 112 may include an aggregate of user characteristics or include a range of values. The range of values of a user characteristic may be a range of a user demographic. The range of values of a user characteristic may be a range of behaviors, or a range of age.

In embodiments, mobile subscriber characteristics 112 may form parameters that limit the advertisement 2002 search results to those relevant to a mobile subscriber characteristic 112 or profile of multiple characteristics. The display of advertisement 2002 result set(s) may, thus, omit information, prioritize information (e.g., presenting sponsor links prior to all others), highlight a subset of the search result set, or order the display of information based upon the presence or absence of mobile subscriber characteristics 112. Examples of representative elements that may be stored within the mobile subscriber characteristics database 112 include location, personal information relating to a user, web interactions, email interactions, messaging interactions, billing history, payment history, typical bill amount, time of day, duration of on-line interactions, number of on-line interactions, family status, occupation, transactions, previous search queries entered, history of locations, phone number, device identifier, type of content previously downloaded, content previously viewed, and sites visited.

In embodiments, at least one advertisement 2004 may be associated with at least one webpage at least in part based on the information relating to a mobile subscriber characteristic 112 and mobile communication facility characteristic combination. This information may provide an indication as to what the user may be looking for at a given time and location. For example, a user may be looking for transportation, food, a theater, sports, entertainment, movies, corporations, work, a bank, post office, mail facility, gas, directions, locations, location, navigation, taxi, bus, train, car, airport, baby sitter, service provider, goods provider, drug store, drive through, bar, club, movie times, entertainment times, news, and local information.

In embodiments, an advertisement 2004 may be presented to a mobile communication facility display 172 based at least in part on information relating to a mobile communication facility. This information may form parameters that limit the advertisement 2002 search results to those compatible with, relevant to, or preferred for presentation on a given type of mobile communication facility. The display of advertisement 2002 result set(s) may, thus, omit information, prioritize information (e.g., presenting sponsor links prior to all others), highlight a subset of the search result set, or order the display of information based upon the presence or absence of a mobile communication facility or a feature of a mobile communication facility. Examples of representative elements that may be stored within the mobile subscriber characteristics database 112 include search history, a parental control, or a carrier business rule 130, display resolution, processing speed, audio capability, visual capability, and other technical characteristics. For example, an advertisement 2004 may be associated with only the subset of mobile communication facility models that are best suited for presentation of the advertisement's 2004 content due to technological requirements for the content to optimally present. For example, an advertisement 2004 may have content that requires a Java-enabled device. Therefore, it may be desirable for the advertisement 2004 to present its content only on those mobile communication facilities that are Java-enabled.

In embodiments, advertising and webpage content compatibility with a type of mobile communication facility 102 may be determined at least in part by tracking a plurality of mobile communication facility 102 interactions with such content. Information may be stored pertaining to the advertising and web interactions in a database, where a portion of the information comprises identification of at least one mobile communication facility 102 from the plurality of mobile communication facilities, and predicting the compatibility of the mobile communication facility 102 with the content based, in part, on how many content interactions there were. The prediction of compatibility of the mobile communication facility 102 with content may be based, in part, on how many interactions there were in the user's past. Content may be a download, program, file, executable file, zipped file, compressed file, audio, and video. An advertising or web interaction may be a click on a hyperlink, an indication of downloaded content, and/or an indication of a downloaded program.

In embodiments, advertising content may be associated with webpage content and the at least one mobile subscriber characteristic 112 and or the at least one mobile communication facility 102 characteristic.

In embodiments, an advertisement 2004 may be associated with at least one webpage based at least in part on information relating to a mobile communication provider. The information relating to a mobile communication provider may include, but is not limited to, a graphical trademark, audible signal, a recording of a person reading the slogan trademark of a mobile communication provider, a distinctive audio tone or combinations of tones associated with a mobile communication provider, or a video stream, such as an audio-visual commercial.

In embodiments, the past performance or other information relating to a mobile communication facility may be stored, aggregated, and analyzed on a remote server 134 and database 138, wireless provider data facility 124 (referring to FIG. 1), the mobile communication facility 102 (referring to FIG. 1), or other similar facilities. Past performance may include, but is not limited to, past content interaction, content download, audio content streaming, video content streaming, content contained in java cookies, content contained in temporary internet files stored on the mobile communication facility, past transaction information, and the like.

In embodiments, an algorithm facility 144 may perform algorithms including algorithms for associating information relating to the past performance of a mobile communication facility or other information relating to the mobile communication facility. For example, an algorithm facility may include an algorithm to determine the cumulative frequency of a given past performance (e.g., downloading an MP3 file) within a single mobile communication facility 102 or group of mobile communication facilities. Content may be categorized into a yellow-pages like taxonomy and this taxonomy mapped onto the past performance of a mobile communication facility 102 or group of mobile communication facilities. The taxonomies may then be ordered according a descending order of the cumulative rank associated with the mobile communication facility or group of mobile communication facilities. For example, applying such an algorithm to a user's mobile communication facility past performance may result in a content taxonomy cumulative frequency rank similar to the following (e.g., where each number represents the cumulative, discrete content interactions): MP3: 92; Ringtones: 43; Online Musical Instrument Sites: 16; Newspaper websites; 2; Business Week Magazine Website; 1. Based on this array of data, the relevancy of content may be inferred and, as a result, content related to music (listening to and playing) given a higher priority rank than content related to news.

In embodiments, an algorithm may also correlate past performances within a single mobile communication facility 102 or group of mobile communication facilities. For example, an algorithm may compute a correlation coefficient to describe the association between the past performance of downloading an MP3 file and purchasing a concert ticket online, using a mobile communication facility 102. This coefficient may, in turn, form the basis for ordering content for presentation to a mobile communication facility 102. For example, it may be found that within a single mobile communication facility past performances, or a group of such facilities, the download of MP3 files is positively correlated with online concert ticket purchases, with a coefficient of 0.23, whereas download of MP3 files is positively correlated with the download of real estate listings with only a coefficient of 0.04. This information may be used to rank the relevancy of content such that a person with a past performance of an MP3 download is presented content related to concert ticket purchases more frequently than, with preference to, with prioritized placement within the mobile communication facility display 172 over, to the exclusion of, and so on, any content related to real estate listings. This information may also be used to infer the appropriateness and likelihood of content interaction. For example, a mobile communication facility 102 with many past performances of MP3 downloads, but no online concert ticket purchases may be a prime candidate to receive ticket purchase content and or receive ticket purchase content with priority over news content, and so forth.

In embodiments, the algorithm types described above may also be used to assess the relevancy, priority, positioning, placement, and so forth of content based upon information associated with the mobile communication facility, a capability of the mobile communication facility, a user associated with the mobile communication facility, an owner of the mobile communication facility, mobile subscriber characteristic(s), carrier information or other information that may be used as a predictor of the likelihood of an interaction with the sponsored content. The capability of a mobile communication facility may include, but is not limited to, audio capabilities, video capabilities, visual capabilities, processing capability, screen capability, and the like. User characteristics may include, but are not limited to, user history information, demographic information, transaction history, location information, user billing information, personal filters, and the like. A mobile subscriber characteristic may include, but is not limited to, user transaction history, user location, personal information relating to a user, user web interactions, email interactions, messaging interactions, billing history, payment history, typical bill amount, time of day, duration of on-line interactions, number of on-line interactions, family status, occupation, previous search queries, history of locations, phone number, device identifier, type of content previously downloaded, previous content viewed, websites visited, and the like. Mobile subscriber characteristics may also include demographic information. Demographic information may include, but is not limited to, age, sex, race, religion, an area code, zip code, a home address, a work address, a billing address, credit information, family information, income range, birth date range, birthplace, employer, job title, length of employment, or an affiliation, and the like. A mobile service provider characteristic may include, but is not limited to, a carrier business rule, the geographic region in which the mobile service provider's service is available to consumers, walled-garden content, and the like.

An aspect of the present invention involves a method for receiving a website request from a mobile carrier gateway, receiving contextual information relating to the requested website, associating the received contextual information with a mobile content, and displaying the mobile content with the website on a mobile communication facility.

A mobile communication facility used to make a website request may be one or more of a phone, a mobile phone, a cellular phone, a GSM phone, a GPRS phone, a WAP-enabled phone, a satellite phone, a WiFi phone, a wireless device, a pager, a personal digital assistant, or the like. The website request may be sent through a mobile carrier gateway which then initiates a context review request of the requested website. The requested website may be one or more of the following: a webpage, a document, an image, video, audio, or some other website. A server may respond to the context review request by accessing the website and performing a context review of the website. The result of the context review may be the identification of contextual information associated with the website. The identified contextual information may then be sent back to the server. The contextual information may include one or more of the following: a link, a link structure, an inbound link to the website, an outbound link from the website, a reciprocal link, text, a keyword, metadata, website usage patterns, website usage statistics, or the like. For example, a user of a mobile communication facility may execute a website request for a website containing the Amtrak schedule for trains from Boston, Mass. to New York City, N.Y. Contextual information associated with the Amtrak schedule website may include, for example, keywords such as 'travel', 'train', 'vacation', 'Boston', and 'New York', outbound links to local weather in Boston and New York City, or an inbound link from a travel agency website. Once identified, one or more pieces of contextual information related to the Amtrak schedule website may be sent back to a server.

The server may receive contextual information and then associate it with a mobile content. Optionally, the server may store contextual information associated with a particular website to facilitate subsequent context review requests originating from either the same or a different mobile subscriber. The mobile content may relate to one or more of the following: an advertisement, sponsored content, a sponsored call, an image, a video, text, a search box, a pay-per-click link, a pay-per-call link, or some other mobile content. For instance, if the contextual information is the keyword 'vacation', the associated mobile content may be a search box for an airfare metasearch engine, an advertisement for an all-inclusive resort in Cancun, or a review of an exotic destination. When the mobile content is a search box, the search box may relate to a local site search box, an advertisement search box, a carrier portal search box, or some other such search box. For example, the local site search box may only query the requested website while the carrier portal search box may provide for queries of a greater collection of websites.

The mobile content may also be optionally branded using a wireless carrier brand. For example, the mobile content may be a search box that employs the technology of a third-party search engine but bears a name, a logo, a trademark, a slogan, a graphic, audio, video, an image, or some other representation of the wireless carrier brand.

In order to deliver pertinent mobile content with the requested website to the mobile communication facility, the association between the received contextual information and mobile content may be based at least in part on a relevance. For example, the relevance may be related to a mobile subscriber characteristic. For instance, if a subscriber who is a senior citizen requests a website for which derived contextual information includes the term 'vacation', relevant associated mobile content may be an advertisement for a seniors' cruise and not one for spring break in Cancun.

Relevance may also be based at least in part on the relationship between the contextual information and the mobile content. For example, the relationship may be a similarity or dissimilarity of the contextual information and the mobile content. Mobile content that exhibits greater similarity to the contextual information than other mobile content may be considered more relevant and, therefore, more likely to be displayed along with the website on the mobile communication facility. In contrast, mobile content that is dissimilar to the contextual information may not be deemed relevant and may be lowered in priority for display. For example, the contextual information may be an outbound link to a bookstore's website (e.g.: Barnes & Noble, Border's). A link to a bookstore may be considered similar to mobile content that includes an Amazon.com search box or an advertisement for a popular author's latest release. A link to a bookstore may be considered dissimilar to mobile content that includes an advertisement for a flat-screen television.

Relevance may also be based at least in part on the relationship between stored contextual information and/or mobile content originating from a previous website request by the mobile subscriber and the current pool of mobile content. Mobile content to be delivered to the mobile communication facility may be identified as relevant by association to contextual information from a previously viewed website. For example, even though the current website request is for an international news website, based on previous derived contextual information which included 'shopping' and 'home furnishings', the delivered mobile content may be a search box for Target.com.

Once a mobile content has been associated with the received contextual information, the mobile content may be displayed with the website on the mobile communication facility. The mobile content may be displayed interstitially or concomitantly with the website. Optionally, the mobile content displayed may be stored on a server.

In some embodiments of the method, an opt-in function may be provided to an entity associated with the website, wherein the opt-in function registers the website for automatic contextual syndication. The contextual information may be provided by a server involved in sending the mobile communication facility the website. The server may be one or more of the following: a WAP server, a mobile application gateway, a WAP gateway, a proxy server, a web server, or the like.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

A user generally may perceive relevant mobile content as more beneficial than random mobile content. Therefore, mobile content that is relevant to a user may have a greater value to the content provider because the user may be more likely to interact with the content in a way that is favorable to the objectives of the provider, such as making a purchase or opting-in for an offer. Consequently, delivering relevant mobile content to a user of a mobile communication facility 102 may provide benefits for the user, mobile service provider, and content provider.

Delivering relevant mobile content to a user may be associated with the delivery of a website or webpage content to a mobile communication facility 102. By associating the delivery of relevant content with deliver of a webpage, a user of a mobile communication facility 102 may already be anticipating new information being displayed on the mobile communication facility 102. Also the relevant mobile content may be relevant to the delivered webpage, thereby reinforcing the relevance of the mobile content with the user.

A website or webpage (and associated mobile content) may be delivered to and displayed (or played such as for video or audio) on a mobile communication facility 102 based on a variety of actions or conditions. One such action is the user explicitly requesting the website or from the wireless provider 108. As a result of the request, the wireless provider 108 may select mobile content from a variety of sources of mobile content such that the selected mobile content may have a relevance to the user and/or the website.

The variety of sources of mobile content may include without limitation, the internet, a data facility 124 of the wireless provider 108, a content walled garden 132, an advertiser data 174, a sponsor 128, a server 134, a search facility 142, and a sponsorship facility 162. As herein described, the sponsorship facility 162 may provide some relevance matching of mobile subscriber characteristics 112 (e.g. user behavioral information) to sponsored mobile content. To facilitate relevance matching in the sponsorship facility 162, the wireless communication facility 104 may provide criteria such as mobile subscriber characteristics 112 or user behavioral information, or location information 612, and requested URL to the sponsorship facility 162.

The mobile content may interact with the mobile communication facility 102 such that certain user interface elements of the mobile communication facility 102 may allow a user to directly respond to the source of the mobile content. Such interaction may allow the mobile communication facility 102 to directly interact with the source of the mobile content even while the mobile communication facility 102 is performing other functions such as web browsing, audio calling, and the like.

In an example, a mobile communication facility 102 may have a variable function key included with the user interface. When mobile content is received by the mobile communication facility 102, the variable function key may become an opt-in key for an offer of the mobile content. The user may automatically opt-in to an offer of the mobile content by activating the variable function key. Appropriate user information may be provided to the website or provider of the mobile content to activate the user's subscription or agreement to opt-in to the offer.

A webpage may be delivered to a mobile communication facility 102 based on actions or conditions other than a user request. A webpage may be delivered based on actions such as a call being received or initiated by the mobile communication facility 102, a location change of the mobile communication facility 102, a power-on of the mobile communication facility 102, and many other actions or conditions, described herein, that may be associated with a mobile communication facility 102 in a wireless search platform 100. Mobile content may also be selected based at least in part on information related to the action or condition. In an example, as a result of a user completing a phone call with an electronics retailer, a webpage and associated mobile content inviting the user to view current special offers from a competitive electronics retailer may be displayed on the mobile communication facility 102. In another example, the wireless provider 108 may detect the location change of the mobile communication facility 102 and deliver a webpage with associated mobile content containing a local weather forecast and local restaurants based on a relevance to a user characteristic.

A server 134 may be used to select mobile content such that it has a relevance to the user for delivery. In an example, a user's history may include some or substantially all transactions that the user has initiated from a mobile communication facility 102. In this user history, the user may have demonstrated a preference or tendency to interact with mobile content that is associated with jazz music. The user may also have executed a plurality of queries related to jazz music. Therefore, delivering mobile content that is associated with jazz music may have a relevance to the user. A server 134 may select and store a variety of mobile content based on such types of relevance and make it available to a wireless provider 108 to facilitate delivering relevant mobile content to a user.

The behavioral information to which the mobile content may be associated to establish relevance may be based on an individual user or a group of users. The group of users may be users with one or more characteristic in common. The characteristic may be related to the user (user characteristic), the mobile communication facility 102, a location of the mobile communication facility 102, a time, or some other characteristic.

The relevant mobile content may be an advertisement or another type of mobile content such as sponsored content, a sponsored call, a search box, and the like. The relevant mobile content format may be selected based at least in part on a relevance to the user behavioral information. A user may have indicated explicitly or through specific actions with the mobile communication facility 102 a preference for mobile content that includes both audio and video. This user behavioral information may be used to select between similar mobile content to provide the most relevant mobile content to the user. Methods and systems for associating mobile content with behavioral information related to a user of a mobile communication facility 102, as herein disclosed may also be applied to selecting the mobile content in association with a website.

In embodiments, interaction information relating to a mobile communication facility may be used to weight content, and the content may be ordered for presentation on a mobile communication facility 102 based at least in part on the weighting. For example, interaction information may be based on transaction events, purchase history, user history, user characteristic, user device, geographic location, time, expertise, occupation, income bracket, home address, and the like. A user who has made several online book purchases during the past week related to baseball may, as a result of this past behavior, have sports content weighted favorably and prioritized for placement on his mobile communication facility 102. This interaction information may also be used to weight and prioritize content for other mobile communication facility users who share some attribute or plurality of attributes (e.g., age, income, etc.) with the user who purchased the baseball books. As interaction information is collected, it may be stored and analyzed in the aggregate in order to derive weights for mobile content and prioritize the presentation of content based upon information relating to mobile subscriber characteristics, mobile communication facility characteristics, and other information relating to users.

In embodiments, mobile content may include, but is not limited to, downloadable content, sponsored links, a URL, an email address, an FTP address, a phone call, and webpage address, an advertisement, a sponsored content, an audio stream, a video, a graphic element, and the like. In embodiments, information that may be related to interaction information may be segmented (e.g. an age range, income range, etc.).

In embodiments, mobile content interaction information may be derived from mobile communication facilities, such as, a phone, a cell phone, a mobile phone, a GSM phone, a personal digital assistant, a "pocket" personal computer, and the like.

In embodiments, the mobile content interaction information may be a plurality of mobile content interaction information. The weighting of mobile content may be based upon a plurality of mobile content interaction information.

Interaction information relating to mobile content (e.g. a website, downloadable content, sponsored link, sponsored call, sponsored content, advertisement, search result, etc.) may be used to weight the content. In situations, the weighting is similar in nature to a link analysis but here the number of separate interactions with the content may be used in a calculation to judge how popular or otherwise relevant the mobile content is. In embodiments, not every interaction with the mobile content is weighted equally. An interaction from a user that has a greater authority may be deemed more relevant or it may be deemed more as an indication of the actual value of the mobile content and therefore the interactions from this particular user may be provided a greater weight. For example, two users may interact with a particular piece of mobile content. The first user may have a little on-line history because he is a relatively new user of the web service provided through his mobile communication facility. The first user may interact with the mobile content many times and this many interactions may be logged and used in a calculation to determine how popular the mobile content is. The second user may be a frequent user of web services through his mobile communication facility (e.g. as determined through mobile subscriber characteristics as described herein elsewhere). This user may interact with the mobile content a limited number of times (e.g. once or twice). The limited number of interactions may be used, in conjunction with the first users many interactions, to judge the popularity of the mobile content. The second users few interactions may, however, be given a higher weight because he may be considered to have more authority in the calculation because of his status as a frequent web services user as compared with the beginner status of the first user. The result may be to significantly discount the first user's interaction history with the mobile content and increase the reliance on the few interactions from the second user. This may effectively reduce the popularity ranking of the mobile content as compared to a calculation simply based on the number of interactions with the mobile content.

In embodiments, it is the user's apparent authority in predicting the value of the interaction that provides a weighting to the user's actual interaction with mobile content. This user's authority can be used to decrease or increase the weighting of his interaction such that the popularity, relevance or other such parameter of the mobile content is based more heavily on interactions from authoritative users as opposed to just any user that happens to interact with the content. A user's authority may be based on their user history, transaction history, online behavior, web services usage, type of mobile communication facility or other parameter which is tracked, monitored, evaluated, measured, recorded or otherwise stored in relation to the mobile communication facility (e.g. mobile subscriber characteristics), for example. The information relied on to evaluate the authority of the user may be stored in the mobile communication facility associated with the user or it may be stored remotely (e.g. in a mobile subscriber characteristics database associated with the wireless provider). When stored with the wireless provider, or other third party, the wireless provider may be the entity providing the authority information or performing the authority calculation.

In embodiments, each mobile communication facility user may be rated with a general and/or specific authority ranking. For example, a user may have a history of using web services through his mobile communication facility and be deemed to have a high general authority ranking. The same user may have a history that suggests he is a frequent user of local search systems so he may receive a specific high authority ranking for local mobile content interactions. In embodiments, the general authority ranking may be based on the user's use of web services, web content, websites, transactions, purchases, downloads, views, listens, streaming viewing or other such general web interactions. In embodiments, the specific authority ranking may be based on more specific categories of interactions such as local interactions, implicit interactions (interactions resulting from an implicit search), pay per call interactions, sponsored links interactions, advertisement interactions, search result interactions or other such specific category of interaction. In embodiments, the specific authority ranking may be based on a specific interaction such as an interaction with a specific phone number, specific piece of content (e.g. such as the highest ranked content known, such as the highest ranked advertisement).

A sponsor using mobile content to sell its products or services within a wireless platform 100 may find it advantageous to have information regarding the expected value that it may derive from sponsoring a mobile content. By knowing an expected value associated with a mobile content, a sponsor may be able to select those sponsorship opportunities from which it is most likely to derive revenue. The expected value may assist a sponsor in budgeting for an advertising program based on the total expected revenue to be derived from an advertising program. Behavioral metrics, such as clickthrough volume, and conversion volume may be used to predict future consumer interactions with mobile content. Financial metrics, such as product price, profit margin, and the like, may be used to indicate the financial results of associating a given product with the behavioral metrics related to a mobile content. Expected value calculations may be beneficial for sponsors such as advertisers, wireless information providers, wireless carriers, wireless operators, telecommunications providers, and the like.

In embodiments, an expected value calculation may indicate to a sponsor the expected revenue that it may be predicted to receive from a sponsorship, such as an advertising program. Such an expected revenue calculation may be performed by multiplying a clickthrough parameter associated with a mobile content by the conversion associated with that content by the purchase price of the product that is the subject of the content. In this calculation, the clickthrough parameter may represent the cumulative number of times the content is accessed (i.e., "clicked"), the click through rate, or other parameter associated with the interactivity with the content. The conversion may represent the cumulative number of transactions, such as a purchase, associated with the content, the transaction rate associated with the content, or other parameter associated with the transactions associated with the content. The purchase price may be a manufacturer's suggested retail price, a price explicitly set by the content provider, a price unique to a specific user's conversion, or a product price resulting from some other price setting protocol. The expected revenue may also be calculated as a bid-weighted revenue in which the expected revenue is multiplied by a bid amount.

In embodiments, an expected value calculation may indicate to a sponsor, or wireless carrier, the expected margin that it may be predicted to receive from a sponsorship, such as an advertising program. Such an expected margin calculation may be performed by multiplying the clickthrough associated with a mobile content by the conversion associated with that content by the margin of the product that is the subject of the content. Margin may include, but is not limited to, an expected advertiser margin, an expected wireless carrier's margin, the profit margin associated with a product, and the like. The expected margin may also be calculated as a bid-weighted margin in which the expected margin is multiplied by a bid amount.

In embodiments, an expected value calculation may indicate to a sponsor, or wireless carrier, the expected yield that it may be predicted to receive from a sponsorship, such as an advertising program. Such an expected yield calculation may be performed by multiplying a bid associated with a mobile content by the clickthrough associated with that content. Similarly, an expected conversion yield may be calculated by multiplying a yield associated with a mobile content by the conversion associated with that content.

In embodiments, an expected value calculation may indicate to a sponsor, wireless carrier, wireless operator, or telecommunications provider the average time spent on a target website and the average depth of use a target website by users visiting the website.

In embodiments, an expected value calculation related to a mobile content may be segmented by a characteristic associated with a mobile communication facility. For example the expected value may be segmented by a characteristic including, but not limited to, a display capability, display size, display resolution, processing speed, audio capability, video capability, cache size, storage capability, memory capacity, and the like. In embodiments, the expected value may also be segmented by a mobile subscriber characteristic including, but not limited to, age, sex, race, religion, area code, zip code, home address, work address, billing address, credit information, family information, income information, birth date, birthplace, employer, job title, length of employment, user history, user transactions, geographic location, time, and the like. The segmented expected value may provide information relating to the expected value within a given segmentation.

One example, of many potential examples, of how an expected value may be used by a sponsor is described below. Content sponsors may seek to sponsor content that they believe is most likely to be accessed by persons or entities interested enough in their products or services that a conversion (e.g., purchase) will result. One of the primary functions of market research is to gain insight into consumer profiles that are most associated with past conversions and to provide information on other consumer profiles that may represent the untapped market share of consumers currently unfamiliar with, but likely to purchase the provider's products. For example, in a traditional medium such as television, a sponsor may purchase market research regarding the demographic profile, number of viewers, length of average viewing time, etc. associated with a particular primetime situation comedy. Based on prior market research a sponsor may have regarding the profiles of its past consumers, the sponsor may make an educated guess as to the appropriateness of sponsoring content (e.g. advertising) during the sitcom based on the level of concurrence between the sitcom viewers and the sponsor's past consumers. The higher the level of concurrence the greater the probability that purchases will result from the advertising, and the greater the expected value that the company may presume it will receive on its advertising expenditures. Furthermore, the greater specificity with which a consumer profile may be described (e.g., not "California," but rather "Area Code=90210"), the more accurately a sponsor may potentially target its intended consumers and increase its expected value.

In response to a mobile content search initiated by a user of a mobile communication facility 102, a mobile content provider may deliver sponsored content, advertisements, sponsored call numbers, or other sponsored content to the mobile communication facility 102 based at least in part on a relevance to the search query. In addition to selecting among a variety of sponsored advertisements, a mobile content provider may also select a sponsored content, such as an advertisement, from a variety of sources or mobile content inventories. Different sources of sponsored content may have unique arrangements relating to cost, derived revenues, wall-garden restrictions, blacklisted content, whitelisted content, and the like. Therefore, it may be advantageous for a mobile content provider to select mobile content from the available mobile content inventories based at least in part on optimizing the benefits for the mobile content provider.

In one embodiment, a cross inventory yield optimization method may include determining which mobile content inventory provides the greatest clickthrough value. As an example, a first mobile content inventory may pass through a higher percentage of an advertisement impression bid than a second inventory. Therefore, by selecting the mobile content from the first inventory, greater revenues may be generated when the content is presented to a mobile communication facility.

Cross inventory yield optimization of mobile content may assist in generating greater revenue for a presenter of the content than non optimized content. Methods and systems of optimizing the yield of presenting mobile content on a mobile communication facility 102 may include a variety of factors. One or more of the factors may be evaluated in the context of an objective of the optimization. For example, one objective of optimizing yield may be to generate the greatest likelihood of receiving clickthrough revenue associated with the presentation of mobile content. As such, content may be preferentially selected based at least in part on factors that advance this objective, such as the clickthrough rate associated with a mobile content, or the revenue derived per click of the mobile content, cost-per-thousand revenue, cost-per-acquisition, and so forth. In another example, an objective of the cross inventory yield optimization may be to preferentially select mobile content that is the most compatible with a mobile communication facility 102, based upon criteria, such as screen resolution, memory capacity, video capability, and the like.

A method for determining which among a plurality of content inventories provides the greatest value may include comparing the impression bid offering from each inventory provider and selecting the highest bid offering. Alternatively, an advertisement with a lower impression revenue may be selected if it pays a higher clickthrough revenue and the clickthrough rate results in greater revenue. In these examples, one can appreciate how the objective of optimization may impact which factors associated with an advertisement are preferred.

There may be available a choice of mobile content, such as advertisements, for different products or services, each of which may have a relevance to a mobile search. Determining which of the advertisements may generate the greatest revenue may include factors related to the advertisement. Factors may include, without limitation, popularity of the advertisement, clickthrough rate, and freshness of the content, advertisement, or call number, and so forth. As an example, a very popular advertisement that is relevant to the search may provide a more optimal revenue opportunity than a less popular, yet relevant advertisement due to the increased odds that the popular advertisement will be viewed, interacted with, will produce a clickthrough, and the like. In another example, an advertisement with a higher clickthrough rate may present a more optimal revenue opportunity than an advertisement with a lower clickthrough rate since the advertiser pays the clickthrough bid for a higher percentage of impressions. An advertisement, sponsored call number, or other sponsored content that is freshest (i.e. has been more recently updated or verified) may also provide a greater revenue opportunity. In an example, advertisements may present an event that has recently had a change in venue. An advertisement that has been updated since the venue change may be more likely to provide clickthrough revenue than one that presents the obsolete venue. Therefore a method for optimizing cross inventory yield may include assessing advertisement popularity, clickthrough rate, or freshness of content.

Optimizing cross inventory yield may include factors associated with a user of a mobile communication facility 102, such as a user characteristic as herein described. A user history utilized in optimizing cross inventory yield is described in the following example. A user history may include metrics associated with a user's actions when presented with advertisements, sponsored content, and/or sponsored call numbers. The history may indicate that a user more often follows through with a sponsored call number than with a sponsored advertisement. Therefore, presenting a sponsored call number to this user may optimize the revenue generated. Consequently, a cross inventory yield optimization method may preferentially select a sponsored call number to present to this user instead of a non-call-number-based mobile content item.

The mode in which a mobile communication facility 102 user enters a search query may also be factored into optimizing cross inventory yield. Since a mobile communication facility 102 may have multiple independent modes of entry (e.g. voice, keypad, touchscreen, camera, and the like), the selection of a mobile content, advertisement, sponsored content, or sponsored call number may optimized based at least in part on the mode of query entry. For example, a user who issues a search query using a keypad entry may be more likely to be viewing the mobile communication facility 102 than listening to it. As a result, selecting an advertisement with little display content and significant audio content may reduce the yield associated with the content relative to a more visually-based mobile content. However, voice entry of a search query may be indicative of a user that prefers an audio based mobile content.

A cross inventory yield optimization method or system may combine factors to optimize revenue for mobile content, advertisements, sponsored content, or sponsored call number presentation. Yield optimization may include factors associated with a user, a mobile communication facility 102, a location, the advertisement/content/number, revenue (e.g. impression and clickthrough bids), payment terms, and the like. In an example, an English speaking user may be traveling to Paris and may enter a search query. An optimization method may combine factors such as user language preference (English) with location (Paris) with payment terms (pay in USD) and popularity (French current events) and revenue (impression bid). The above is only an example and many other combinations of factors are possible and may be used singly, or in combination, as part of an cross inventory yield optimization method and system.

As previously described, a wireless search platform 100 may be associated with a plurality of datasets from which consumer profiles may be derived for use in targeting content (e.g. advertisements, sponsored content, sponsored call numbers), deriving estimates of the expected value associated with content, and expected value estimates for content segmented by information relating to a mobile communication facility. By receiving information on the clickthrough volume and conversion volume associated with content, a sponsor may forecast based upon it's products' purchase prices, profit margins and the like an appropriate bid amount for a content and the probable financial results it will derive from sponsoring the content. A wireless platform 100 may include information relating to a wireless provider 108, a mobile communication facility 102, mobile subscriber characteristics 112, location 110, and so forth. Thus, a sponsor may receive an expected value for mobile content that it may want to sponsor that is segmented by information relating to a mobile communication facility in order to identify the most profitable population within which to sponsor content.

For example, a sponsor specializing in Boston Red Sox memorabilia may use expected value data segmented by information such as a user's device characteristics, demographics, and current location, to predict which content and which population of mobile users may be associated with the greatest expected value. The memorabilia company may find that there is a high expected value for sponsoring content that is associated with a high clickthrough and conversion volume among "men," making ">$100,000 per annum," and whose current location is the "zip code" of Boston. This level of expected value segmentation may allow the company to identify and sponsor that content with a greater likelihood of financial benefit and minimize sponsorship of content that may be associated with little or no likely benefit to the company.

In embodiments, sponsors may be offered an opportunity to bid for the placement of content on a mobile communication facility display 172 and user interface based upon an anticipated expected value that is associated with the placement of the content. Such a bid may occur in the form of an auction, a reverse auction, or a partially randomized auction. The content that is the subject of a bidding process may include, but is not limited to, an advertisement, a sponsored link (such as an URL, email address, FTP address, or phone call), an advertisement, a sponsored call, an audio stream, a video, a graphic element, and the like.

In embodiments, content that is the subject of the bidding process may be placed on a query page, home page, search page, on a sponsored links portion of the user interface, or on a page of the user interface that may be associated with a set of search results or a specific result.

The anticipated expected value may be determined by an expected value estimation facility. The expected value estimation facility may be based on an expected value calculation associated with a variable or variables selected from the group consisting of the amount of the bid, the location of the media item in the user interface, the duration of the presentation of the media item in the user interface, the probability that a user will view the media item if placed in the user interface, the probability that the user will interact with the media item if placed in the user interface, the probability that the user will view, interact with and/or execute a transaction associated with the media item, and the value of the transaction to the bidder, for example. In embodiments, the expected value estimation facility may be dynamic in that a change of a bid amount automatically adjusts the expected value estimation based on this new economic data.

In embodiments, a bidder may be able to pre-select the location within the mobile communication facility display 172 that it seeks to place content. Similarly, duration of the time that the content displays may also be selected.

In embodiments, the probability that a user will view, interact with, and/or execute a transaction in association with content may be based upon mobile subscriber characteristics 112, mobile communication facility 102 type, mobile communication facility 102 characteristics, and other data types that may be part of, or related to, a wireless platform 100. Examples of mobile subscriber characteristics includes, but is not limited to, age, sex, race, religion, area code, zip code, home address, work address, billing address, credit information, family information, income information, birth date, birthplace, employer, job title, length of employment, and the like. Examples of mobile communication facility 102 type includes, but is not limited to, a phone, cellular phone, mobile phone, GSM phone, a personal digital assistant, and or a "pocket" personal computer. Examples of mobile communication facility 102 characteristics includes, but is not limited to, display capability, display size, display resolution, processing speed, audio capability, video capability, cache size, storage capability, memory capacity, and the like.

In embodiments, the value of a transaction to a bidder (i.e. the expected value to the bidder) may be based on one or more of the price of an item described in the media item, the net price of an item described in the media item, the cost of the item described in the media item, the value of the attention of a user to the media item, the value of the brand presented in the media item, value attributed to the goodwill of the mobile subscriber, value attributed to multiple items presented in the media item, the revenue associated with a transaction executed by a mobile subscriber in connection with interaction with the media item, the net revenue associated with a transaction executed by a mobile subscriber in connection with interaction with the media item, and the probability that executing a transaction associated with the media item will result in another transaction with the bidder. Value may be expressed as a net present value, a discounted rate, or a discounted value. A bidder may be able to personally adjust the discount rate.

In embodiments, a bidder may be able to enter an item of data associated with one or more of the amount of the bid, the location of the media item in the user interface, the duration of the presentation of the media item in the user interface, the probability that a user will view the media item if placed in the user interface, the probability that the user will interact with the media item if placed in the user interface, the probability that the user will execute a transaction associated with the media item, and the value of the transaction to the bidder.

As was described above for the process of bidding on the presentation of content based at least in part on the anticipated expected value associated with the content's display, so too may a bidding process present an opportunity to bid based upon an anticipated yield associated with the display of a given content. A yield estimation facility may be based on an yield calculation associated with a variable selected from the group consisting of the amount of the bid, the location of the media item in the user interface, the duration of the presentation of the media item in the user interface, the probability that a user will view the media item if placed in the user interface, the probability that the user will interact with the media item if placed in the user interface, and the probability that the user will execute a transaction associated with the media item.

In embodiments, a method and system may be provided for the indexing, searching, and displaying of WAP and Web results (URLs) in a unified result set by a search engine. For this, the search result page may provide a single and unified results set that may consist of only WAP URLs, only Web URLs, or a combination of both based on factors including, but not limited to, information relating to a mobile communication facility. The order and blend of WAP URLs and Web URLs may be based at least in part on information relating to the mobile communication facility from which the search query originates. Individual search results may be identified as WAP or Web on the search results page.

In embodiments, a method and system may be provided for accepting, converting, and storing user generated content based on the voice capture capabilities of a mobile communication facility. The captured voice data may be stored as audio or converted to text based on the capabilities of the mobile communication facility, network, or some other factor. The conversion and storage of the data may take place on either the client mobile communication facility or on a network based server. Captured review data may be associated with any URL, set of URLs, or provided meta-data displayed to the mobile communication facility user. Converted text based data and associated URL(s) or meta-data may be made available to search applications on the mobile communication facility, server, or wireless platform.

In embodiments, a method and system may be provided for algorithmic and editorial detection of correspondence between WAP and Web sites. The method and system may identify any Web sites and/or URLs associated with the indexed WAP sites and/or URLs and may use this relationship to enhance the meta-data for the WAP site and/or URL. Information obtained from Web sites/URLs, and related back the WAP site/URLs, may include web page text, anchor text, titles, descriptions of the page, or some other information. This additional information may then be used to help calculate a relevancy between mobile search queries and corresponding WAP URLs. The system may also use analysis of the Web linking structure to augment and alter any linking structure derived from a crawl of WAP sites.

In embodiments, a method and system may be provided for accessing, analyzing, and applying the usage of a mobile device to create and enhance the relationships within a social network. The system may access user specific usage patterns on the mobile communication facility, including, but not limited to, inbound calls, outbound calls, phonebook, or other information, to establish new connections and to augment the strength of existing connections in a social networking application. The information may be accessed, stored, and shared based on rules defined by a mobile communication facility user and/or mobile operator.

In embodiments, a method and system of query classification may be used to identify user intent in order to assist navigation to a specific vertical of content and/or to flash in content from a likely answer source. A user's search behaviors may be analyzed and monitored on a consistent basis to understand what the user is searching for and selecting as a result of a search. In embodiments, a search engine may classify different types of queries to connect user's searches to the right content in the shortest distance. Thus, a search for "ice cream boston" may give preference to local listing results to general web pages, and the search "UA 123" may return flight arrival and departure information.

In embodiments, a search engine may use query classification to identify the intent and specificity of a user's search to either redirect the user to the best individual results, or to prioritize categories of results answering the user's query. In embodiments, both language-specific rules and statistical methods may be used to identify user intent. Language-specific rules may identify narrow searches and re-direct the user to specific results. For example if a user searches for "maps nyc," language-specific rules may identify the operative term "maps," and a specific location, "nyc" and infer that the user is looking for a map of New York. In this example, the user may be directed to a map of New York provided by a maps vertical. Statistical methods, a second query classification tool, may rank different categories of results for broader queries. For example, if a user is searching for a celebrity name, such as "Naomi Campbell," a model, through historical behavior it may be inferred that the user is more likely to be looking for images or news articles, rather than for music, and thus return these categories at the top of the results set on the first page.

In embodiments, the heuristics of query classification engine may be adjusted globally, on a per language or per operator basis. Query classification may identify different patterns of search behavior that assists the correct display for a given query. The classification may become more granular as the system learns more user behavior.

In embodiments, the display of a mobile communication facility may include a "widget" to answer a user's query, help a user to disambiguate their query, guide a user deeper into content properties, and bubble up the most popular and/or relevant content. Widgets may utilize structured and semi-structured data to help users to minimize searching for content and answer a user's queries directly. In addition to the query classification, a 'learning' algorithm may use click and impression analysis to determine when an answer/result should be shown, where on the page it should be shown, and/or how much content from a given source should be displayed. While the algorithm may determine the correct results set, it may be possible to inject editorial overrides and influence the display of content for queries based at least in part to actively manage/merchandise query results.

In embodiments, editors may import/export common format feeds, keywords, choose display templates, and assign a content component type a relevancy weight. For example, the query "music" may be too broad to rely entirely on algorithms; instead an editorial or business review may be required. Through session, and user behavior analysis editors may identify content that will help narrow the search and get closer to what the user actually intended. In the case of the query "music", an editor may build a smart component to expose genre links, navigational links that take users deeper into the music vertical, and a video link. If these links don't perform well, then the editor may make adjustments.

In embodiments, a popularity management tool may allow an editor to review algorithm weightings and adjust thresholds for a smart component and its affiliated content.

In embodiments, a method and system of query classification may affect the display logic that is associated with a mobile communication facility. In an example, a search query may be classified according to a query classification scheme. A query classification scheme may include, but is not limited to, classes such as Vertical Class, Navigational Class, Definition Class, Category Class, Specific Class, Query+Modifier Class, Reference Class, Adult Class, or some other query class.

In embodiments, a Vertical Class may include a search vertical. A search vertical may be associated with a taxonomy of content and may be a general search or related to a search, ringtones, images, games, yellow pages, weather, white pages, news headlines, WAP sites, web sites, movie showtimes, sports scores, stock quotes, flight times, maps, directions, a price comparison, WiFi hotspots, package tracking, hotel rates, fantasy sports stats, horoscopes, answers, a dictionary, area codes, zip codes, entertainment, blogs, or some other search vertical.

In embodiments, a Navigational Class may be an identified domain name, URL, website, IP address, or some other navigational location.

In embodiments, a Definition Class may be associated with a query that includes the term "define," "definition," "meaning," "means," or some other term associated with a request for a definition.

In embodiments, a Category Class may be associated with a deeper taxonomy present within the search query (e.g., hip hop, NFL, soccer, cameras) and include bubble up content/topics that may help users to disambiguate a query.

In embodiments, a Specific Class may be a list of structured data, extracted data, or the like from various categories (e.g., Gunners, Hinder, Sagittarius, Smallville, Nikon coolpix) that may be indicative of user intent.

In embodiments, a Query+Modifier Class may be a combination of a sub-category, genre, and/or specific source.

In embodiments, a Reference Class may be data that is extracted from a reference source, such as an online encyclopedia.

In embodiments, an Adult Class may related to adult content, such as gaming, gambling, pornography, lottery, or some other form of adult content.

In embodiments, query classifications may be associated with indicator inputs. Indicator inputs may include current content popularity, current query popularity, current emerging queries, current location, previous location, user characteristics, editorial work, or some other indicator associated with a mobile communication facility, its user, and/or query content.

In embodiments, the query classification that is associated with a search query, and/or the indicator inputs, may influence the formatting of the results that are displayed to a mobile communication facility. For example, the formatting may expand category results, order the results according to the indicator inputs (e.g., by decreasing order of popularity), by category, or according to some other schema.

In embodiments, user behaviors (e.g. clicking on a content) relating to the formatting of the results that are displayed on a mobile communication facility may be analyzed and used to further refine, structure, index, and/or order the query classifications and/or indicator inputs.

In embodiments, by associating a query with indicator inputs and/or query classifications it may be possible to determine an optimal rank order of content to display to a user's mobile communication facility, based at least in part on the user's interaction with content and the history of interactions by other users. For example, it may be possible to determine a threshold for presenting a content to a mobile communication facility (e.g., popularity rank); it may be possible to determine which content type to expand, and so forth.

In embodiments, business rules may be associated with a query classification engine. Business rules may include popularity rules, location rules, mobile communication facility type rules, keyword matching rules, parental control rules, spelling and spelling-correction rules, recommendation rules, rules relating to user characteristics, or some other business rule.

In embodiments, a user of a mobile communication facility may be able to pin or tag a mobile content, and store tagged mobile content in a repository that functions as a "mobile briefcase." In embodiments, the tag associated with a mobile content may include information about the content, such as subject matter, location, genre, date, or some other information. In embodiments, the tag associated with a mobile content may include information about the user who tagged the content, such as name, location, demographic information, social networks in which the user is a participant, or some other information about the user.

In an example, a user may type a query, such as "New York," and see a result in the search results that they would like to remember. An icon, link, or some other facility may be provided that indicates that a result may be tagged. Interacting with this icon, link, etc. may permit the user to tag the result. The user may then be prompted to name or label the result in some manner (e.g., New York City Hotels). The user may be able to save the result to a mobile briefcase.

In embodiments, this tagged data may be used at the subscriber level. For example, when a subscriber types in "New York" he may see results that he pinned ranked higher, and/or with a different look, to indicate to the user that the result is his tagged result. The result may have an icon, or some other distinctive aesthetic, that differentiates it from the normal (i.e., non-tagged) results.

In embodiments, metadata associated with content that has been tagged by a user, or plurality of users, may be used to improve the overall tagged-ranking algorithm.

In embodiments, the tagged results may also be included in creating a subscriber's personal index of content that they may search against.

In embodiments, the mobile briefcase may be cached. In embodiments, an index of the mobile briefcase may be cached.

In embodiments, tagged results may be available to a user when the user is offline.

In embodiments, content may be implicitly tagged based at least in part on repeated user behavior(s).

In embodiments, tagged content may be shared within the context of a limited social network, unlimited social network, or some other social network format.

In embodiments, a tag associated with a mobile content may be associated with other mobile content tags. In an example, a user may tag a mobile content, such as a photo, in part with tag information indicating that the photo relates to the saxophonist Eric Dolphy. Other mobile content tags by the same user, or other users, may have tags that also indicate a relation to Eric Dolphy. In embodiments, the tags that are associated with mobile content may be searchable so that, for example, it is possible to find all mobile content in a mobile briefcase, or plurality of mobile briefcases, relating to Eric Dolphy by querying the mobile briefcase(s).

In embodiments, a user's mobile briefcase may be associated with a security facility. A sign in process may be required to access content within a mobile briefcase. A security facility may include functionality that permits a user to restrict a tagged mobile content in his mobile briefcase for viewing only by himself. A security facility may include functionality that permits a user to release a tagged mobile content in his mobile briefcase for viewing by all members of a social network. A security facility may include functionality that permits a user to release a tagged mobile content in his mobile briefcase for viewing by named members of a social network. A security facility may include functionality that permits a user to release a tagged mobile content in his mobile briefcase for viewing by the general public.

In embodiments, a tagged mobile content may be associated with a sponsored content. In embodiments, a tagged mobile content may be a sponsored content. In embodiments, a tagged mobile content may be associated with a subscription content. A tagged subscription content may be associated with an offer to users viewing the tagged subscription content to subscribe to the subscription content provider.

In embodiments, a user viewing the content within another user's mobile briefcase may "pin" a content of interest. A process of pinning a mobile briefcase content may include, but is not limited to, adding a tag to the content that indicates an association with the user placing the pin; saving the pinned mobile content to the user's personal mobile briefcase; or some other method of marking the mobile content for the user's later reference.

In embodiments, mobile gateway data may be used to improve the relevancy of mobile search results. Gateway data may be used to create authority scores, to establish related sites, to improve personalization of the search results, or improve the relevance of mobile search results in some other manner. In embodiments, the usage of gateway data may include a relevancy based at least in part on site access and usage statistics (e.g., number and length of visits); scoping based at least in part on user groups; content relationships based at least in part on the progression of user sessions; content discovery (e.g., new URLs/Sites); site quality (e.g., access and usage statistics); determining behavioral targeting conditions based at least in part on the content being accessed; determining the stage of a buying process based at least in part on the content being accessed (e.g., research vs. purchase); advertiser quality based on interaction with a site following a click; SPAM detection based at least in part on interaction with site following a click; navigation popularity and clusters; or some other usage of gateway data.

In embodiments, gateway data may be used to determine, in part, the relevancy of a mobile content. Gateway data may associated with information relating to a mobile communication facility 102 in order to determine a relevancy. This information may relate to a user characteristic. User characteristics may include a user's age, sex, race, religion, area code, zip code, home address, work address, billing address, credit information, family information, income information, birth date, birthplace, employer, job title, length of employment, and other information associated with user characteristics. For example, the user characteristic, home address, may be used to determine, in part, the relevancy of news headlines that derive from news websites using IP addresses associated in some manner with the user's home address.

In embodiments, the association of gateway data to a user history may be used to determine a relevancy. User history may include, but is not limited to, a user transaction, a geographic location, geographic proximity, a user device, a time, and or other user characteristics.

In embodiments, the association of gateway data with a mobile communication facility characteristic may be used to determine a relevancy. A mobile communication facility characteristic may include, but is not limited to, a display capability, display size, display resolution, processing speed, audio capability, video capability, cache size, storage capability, memory capacity, and other mobile communication facility characteristics. The information relating to a mobile communication facility 102 may be provided by a wireless operator, a wireless service provider 108, a telecommunications service provider, or other providers associated with a mobile communication facility 102.

In embodiments, relevance may be based at least in part on a statistical association. The relevance may be a score. The statistical association may relate to an association between the gateway data and the information relating to a mobile communication facility 102. The statistical association may relate to an association between the gateway data and a performance criterion. A performance criterion may include processing speed, or some other performance criterion.

In embodiments, gateway data may be processed either in batch or in real-time.

In embodiments, mobile-specific content and transcoded webpage content may be blended within a content repository based at least in part on a relevancy. In embodiments, the content may be blended using an algorithm. In embodiments, the content may be blended using a combination of an algorithmic and editorial review.

In embodiments, the blended content may be stored in repository and indexed according to a relevancy to a mobile communication facility characteristic. A mobile communication facility characteristic may include, but is not limited to, a display capability, display size, display resolution, processing speed, audio capability, video capability, cache size, storage capability, memory capacity, and other mobile communication facility characteristics.

In an example, for a mobile communication facility of Type 1, all content, or a subset of content, in the blended content repository may be ranked according to a relevance that is based at least in part on how well each content will present on the Type 1 mobile communication facility. In embodiments, the content that is presented to the mobile communication facility Type 1 may be selected based at least in part on meeting or exceeding a relevancy rank. In embodiments, the content presented to the mobile communication facility may be ordered according to the relevancy rank, such that the most relevant content is presented first, most prominently, or based on some other preferential display.

In embodiments, "targeted transcoding" may be used to provide the most appropriate result set for a given handset's capabilities. Targeted transcoding may identify high-quality web sites without a mobile presence to include in a mobile search index and offer a high-quality editorially reviewed/ improved transcoded version of these websites. These transcoded sites may be identified in a search index. In embodiments, transcoded sites may be normalized and blended based on a relevancy with existing mobile-friendly results. In embodiments, transcoded sites may be identified to the user as a 'transcoded result' on the search engine results page. In embodiments, transcoded sites may be excluded completely from the search results for devices that do not support the display of transcoded pages In embodiments, general transcoding may be used to present results to a user that is served from a generic web search backfill. These results may be presented as an alternative results category or as the primary results when no relevant mobile-friendly or targeted transcoded results exist. In embodiments, these generic web search results may be excluded from any search result set as desired.

In embodiments, a mobile content site and a non-mobile content site bearing a relationship may be associated with one another. A relationship may include common ownership by an entity, for example, a newspaper's mobile content site and its non-mobile content site. A relationship may include a common subject matter, for example weather information.

In embodiments, the relationship between a mobile content site and a non-mobile content site may be discovered, based at least in part on spidering. An autonomous agent or software agent may provide the spidering. This agent may be a web crawler, a web spider, an ant, and the like. For example, spidering may begin with the agent retrieving a webpage at a known URL. That webpage may contain metadata, hyperlinks or reference to other webpages. Spidering may continue with the agent retrieving the other webpages, which may also contain metadata, hyperlinks or references to other webpages.

In embodiments, the process of deriving the relationship between a mobile content site and a non-mobile content site may include processing gateway data (e.g. WAP gateway data, mobile server gateway data, server gateway data, and/or wireless provider gateway data). Gateway data may be associated with a WAP gateway, or other such facility, the wireless communication facility 104, the additional or remote server 134, or any other server or facility associated with the wireless search platform 100.

In embodiments, the process of deriving the relationship between a mobile content site and a non-mobile content site may comprise self-submission. A provider of a mobile content site may submit an identifier, or plurality of identifiers, of non-mobile content sites with which it has a relationship.

In embodiments, a mobile communication facility user seeking to access content using a non-mobile content site may instead be directed to the mobile content site with which the non-mobile content site has a relationship. In an example, a mobile communication facility user may submit a query for the non-mobile website www.espn.com. This website may be associated with a mobile content site counterpart, for example, "mobile.espn.go.com." The provider may direct the content from the mobile site to present to the user's mobile communication facility, rather than the worse-performing non-mobile content site.

In embodiments, a method or system may be used to analyze a mobile content website to identify the predominant language used on website. In embodiments, a content may include keywords presented on the mobile content website. As an example, an automated system (e.g., spidering) may process each page of a mobile content website, processing each through one or more filters for filtering out common language-specific terms. The automated system may further process the words into groups such as those terms related to action links, internal links, external links, and the like may indicate the predominant language of a mobile content website.

In embodiments, gateway data may be used to determine the predominant language of a mobile content website. Gateway data may include WAP gateway data, mobile server gateway data, server gateway data, and/or wireless provider gateway data.

In embodiments, the predominant language of a mobile content website may be determined using a combination of an algorithmic and editorial review.

In embodiments, gateway data may be used to determine the quality of content located on a website. In embodiments, quality may be associated with the markup used, the number of visits to a site, the length of visits to a site, the popularity of a site, word repetition, outbound links, inbound links, the age of a page, the age and growth of inbound links, inbound link usage, or some other quality indicator. In embodiments, low quality may be associated with unwanted content, such as spam (i.e., unwanted solicitations).

In embodiments, information relating to a website, for example keywords, anchor text, referring sites, internal links, external links, and other information may be used to determine the quality of content located on a website.

In embodiments, gateway data may include WAP gateway data, mobile server gateway data, server gateway data, and/or wireless provider gateway data.

In embodiments, the quality of the content located on a website may be determined using a combination of an algorithmic and editorial review. Algorithmic review may include the use of tools, such as spidering.

In embodiments, a mobile communication facility user may be associated with content to which the user has a subscription. In embodiments, a process may be provided for identifying subscribers who have purchased subscription content and integrating the subscription content into mobile search results for those subscribers. In embodiments, a query result presented to a user having a content subscription may include subscription and non-subscription content. In embodiments, non-subscription content may include a solicitation to subscribe to a subscription content. A solicitation may include a sponsored link or other promotional content included in the search results. A user may be able to subscribe to content in response to a solicitation included in the results.

In embodiments, subscription content may include, but is not limited to, a magazine subscription, newspaper subscription, RSS feed, or some other type of subscription content.

In embodiments, a user's subscription data may be associated with a user account, a mobile communication facility, or some other data.

In embodiments, information regarding the current location of a mobile communication facility 102 may be used in a competitive bidding process in which sponsors place a bid amount based at least in part on a user's current location, past location, future location, and the like. As a user's mobile communication facility 102 enters a location, a sponsor, or plurality of sponsors, may be presented with an opportunity to place a bid amount for the right to have their content presented to the user. In another example, sponsors may place bids in advance relating to the future right to present sponsored content to users reaching a target location (e.g., within one mile of the sponsor's store location), and so forth.

In embodiments, sponsored content may be presented on a mobile communication facility in conjunction with a game. In an example, the sponsored content may be a banner placed next to the gaming display, the sponsored content may be embedded in the gaming content, wrap around the visual display of the gaming content, or bear some other proximity to the game.

In embodiments, sponsored content may be presented on a mobile communication facility in conjunction with a video. In an example, the sponsored content may be a banner placed next to the video display, the sponsored content may be embedded in the video content, wrap around the visual display of the video content, or bear some other proximity to the video display.

In embodiments, sponsored content may be presented in the form of an interactive banner. In an example, an interactive banner may provide a mobile communication facility user an opportunity to choose content from a list, complete a survey, view offline content (e.g., an offline newspaper advertisement), or some other opportunity.

In embodiments, a sponsored banner content may include dynamic text insertion. In an example, a sponsored banner advertising a television may dynamically insert text that is obtained from a retailer's database indicating the current price, number of units available, or some other text-based data.

In embodiments, a sponsored content may present to a mobile communication facility based at least in part on a variable that is associated with, but external to, the mobile communication facility. In an example, a location of a mobile communication facility may be associated with a news event occurring at or near the same location (e.g., an interstate car crash that has delayed traffic). In response to this external variable, the user's mobile communication facility may present a sponsored content through which the user may obtain alternate traffic route information in order to avoid the traffic delay.

In embodiments, a promotion may be presented to a user of a mobile communication facility in which the promotion requires the user to search for a content, solve a puzzle, break a code, follow a clue, or perform some other activity in order to derive the promotional benefit.

In embodiments, a coupon may be presented to a mobile communication facility in the form of a code that may be presented to an offline location to derive the coupon's benefit. The act of the user presenting the coupon may be entered and stored in a data storage facility. This stored data may be associated with user characteristics, mobile communication facility characteristics, and the like, and these associations may be used to present targeted advertisements, coupons, cross-sell, up-sell, and so forth to users. A sponsor may be charged a fee by a mobile service provider for each instance of its mobile subscribers presenting such a coupon.

In embodiments, the most influential members of a social network may be identified, and sponsored content directed to them. Influential members of a social network may be identified by the number of persons listed as members of their network, the number of other social network members listing a social network member within their personal network, SMS traffic, number of purchases, or based on some other measure of personal influence. In embodiments, sponsors may bid on the right to provide their sponsored content to members of a social network based at least in part on a social network member's level of influence. The level of influence of social network members may be indexed and stored in a data storage facility. The content of the index of social network members' influence may be licensed to mobile service providers, third parties, and the like.

In embodiments, sponsors may be able to bid for the exclusive right to have their content associated with a keyword, location, or some other data.

Figure 21:
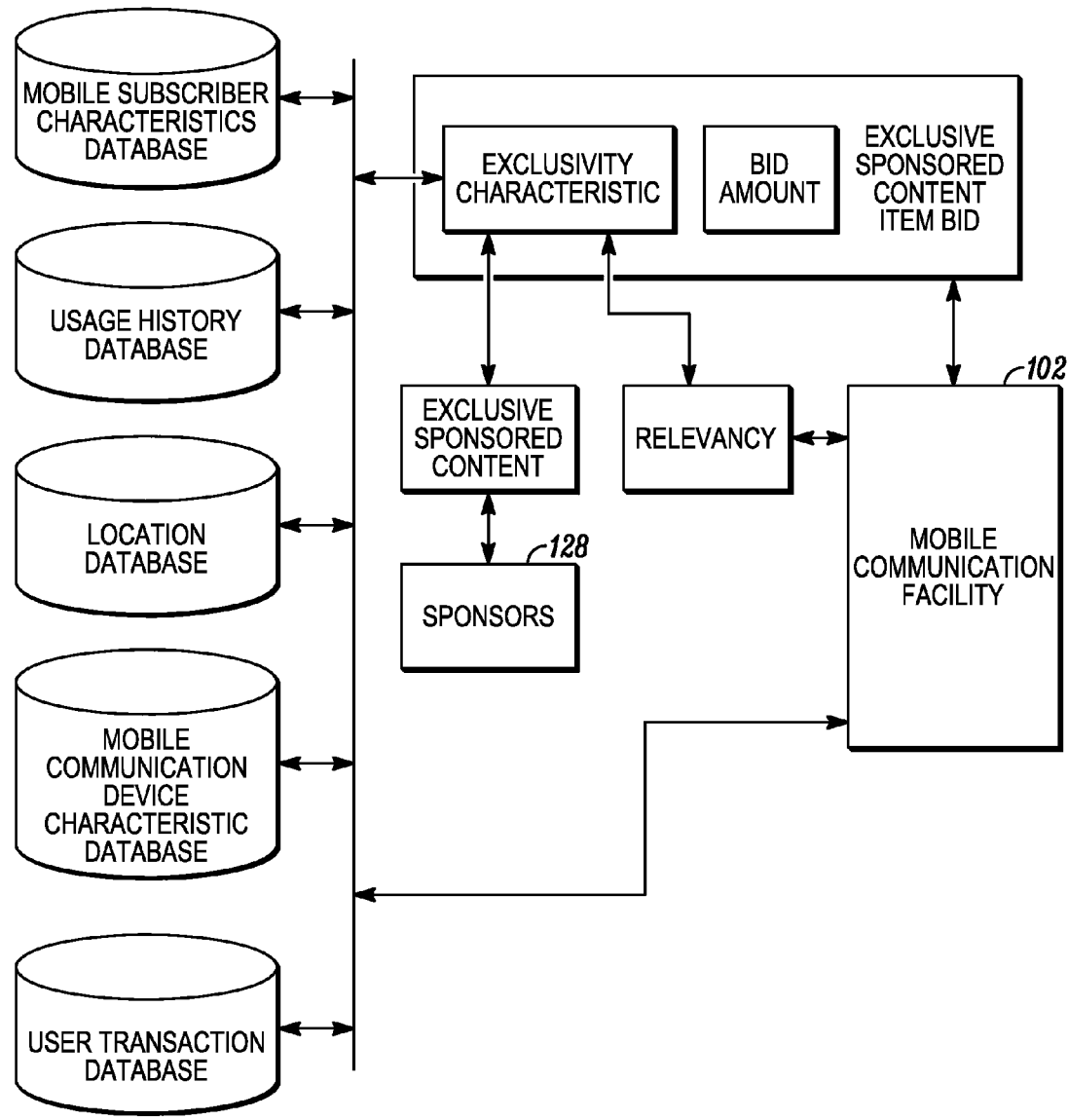
FIG. 21 illustrates a generalized method for exclusivity bidding for sponsored content within a mobile platform.

Referring to FIG. 21, in embodiments, sponsors 128 may be able to bid for exclusive sponsored content delivery to user mobile communication facilities 102, such as to a phone, a mobile phone, a cellular phone, a GSM phone, and the like. Examples of situations that may lend themselves to a sponsorship model where sponsors 128 competitively bid against each other may include a grouping of car dealerships in close proximity; clothing stores in a mall; multiple food stores in the same town; head-to-head competitors such as Borders and Barnes & Noble, Lowes and Home Depot, and the like; restaurants in the same vicinity; and the like. In embodiments, a bidding model for direct competition for exclusive sponsored content delivery through the user's mobile communication facility 102 may be effective in any situation where competitive sponsors 128 are targeting the same exclusivity characteristics of users.

In embodiments, a method and system for exclusivity bidding for mobile sponsored content. In embodiments, a bid may be received for exclusive sponsored content for presentation to a user's mobile communication facility 102, where the bid may include a bid amount and at least one exclusivity characteristic relating to the user, such as from a mobile subscriber characteristic database, a usage history database, a location database, a transaction database, a mobile communication device characteristic database, and the like. The bid may be submitted as a part of a competitive auction, as an open bid, as a closed bid, and the like. In addition, the exclusivity characteristic may be matched to the exclusive sponsored content item based at least in part on a relevancy for presentation to the mobile communication facility 102, such as a score or rating. For instance, Route 202 in Flemington N.J. has 18 new car dealerships, all on the same strip of road, including Audi, BMW, Buick, Chevrolet, Chrysler, Dodge, Ford, GMC, Infiniti, Jeep, Lincoln, Mercury, Nissan, Mazda, Pontiac, Porsche, Subaru, and Volkswagen. This large collection of new car dealerships presents a strong competition for potential buyers coming to the area to shop for cars. A user may know that this area has virtually every major car brand on the market, and may visit the area with little prior knowledge of what each of the dealerships are currently offering in the way of sales, and available models, such as their current stock of certified used cars. This may be a situation where users may gain buyer direction as to where they are going to first look based on sponsored content delivered to their mobile communication facility 102 as they drive into the area, and car dealership sponsors may be willing to bid for exclusive access to a user's mobile communication facility 102, where the delivery of the sponsored content is based at least in part on information relating to the user's mobile communication facility 102 (e.g. mobile subscriber characteristics).

Continuing the above example, the dealerships may additionally what to target certain aspects of a user that make them a more desirable target, where these aspects may be referred to as exclusivity characteristics, and a relevancy matching of a user's exclusivity characteristics to the exclusive sponsored content may better ensure the effectiveness of the exclusive sponsored content on the user's preferences. For instance, many of the dealerships may have sports car offerings, and are willing to bid for access to users' mobile communication facility 102, which may be particularly effective in this instance because of the user profile that may be associated with buyer of high end sports cars. That is, high income males who may be likely to utilize their mobile communications facilities 102 in their decision making. Given this profile, the dealership sponsors 128 may want to bid based on exclusivity characteristics, and in this case, the relevancy of the user's exclusivity characteristics with high end sports cars, such as a mobile subscriber characteristic specifying that the user is over a certain age, a usage history that shows the user has been browsing for sports cars, a location in some proximity to the dealership, a mobile communication device characteristic that specifies the user has a mobile communication facility that has a large high resolution color display, user transactions that indicate the user has significantly increased their spending profile, and the like. In embodiments, the dealership sponsors 128 may offer bids that combine the bid amount, exclusivity characteristics, and relevancy in a plurality of ways in order to better utilize sponsorship dollars in the increase in car sales due to delivery of exclusive sponsored content.

In embodiments, relevancy matching may be an important aspect in the effective delivery of exclusive sponsored content, allowing the sponsored exclusive sponsored content to be better targeted to the intended audience. One way to better ensure relevancy to the user is to utilize mobile subscriber characteristic data associated with the user's mobile communication facility 102, including user profile information, demographic information, billing information, and the like. By using such information it may be possible to relevancy match exclusive sponsored content to personal attributes of the user, such as their age, address, gender, and the like. For instance, advertising for clothing can be matched to the age, gender, and whether they live in an urban or rural setting. Advertisements for middle aged males may target sports, cars, home improvement, and the like. Advertisements for young girls may target clothing, and the like. Advertisements for seniors may target health products, travel, and the like. In embodiments, information derived in association with mobile subscriber characteristic information may prove effective for matching the exclusive sponsored content to the user. In embodiments, profile data such as age, gender, and address, may be sufficient for an initial user relevancy matching of exclusive sponsored content.

In embodiments, relevancy may be derived from a user transaction data associated with the mobile communication facility 102, such as an online product purchase, the filling of an online shopping cart, an ad conversion, and the like. For instance, the user of the mobile communication facility 102 may have just purchased some women's seasonal clothing. Now, the user may not be interested in purchasing more seasonal clothing, and so the relevancy for seasonal clothing may be significantly reduced as a result of the purchase, but since the user is a woman, and hasn't yet purchased any seasonal shoes, the relevancy for shoes may be elevated as a result of the purchase. In another example, a user may be purchasing new floor mats for a late model car, which may indicate that the user has just purchased a late model car. As a result, this may lower the relevancy for car ads, but may elevate the relevance of car care products. In addition, user transactions may be indicative of the user's interests, and provide a better relevancy matching of the exclusive sponsored content to the user. In embodiments, user transactions associated with the mobile communication facility 102 may be effectively used in determining the user relevancy to exclusive sponsored content.

In embodiments, relevancy may be derived from a usage history data associated with the mobile communication facility 102, such as a browse history, an ad conversion history, from wireless carrier data, and the like. For instance, a user may be browsing for plasma televisions, and as a result, the relevancy for ads associated with plasma televisions, as well as other similar products such as LCD televisions, may be elevated. This elevation of relevance may become diminished over time if the browsing discontinues, which may indicate that the user subsequently made the purchase. In another example, a user may be browsing through the websites of college campuses, and as a result may be targeted with exclusive sponsored content associated with colleges and college related consumer products, such as laptop computers and the like. In embodiments, usage history may also track ad conversion history, as well as the types of ads that have been converted. For instance, the user may be converting ads for mortgage rates, and as a result, the user may be targeted with exclusive sponsored content related to mortgage rates. Wireless carrier data may also be tracked and provide information that leads to increased relevancy matching. For instance, the user may make a large number of calls from the financial district in New York City, and result in an increased relevancy for ads relating to finances, or the like. In embodiments, usage history may be used to improve user relevancy in the selection of exclusive sponsored content.

In embodiments, relevancy may be derived from mobile communication device characteristic data, such as a display characteristic, a computational characteristic, a bandwidth characteristic, a keypad characteristic, and the like. For example, a florist sponsor 128 of colorful cut flowers may place a high relevancy on users with high end color displays, a sponsor 128 delivering interactive content may place a high relevancy on users with certain keyboards, a sponsor delivering a detailed graphic may place a high relevancy on users with good processing capabilities, and the like. In embodiments, an exclusive sponsored content item bid may be higher based upon the relevancy of a mobile communication device characteristic.

In embodiments, relevancy may be derived in association with location data. There may be a plurality of techniques in determining the location of a mobile communication facility 102, such as by GPS, by triangulation, by triangulation utilizing Wi-Fi, and the like. The location of a mobile communications facility 102 may be determined when a user enters a particular location; may involve a plurality of geographic regions, such as states, cities, and the like; may be specified according to a distance from a specified location; may be associated with some aspect of the mobile communications facility 102 mobile content; may be associated with a previous location or a current location; and the like. For instance, if a user of a mobile communications facility 102 is at a location in proximity to a shopping area for clothing, the relevancy for ads related to clothing may elevate. If a user is in proximity of a series of car dealerships, the relevancy for car ads may elevate. In embodiments, location data may be used to improve user relevancy to sponsored content.

Figure 22:
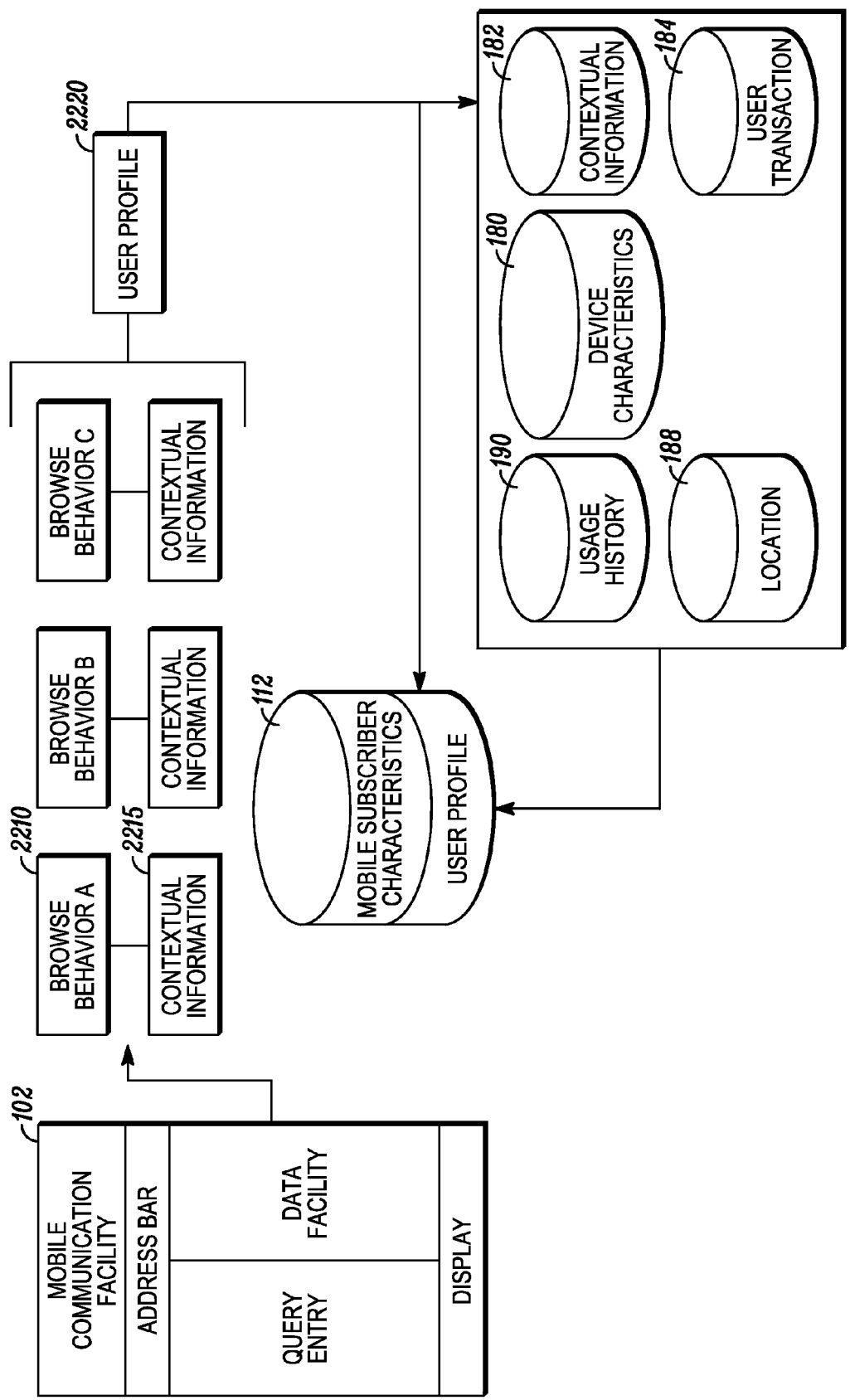
FIG. 22 illustrates a generalized method for mobile user profile creation based on user browse behaviors.

Referring to FIG. 22, in embodiments a navigation request (e.g. a user request that directs a browser application) or plurality of navigation requests may be received from a mobile communication facility 102. Data may be recorded and stored that relates to the navigation request. For example, a user may engage in browser navigation activity 2210 on his mobile communication facility 102 and the browse activity may result in the connection to a variety of webpages, web content or interaction with other network locations/content. Each such interaction may be monitored for contextual information 2215 relating to the location and/or content. For example, the contextual information 2215 may relate to the websites visited, content downloaded, content interacted with or other such interactions relating to the user's browse activities. In embodiments, the contextual information 2215 may relate to wireless carrier data. In embodiments, the plurality of browse activities 2210 and the related contextual information 2215 may be used to create a user profile 2220. The user profile may, in turn, be stored in a mobile subscriber characteristics database 112 along with other of the user's mobile subscriber characteristics 112, such as demographics and other characteristics as described herein.

In embodiments, content (e.g. content, mobile content, sponsored content, etc.) may be presented to a user's mobile communication facility 102 based at least in part on the user's profile. For example, sponsor content may be delivered to a mobile communication facility based on mobile subscriber characteristics and/or the user's profile. The contextual information gathered based on the user's interactions with content and/or locations may have been used to generate a profile that generally describes the user. It may be this generalization or profile that allows for more specific targeting of which users to send the sponsored content to. The generalization may be categorized as well. For example, the wireless provider may have several categories of user profile (e.g. sports fan, homemaker, lawyer, male, within a certain age group, etc.). Once the contextual information is gathered it may be used to select a predefined profile maintained by the wireless provider. So, for example, if the user is frequently visiting sites that have many links to sports content and or sites, the user may be characterized into a sports profile.

In embodiments, contextual information may include, but is not limited to, website content, web content itself, a link structure, an inbound link, an outbound link, text, a keyword, metadata, or some other type of contextual information.

In embodiments, wireless carrier data may include, but is not limited to, content relationships relating to the progression of user sessions, content discovery of new websites, access statistics, usage statistics, or some other wireless carrier data.

In embodiments, a navigation request may be a search query, domain name entry, web browser action, menu selection, folder selection, an implicit request, a transaction, an advertisement conversion, or some other type of navigation request.

In embodiments, a user profile may be further based on user transactions. A user transaction may include an online product purchase, an advertisement conversion, or some other user transaction.

In embodiments, a user profile may be further based on usage history. A usage history may include an advertisement conversion history, or some other usage history.

In embodiments, a user profile may be further based on a search vertical that is accessed by the user. For example, if a user frequents a particular search vertical, that vertical may influence the profile or its categorization. A user browser profile, or plurality of a user's profiles, may be indexed according to a relevancy to a search vertical. A search vertical may relate to ring tones, images, games, a yellow pages, weather, a white pages, news headlines, WAP sites, web sites, movie show times, sports scores, stock quotes, flight times, maps, directions, a price comparison, WIFI hotspots, package tracking, hotel rates, fantasy sports stats, horoscopes, answers, a dictionary, area codes, zip codes, entertainment, blogs, or some other type of search vertical.

In embodiments, a user's profile may be based on a location or plurality of locations at which the user was present during a browse session of plurality of browse sessions. The location may be a previous location; a current location; coordinates of a mobile communication facility; location determined by GPS, triangulation, Wi-Fi triangulation, and the like; location determined by a user entering a region, a state, a city, or the like; location determined according to a distance from a specified location, a location associated with a mobile content; and the like. In embodiments, relevancy may be a score. In embodiments, the user profile may be based at least in part on a plurality of subscriber characteristics, a combination of a plurality of mobile subscriber characteristics and a location, a combination of a plurality of mobile subscriber characteristics and a plurality of user transactions, a combination of a plurality of mobile subscriber characteristics and a usage history, and the like.

In an example, a user may use his mobile communication facility 102 to access web content. In this simplified example, there are three browse activities 2210: Browse Behavior A, Browse Behavior B, and Browse Behavior C. Each of the Browse Behaviors 2210 may be associated with contextual information 2215 relating to the website visiting during each Browse Behavior (e.g., a link structure, an inbound link, an outbound link, a text, a keyword, meta data, or some other type of contextual information). In this example, Browse Behavior A is a visit to an online bookstore. Browse Behavior B is a clickthrough from the online bookstore's homepage to a page relating to a specific book. Browse Behavior C relates to the user's browse activity of completing an online purchase of the book viewed during Browse Behavior B. Based upon these Browse Behaviors it may be possible to create a user profile 2220 based on the contextual information 2215 derived from the interactions. This user profile 2220 may be a summary indicator that this particular user is an "online book purchaser." Alternatively, the user profile 2220 derived from the browse session may be used to summarize the length of time that this user views each individual webpage, how the user interacted with each webpage, or some other information relating to web browsing. Each of these pieces of contextual information may be used to generate or influence a user's profile.

In embodiments, a navigation request or plurality of navigation requests may be received from a mobile communication facility 102. Data may be recorded and stored that relates to the browse activity 2210 of a mobile communication facility 102 user based at least in part on contextual information 2215 relating to the websites visited, wireless carrier data, or some other information relating to the user's browse activities. In embodiments, the plurality of browse activities may be used to create a user profile 2220. The user profile based at least in part on the user's browse activities may, in turn, be stored in a mobile subscriber characteristics database 112 along with other of the user's mobile subscriber characteristics 112, such as demographics and other characteristics as described herein.

In embodiments, content may be presented to a user's mobile communication facility 102 based at least in part on the user's browse behavior profile.

In embodiments, contextual information may include, but is not limited to, a link structure, an inbound link, an outbound link, a text, a keyword, meta data, or some other type of contextual information.

In embodiments, wireless carrier data may include, but is not limited to, content relationships relating to the progression of user sessions, content discovery of new websites, access statistics, usage statistics, or some other wireless carrier data.

In embodiments, a navigation request may be a search query, domain name entry, web browser action, menu selection, folder selection, an implicit request, a transaction, an advertisement conversion, or some other type of navigation request.

In embodiments, a user browser profile may be further associated with a user transaction. A user transaction may include an online product purchase, an advertisement conversion, or some other user transaction.

In embodiments, a user browser profile may be further associated with a usage history. A usage history may include an advertisement conversion history, or some other usage history.

In embodiments, a user browser profile may be further associated with a search vertical. A user browser profile, or plurality of a user's browser profiles, may be indexed according to a relevancy to a search vertical. A search vertical may relate to ring tones, images, games, a yellow pages, weather, a white pages, news headlines, WAP sites, web sites, movie show times, sports scores, stock quotes, flight times, maps, directions, a price comparison, WIFI hotspots, package tracking, hotel rates, fantasy sports stats, horoscopes, answers, a dictionary, area codes, zip codes, entertainment, blogs, or some other type of search vertical.

In embodiments, a user's browse profile may be further associated with a location or plurality of locations at which the user was present during a browse session of plurality of browse sessions. The location may be a previous location; a current location; coordinates of a mobile communication facility; location determined by GPS, triangulation, Wi-Fi triangulation, and the like; location determined by a user entering a region, a state, a city, or the like; location determined according to a distance from a specified location, a location associated with a mobile content; and the like. In embodiments, relevancy may be a score. In embodiments, the user profile may be based at least in part on a plurality of subscriber characteristics, a combination of a plurality of mobile subscriber characteristics and a location, a combination of a plurality of mobile subscriber characteristics and a plurality of user transactions, a combination of a plurality of mobile subscriber characteristics and a usage history, and the like.

In an example, a user may use his mobile communication facility 102 access web content. In this simplified example, there are three browse activities: Browse Behavior A, Browse Behavior B, and Browse Behavior C. Each of the Browse Behaviors may be associated with contextual information relating to the website visiting during each Browse Behavior (e.g., a link structure, an inbound link, an outbound link, a text, a keyword, meta data, or some other type of contextual information). In this example, Browse Behavior A is a visit to an online bookstore. Browse Behavior B is a clickthrough from the online bookstore's homepage to a page relating to a specific book. Browse Behavior C relates to the user's browse activity of completing an online purchase of the book viewed during Browse Behavior B. Based upon these Browse Behaviors it may be possible to create a user profile. This user profile may be a summary indicator that this particular user is an "online book purchaser." Alternatively, the user profile derived from the browse session may be used to summarize the length of time that this user views each individual webpage, how the user interacted with each webpage, or some other information relating to web browsing.

Figure 23:
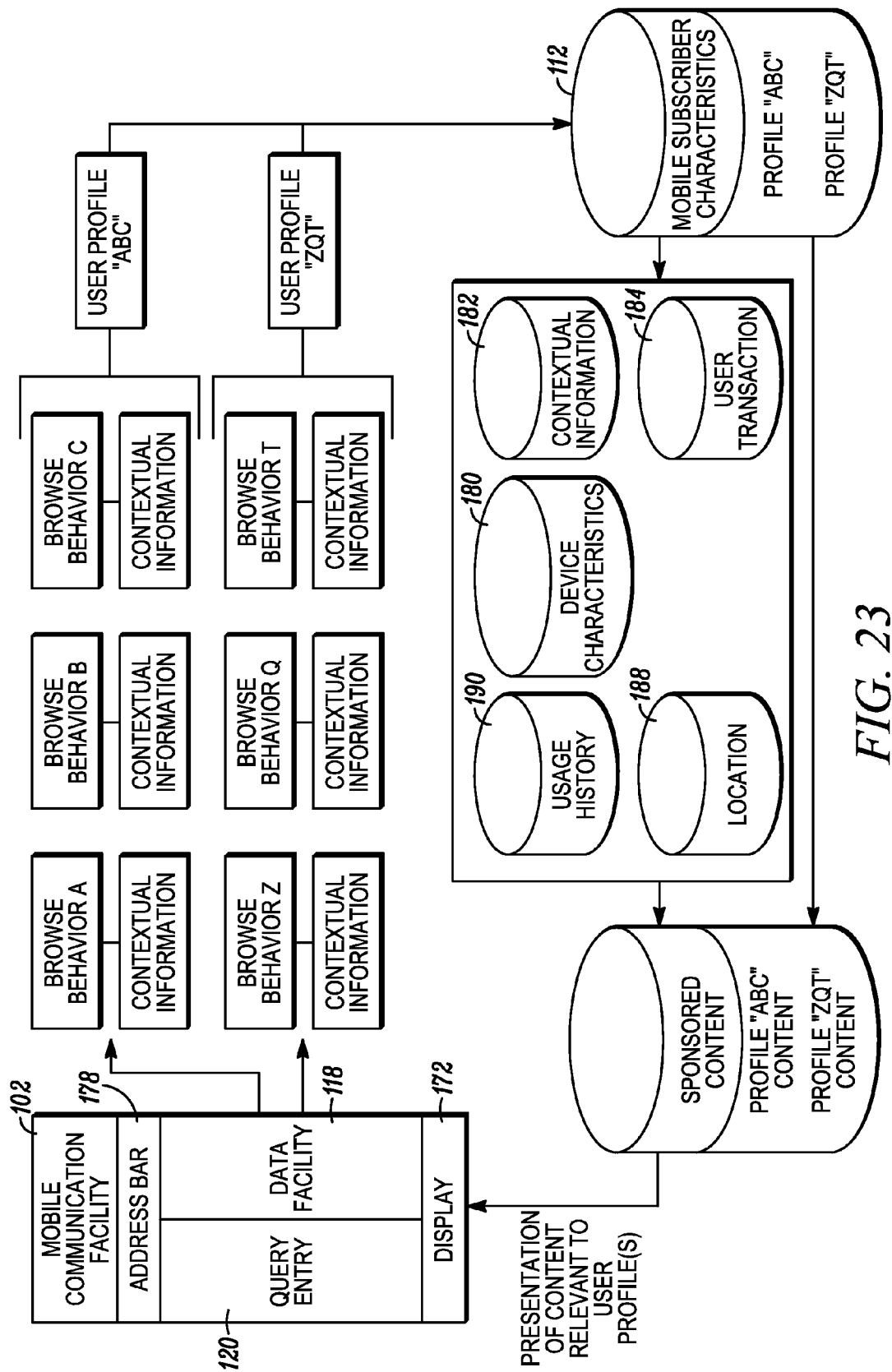
FIG. 23 illustrates a generalized method for mobile user profile category creation based on user browse behaviors.

Referring to FIG. 23, in embodiments, wireless provider data may be used to ascertain web browser activity from a user of a mobile communication facility 102. The web browser activity may be recorded and a plurality of web browser activities stored in association with other data assets of a wireless carrier, such as a mobile subscriber characteristics database 112, or some party associated with a wireless carrier. In embodiments, the plurality of stored web browser activities may be analyzed in order to determine a relationship, or plurality of relationships, among the web browser activities. Based at least in part on this analysis, or analyses, a user profile may be categorized based at least in part by the quantitative and qualitative information relating to the web browser activities. In embodiments, this category of user profile may be associated with the user of the mobile communication facility 102 from which the web browser activities were recorded, and sponsored content may be presented to the mobile communication facility 102 based at least in part on the category of the user profile. In embodiments, a single user may have multiple profiles, across multiple categories of profiles, based at least in part on multiple web browser activities.

In embodiments, the wireless carrier data may be an advertisement tag datum. In embodiments, wireless carrier data may include, but is not limited to, content relationships relating to the progression of user sessions, content discovery of new websites, access statistics, usage statistics, or some other wireless carrier data.

In embodiments, the category of user profile may be created by further associating the web browser activities with a mobile subscriber characteristic. In embodiments, a mobile subscriber characteristic 112 may be age, sex, race, religion, area code, zip code, home address, work address, billing address, credit information, family information, income information, birth date, birthplace, employer, job title, length of employment, or some other mobile subscriber characteristic 112.

In embodiments, the category of user profile may be created by further associating the web browser activities with a user transaction. A user transaction may include an online product purchase, an advertisement conversion, or some other user transaction.

In embodiments, the category of user profile may be created by further associating the web browser activities with contextual information relating to a website. In embodiments, contextual information may include, but is not limited to, a link structure, an inbound link, an outbound link, a text, a keyword, meta data, or some other type of contextual information.

In embodiments, the category of user profile may be created by further associating the web browser activities with a usage history.

In embodiments, the category of user profile may be created by further associating the web browser activities with a location. The location may be a previous location; a current location; coordinates of a mobile communication facility; location determined by GPS, triangulation, Wi-Fi triangulation, and the like; location determined by a user entering a region, a state, a city, or the like; location determined according to a distance from a specified location, a location associated with a mobile content; and the like.

In an example, a user of a mobile communication facility 102 may during a single browse session, or over multiple browse sessions over multiple days, have three web browsing activities: Browse One—visit website of florist, Browse Two—visit website of caterer, and Browse Three—visit website of photographer. A wireless provider, or some third party, may have access to prior web browsing activities that may be analyzed to assess relationships among the web browsing activities and a category of user profile. This category of user profile may, in turn, be used to predict actions or events such as a future purchase, advertisement conversion, or some other action or event that is associated with the category of user profile. In the current example, it may be known to a wireless provider that the three browse activities of visiting the websites of a florist, a caterer, and a photographer within some proximity of each other is highly associated with a user that is a bride to be. Thus, this type of web browsing activity may categorize this user in the "Bride-to-Be" category. This category may be stored in the mobile subscriber characteristics database 112 that is associated with her phone, and sponsored content, such as wedding-related advertisements may be presented to the display 172 of her mobile communication facility 102 based at least in part that she fits the category of "Bride-to-Be."

Figure 24:
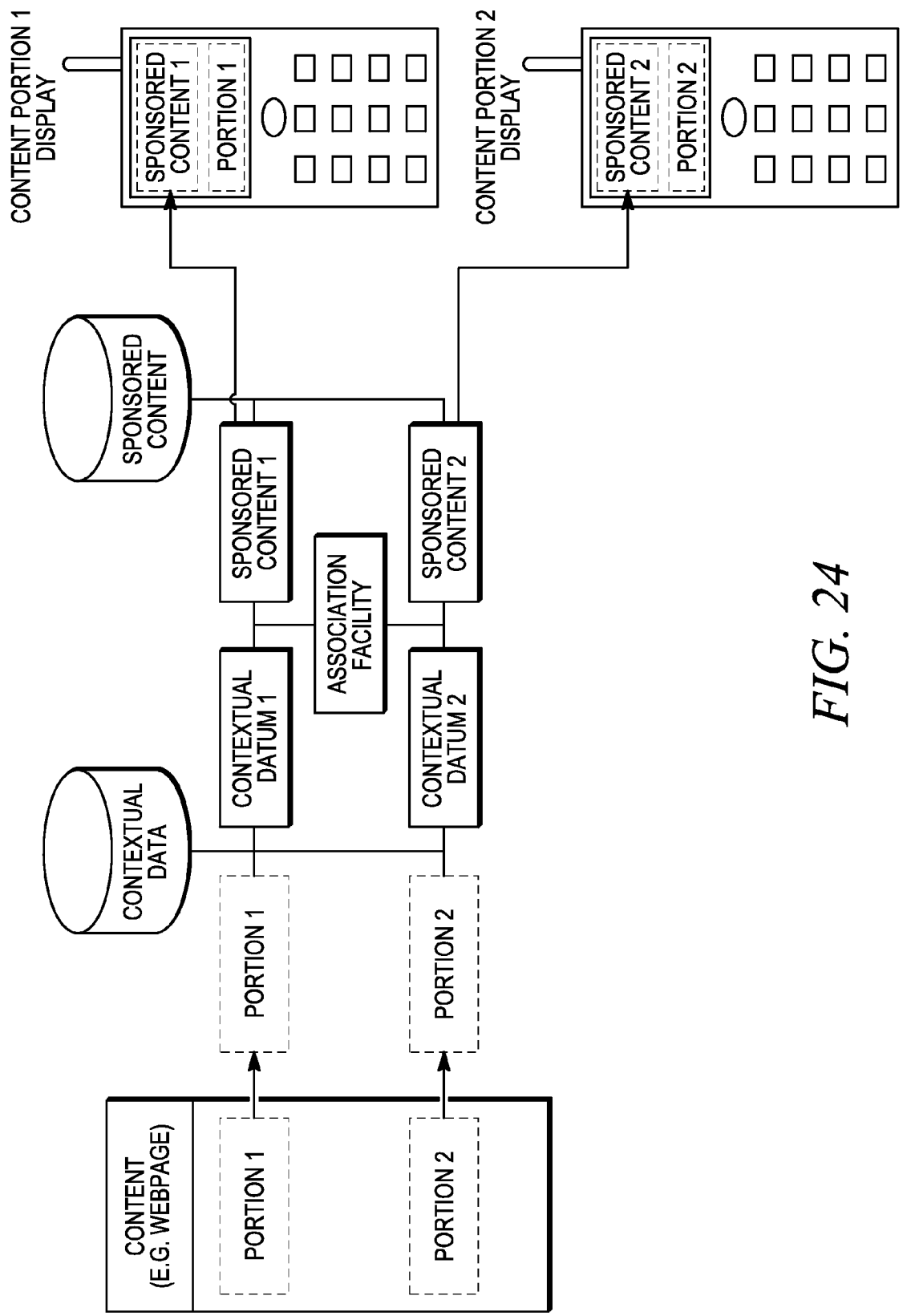
FIG. 24 depicts associating sponsored content with content portions using contextual data relating to the content portions.

Referring to FIG. 24, in an embodiment, a user of a mobile communication facility may access a content, such as a webpage, for viewing within the display of the mobile communication facility. In an example, the content may exceed the capacity of the display to present the entire content within the display, forcing the user of the mobile communication facility to first view a content portion 1 and then navigate to view a content portion 2. The content portion 1 may be associated with a contextual datum 1. The content portion 2 may be associated with a contextual datum 2. Contextual datum 1 and contextual datum 2 may be stored in a contextual database. An association facility may be used to select from a sponsored content database a sponsored content 1 that is associated with the contextual datum 1, and a sponsored content 2 that is associated with the contextual datum 2. The association between the contextual data and the sponsored content may be used to further associate the content portion 1 with the sponsored content 1, and the content portion 2 with the sponsored content 2. During a display of content portion 1, the content portion 1 and its associated sponsored content 1 may be displayed on the mobile communication facility simultaneously, in temporal proximity to one another, in a staged manner, in a sequential presentation, or in some other manner of display in which the content portion 1 and the sponsored content 1 are associated. During a display of content portion 2, the content portion 2 and its associated sponsored content 2 may be displayed on the mobile communication facility simultaneously, in temporal proximity to one another, in a staged manner, in a sequential presentation, or in some other manner of display in which the content portion 2 and the sponsored content 2 are associated. In embodiments, upon navigating to a content portion, an indication of a stage change may be transmitted to a server associated with the mobile communication facility. The stage change may indicate a redirection to the portion. Once the redirection is registered, it may be possible to glean a contextual datum that is associated with the portion. The process may be asynchronous in that the contextual data may be transmitted from the server in the background so that there is minimal interference with the function of the content portion viewed.

In embodiments, an asynchronous process used for transmitting contextual data may be Asynchronous JavaScript and XML (AJAX), or a similar process. AJAX refers to a cross-platform technique that may be usable on different operating systems, computer architectures, and web browsers as it is based on open standards such as JavaScript and the DOM. The AJAX system is asynchronous; in that extra data may be requested from a server and loaded in the background without interfering with the display and behavior of an existing page. JavaScript is a scripting language that may be used to make AJAX function calls. Data may be retrieved using the "XMLHttpRequest" object that may be available to scripting languages run in browsers, or alternatively remote scripting in browsers that do not support "XMLHttpRequest." In embodiments, asynchronous content may be formatted in formats other than XML. AJAX, and related techniques, may exchange small amounts of data with a server as a background functionality so that entire web pages do not have to be reloaded each time there is a need to retrieve data from a server. This may increase a webpage's interactivity, speed, functionality, and usability.

In embodiments, a content portion may be displayed on a display on a mobile communication facility. The mobile communication facility may receive the entire content and then only display portions thereof as appropriate given the user's actions. For example, the user may direct local software (e.g. a browser) on the mobile communication facility to connect to a specific webpage and the software may then retrieve the entire webpage or significant portion of the webpage. The mobile communication facility may then present a portion of the webpage to the display. For example, the top of the webpage may be presented on the display and the software on the mobile communication facility may wait for indications from the user that the user wants to view another portion of the content. The indication may come as a zoom, pan, shift or other request from the user. The software on the mobile communication facility may monitor what portion is currently being displayed, how long the portion is displayed or other parameters relating to the portion being displayed. The software on the mobile communication facility may then transmit this information to a server in real time such that other content related to the content portion being currently displayed can be transmitted to the mobile communication facility. The server side software may select appropriate content (e.g. sponsored content, related content, etc.) based on the content portion, contextual information related to the content portion, behavioral information based on how the user of the mobile communication facility interacts with the content portion, or other such information. Once selected, the server side software may communicate the content to the mobile communication facility. The mobile communication facility may be configured to accept such information or optionally configured to not accept such content. When the mobile communication facility receives the new content that relates to the currently displayed content portion, the mobile communication facility may store the content for later presentation (e.g. such as when the mobile communication facility gets brought to a certain location, based on a time of day, or based on some other later trigger event or implicit search). In other embodiments, the mobile communication facility may present the newly selected content when it is received. The new content may be presented in coordination with the currently displayed content portion. For example, the new content may be displayed within the same display section (e.g. within the same window), or it may be displayed separately (e.g. in a separate window). AJAX may be one technology used to gain an understanding from the mobile communication facility as to which portion is currently being displayed. One skilled in the art would appreciate that no one software or protocol would be required to discover what content portion is currently being displayed or for communicating related information to the server based application. While many embodiments herein describe sending information to the server in real time relating to what content portions are being displayed, it should be understood that such information may be collected and sent in batches at later points in time.

In other embodiments, only a portion of the complete content may be communicated to the mobile communication facility and other content portions may be communicated to the mobile communication facility as requested. So, in contrast to the example above where the majority of the content was delivered to the mobile communication facility and then a portion of the content was selected for presentation on the mobile communication display, in this embodiment, only a portion of the content is delivered to the mobile communication facility. Then other portions of the content can be later delivered. The other content portions may be later delivered in response to a user request (e.g. such as through a pan or zoom request) or through anticipation of what the user is going to want to view (e.g. downloading other content portions through AJAX protocols). In this embodiment, the sever program in charge of monitoring what portions are displayed on the mobile communication display may infer that certain portions are or have been displayed on the mobile communication facility because they have been delivered to the mobile communication facility. The server may track delivery of content portions based on type of request. For example, a user explicit request may be tracked separately from an inference type request that is intended to anticipate what content the user may want to view. Related content selections may be based on any or all types of such content portion requests.

In embodiments, content may be a text, an image, an audio, an audio-visual, a webpage, a section of a webpage, a section of a screen, a sponsored content, an advertisement, a portion of an advertisement, an interactive feature, a subscription content, a tagged content, a dynamic content, or some other form of content.

In embodiments, contextual data may be a link structure, a link, an outbound link, an inbound link, a keyword, metadata, or some other form of contextual data.

In an example, a user of a mobile communication facility may access a content on the New York Times website. The home page of the New York Times website may contain more content than may be simultaneously presented to the display of the user's mobile communication facility. This may force the user to sequentially view portions of the website's content. In this example, once the New York Times is first loaded to the mobile communication facility's display, a content portion 1 may be presented that consists of the main news headline of the day: "Fourth Quarter Foreclosures up 18%." This article, including its headline and associated article text, may be associated with a contextual datum 1 that is stored in a contextual database. For example, within the article there may be a reference to Fannie Mae in which the text "Fannie Mae" is an outbound link to Fannie Mae's website. In another example of contextual data that may be associated with the article, a keyword or key word string, such as "housing," "housing starts," "mortgage," etc. may be included in the article, and these keywords may be stored as contextual data in the contextual database. The information regarding the contextual data associated with the viewed New York Times article (portion 1) may be used by an association facility to select a sponsored content 1 from a sponsored content database that is associated with the article on display. Because the article concerns housing and housing finance, an associated sponsored content 1 may be an advertisement for a mortgage refinance company, a debt management company, a REIT investment opportunity, and so forth. The associated sponsored content 1 may then be displayed in conjunction with the New York Times portion 1. The presentation of the portion 1 and sponsored content 1 may be simultaneous, in temporal proximity to one another, staged, in a sequential presentation, or in some other manner of display in which the content portion 2 and the sponsored content 2 are associated.

Continuing the New York Times example, after reading the article "Fourth Quarter Foreclosures up 18%," the user of the mobile communication facility may wish to view a portion 2 of the same New York Times webpage presenting a sports article. To navigate to the sports article, the user may scroll, zoom, or use some other navigational action to direct the sports article to display on the mobile communication facility. Upon navigating to the sports article, an indication of a stage change may be transmitted to a server associated with the mobile communication facility. The stage change may indicate a redirection to the portion 2 of the New York Times. Once the redirection to portion 2 is registered, it may be possible to glean a contextual datum 2 that is associated with the portion 2. In this example, the New York Times sports article may lead off with an item about a hockey team. The association facility may select from a sponsored content database a sponsored content 2 that is associated with contextual data related to the hockey item, such as keywords "skates," "rink," and/or outbound links to specific NHL team webpages. For example, a sponsored content 2 may be an advertisement for an NHL team's apparel, NHL ticket resellers, and the like. The sponsored content 2 may also be further associated with any of the other data associated with the mobile communication facility and/or its user, as described herein, such as location. This may enable the sponsored content 2 to be further targeted to the mobile communication facility user, such as an advertisement for available skating rink times within a 5 mile vicinity of the billing address associated with the mobile communication facility, or within 5 miles of the mobile communication facility's current location when viewing the sponsored content 2, and so forth.

Figure 25:
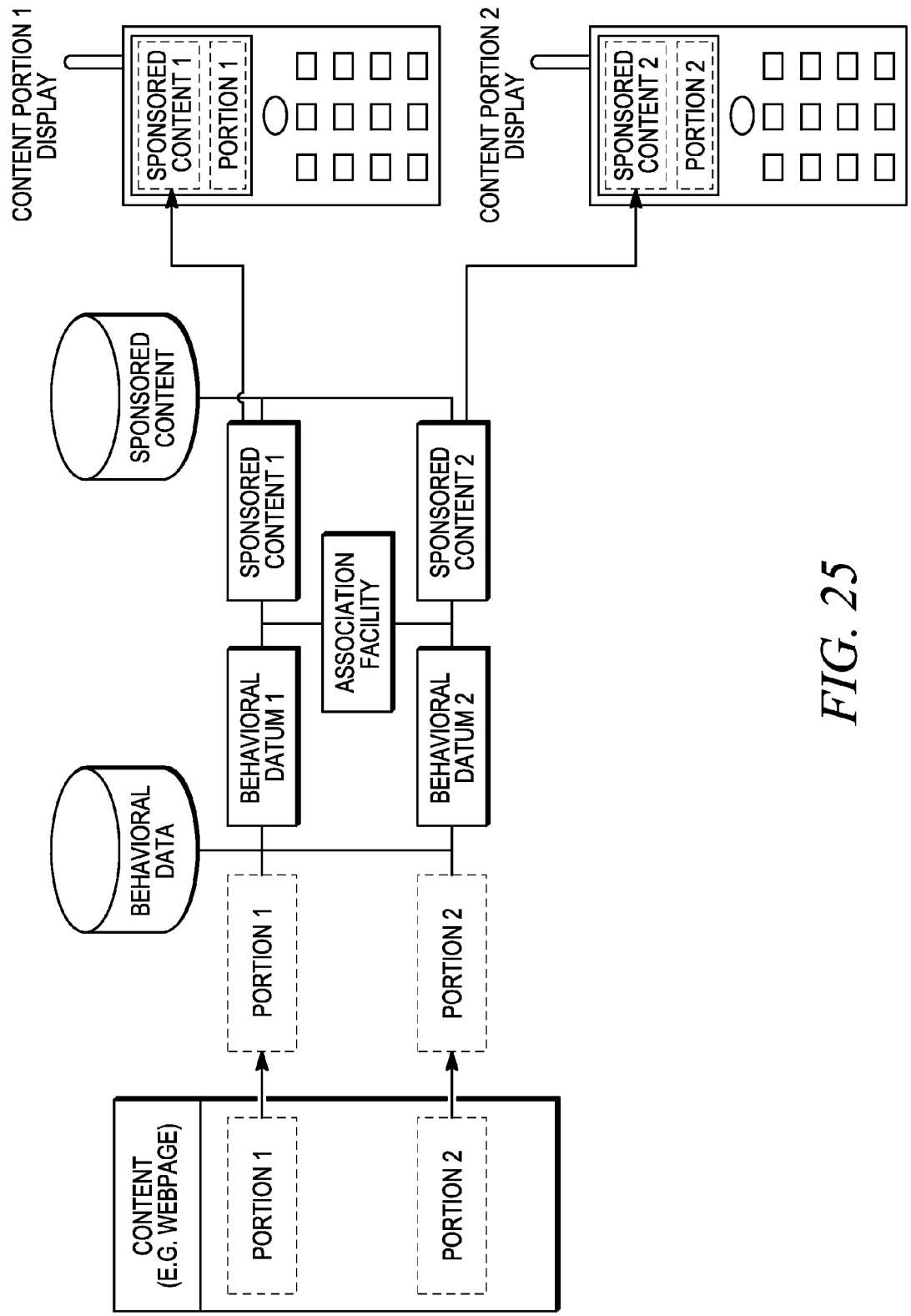
FIG. 25 depicts associating sponsored content with content portions using behavioral data relating to the content portions.

Referring to FIG. 25, in an embodiment a user of a mobile communication facility may access a content, such as a webpage, for viewing within the display of the mobile communication facility. In an example, the content may exceed the capacity of the display to present the entire content within the display, forcing the user of the mobile communication facility to first view a content portion 1 and then navigate to view a content portion 2. The content portion 1 may be associated with a behavioral datum 1. The content portion 2 may be associated with a behavioral datum 2. Behavioral datum 1 and behavioral datum 2 may be stored in a behavioral database. An association facility may be used to select from a sponsored content database a sponsored content 1 that is associated with the behavioral datum 1, and a sponsored content 2 that is associated with the behavioral datum 2. The association between the behavioral data and the sponsored content may be used to further associate the content portion 1 with the sponsored content 1, and the content portion 2 with the sponsored content 2. During a display of content portion 1, the content portion 1 and its associated sponsored content 1 may be displayed on the mobile communication facility simultaneously, in temporal proximity to one another, in a staged manner, in a sequential presentation, or in some other manner of display in which the content portion 1 and the sponsored content 1 are associated. During a display of content portion 2, the content portion 2 and its associated sponsored content 2 may be displayed on the mobile communication facility simultaneously, in temporal proximity to one another, in a staged manner, in a sequential presentation, or in some other manner of display in which the content portion 2 and the sponsored content 2 are associated.

In embodiments, behavioral data may be panning, zooming, navigating, scrolling, positioning, a page view, a text view, an image view, streaming audio content, streaming video content, a download, an upload, a transaction, an advertisement conversion, receiving a text message, sending a text message, receiving an email, sending an email, entering a search query, calling directory information, or some other type of behavioral data. Behavioral data may be communicated to a server that is associated with the mobile communication facility in order to associate the behavioral data with the content that is delivered to the mobile communication facility in response to the receipt of the behavior. The content that is delivered to the mobile communication facility (e.g., the page view) may be used to calculate on the server which portion of a content a user is currently viewing.

Figure 26:
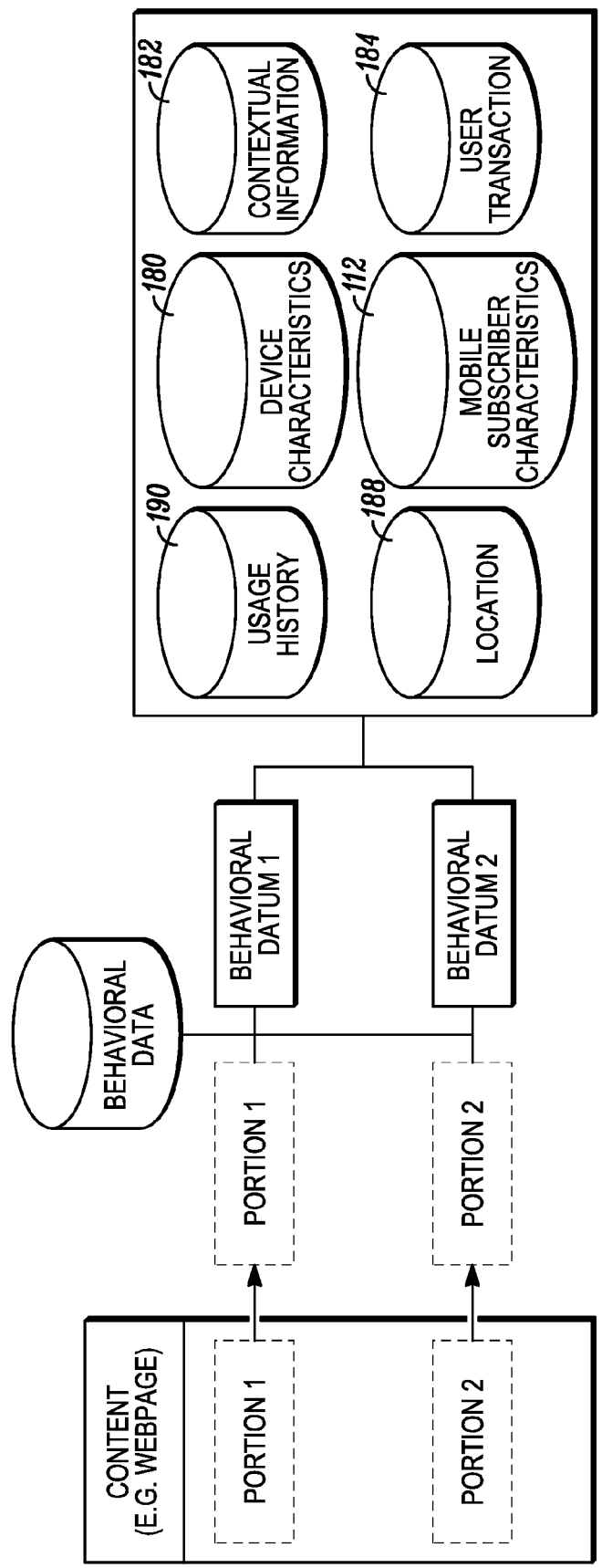
FIG. 26 depicts adding behavioral data relating to viewed content portions to databases associated with a mobile communication facility and/or its user.

Referring to FIG. 26, in embodiments, data relating to a portion of a content, such as behavioral data that is stored in a behavioral database (and/or contextual data that is stored in a contextual database), may be used to create or augment existing data about a mobile communication facility or its user. For example, behavioral and contextual data relating to portions of content viewed on a mobile communication facility may be added to a usage history 190, a device characteristics database 180, a location database 188, a mobile subscriber characteristics database 112, a user transaction history database 184, or a general contextual information database 182.

In embodiments, a mobile content, such as a sponsored content, may be presented to a mobile communication facility based at least in part on contextual data relating to a portion of a mobile content.

In embodiments, a first sponsored content may be associated with a first contextual datum relating to a first portion of a mobile content. A second sponsored content may be associated with a second contextual datum relating to a second portion of the content. The first sponsored content may be presented to a display of a mobile communication facility upon the presentation of the first portion of the mobile content to the mobile communication facility. The second sponsored content may be presented to the display of the mobile communication facility upon the presentation of the second portion of the mobile content to the mobile communication facility. In embodiments, the association may be based at least in part on a relevance.

In embodiments, the first portion of the mobile content may be a section of a text, section of a video, section of an audio, section of an image, or a section of come other content type. A section of a text may be a news article.

In embodiments, the second portion of the mobile content may be a section of a text, section of a video, section of an audio, section of an image, or a section of come other content type. A section of a text may be a news article.

In embodiments, contextual information may be a link structure, an inbound link, an outbound link, a link, a text, a keyword, a meta data, or some other type of contextual information.

In embodiments, contextual information may be gathered from a plurality of portions of a primary electronically displayable content, wherein an association between each piece of contextual information and each of the plurality of portions may be maintained such that the context of each portion is identifiable. Information pertaining to an electronic display of at least one portion of the content may be received within a display screen on a mobile communication facility, and secondary content may be presented to the display based at least in part on the contextual information relating to the at least one portion of the content within the display screen. In embodiments, the primary content may be a webpage. In embodiments, the secondary content may be sponsored content. Sponsored content may be an advertisement. An advertisement may contain an actionable feature.

In embodiments, information may be received relating to a portion of a primary content that is being displayed on a mobile communication facility, wherein the primary content has at least one other portion that is not being displayed. A context may be determined that is related to the information; and a secondary content may be delivered to the mobile communication facility based on a relation of the secondary content to the context.

In embodiments, content context information may be received relating to a panned display position from a mobile communication facility, and content may be delivered to the mobile communication facility based on the content context information.

In embodiments, content context information may be received that is related to a zoomed display position from a mobile communication facility, and content may be delivered to the mobile communication facility based on the content context information.

In embodiments, content context information may be received that is related to a positioned display position from a mobile communication facility, and content may be delivered to the mobile communication facility based on the content context information.

In embodiments, a mobile content, such as a sponsored content, may be presented to a mobile communication facility based at least in part on behavioral data relating to a portion of a mobile content.

In embodiments, a user interaction may be registered with a portion of a mobile content using a mobile communication facility. A datum may be associated with the user interaction. The datum may be transmitted to a server. A sponsored content associated with the datum may be selected, wherein the association is based at least in part on a relevance between the portion of the mobile content and the sponsored content, and the sponsored content may be presented to the mobile communication facility.

In embodiments, a user interaction may be a page view, a text view, streaming audio content, streaming video content, a download, an upload, receiving a text message, sending a text message, or some other user interaction type.

In embodiments, the portion of the mobile content may be a section of a text, section of a video, section of an audio, section of an image, or a section of come other content type. A section of a text may be a news article.

In embodiments, content display information may be received that identifies which portion of a primary content is presently being presented to a display screen of a mobile communication facility, wherein the primary content contains at least one other portion that is not presently being displayed, and a user profile may be generated based on the content display information.

In embodiments, content display information may be received that identifies what portion of a primary content has been presented to a display screen of a mobile communication facility, and a user profile may be generated based on the content display information.

In embodiments, content display information may be received that identifies what portion of a primary content has been presented to a display screen of a mobile communication facility, and a popularity ranking may be generated for the presented portion.

In embodiments, content display information may be received that identifies what portion of a primary content has been presented to a display screen of a first mobile communication facility. Content display information may be received that identifies what portion of the primary content has been presented to a display screen of a second mobile communication facility, and popularity rankings may be generated for the presented portions.

In embodiments, content display information may be received that identifies how long a portion of a primary content is presently being presented to a display screen of a mobile communication facility, wherein the primary content contains at least one other portion that is not presently being displayed, and a user profile may be generated based on the content display information.

In embodiments, content display information may be received that identifies how long a portion of a primary content has been presented to a display screen of a mobile communication facility, and a user profile may be generated based on the content display information.

In embodiments, content display information may be received that identifies how long a portion of a primary content has been presented to a display screen of a mobile communication facility, and a popularity ranking may be generated for the presented portion.

In embodiments, content display information may be received that identifies how long a portion of a primary content has been presented to a display screen of a first mobile communication facility. Content display information may be received that identifies how long a portion of the primary content has been presented to a display screen of a second mobile communication facility, and a popularity ranking may be generated for the presented portions.

In embodiments, content portion display information may be received from a mobile communication facility. Mobile subscriber characteristic information relating to the mobile communication facility may be received, and sponsored content may be delivered to the mobile communication facility based in part on the content portion display information and in part based on the mobile subscriber characteristic information.

In embodiments, content portion display information may be received from a mobile communication facility, and the content portion display information may be added to a mobile subscriber characteristic database relating to the mobile communication facility.

In embodiments, content portion display information may be received from a mobile communication facility. Mobile subscriber characteristic information relating to the mobile communication facility may be received, and a user profile may be generated based at least in part on the content portion display information and in part based on the mobile subscriber characteristic information.

In embodiments, mobile advertising may enable mobile operators, carriers, and others to assist advertisers in targeting mobile content, such as mobile advertisements, to consumers. In embodiments, mobile operators may create targeted on-, and off-portal mobile advertising networks. In embodiments, a mobile advertising network, as described herein, may be further associated with user privacy protocols, or some other security protocol.

Figure 27:
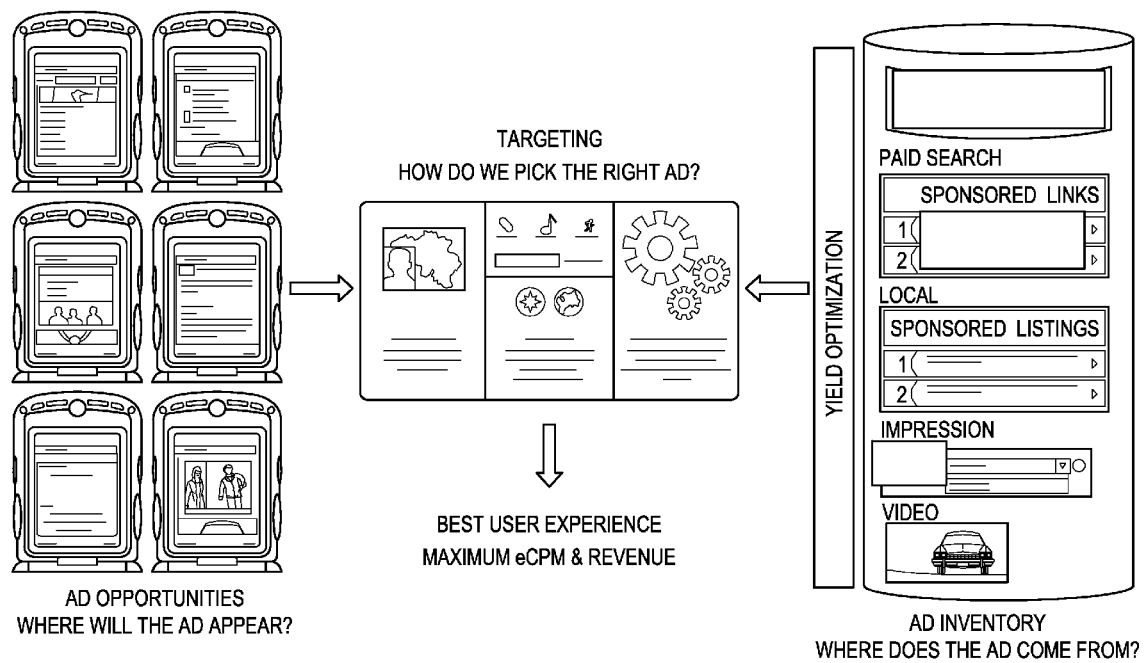
FIG. 27 depicts an overview of targeting advertisements.
Figure 28:
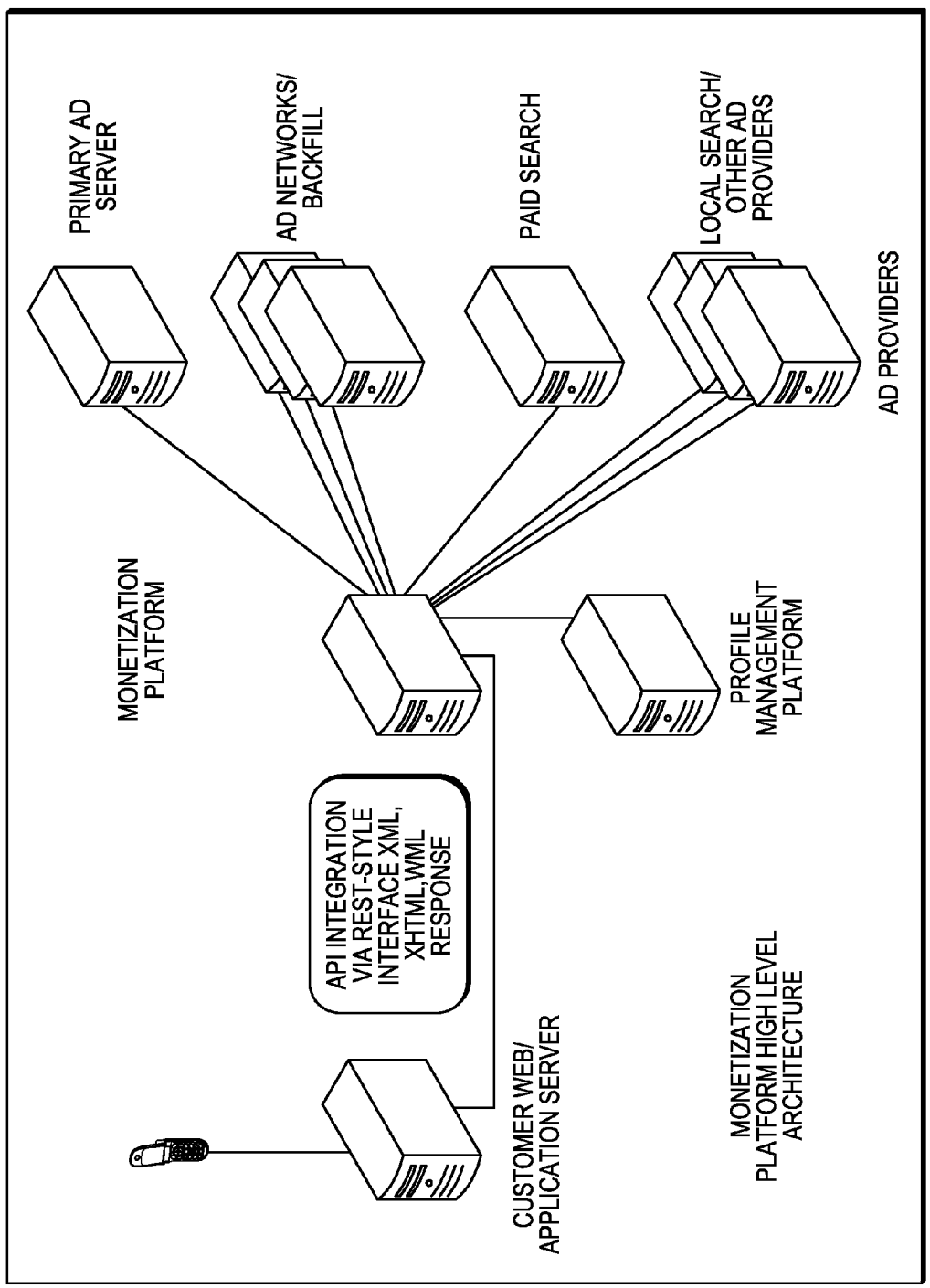
FIG. 28 depicts a high level monetization platform architecture.
Figure 29:
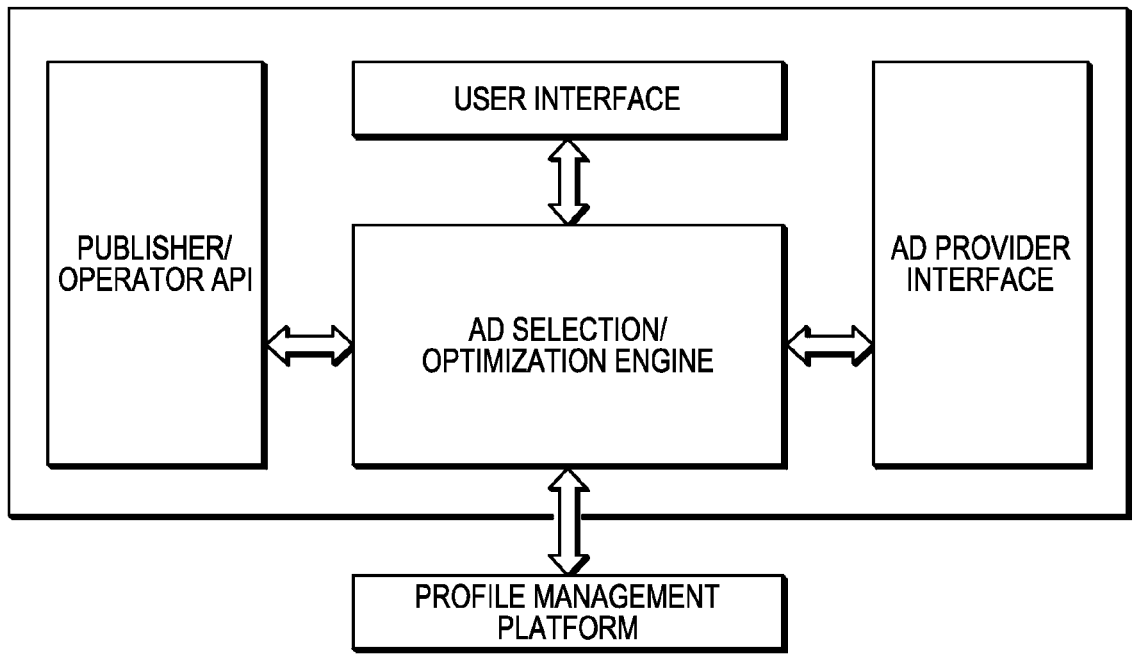
FIG. 29 depicts a multi-interface structure associated with a monetization platform and profile management platform.

Referring to FIGS. 27 and 28, in embodiments, a monetization platform, as described herein, may enable a unified, multi-screen ad server capable of handling a plurality of mobile advertising formats, including but not limited to banners, text, audio, video, graphics, multimedia, or some other advertising format, from a plurality of ad networks and/or systems. As depicted in FIG. 29, a monetization platform may be associated with a profile management platform (PMP). In embodiments, a monetization platform may be enabled to select and target advertising content that is available from across a plurality of advertising inventories. The selection and targeting of advertising content within the monetization platform may be based at least in part on a rules engine within the monetization platform. The selection and targeting of advertising content may be based at least in part on demographic data, contextual data, behavioral data, or some other data type associated with a mobile user and/or carrier.

Figure 30:
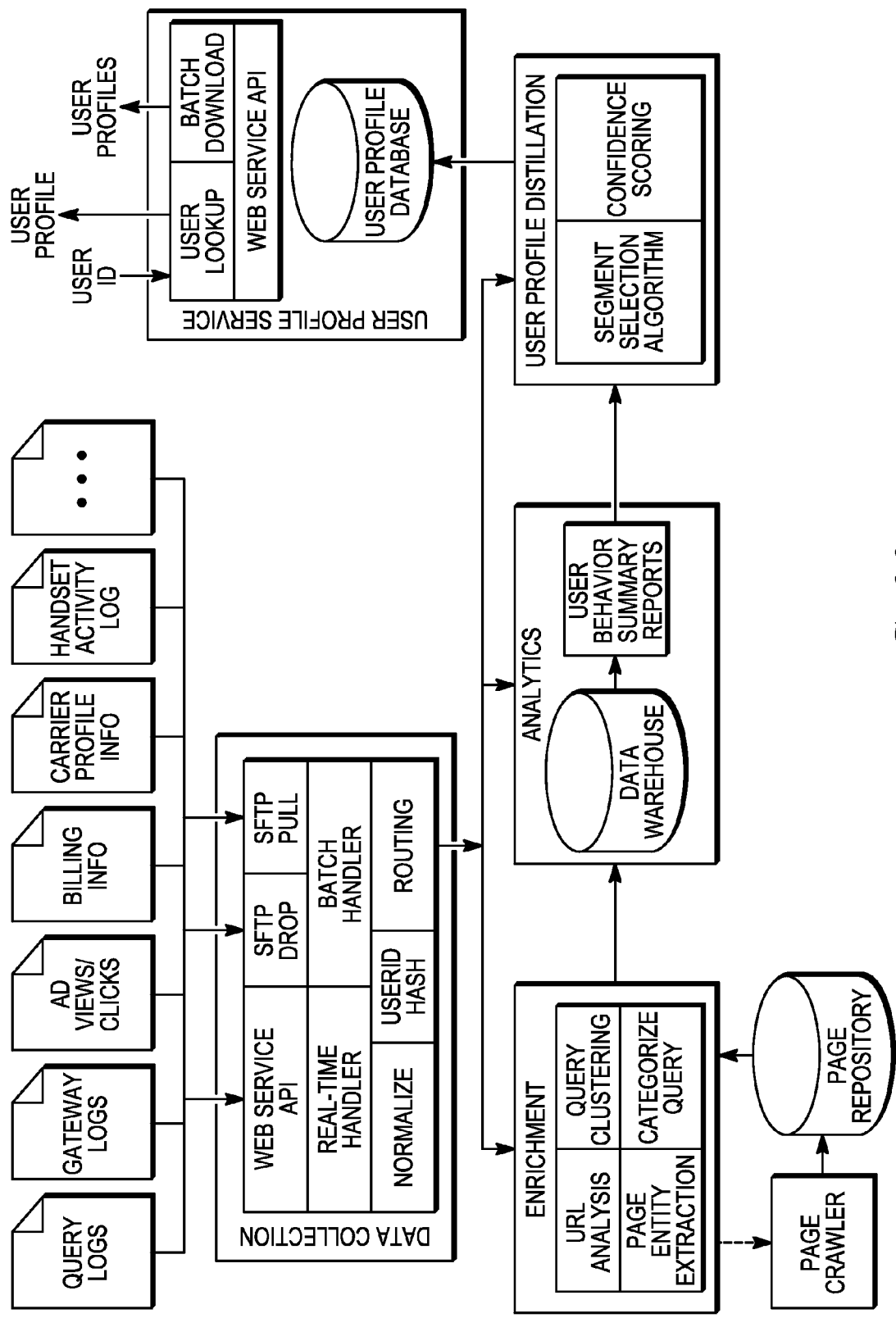
FIG. 30 depicts a generalized method for using user profile data within a monetization platform.

Referring to FIG. 30, in embodiments, a monetization platform may be used to employ contextual and behavioral targeting techniques. In an embodiment, the contextual and behavioral targeting techniques may be used to decipher the context of a page a user browses in order to display a targeted ad. In another embodiment, the contextual and behavioral targeting techniques may be used to enhance a user profile. This may enable the building of robust user profiles. The search algorithms may enable crawling, entity extraction, query categorization or any other enrichment process in order to provide a contextual understanding of the page and to offer a precise page content understanding. In embodiments, query stream analysis may be used in combination with term categorization to understand user interests over time as well as in precise moments in time to build behavioral profiles. The creation of behavioral profiles may increase the relevancy of mobile advertising.

In embodiments, the monetization platform may serve as a centralized mobile advertising hub by partnering with mobile operators to balance mobile operator, user, and advertiser needs to deliver the mobile advertising while building traffic. The monetization platform may integrate multiple ad networks and servers via a single integration. A cross-inventory selection process may dynamically select a relevant and profitable advertisement to display from the mobile advertising network and other integrated advertising networks.

In embodiments, the monetization platform may integrate multiple ad networks and servers. A primary ad server may serve as the booking and delivery system for premium inventory to operator portal, publisher web sites, client applications or any other application. This may provide for direct sales of the operator's or publisher's high-value inventory. Multiple ad networks may be integrated into the monetization platform and may be used to supplement direct sales activities. In embodiments, the monetization platform may integrate with multiple local ad providers in multiple markets. In some embodiments, operator/publisher remnant or run-of-site inventory may also be made available to ad networks. In other embodiments, a paid search system may be integrated with the monetization platform for searching and browsing inventory. The monetization platform's ad provider Application Programming Interface (API) may allow for easy integration of new ad providers without code releases.

In embodiments, the optimization engine of the monetization platform may choose an appropriate ad for a given ad spot. The criteria that may be used for choosing the appropriate ad may be the type of ad and the ad provider targeted to the ad spot, or some other criteria. The criteria may include business rules applied to the ad spot. The business rules may include setting a priority of ad providers, keyword/domain blacklists, adult ad filtering, weighting ad providers, setting a default ad provider in case no ad is returned or any other business rule. The weighting of ad providers is done so that the ads are served in a designated allocation. In embodiments, the monetization platform may use past user behavior and profile information to determine the ad provider and the ad that is valuable to serve.

In embodiments, a yield optimization algorithm, as described herein, may determine which ad is relevant and revenue generating based on context (WAP page), consumer behavior, expected ad revenue, or some other characteristic.

In embodiments, the profile management platform may place users who are anonymously tracked into one or more segments based on browsing, search, ad interaction, purchase behavior or any some other user behavior. Profiles may also be enhanced with demographic information that may get loaded into a behavioral database. In embodiments, operators or publishers may pass segment or other profile information at ad request time. The segment or profile information may be passed to the ad provider who may use it to serve a targeted ad.

In embodiments, the monetization platform may be enabled to change ad behavior without changing ad tags. This may be done by using ad spots. Ad spots may be locations set up by the operator or publisher into which ads may be returned. Each ad spot setup may include the ad types and the ad providers that may be targeted to the given ad spot. Ad providers may be targeted to the given ad spot. The ad spot may also include business rules which may determine how ads are selected for the ad spot. Ad types, ad providers and business rules may be changed in the monetization platform without modifying the publisher's ad request for an ad spot. This may ensure that operators and publishers may make changes to their ad spots without making changes to their site. The changes may be made through an administrative console and may take effect in real time.

In embodiments, the monetization platform may provide operator and publisher access to the monetization platform. The monetization platform API may provide a programmatic interface for operators and publishers to retrieve multiple ad types. In embodiments, the programmatic interface may report ad activity back to the monetization platform. Operators and publishers may need to integrate the ad tags once and may access the existing ad providers and new ad providers as they come online.

In embodiments, the monetization platform may have an architecture including the monetization platform API, monetization platform application servers, an optimization engine, a profile management platform, a user interface and a publisher/operator application server.

In embodiments, the monetization platform API may allow publishers and mobile operators to request and retrieve ads as well as report ad activity back to the monetization platform. The monetization platform application servers may receive API requests, pull the appropriate ads from various providers and return the results. The optimization engine may make the determination based on the most appropriate targeting and the available inventory. The determination may yield as to which ad providers to query and which ads to select for a given request. The profile management platform may collect search activity, browsing behavior, ad interaction and any explicitly stated demographic or profile information. This data may be passed with an ad request or enhanced by proprietary data sources. The monetization platform user interface may be an administrative interface for setting up business rules and weighting, creating ad spots, setting up new ad provider integrations, profile administration and reporting.

In embodiments, the monetization platform may retrieve ads from various sources and select the appropriate ad(s) to return based on business rules, behavior, targeting, or some other criteria. The sources may include banner ad servers, paid search ad systems, ad networks and other third party ad providers. The integration of an ad provider with the monetization platform may shield operators and publishers from having to integrate with multiple ad providers.

In embodiments, the publisher/operator application server may request ads specific to its implementation. The publisher/operator application server may place the ads on a mobile web page or in the client application. The placed ad may be viewed by a mobile subscriber.

In embodiments, the monetization platform may leverage the profile management platform (PMP) to access user specific targeting information. The PMP may provide a robust and scalable architecture for the creation, management, and distribution of user profiles and behavioral based segmentation. The platform may integrate data from a large number of disparate data sources, both internal and external to the PMP and/or the operator itself. The PMP may include a series of enrichment modules that may leverage the monetization platform's unique understanding of mobile search and browse based behavior. This may allow the platform to extract meaning from search patterns and to categorize search and browse data at scale. The modules may process raw search and browse data and allow the monetization platform to enhance user profiles with additional information that may provide higher-quality and granular user segmentation. The additional information may include relevant keywords.

In embodiments, a user profile creation in the PMP may include data collection, normalization, enrichment, warehousing and analysis.

In embodiments, data collection may include accepting data into the system in both real-time and batch. An example of data may be search data. The profile management platform may be able to integrate profiling data from any source. The sources may include search streams, ad interactions, browse activity, operator CRM data and other third party data. In embodiments, a search stream may include queries performed by a particular user, a query timestamp, and post query activity. The search stream data may provide insight into general user interest over time and illuminate immediate and evolving user needs. The search stream data may identify longer term and real time interests which may provide time-sensitive targeting opportunities. The search data may be collected by the profile management platform via search deployments may be imported from external sources and may be deduced from gateway activity to capture off-portal search activity. An example of base data collected, analyzed and enriched by the profile management platform may be as follows: A User ID may be collected which may be a Common Unique identifier. A Source may be collected which may be "where the search was executed". Examples of locations where search may be executed are a portal, a storefront and the like. A query may be collected which may be the keyword entered by the user. A URL may be collected which may be a URL clicked on a search result page. A location may be collected which may be a geographic location where the query was executed.

In embodiments, an ad interaction as a source may include the profile management platform collecting data about a given user's interaction with both search and display advertising. The ad interaction data may allow the system to expand the knowledge of a user to include consideration for the type of advertising they are most likely to respond to. The information may be analyzed and provided as an element within the summarized user profile. An example of a base set of data collected by the profile management platform for ad interactions may be as follows: A User ID may be collected which may be a Common Unique identifier. A provider may be collected which may be an advertisement source. Examples of an advertisement source may be a primary ad server. A context may be "where the ad was displayed". Examples of context may be a sports portal, a third party site and the like. An ad type may be details of the ad. Examples of ad details may be text, static graphic, interactive and the like. A timestamp may be the time the ad was displayed. A trigger may be "What the ad was served in response to". Examples of a trigger may be search, context, behavior, demographics and the like. An ad interaction may describe the ad success. Examples of an ad success may be click, conversion and the like.

In embodiments, browse activity as a source may include integrating both on-portal and off-portal browse data into the user profile. On-portal brose behavior may be integrated via ad tags on the operator portal. Off-portal browse behavior may be accessed via an integration with the operator gateway. The off-portal browse behavior may be a unique operator asset that the PMP may analyze to improve the relevancy of the operator search experience and the yield of operator managed advertising. A key capability of the PMP may be its ability to analyze browse traffic to understand the content and nature of pages being visited. This may be done via an enrichment process.

In embodiments, the operator CRM data and other third party data may include the PMP integrating operator specific CRM data (e.g., demographics) as well as existing segmentation data. The operator may pass explicit targeting information such as gender or age which may be used for targeting and also for enhancing the user profile. Integrating operator specific data may be supported by the base platform, but may require professional services work for the actual integration as the nature and source of the imported data may be specific to each operator. When the monetization platform provides the search and/or advertising solutions to the operator, this data may be included in the profile process and no additional integration may be required. When the search and/or advertising solution is not provided or in cases where additional operator specific data may be included (e.g., gateway browse data, demographics), the PMP may provide both a real-time web services API for data collection as well as a feed based batch process. The monetization platform may work with external data providers to determine the best method for data collection based on the quantity, value, and time-sensitivity of the data to be collected.

In embodiments, the PMP may include a number of modules to normalize the data collected from disparate data sources. In embodiments, the PMP may rely on a common user ID to combine user data from different sources. In an example, a common and reliable user ID may already exist. In some examples a hashed/encrypted user ID may be available from some sources. The user ID normalization process may integrate an algorithm or algorithmic key for decoding user IDs and accessing the base user ID for compilation with other data sources. In embodiments, the PMP may rely on having data time-stamped in a known format and time-zone. The timestamp normalization process may convert all inputs into an expected format and perform any time-zone conversions based on knowledge of the data source. In some embodiments, not all data from a given source may be provided to the PMP. In an example, a sample of the gateway access data (off-portal browse activity) may be provided. This knowledge (e.g., 50% of random activity is provided) may be incorporated into the raw data from the given source and may be used by the PMP analysis algorithms to improve the data weighting and the quality of the segmentation.

In embodiments, enrichment may include performing value-added processing of the collected data. The enrichment modules within the PMP may incorporate unique mobile user and mobile content understanding to improve the quality of the information included in the user profiles. Examples of the enrichment modules may include: URL Categorization, Entity Extraction, Query Clustering, Query Categorization, Query Differentiation, Blacklisting, User Opt-Out and Contextual Targeting Support, or some other enrichment module.

In embodiments, URL categorization may include the PMP leveraging the crawl, search, and categorization technology to understand the nature of the content being accessed by users. The PMP may maintain a database of URL classifications and an external service may enable new URLs entry into the database when an unknown site/URL is provided as an input. This service may leverage the editorially constructed training sets and learning algorithms to automatically classify unknown URLs. The categorization metadata may then be included in the raw user behavior data and may be leveraged by the profile analysis algorithms to improve the user segmentation quality.

In embodiments, entity extraction may include the PMP search algorithms analyzing accessed URLs content to determine the common entities (e.g., names, places) in the page text. This information may be distilled and included in the raw user behavior data for analysis. This process may be extended to include sentiment analysis to determine the nature of the content related to the entity. In an example, the user may frequently access information about certain kind of automobiles, but a majority of the content may be negative about the automobiles. The entity extraction process may also be a valuable input into the keywords that are associated with a user profile.

In embodiments, query clustering may include processing and summarizing of a user's query stream for analysis and inclusion into the user profile. The PMP may leverage the monetization platform's search experience and technology to provide advanced query analytics. The query clustering component may be responsible for grouping similar queries to allow for eventual categorization. The clustering component may rely on proven search tools to group similar terms and concepts based on historical analysis of millions of user searches. Spell correction technology may be used to correct queries prior to categorization.

In embodiments, query categorization may include summarizing user searches into a set of defined query categories. The PMP may use advanced search technology to assign user queries to a defined set of categories. This process may use both an editorially defined training set for associating popular keywords to categories as well as a search based process that relies on URL categorization capabilities and access to a large scale web index. The two step process may take queries that are not editorially categorized and execute a search for them against a web index. The returned URLs may then be weighted and categorized to provide a category for the given query.

In embodiments, query differentiation may include seeking to identify distinguishing terms from common and non-distinguishing terms. Many queries may provide neither segmentation nor targeting value, while other queries may provide insights in user behavior or a change in user behavior that presents a strong targeting opportunity. This knowledge may allow non-distinguishing queries to be removed (or down-weighted) from a user profile and allow more distinguishing queries to be weighted higher in the profile analysis.

In embodiments, blacklisting may include an operator defining classes of content for which user behavior is not tracked. For example, an operator may request that neither access to secure sites (i.e., https) nor access to adult sites be tracked and used in user profile creation. By default, the monetization platform may exclude adult search terms and site access from profile creation.

In embodiments, a user opt-out may include the PMP supporting user level opt-out from profiling. The PMP may accept, in batch format, a list of user IDs associated with users who may have opted out of behavioral targeting. In an embodiment, based on the implementation and the specific market and/or operator requirements, the monetization platform may implement opt-out requests to preclude all data associated to the given user ID from collection and storage in the data. In another embodiment, the monetization platform may implement opt-out request to allow data associated with the user ID to be collected and processed, but not allow summarized user profiles to be created and distributed for the given user ID.

In embodiments, contextual targeting support may include leveraging the data collected by the PMP by the contextual targeting engine within the monetization platform. The query clustering and query categorization data compiled by the PMP may be exported for use within the contextual analysis and yield optimization engine. Access to this data may allow the monetization platform to include keyword optimization as part of the yield algorithm for contextually targeted ads. For example, if the contextual analysis engine determines that 'stock tips' is the topic of a given page, the keyword clustering and categorization data may be used to expand keywords considered by the yield optimization algorithm to include related keywords such as 'investment advice' and 'trading strategies'. This technology may allow the monetization platform contextual targeting process to select the highest yielding ad possible.

In embodiments, warehousing includes the PMP leveraging a robust data warehouse built to provide real-time, on-demand access. The platform may be built on the latest data warehousing technology. The platform may be a core component in the architecture, providing both visibility and scalability. The data warehouse may be accessed by the user profile analyzer to create the summarized user profiles that are eventually made available to the monetization platform as well as other third party platforms. The data warehouse may enable summary level reports that provide insight into the archived data quality. An example of the metrics included in the reports may be Total Users: Total number of users with data in the warehouse, Profiled Users Total number of users with enough data to be placed in a segment, Recency: Histogram of profile recency (i.e., when user data was last updated) and Profile Depth Histogram of profile features (e.g., segments, keywords).

In embodiments, analysis may include leveraging normalized, cleansed, and enriched raw data from the previous steps to create a consumable user profile. The analysis portion of the PMP may include two general components. The first component may allow segments to be defined within the PMP and the second component may be the actual analysis module which performs the computational steps required to generate the user profile. The segment component may allow for definition of N number of top-level user segments (e.g., Music, Sports) and N number of secondary level segments (e.g., Pop, Football).

A segment definition may consist high-level components, including but not limited to:

Name and Description: The segment name may be exposed to services that consume the profile, as well as a segment marketing description.

Action weightings: Action weightings may be configurations that may define the relative importance of different user behaviors (e.g., click, browse, search) in determining if a given user should be associated with the segment.

Category relationships: Category relationships may define the affinity level between the browse (URL) and search (query) categories and the given segment.

Time Sensitivity Time sensitivity may define the general decay curve for how quickly historic raw user data may be discounted when determining scoring for the given segment. The ability may exist to create a window of time for which the raw user data may be given an inflated weighting in the overall segment scoring. This may allow the PMP to define segments which may be extremely sensitive to changes in user behavior and may be quickly associated with a given user, in order to take advantage of limited duration changes in user behavior (e.g., vacation shopper).

Confidence Minimum Confidence minimum may be the minimum correlation level with user behavior that is achieved in order to associate the segment with a given user.

In embodiments, the PMP may support a large number of segments. A balance between segmentation and reach may be maintained. The monetization platform may work with the operator to achieve the proper balance between segment granularity (targeting), segment reach (traffic), and available advertisers (coverage). The PMP's dual-level segmentation capabilities may allow for more granular segments to be experimented with while the top-level segmentation remains intact for targeting and ad delivery.

In embodiments, the PMP profile creation may be responsible for analyzing the user level raw data and performing the following tasks: Segment Assignment, Keyword Assignment and Metadata Assignment.

In embodiments, segment assignment may be based on the segment definitions, the analysis module scoring users may be based on segment definitions and associates users to zero or more segments, along with a confidence score. The segment assignment process may be configured to run at a periodic basis, as required by the operator and/or the change rate of the underlying raw data. The segment assignment process may be configurable to analyze different users' behavior on a different schedule than other users (e.g., the segment analysis for more active users can be done more frequently).

In embodiments, a keyword assignment process may include analyzing the user level raw data to associate a configurable number of keywords/keyphrases to specific user profiles, along with a confidence score. The keyword assignment may be based on the analysis done during the enrichment portion of the data collection process, and the final analysis and rollup may be done during the keyword assignment phase. The keyword assignment process may be configured to run at a periodic basis, as required by the operator and/or the change rate of the underlying raw data. The keyword assignment process may be configurable to analyze different users' behavior on a different schedule than other users (e.g., the segment analysis for more active users may be done more frequently).

In embodiments, metadata assignment may include the analysis and rollup of data not associated with a segment or keyword. The profile features considered may include location, operator or third party provided demographics, and user specific ad interaction rates across data sources.

In embodiments, the PMP user profile definition may result in discrete user profiles that may be accessed. The user profile characteristics may include User ID: Encrypted version, only passed with batch profile delivery, Top-Level Segment(s): The 0 to many top-level segments associated with a profile, Secondary Segment(s): The 0 to many secondary segments associated with a profile, Segment Strength: A numeric score that may represent the correlation to the segment, Keyword(s): The 0 to many keywords/key phrases associated with the profile, Keyword Strength: A numeric score that may represent the correlation to the keyword, Emergent Segment: A segment not currently associated with the user, but that recent behavior may have suggested may be assigned in the near future, Ad Interaction Summarized interaction rates for text, display, and interactive, Demographics: Operator or third party provided demographics (e.g., age, gender), Estimated Demographics Demographic data derived by the PMP based on analysis of the user behavior, Billing Location Operator provided billing location and Predominant Location: 'Home' location based on analysis of user location when interacting with the external systems (e.g., search).

In embodiments, the PMP may provide a comprehensive security layer and multiple access methods for sharing user profiles with the monetization platform and operator designated third parties.

In embodiments, the PMP may support two levels of access restrictions. The API access restrictions may include exposing user profiles via a real-time web services API as well as a batch orientated and feed based scheduler mechanism. Access to these services may be restricted based on IP restrictions and authorization key. In embodiments, a pre-defined list of allowed IPs may access the PMP user profile service. The list of IPs may be provided prior to system use. A valid authorization key may be passed as part of the profile request. Authorization keys may be unique, based on the requesting IP, and may be updated on a frequent interval. An authorization key may be used to map the request to an account to determine profile level restrictions.

In embodiments, for a given account, the PMP may support the notion of profile level restrictions. Profile level restrictions may define the set of user profile features that a given account may access. For example, an account may be created that may provide access to top-level segments and keywords while other accounts may be created that may allow full access to features included in the user profile. This may allow the PMP to share user profile data at the level required by the requesting party and provide a mechanism for the operator to offer differing levels of service/targeting to third party consumers of the profiles.

In embodiments, the PMP may support both a real-time web service API as well as a file based batch delivery mechanism. The web services API may require that a valid user ID and authorization key be passed to the system. Once the authorization key is validated, based on the requesting IP, the PMP may look up the user profile for the given user ID. The corresponding user profile may then be retrieved and the allowed profile features for the given account may be returned. The PMP may support batch based delivery of a large number of user profiles. This service may require additional professional services work to ensure that only encrypted user IDs are made available to the third party accessing the user profiles and that the third party has a valid mechanism and secure process for managing user IDs within their environment. In addition, operator approval may be required before any batch delivery of user profiles is done.

In embodiments, to allow for forecasting and targeting by segment, the monetization platform may pass the subscriber segment information to the ad providers that accept it. When an ad request comes in from an operator, the segment information may be automatically passed to the appropriate ad providers. This may allow for campaigns targeted to those segments to be retrieved as well as allow for forecasting by segment for the ad providers who support it.

In embodiments, the process for passing segments from the PMP to the MP is as follows:
  Ad server: The monetization platform may passes the subscriber segment using the keyname/value functionality in an ad server along with an ad request. Ads targeted to the segment(s) that may be passed in are then returned. If there are no ads targeted to the segment(s) passed in, untargeted ads may be returned. The same holds true for demographic data passed in with the ad request. An ad server may use the data in the keyname/value pair to build an inventory forecast for each segment. Forecasts may also be run for combinations of segments or combinations of segments with demographic or other operator-supplied information.
  Paid Search: A keyword associated with the subscriber segment or the page context may be passed to a paid search system. If there are any ads targeted to the keyword, they may be returned. For ads displayed with results triggered by a user search, the specific search keyword may be passed to paid search and matching ads may be returned.
  Other ad providers: For other ad providers who may support targeting, the monetization platform may pass segment or other subscriber information as parameters to an ad request if the ad provider supports this functionality. This may be set up during the implementation of a new ad provider.

In embodiments, targeting of advertising content may include integrating the targeting capabilities of the monetization platform with leading ad providers. Targeting campaigns to segments or other subscriber information may be dependent on the capabilities of the ad provider.

Ad server: If segment and/or subscriber information targeting is desired for a particular campaign, this may be done by using the search term wizard within an ad server. The search term wizard may allow the campaign manager to create an expression to target a particular campaign to a combination of segments and subscriber information.

In embodiments, the monetization platform may utilize all levels of targeting exposed via an ad server API. This may include use of the keyname and keyvalue pairs to create campaigns targeted to segments and/or demographics, ability to pass a keyword to the ad server for targeting. The monetization platform may be configured to pass either the actual user query segment names, segment level keywords (as defined by the PMP), or profile level keywords (as defined by the PMP) as part of the ad request. Targeting may include the ability to pass a zip code to the ad server. The monetization platform may be configured to pass either the user's current physical location (based on a location based services integration), the actual user input value (if/when available), or a known location from the user profile.

In embodiments, the monetization platform may leverage location targeting capabilities for the delivery of location specific pay per call ads. This may include the ability to pass a location to the ad server for targeting. The monetization platform may be configured to pass either the user's current physical location (e.g., based on location based services integration), the actual user input value or a known location from the user profile, or some other location information.

In embodiments, the monetization platform may be able to integrate to a third party ad provider for the delivery of targeted advertising. The degree of targeting may be limited by the third party API and/or ad serving capabilities. An optimized integration may be provided that leverages the full capabilities of the third party ad delivery system.

In embodiments, the monetization platform may support the following ad types: sponsored links, banner ads, rich media (audio/video), promotions or any other ad type. The monetization platform may support linking directly to an advertiser mobile web site or to a client application hosted landing page. The supported landing pages for sponsored links and promotions may be: phone call launch, SMS landing page, marketing message, email capture, local listing and the like.

In embodiments, sponsored links may be ads placed on search result pages as a result of a user search query. The user intent may be derived directly from the query and location targeting information included on the ad search request as well as past user behavior. In embodiments, advertisers may create and target ads and bid on relevant keywords so that their ads may appear in response to requests for sponsored links.

In embodiments, banners may be displayed during a mobile subscriber's browsing experience on a publisher site. Banners may be graphical, graphics+text, text only advertisements or similar kind of advertisements. Banners may not have as much context as sponsored links with which to derive user intent. Data such as landing page context, placement on the page and past user behavior may be taken into account when selecting an ad to serve.

In embodiments, promotions may be mobile-operator-specific keyword triggered ads that may be separate from the sponsored links auction and do not have a bid associated with them.

In embodiments, video and audio advertisements may be delivered by giving a reference to the resource file location. Tracking of interaction with video/audio ads may be provided via a 1×1 pixel that may be accessed upon impression and/or interaction with the advertisement. An ad spot and ad request for video and audio ads may include, but is not limited to, the following parameters: Bit rate, duration, format, click-through URL, dimensions (video only), and placement (video only and includes values such as pre-roll or post-roll).

In embodiments, landing pages may be displayed. A phone call launch may include presenting a message and optional image to the user along with a phone number which they can click-to-call. An SMS landing page may present a message and SMS short code along with any subscription/pricing information. If there is an integration with the carrier SMS, the subscriber may have an option to trigger an SMS from the landing page. A message with instructions for sending the SMS may be displayed.

In embodiments, a marketing message may include a title, description and optional image displayed to the user.

In embodiments, an email capture may include a title, description and optional image displayed to the user along with an edit box where they enter their e-mail address for follow-up by the advertiser. A confirmation page may be displayed after the e-mail address is collected.

In embodiments, the local listing landing page may represent a phone book style listing, typically for a business. This may contain ad text, an image, a phone number, a street address, a city, a state, a zip and distance from the user's location.

In embodiments, a coupon landing page may be added as a supported type. A coupon landing page may allow an advertiser to create an offer, targeted based on existing monetization platform capabilities, and then subsequently track interactions with, and redemption, of the offer.

In embodiments, the monetization platform setup and management may be executed as part of the operator/publisher implementation process. Operators or publishers may not have direct access to the monetization platform administration console.

In embodiments, the monetization platform setup may include an ad spot setup. Users may create new ad spots or modify existing ad spots within the monetization platform. Each ad spot may contain a unique set of ad types, ad providers and business rules that may determine what kinds of ads may be eligible to be displayed in a particular ad spot and which ad providers may be called to retrieve ads for that particular advertisement spot.

In embodiments, an advertisement spot setup screen may include fields/parameters such as Name, Description, Description, Default ad provider, Offline, Adult content, Listing Type, Ad Limit or some other feature. Name may be name of the ad spot that is exposed externally via the monetization platform API. It might not contain spaces. Description may include a description of a particular ad spot. This may be for internal use only. A default ad provider may be applicable if ads are returned for this spot. This may be the ad provider of last resort if no other ads are returned. If the Offline field is unchecked it may mean that the activity reporting (impressions and click-throughs) for this ad spot are handled by the monetization platform and the ad provider at the time the impression or click-through occurs. If the Offline field is checked it may mean that the publisher is responsible for reporting back impression and click-through data to the monetization platform using the API. This may be applicable to ads displayed in client applications which may not be online at the time an ad is displayed. The field adult content may include one of 'Allowed,' 'NotAllowed,' or 'Only.' 'Allowed' may indicate that adult ads may be returned with the ad response in addition to non-adult ads. 'NotAllowed' may indicate that adult ads may not be returned with the ad response. 'Only' may indicate only return adult ads with the ad response. 'Listing Type' may include 'promotion', 'bid' or 'mixed'. Typically, this may be set to Bid. Promotion or Mixed listings may be only used when paid search promotional ads are to be returned to a particular ad spot. 'Ad Limit' may indicate the maximum number of ads to return in the ad response.

In embodiments, as part of the integration with ad providers, various parameters may be set up and may be passed with each request. Some parameters may be constant across all ad spots for a given ad provider and some may be modified for each ad spot. The monetization platform may display the parameters for the selected ad provider and the user may add parameters and their associated values or edit existing parameters and values. Parameters may be ad provider specific and the values for ad spots may be managed by the campaign management team.

In embodiments, integration with new ad providers may be handled by the integration team. The mapping of ad types and ad providers may be handled within the monetization platform. New ad providers may be added to an ad spot or ad spots.

A monetization platform, as described herein, may enable defining and cataloging advertisement inventories as a tiered network of networks/sites. In embodiments, an advertisement inventory may be defined by sites, site groups, a section, a page, a position, or some other characteristic.

The monetization platform may enable defining frequency capping span and sequencing rules configurable at network and site definition level. In embodiments, the frequency capping may be defined per session. The creatives may be given a sequence to be shown to the users.

The monetization platform may enable supporting directory services as a site inventory within the network hierarchy. In embodiments, the monetization platform may make calls to multiple sources of inventory. The multiple sources of inventory may be included in the site inventory.

The monetization platform may update the ad network, sites and inventory. In embodiments, sites, site groups, sections, pages and positions can be modified within an ad server interface. Ad spots may be added and configured to retrieve different ad types from multiple ad providers within the monetization platform.

In an embodiment, the monetization platform may have the changes taking effect immediately. In another embodiment, the changes may be designated date-effective. In embodiments, additions to sites, site groups, sections, pages and positions may be reflected immediately in the interface. Campaign updates may be reflected within a few minutes of making an update and may be set up to be effective on a specific date.

The monetization platform may package ad targeting parameters (e.g., geographic, demographic, etc.) inherent in the system in a way that is easy for sales to use. In an example, geographic targeting may be packaged into a company's divisions.

The monetization platform, as described herein, may enable packaging advertisement trafficking parameters inherent in the system. Examples of advertisement trafficking parameters may include national, local, daypart, queuing, frequency, or other type of parameters. The packaging may be done in a way that is easy for sales to use. For example, the packaging of group daypart may be done as morning, afternoon, primetime, or in any other way. In embodiments, forecasts may be generated for any key/value pair. Standard forecasts may include sites, site groups, sections, pages and positions. For any other parameters, key/value pairs may be passed to be included in an inventory report.

The monetization platform, as described herein, may enable setting up user profile criteria. Embodiments of user profile criteria may include user identity, declared and/or inferred demographics, preferences, sites visited, content consumed, or any other type of criteria as described herein. In embodiments, the profiles themselves and the criteria and thresholds for inclusion may be configurable. In embodiments, some custom development may be required based on network requirements, ingestion of profile criteria from the network, interfaces with other systems, or any other basis.

The monetization platform, as described herein, may enable maintaining and updating user profile criteria. In embodiments, user profile criteria may be updated automatically. In embodiments, the automatic updating may be online, for example by search streams browse activity, ad interactions, enriched data passed in with the ad request, or any other online methodology. In embodiments, automatic updating may be offline. Examples of offline updating may involve loading profile data into a profile management platform in an offline manner.

The monetization platform, as described herein, may enable entering advertisement serving criteria. In embodiments, advertisement serving criteria may be passed in with the advertisement request and the criteria for delivering a particular campaign is set up within the ad server.

The monetization platform, as described herein, may enable packaging advertisement serving criteria. In embodiments, arbitrary expressions for campaign targeting may be set up within the campaign using combinations of key/value pairs.

The monetization platform, as described herein, may enable entering pricing criteria. In embodiments, the pricing criteria may be in accordance with IAB, NAB, MMA, CAB, standards such as CPC, CPM, or any other standard, or network pricing requirements, among other requirements. In embodiments, CPM, CPC, CPA and flat rate (sponsorship) models may be supported for primary ad serving.

The monetization platform, as described herein, may enable packaging pricing criteria in accordance with IAB, NAB, MMA, CAB, standards such as CPC, CPM, or any other standards, or network pricing requirements, among other requirements. In embodiments, the pricing models described above may be combined within a campaign or multiple campaigns may be set up to accommodate widely varying pricing criteria.

The monetization platform, as described herein, may enable storing campaign data for recall on future campaigns. In embodiments, campaign data may be accessed via the reporting system.

The monetization platform, as described herein, may enable storing hard coded advertisements for recall on future campaigns. In embodiments, existing campaigns and creatives may be copied and used for future campaigns.

The monetization platform, as described herein, may enable reserving inventory for a siloed campaign prior to entry of an insertion order. In embodiments, campaigns in An ad server may be set to 'reserved' status in order to reserve inventory prior to IO entry.

The monetization platform, as described herein, may enable reserving inventory for multiple screen campaigns prior to entry of an insertion order. In embodiments, inventory may be reserved for campaigns targeted to multiple sites or site groups.

The monetization platform, as described herein, may enable preempting previously reserved inventory. In embodiments, preempting may be performed on the basis of priority, advertiser, or any other criteria.

The monetization platform, as described herein, may enable forecasting revenue in aggregate. In embodiments, the forecasting may be performed by campaigns based on criteria like ratings, CPM, CPA, click-to-call, reach and frequency, duration of run, or some other type of criteria. In embodiments, campaign groups may allow for revenue forecasting based on campaign selection criteria.

The monetization platform, as described herein, may enable forecasting revenue in aggregate across/within silos. The forecasting may be based on criteria like ratings, CPM, CPA, click-to-call, reach and frequency, duration of run, or some other type of criteria. In embodiments, campaign groups may allow for revenue forecasting based on campaign selection criteria in aggregate or within site-targeted silos.

The monetization platform, as described herein, may enable forecasting inventory aggregated across or within silos of the tiered network for RFP response. These may include type of advertisements, flighting, location (site selection), packages, size of advertisements, or some other criteria. In embodiments, campaign groups may allow for revenue forecasting based on campaign selection criteria in aggregate or within site-targeted silos.

The monetization platform, as described herein, may enable identifying available audience characteristics for marketing, proposals and RFP response. Embodiments of audience characteristics may include specific demographics (including age, sex, income, profession, or any other demographic information), channel, interest group, relevance, product purchase behavior, product usage, media usage, or some other type of audience characteristic. In embodiments, these criteria may be passed in as key/value pairs.

The monetization platform, as described herein, may enable supporting sales credit. In embodiments, campaigns may be grouped by salesperson via the campaign groups feature.

The monetization platform, as described herein, may enable supporting sales commissioning. In embodiments, a sales rep and commission percentage may be entered for each campaign.

The monetization platform, as described herein, may enable providing a dashboard view across all screens. In embodiments, the summary/dashboard view may be provided across sites, site groups and sections allowing for an overview of performance across all screens.

The monetization platform, as described herein, may enable alerting sales through email, dashboard, or some other type of medium, when campaign is not meeting objectives. In embodiments, notifications may be sent for a campaign. These notifications may include: beginning of campaign, end-of-campaign, daily over-delivery, daily under-delivery, lifetime under-delivery, lifetime over-delivery, weekly & monthly campaign reports, end of campaign reports, or some other type of notification.

The monetization platform, as described herein, may enable integrating with a CRM system to manage life cycle account sales. In embodiments, a flexible API may be used to integrate with CRM systems for sales management.

The monetization platform, as described herein, may enable adding new targeting criteria to the system. In embodiments, targeting parameters may be added at any time and passed in to a monetization platform. These parameters may be passed to and processed by the profile management platform and the passed to the advertisement server. Because of the flexible nature of the key name or value targeting, new criteria may be passed in or added to the profile and when campaigns are targeted to the new key name/value pairs, the appropriate ad may be returned. These new criteria may also be added to inventory forecasts.

The monetization platform, as described herein, may enable targeting on publisher defined targeting criteria. In embodiments, key name/value pairs may be passed in by the publisher and campaigns targeted to those key name/values may be returned when they match.

The monetization platform, as described herein, may enable interfacing with other advertisement serving vendors on additional platforms.

The monetization platform, as described herein, may enable targeting using extensive day-part parameters. Embodiments of day-part parameters that may be targeted may include time of day, day of week, hour of day, or some other parameter.

The monetization platform, as described herein, may enable targeting using extensive demographic profiles.

Examples of demographic profile may include age, gender, income, or some other type of parameter as described herein. In embodiments, these criteria may be combined with each other or other targeting criteria and ranges of values may be targeted.

The monetization platform, as described herein, may enable targeting using extensive psychographic profiles. Examples of psychographic profiles may include PRISM. In embodiments, psychographic targeting may be performed using search, browsing, context, ad interaction data, or some other type of technique.

The monetization platform, as described herein, may enable targeting using extensive geographic profiles. Examples of geographic profiles may include continent, country, state, city, zip, triangulation, DMA, zone, telephone code or some other type of geographic parameter. In embodiments, geographic targeting may depend on the advertisement provider.

The monetization platform, as described herein, may enable targeting using extensive techno-graphic parameters. Examples of techno-graphic parameters may include IP address, browser, device type, or some other type of parameters. In embodiments, the monetization platform may be detect and classify the device. In embodiments, handset make, model, and handset capabilities may be determined. The appropriate advertisement format may be selected based on handset capabilities. In addition, handset make, model and specific handset capabilities may be targeted. In embodiments, IP address, browser, OS, domain, bandwidth, or some other type of network parameter may be targeted for online advertisement serving.

The monetization platform, as described herein, may enable targeting using advanced keyword search or keyword-value pair algorithms. In embodiments, the monetization platform may pass keyword or key value pairs to any advertisement provider. These keyword or key value targeting mechanisms may be publisher initiated (included in the ad request) or internal to the monetization platform. In embodiments, for any keyword passed in to the paid search system, the set of relevant ads based on the keyword, match type and targeting criteria may be returned. In embodiments, arbitrary keyword or key name/value targeting may be available for campaigns. Expressions may be used to combine key name/value pairs for complex targeting.

The monetization platform, as described herein, may enable targeting using advanced contextual relevance algorithms. In embodiments, entity extraction may be performed on pages crawled and visited to be able to classify pages and allow for contextual targeting.

The monetization platform, as described herein, may enable targeting using advanced behavioral relevance algorithms. In embodiments, the profile management platform may use a combination of search behavior, browsing behavior, advertisement activity and user data to create a behavioral profile. A user may be classified into appropriate segments and keywords may be stored within profiles.

The monetization platform, as described herein, may enable targeting an advertisement to a channel or program based on defined content. In embodiments, the monetization platform advertisement spots may be set up to correspond to a particular channel or program. This information may then be passed to the appropriate advertisement provider. In embodiments, a channel or program may be targeted by making it a page within the system or by passing the appropriate targeting parameters.

The monetization platform, as described herein, may enable targeting based on location of user (LBS), using either TODA based technology or GPS based technology. In embodiments, location parameters may be passed in to the monetization platform which may pass them on to an advertisement provider for geographic targeting.

The monetization platform, as described herein, may enable supporting full inventory of mobile device targeting and creative abstraction or translation. In embodiments, appropriate targeting parameters may be passed in to the advertisement server to select the right creative size. In addition, information pertaining to handset make and model may be passed as targeting parameters to allow for handset make and model forecasting and targeting.

The monetization platform, as described herein, may enable interfacing with an external relevance engine to facilitate advertisement targeting.

The monetization platform, as described herein, may enable interfacing with third party targeting systems.

The monetization platform, as described herein, may enable supporting personalization and targeted advertising based on subscriber preferences. Examples of such preferences may include preferences volunteered by the user in the process of registering or requesting information, or any other type of preferences. In embodiments, subscriber preferences may be stored with the user profile in the Profile Management Platform. This information may be added to the rules used to generate user segments, or may be used for targeting.

The monetization platform, as described herein, may enable accepting interest scores as user attributes and as advertisement attributes, and deliver advertisements based on matches on those attributes. Examples of interests may include interest in sports, interest in a music genre, or some other type of interest. In embodiments, the interest scores may be implemented as key value pairs which may be used to generate forecasts and target campaigns. New attributes may be added by adding the appropriate key value pair.

Figure 31:
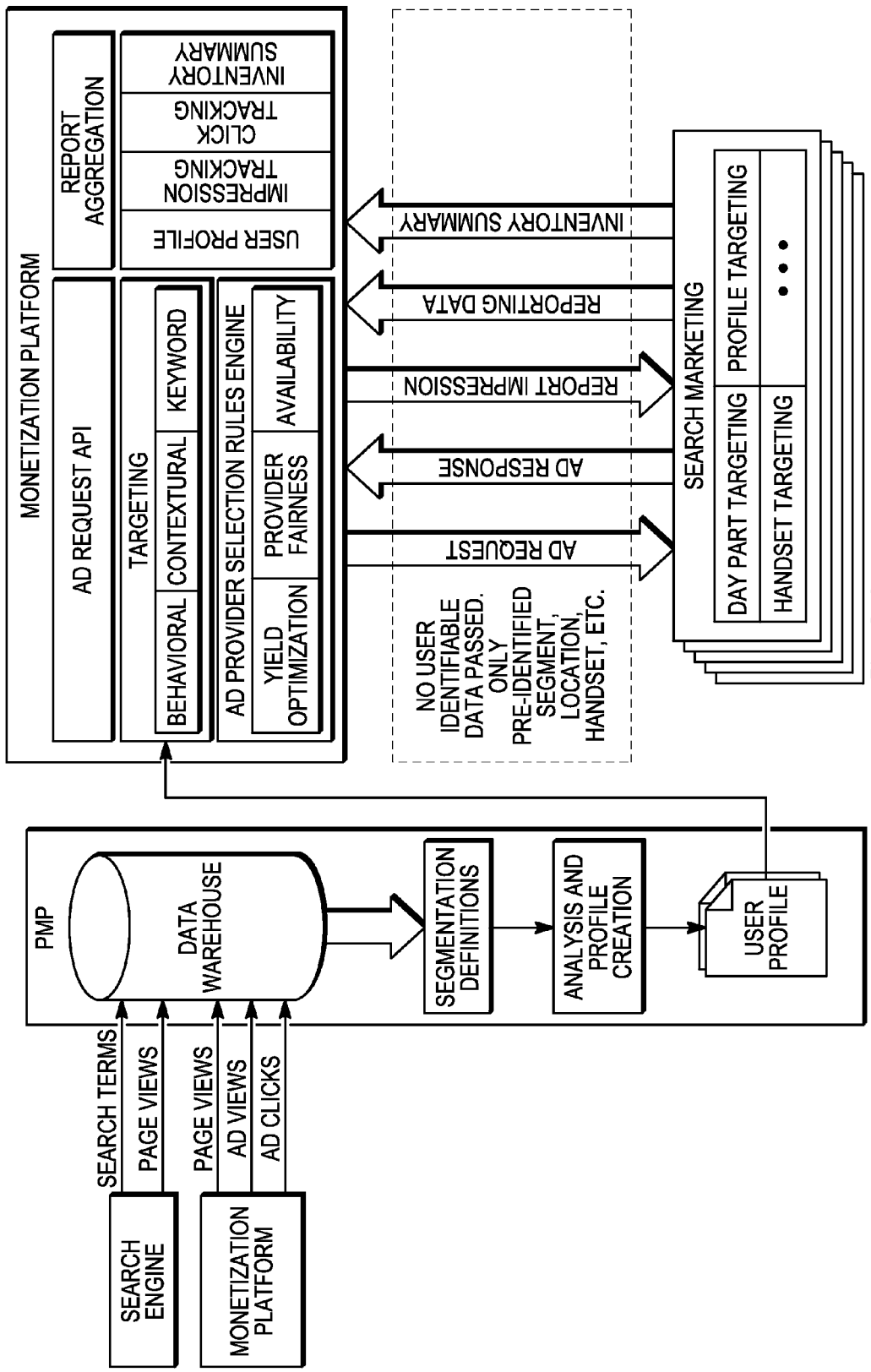
FIG. 31 depicts a generalized method for blocking user identifiable data within a monetization platform.

Referring to FIG. 31, the monetization platform, as described herein, may enable masking a subscriber to external parties using randomly generated identifiers or 'matched key pairs' with defined lifecycle, correlation, tracking, and reporting capabilities. In embodiments, the monetization platform may pass a hashed version of a user id to advertisement providers for targeting. In addition, targeting may be achieved by passing the targeting parameters as name value pairs.

The monetization platform may create an insertion order, update insertion orders, create orders from templates and from an existing campaign order. An ad server contract management module may provide for insertion order creation and workflow.

The monetization platform may schedule ads/campaigns supporting all industry ad sales practices. Campaigns may be created with CPM, CPC, CPA, fixed price or a combination.

The monetization platform may weight campaign delivery by objective, across network/sites, in fixed or percent allocations. Campaign weight and priority may be set per campaign and adjusted to meet campaign goals.

The monetization platform may support frequency capping span, sequencing rules configurable at campaign level. Frequency capping may be set for impressions or clicks for the following time periods: session, hourly, daily, weekly, monthly, lifetime. Ad sequencing may be set up per creative to determine the order that ads appear to a given user.

The monetization platform may interface with various Customer Relationship Management, Advertiser Buy Side, and third Party Sales systems to facilitate ad sales and automate campaign insertion order ingestion. Third party systems may integrate with the an ad server API to set up campaigns and creatives and for IO ingestion.

The monetization platform may integrate with one or more content management (CMS) and/or digital asset management (DAM) systems to automate ad creative workflow—ingestion, through trafficking and publishing. Third party systems may integrate with the an ad server API to set up campaigns and creatives and for IO ingestion.

The monetization platform may upload ad content via the ACM user interface, or the content management system user interface. Ad content/creative may be uploaded via the an ad server interface.

The monetization platform may auto detect the ad parameters under manual or bulk ingestion. Bulk ingestion may be available via the an ad server API.

The monetization platform may auto create metadata (for ad size, format, etc.) under manual or bulk ingestion. Bulk ingestion may be available via the an ad server API.

The monetization platform may bulk upload ad content via FTP. Bulk ingestion may be available via the an ad server API.

The monetization platform may encode and transcode digital video ad content. Digital video encoding and transcoding may be provided as a professional service.

The monetization platform may stage and publish ad content to ad servers. When campaigns are set to run live, they may be automatically staged and published.

The monetization platform may preview ad content in context. Ad/creative previews may be available within an ad server.

The monetization platform may test ad content in context. The paid search system may allow advertisers to see previews of their ads. For an ad server, a preview of an ad may be seen, but it may not be in a mobile context.

The monetization platform may stage and publish digital video ad content to the Content Delivery Network (CDN). An ad server may push content to CDN as a built-in function. For streaming content may be hosted and/or pushed to CDN, an additional CPM bandwidth charge may be applied.

The monetization platform may update in real time the catalog of available inventory including type of ads, audience, flighting, location (web site selection), packages and size of ad. Sites, site groups, sections, pages and positions may be modified in the an ad server UI in real time or uploaded via an Excel template.

The monetization platform may update projected inventory based on history, seasonality and the like. Ad server forecasts may project inventory based on history and choice of forecasting algorithm and seasonal multipliers.

The monetization platform may project inventory forecasts out one year. An ad server may offer inventory forecasts for up to one year.

The monetization platform may adjust in-flight campaigns based on new/revised inventory forecasts to improve yield. Campaign priority or targeting may be modified to account for revised inventory forecasts.

The monetization platform may allocate inventory for different buy types. Inventory may be allocated by site, site group, section, page and location. These entities may be used for national/local/promotion buy types.

The monetization platform may set priorities during the reservation stage. In embodiments, the monetization platform may set priorities during the actual booking stage.

The monetization platform may identify when inventory is over-subscribed (based on publisher defined thresholds). This may be done by detailing inventory reports booked versus available inventory.

The monetization platform may use AD-ID (Advertising Digital Identification) to standardize asset identification. An ad server may allow for client-defined AD-ID.

The monetization platform may receive ad calls from any service delivery platforms client-side or server-side. Typical implementation for mobile may be a server-side delivery.

The monetization platform may serve optimal ad calls to any service delivery platforms client-side or server-side. The monetization platform may retrieve the best ad from the right ad provider based on the ad request, user profile, business rules and other optimization parameters. The monetization platform may retrieve the best ad from the right ad provider based on the ad request, user profile, business rules and other optimization parameters.

The monetization platform may determine optimal ad to deliver in real-time based on targeting. The combination of targeting criteria and campaign priority may ensure that the best ad is being returned for any given ad request. If multiple campaigns may return an ad for the same ad request, but one has a higher CPM, campaign priority may return the higher priority ad.

The monetization platform may determine optimal ad to deliver in real-time based on revenue. Within an ad server, campaigns may be prioritized based on CPM or CPM and the optimal ad can be returned for a given request. The monetization platform may have the ability to optimize across ad providers, but need ad providers to supply the appropriate meta-data.

The monetization platform may determine an optimal ad to deliver in real-time based on fulfillment status. The monetization platform may have a fallback business rule that may allow for calling additional ad providers if the first ad provider does not return an ad.

The monetization platform may have ad serving decision rules support frequency capping. Frequency capping may be defined per session, hour, day, week, month, lifetime. Creatives may be given a sequence to be shown to users.

The monetization platform may have ad serving decision rules support ad sequencing. Within a campaign, creatives may be given a sequence to be shown to users.

The monetization platform may receive/respond to ad calls from html, JavaScript, LFrame, AJAX, flash and the like. The monetization platform may be agnostic to the source of an ad request and can return responses to any platform that is capable of sending an ad request and receiving a response.

The monetization platform may recognize that a user has opted-in or opted-out for advertisements before serving a targeted ad. The profile management platform may store the user's opt-out/opt-in status and the monetization platform may not return an ad for opted out users.

The monetization platform may enable accurate, reliable logging of ads served as response to ad calls from service delivery platform. Both the monetization platform and an ad server may log ad calls.

The monetization platform may log the delivery of the ad (upon receipt of successful delivery notification from the service delivery platform). The monetization platform may log the delivery of text ads and offline ads.

The monetization platform may serve keyword search ads—mobile. The paid search engine, which is tightly integrated with the monetization platform may support an advertiser self-service interface, a multi-currency, multi-language platform and a set of keyword/domain blacklist tools for carriers/publishers.

The monetization platform may serve interactive ads such as polling, voting, quiz, contest, sweepstakes ads (applications)—mobile.

The monetization platform may serve long form video ads to the platforms—mobile. The ads may be served ads on mobile that a user clicks to from a landing page. It may support the ability to pass a reference to a video asset which may be used as a standalone, pre-, post- or mid-roll ad.

The monetization platform may serve classified ads across all platforms. Text ads may be hosted in an ad server or by a specialty ad provider and the monetization platform may serve the classified ads.

The monetization platform may serve rich media (e.g., Eyeblaster) ads to the platforms—mobile. The monetization platform may support rich media ad capabilities such as JavaScript or Flash.

The monetization platform may serve an advergame (application)—mobile.

The monetization platform may provide contracted custom sponsored games. The monetization platform may also be able to serve ads into games where the game provider makes the appropriate ad request.

The monetization platform may serve banner ads (graphics)—mobile.

The monetization platform may serve bookend ads for streaming video—mobile.

The monetization platform may serve in-stream video ads for streaming video—mobile.

The monetization platform may serve Podcast Ads—mobile.

The monetization platform may serve interstitial ads—mobile, viral ads—mobile, email direct marketing campaigns—mobile, blogs and/or social networks—mobile, sponsorships—mobile and the like. It may serve mobile ads based on ad requests. Additional viral functionality would need to be implemented by a third party. Serving an ad into a blog or a social network on mobile is executed the same way that serving a banner into a mobile web page is executed. Sponsorships for a web site, section or page may be supported.

The monetization platform may integrate with one or more external ad store or content deliver network systems. Creatives may be pulled from external ad servers or ad stores—a reference to an external creative may be placed in the creative definition.

The monetization platform may provide internal ad store or content delivery component. Images and other component files (e.g. XHTML) may be uploaded and stored by an ad server.

The monetization platform may interface with various mobile or delivery infrastructures to facilitate ad delivery.

The monetization platform may receive ad triggers and issue ad calls from any service delivery platforms client-side or server-side.

The monetization platform may track partially viewed ads. The monetization platform API may include a server-to-server API service that may allow for the notification of ad activity and duration.

The monetization platform may track fully viewed ads. For images, an ad server tracks the delivery of the image. For other ad types (video, audio), the monetization platform supports a server-to-server API call that signals when an ad impression is complete.

The monetization platform may track conversions and direct response actions.

The monetization platform may deliver rich user profile to the ad server (e.g., user ID, declared demographics, preferences, sites visited, content consumed, etc.).

The monetization platform may deliver universal rich user profile to the ad server (e.g., user ID, declared demographics, preferences, sites visited, content consumed, etc.).

The monetization platform may federate a single identify/profile across all screens. If the same ID is passed to the monetization platform across screens, all profile information may be federated.

The monetization platform may issue ad call to ad server for all types of portal ads (e.g., interactive, long form video, Podcast, rich media, instant messaging, etc.). The monetization platform may make calls to the ad server for supported ads.

The monetization platform may retrieve ad assets from within the service delivery network and external to the service delivery network.

The monetization platform may issue an ad call when a user interacts with streaming video content (e.g., start/stop/rewinds/forwards/pauses skip avoidance). Dependent on functionality being available in streaming video content platform.

The monetization platform may collect behavioral relevance and pass in the ad call, may collect contextual relevance and pass in the ad call, may facilitate direct response transaction and log initiation/completion. Behavioral relevance may be pulled from the profile management platform by the monetization platform and passed in keyname/value pairs to an ad server and other ad providers. Contextual data stored by the profile management platform may be passed in the ad call as a keyname/value pair.

The monetization platform may pass keyword search query results in an ad call. Keyword search ads may be pulled from the paid search engine by the monetization platform. The response may include appropriately targeted paid search text ads. A keyword may also be passed to the ad server or ad network in order to return keyword-targeted banner or other ads.

The monetization platform may pass location/GIS info in ad call. A location parameter may be included in the monetization platform API and is passed onto ad providers for targeting.

The monetization platform may serve click-to-call ads. It may support a click-to-call landing page.

The monetization platform may serve click-to-buy ads. Users may be sent to an on- or off-portal product detail page from which they may make a purchase.

The monetization platform may serve click-to-applications ads where users are sent to a purchase or download page for an application.

The monetization platform may integrate with one or more external ad delivery systems or ad campaign management systems. The monetization platform may connect to multiple ad platforms.

The monetization platform may add extended ad metadata fields via data driven interfaces. Within an ad server, rich media ad templates may be used to provide arbitrary markup for an ad.

The monetization platform may return a list of the last pages viewed by a particular user, with timestamps on each page view. The monetization platform may log ad requests and user ID along with other request information. Implementing a user interface to retrieve this information may be custom work.

The monetization platform may serve instant messaging, SMS, MMS ads to the Mobile platform.

The monetization platform may serve a system wide ad on the wireless portal start page to the mobile platform.

The monetization platform may serve ads optimizing campaign objectives, across sponsorships, CPM, CPC, CPA, blends of above. Within an ad server ads are served based on their targeting criteria and prioritization. The yield manager can be used to optimize for eCPM. An ad server may select the best ad for a request given its targeting and priority.

The monetization platform may serve optimizing campaign revenue, across sponsorships, CPM, CPC, CPA, blends of above. The monetization platform may look at the eCPM across ad providers and select the best ad provider for the given request.

The monetization platform may monitor campaign status (e.g., expiring campaigns, behind schedule campaigns, etc.). An ad server may have the ability to delivery campaign notifications for campaign start, end and for daily or lifetime over/under delivery.

The monetization platform may optimize campaign performance attainment by reallocation of campaign objectives (e.g., scheduling, flighting, objectives, weighting, etc.) across multiple screens, taking effect in real-time. The monetization platform may optimize revenue attainment by reallocation of campaign objectives (e.g., scheduling, flighting, objectives, weighting, etc.). Campaign priority may be used for revenue optimization, based at least in part by assigning priority levels to various CPM ranges, higher revenue generating ads will receive priority.

The monetization platform may adjust campaign based on changing inventory forecasts. The number of impressions, clicks, targeting or flight dates of a campaign can easily be changed to handle changed inventory forecasts.

The monetization platform may adjust campaign based on changing campaign funnel. Campaign information may be changed at any time during its run.

The monetization platform may adjust in-flight campaigns based on new/revised inventory. The number of impressions, clicks, targeting or flight dates of a campaign can easily be changed to handle changed inventory forecasts.

The monetization platform may reconcile ad delivery to contracted terms. Campaign reporting may verify that ad delivery matched contracted terms.

The monetization platform may generate invoices per contracted terms.

The monetization platform may generate integrated invoices per contracted terms. The invoice report may be based on the contracted terms entered for the associated campaign(s).

The monetization platform may generate periodic invoices (e.g., end of the month) by type as well as final invoices for a campaign. Invoice reports may be generated for a defined date range.

The monetization platform may generate periodic integrated invoices (e.g., end of the month) by type as well as final invoices for a campaign.

The monetization platform may bill premium charges based on conversions.

The monetization platform may send paper invoices to advertisers, agencies, or third party billing agencies. An invoice report may be printed out and delivered to third parties.

The monetization platform may send electronic invoices to advertisers, agencies, or third party billing agencies. An exported invoice report may be delivered electronically.

The monetization platform may issue make-goods/credits for under delivery or bonuses for over delivery of a campaign. Additional make-good impressions or clicks can be added to a campaign during its run.

The monetization platform may select make-goods credits appear or not on invoice.

The monetization platform may select bonuses to appear or not on invoice.

The monetization platform may interface to financial management systems to book revenue. This may be available via an ad server reporting API.

The monetization platform may interface to financial management systems to manage accounts receivable. This may be available via an ad server reporting API.

The monetization platform may generate reports in industry standard formats. Reports may be generated in XML, Excel and delimited formats.

The monetization platform may generate booked/unbooked inventory reports (revenue, utilization). An ad server inventory reports include booked and unbooked inventory.

The monetization platform may store historical campaign reports and analysis. Historical reports may be available within an ad server for the previous 24 months.

The monetization platform may make accessible historical campaign reports and analysis. Reports may be made available to external users and granular access may be given so that users only have access to the appropriate data.

The monetization platform may generate revenue and yield performance analytics (business intelligence), by campaign, customer, roll-up. Revenue reports by account, advertiser, agency, campaign, site, site group, section, page and position may be available.

The monetization platform may create custom reports. Custom reports can be defined to include specific campaign data and ordering and that include a user-defined time period roll up. In addition, there are hundreds of available standard delivery, revenue and forecasting reports with most conceivable combinations of data and grouping.

The monetization platform may create ad hoc reports. Users may log-in to run ad-hoc reports for accounts, advertisers, agencies, campaigns, campaign groups, sites, site groups, sections, pages, keywords. Access control may be granted so that users only have access to the appropriate reports.

The monetization platform may schedule reports. An ad server may have the ability to deliver campaign reports weekly, monthly, at campaign start, end and for daily or lifetime over/under delivery.

The monetization platform may deliver reports via email, FTP. Reports can be delivered via e-mail. Other report delivery may be custom.

The monetization platform may generate alerts when campaign is not meeting objectives or have oversell issues. An ad server may have the ability to delivery campaign alerts for campaign start, end and for daily or lifetime over/under delivery.

The monetization platform may deliver alerts (e.g., via email, dashboard, etc.) if a campaign is not meeting objectives or have oversell issues. An ad server may have the ability to delivery campaign alerts for campaign start, end and for daily or lifetime over/under delivery.

The monetization platform may provide data logs to third parties for auditing of ad delivery.

The monetization platform may evaluate actual campaign performance against projections. An ad server may provide reports that show scheduled impressions & clicks versus actuals.

The monetization platform may track and report on raw click stream data for all ads served (i.e. click through rates, etc.). The monetization platform may log ad requests and responses and this information can be delivered periodically via a data feed if required.

The monetization platform may generate real time hierarchical campaign performance reports (over/under delivery and trend extrapolation), by customer, screen, roll-up. Campaign reports by site, site group, section, page and position may be generated.

The monetization platform may adhere to PII compliance regulations (disclosure of collected data, use, opt-out, etc.). It may store a hashed version of the user ID so no PII is stored with a user profile. In addition, opt-out preferences are stored with the user profile.

The monetization platform may provide a latency of less than 10 ms while processing each request or response.

The monetization platform may provide an ASP version of the application, may provide a full functional Enterprise version.

The monetization platform may support custom data attributes for trafficking, custom key value pairs for trafficking, custom attributes for targeting, custom key value pairs for targeting, custom attributes for user profile, custom key value pairs for user profile. The profile management platform supports custom attributes. The monetization platform in conjunction with the profile management platform can be configured to store and pass custom key value pairs. These are added to the ad request.

The monetization platform may provide hardware installation documentation if applicable, provide application software documentation and any required third party software documentation, provide complete installation, configuration, and setup documentation, may supply a list of all vendor-supplied software that is part of their solution, may supply a list of all third party software necessary for the operation of the system, may provide a list of recommended hardware platforms, operating systems, and versions required for the system.

The monetization platform may provide a list of all documentation that is included free of charge to support system installation, maintenance, support, training, system and technical manuals, and instruction procedures, provide a hard copy and CD-ROM documentation for the system at no additional charge, provide a document for all single points of failure within the system, may provide documentation of the software and hardware upgrade procedures, may handle temporary interruptions to the services infrastructure—for example, loss of network or database connectivity, may run across multiple servers, may indicate how the system processes the ability to operate with reduced functionality when parts of the infrastructure are not present when a server fails.

The monetization platform may operate with reduced functionality when parts of the infrastructure are not present, may provide notification of an interruption to the respective endpoint, may have ability for the system to return to normal operation after infrastructure interruptions have completed, may have ability for the system to handle database connectivity interruptions (if applicable).

The monetization platform may provide the following minimal set of documentation covering platform operations in Word or PDF format: User Guide, System Administration Manual, Developer's Guide (if applicable), Release notes, Upgrade instructions, Javadocs (if applicable).

The monetization platform may provide documentation for the system real-time statistics and counters related to metrics for the following (as applicable): Network throughput, User response times and Sessions processed.

The monetization platform may provide training for installation and maintenance of the system, user training for administration of the system, user training for the end users of the system and training for the application development extensions, if applicable. Administrator training may be provided for profile definition, system setup, forecasting, campaign management, and reporting. User training may be provided for forecasting, campaign management and reporting. Training for Monetization Platform API integration and any other integration identified may be provided.

In embodiments, the monetization platform may support a database, including but not limited to MySQL. In embodiments, the monetization platform may be further associated with third party software, including but not limited to Apache, Tomcat, MySQL, or some other third party software product, module, or code (including binary or source code).

In embodiments, user actions may be digested by the profile platform. User events may be fed into the system real-time (as they occur), or in batch depending on the requirements and the type of events that are being generated. Out of the box, digestions of search events (queries and clicks on results), ad events (impressions and clicks), purchase events, and browsing events may be supported. As these events come in, they may be analyzed and tagged with meta information, such as the category. The events may be then digested by the Analytics application, where it may be aggregated and made available to the profile generator. The profile generator may be responsible for looking at the aggregated information, and updating the users profile accordingly.

In embodiments, the profile system may have two core integration points. The first may be to feed events into the system, and the second may be to request profiles. To feed events into the Profile system, there may be two interfaces. The first may be a web service interface (based on REST). This interface may allow communication of events as they happen. The second may be a batch process using file transfer (files may be deposited to the system using SCP, or may retrieve files from a defined location HTTPS/SCP). To retrieve profiles or ads, a web service interface may be available.

In embodiments, the monetization platform may be integrated with several ad networks. There may be two or more mechanisms to integrate with an ad network. One mechanism may be an API integration in which the monetization platform invokes a web service hosted by the ad network. Alternately, the market place may be synchronized out of the ad network and into the monetization platform.

In embodiments, an ad server may provide an API that may be used for ad content ingestion, metadata management, content cataloguing and creative management.

In embodiments, an ad server may push data to a CDN as a built-in function.

In embodiments, the monetization platform may be integrated with a relevance engine. In embodiments, a custom integration may consist of defining data that is passed from the relevance engine and the rules that should be applied for segmentation. Targeting and ad serving may also need to be defined. To the extent that data from the CRM system may be used to generate profiles, a data format for the data to be supplied to the monetization platform may need to be defined. For the ad server, integration with many of these systems may use of an ad server API which may be used to set up entities within the system including campaigns and creatives. It may also be used to retrieve campaign delivery and billing information to be integrated with billing systems. Integration with external ad stores may be accomplished by placing a reference to the hosted creative within an ad server or through the built in ability to push data to a content delivery network.

In embodiments, an ad server may allow clients to implement their natural taxonomy as the basis for the metadata used for ad management (including targeting and reporting). The required metadata for each ad request may include, but is not limited to:

Ad site—a virtual label applied by client, commonly used to describe the content. It may be more specific or more general—i.e. Section, Channel, Network, Sub-section, Page, Widget, Newsletter, etc. It may be included or excluded from any campaign target.

Position List—May Request up to 126 "Positions", commonly used to indicate Ad Zone, Placement, Length, Size and/or Type. Campaigns & Ads are assigned to Position(s) in an ad server UI.

Figure 32:
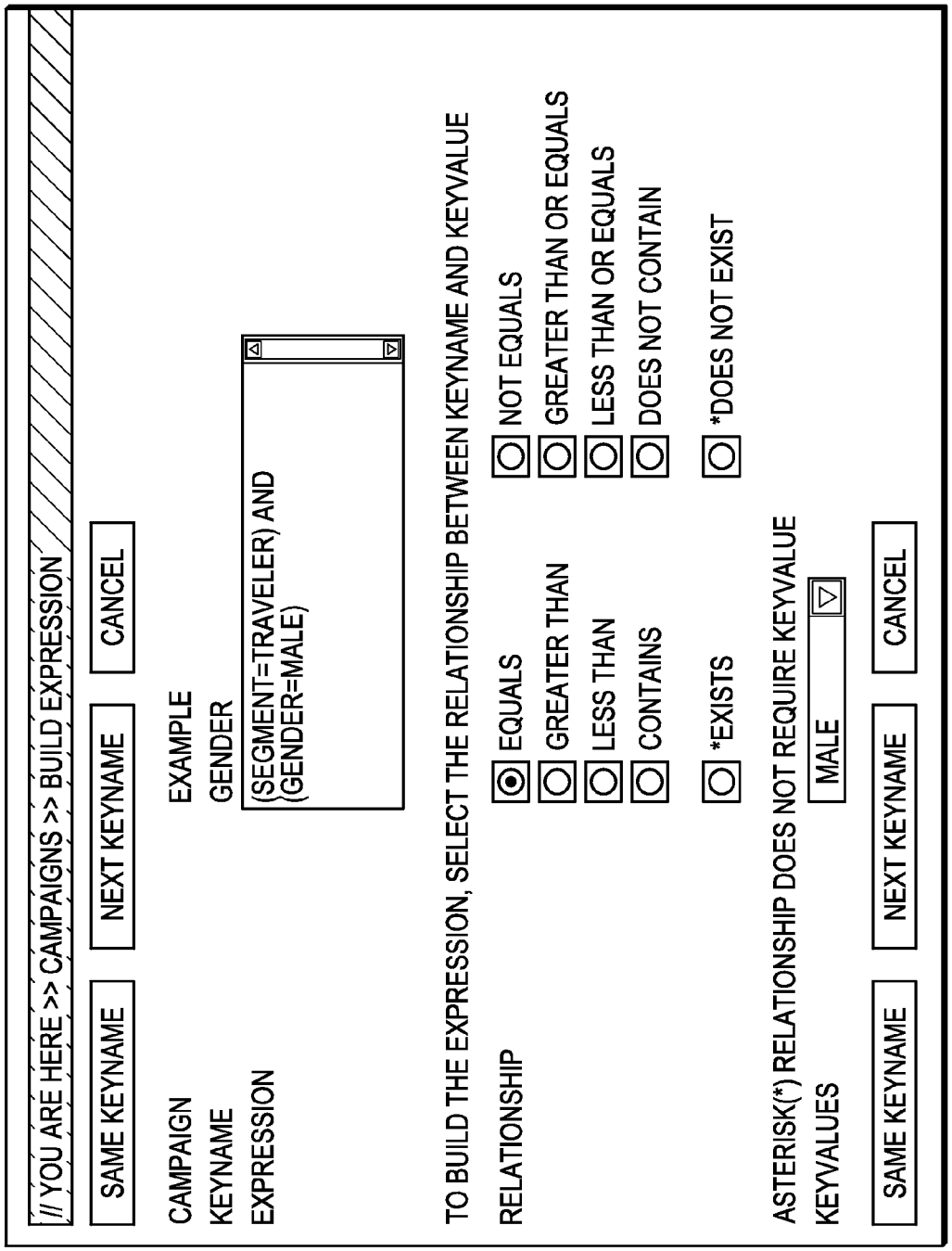
FIG. 32 depicts a sample user interface screen for creating an expression within a monetization platform.

The optional metadata for each ad request may include, but is not limited to:

Custom Keywords—May pass up client-defined name-value pairs with each ad request. As depicted in FIG. 32, these custom keywords may be included, excluded, or used to build Boolean targeting expressions for each ad campaign.

Cookies—Cookies in the client's domain may be targetable via Boolean expressions. An ad server may also has access to standard HTTP headers such as Date and User-Agent and these are available for targeting inclusion/exclusion in each campaign. Reporting may be available on metadata as well.

In embodiments, profile management and ad targeting may be based on profiles comprised of data including, but not limited to, 1) demographic information provided by the operator, 2) behavioral indicators provided by the operator, 3) processing raw data from the operator (e.g., click history, search history, SMS/call data), 4) on-portal search services provided to the operator (where such queries may be normalized, enriched, and categorized), 5) on-portal click history (determined via ad tags), 6) off-portal behavior (determined via relationship directly with publishers, which may include behavioral profile information provided by the publisher or determined based on search history or browsing revealed via ad tags), 7) previous and current location based information, or some other profile data. Data may be provided, captured, and used in batch or real-time. In embodiments, a user's clicks may be correlated with the contextual information of a page (e.g., webpage) based at least in part on search algorithms (e.g., word frequency, link analysis).

Figure 33:
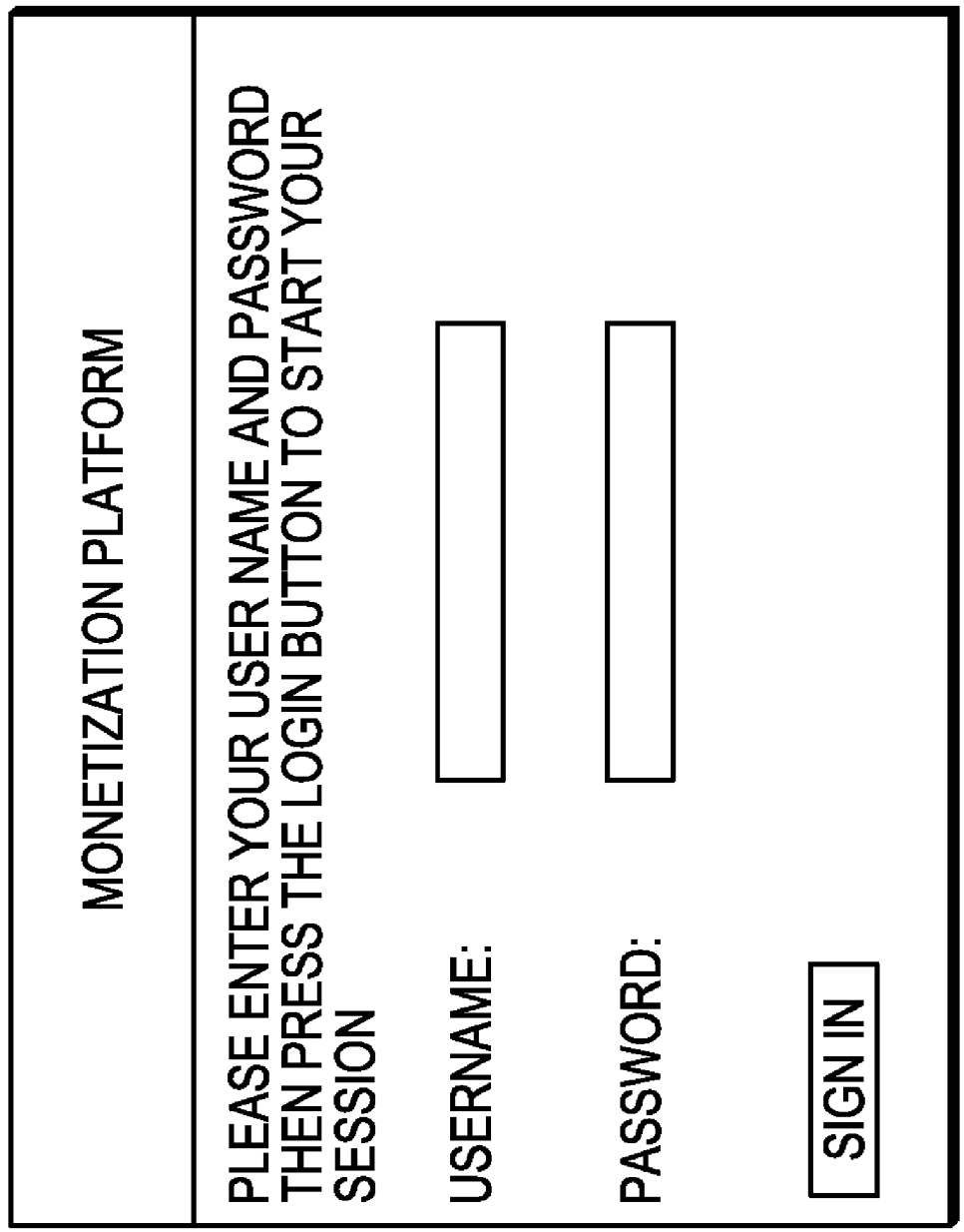
FIG. 33 depicts a sample monetization platform login screen.

As shown in FIG. 33, a monetization platform may be associated with a user login screen.

In embodiments, advertising for non-web mobile traffic (e.g., SMS, MMS, in-game, in-application, video, TV, voice [e.g., during directory assistance call or a call to vote in a television or radio program]), or some other type of content based at least in part on contextual and behavioral data, as described herein.

In embodiments, contextual targeting of pay-per-click ads may be based on the content of an SMS, MMS, in-game data, in-application data, video, TV, voice, or some other type of content.

In embodiments, a behavioral profile may be used for syndication of content, including advertisement content. In an example, a third party publisher (e.g., a party other than an operator), or a third party ad network may request behavioral profile information to facilitate the delivery of a targeted ad for a third party publisher other than the operator. A behavioral profile may be returned that is developed in conjunction with an operator. In embodiments, this application may describe access rights to components of the behavioral profile. The application may also include obfuscation, hashing, a time-limited ID, or some other method of limiting the permitted access to the profile data.

In embodiments, an operator may receive revenue for profile data in the form of a flat fee, revenue share, or some other revenue metric against the advertising.

In embodiments, the importance of information within profile may be weighted (e.g., demographic vs. behavioral data).

In embodiments, a behavioral profile may be aggregated. In an example, a publisher may request an ad, the monetization platform may determine which operator the user is requesting the content from, and may pull the behavioral profile for the associated network, and return the associated behavioral profile information.

In embodiments, multiple ad inventories may be managed for the monetization of mobile traffic. In an example, a publisher and/or operator may select an event that they wish to monetize. They may request an ad from the monetization platform, which then determines from which inventory an ad should come. The distribution of ad inventory may occur across multiple ad networks and or ad servers. The determination of which inventory from which to select an ad may include weighting (i.e., percentage allocation), backfill (i.e., try A, then B, then C), blending (i.e., sort multiple ads for delivery in one event based on bid price, relevance, yield, or other), yield (i.e., MP can query an ad provider/server for an ad, compare the pricing to ads from other servers, and determine expected yield based on correlating the ad with the behavioral profile), or some other method. Such rules may be targeted to a single ad spot or applied across multiple ad spots. As depicted in FIGS. 34, 35 and 36, the creation and management of a ad spots, ad types, and ad providers may be associated with a user interface of the monetization platform. The system may also re-balance after a change is made to reserve inventory for a particular campaign.

In embodiments, personalization and/or content recommendation technologies may be enable in order to access behavioral profiles for the purposes of content delivery.

In embodiments, a monetization platform may include handset management across multiple ad networks and servers when managing multiple ad inventories for the monetization of mobile traffic. In an example, a centralized handset database with makes, models, and capabilities may be used. When an ad is requested, the handset and capabilities may be provided to the ad networks and servers for targeting purposes and the right ad selection (e.g., small, medium, or large). In an embodiments, the monetization platform may provide exception management where one carrier/publisher can change the ad type/size data provided to ad networks/servers for a particular handset, which may be different than all other carriers are using. The make and model of a handset may be determined based on the webpage request (e.g., user agent string in the WAP header), a client application that can query the handset directly, the carrier user/handset database, or some other criterion. This system may allow for mobile enabling of non-mobile ad serving technologies (e.g., for publishers wanting to continue using the same campaign management and reporting tools).

In embodiments, mobile behavioral data may be used within a monetization platform for targeting ads on non-mobile media (e.g., computer, TV, settop box, etc.). In embodiments, methods and systems of the monetization platform, as described herein, may be used to identify the mobile user on other, non-mobile media, for example, including but not limited to phone detection from the TV set-top box and categorizing the viewed content, dropping a cookie to continue tracking the computer when it's accessing the Internet away from the home, or some other method.

In embodiments, in the monetization platform, advertisers may be allowed to bid in a mobile pay-per-click marketplace based at least in part on behavioral profile data.

In embodiments, the monetization platform may use contextual targeting of an ad, including using search algorithms (e.g., word frequency, link analysis, and other methods) to contextually target display advertising. In embodiments, this information may be combined with other information relating to a mobile communication facility and/or its user, as described herein.

In embodiments, ad targeting may be based on a categorized location. Categorized locations may include home, work, in-market, out-of-market, and may be based at least in part on location history data that is associated with a mobile communication facility. Categorized locations may be provided based at least in part by logs of calls, SMS, or other activities that include a cellphone tower ID, or some other location detection technology, that may be correlated with a geographic region.

In embodiments, gateway data or other operator data (e.g., click history through a transcoder) may be use to modify a link authority algorithm. In embodiments, the historical usage of links within a network may be able to improve link analysis and quality detection.

In embodiments, search from a mobile communication facility may be based at least in part on a contextual search (e.g., where a user is searching form) and contextual suggestions (e.g., from SMS, browser, contact list, etc.)

In embodiments, search may be based on a categorized location. Categorized locations may include home, work, in-market, out-of-market, or some other category of location. Home and work locations may be determined without demographic data being provided based, for example, on historical location information provided by the network. Categorized locations may be provided based at least in part by logs of calls, SMS, or other activities that include a cell phone tower ID, or some other location detection technology, that may be correlated with a geographic region.

In embodiments, data integration techniques and methods may be used as part of the monetization platform and other preferred embodiments, as described herein, to collect, join, merge, validate, analyze, and perform other data processing operations for wireless operator data, mobile communication facility data, user data, mobile content data, and other data types as described herein. Data integration techniques and methods may be used to take the information collected from a plurality of mobile data sources in order to draw an inference from the collected information, identifying a potential change to a database based on newly received information, and validating the change to the database based on the inference.

In embodiments, data integration techniques and methods may be used to extract information from a plurality of mobile data sources, and the like, the data sources having a plurality of distinct data types, transforming the data from the data sources into a data type that can be represented in, for example, a database to be used by a monetization platform, the database thereby integrating information from the distinct data types. In embodiments the distinct data types may be selected from a group consisting of wireless operator data, mobile communication facility data, contextual information relating to content, mobile subscriber characteristics, user transactions, geographic data relating to a user and/or a user's mobile communication facility, user behavioral information (including user profiles), demographic information, usage history, and other data sources and types as described herein.

In embodiments, data integration techniques and methods may be used to apply rules, such as by a rules engine, in connection with creation, updating and maintenance of a data set, such as one stored or used in association with a monetization platform. A rules engine may be applied to secondary change data, that is, data that comes from one or more data sources and that indicates that a change may be required in a data set or to inference data, that is, data derived by inferences from one or more data sets. For example, a rule may indicate that a change in a data set will be made if a secondary data source confirms an inference, or if an inference is consistent with data indicated by a data source. Similarly, a rule might require multiple confirmations, such as requiring more than one data source or more than one inference before confirming a change to a data set (or creation of a new feature or attribute in the data set). Rules may require any fixed number of confirmations, whether by other data sets or by inferences derived from those data sets. Rules may also embody various processes or work flows, such as requiring a particular person or entity to approve a change of a given type or a change to a particular type of data.

In embodiments, data integration techniques and methods may be used to extract information from a plurality of mobile data sources, the data sources having a plurality of distinct data types, storing the data in a common data set, considering a change request associated with a database, such as a database that is associated with a monetization platform, and using the common data set to validate the change request.

In embodiments, data integration techniques and methods may be used to extract information from a plurality of mobile data sources, the data sources having a plurality of distinct data types, storing the data in a common data set, considering the common data set to identify potential changes to a database, such as a database that is associated with a monetization platform, and initiating a change request based on the common data set.

In embodiments, a data integration facility may be used to integrate data from a plurality of mobile data sources, the data sources including attributes relevant to a monetization platform, wherein the data integration facility is selected from the group consisting of an extraction facility, a data transformation facility, a loading facility, a message broker, a connector, a service oriented architecture, a queue, a bridge, a spider, a filtering facility, a clustering facility, a syndication facility, and a search facility.

In embodiments, a data integration facility may be used to integrate data from a plurality of mobile data sources, taking an inference drawn from analysis of data collected by a plurality of data sources, applying a data integration rule to determine the extent to which to apply the inference, and updating a data set based on the application of the rule.

In embodiments, a data integration facility may be used to integrate data from a plurality of mobile data sources, taking an inference drawn from analysis of data collected by a plurality of data sources, applying a data integration rule hierarchy to determine the extent to which to apply the inference, and updating a data set based on the application of the rule.

In embodiments, a data integration facility may provide a rule hierarchy to determine a data type to use in a data set related to a system, such as a monetization platform, the rule hierarchy applying a rule based on at least one of a data item, the richness of a data item, the reliability of a data item, the freshness of a data item, and the source of a data item and representing the rule hierarchy in a data integration rule matrix, wherein the matrix facilitates the application of a different rule hierarchy to a different type of data.

In embodiments, a data integration facility may be used to integrate data from a plurality of mobile data sources, taking an inference drawn from analysis of data collected by a data sources, applying a data integration rule matrix to determine the extent to which to apply the inference, and updating a data set based on the application of the rule.

A data integration facility may be used in association with a system, such as a monetization platform, to iteratively collect and make inferences about data that is collected for use in the monetization platform. Iteration may be performed a plurality of times, or continuously, as an on-going process to collect and make inferences about data attributes. Iteration may be a function of the entire data set (e.g., an entire usage history of a user, all ad conversion data related to a content, and the like), or a function of specific data segments (e.g., usage history <24 hours old, ad conversion data among females). Data attributes may be stored for subsequent comparison to previously collected data inference attributes, such as comparing a first data inference attribute made for a user's browse history to a second data inference attribute made for the same user's history performing some behavior other than browsing (e.g., SMS texting). In embodiments, this process may be continuous, and represent an ongoing comparison of inferred attributes for the purpose of detecting differences over time.

The data integration facility may include at least one of a bridge, a message broker, a queue and a connector. Therefore, a useful data source may be associated with a data integration facility via computer code, hardware, or both, that establishes a connection between the source and the data integration facility. For example, the bridge may include code that takes data in a native data type (such as data in a mark-up language format), extracts the relevant portion of the data, and transforms the data into a different format, such as a format suitable for storing the data for use in a monetization platform (e.g., as an attribute or metadata associated with user data, content data, wireless operator data, publisher data, and the like). The message broker may extract data from a data source (e.g., a wireless operator), place the data in a queue or storage location for delivery to a target location (e.g., monetization platform server), and deliver the data at an appropriate time and in an appropriate format for the target location. In embodiments, the target location may be a monetization platform database 152, a data mart, a metadata facility, or a facility for storing or associating an attribute within a monetization platform. The connector may comprise an application programming interface or other code suitable to connect source and target data facilities, with or without an intermediate facility such as a data mart or a data bag. The connector may, for example, include AJAX code, a SOAP connector, a Java connector, a WSDL connector, or the like.

In embodiments, the data integration facility may be used to integrate data from a plurality of data sources, the data sources including attributes relevant to, for example a monetization platform. The data integration facility may include a syndication facility. The syndication facility may publish information in a suitable format for further use by computers, services, or the like, such as in aid of creating, updating or maintaining a monetization platform database, such as one related to user behavioral profiles, publishers, or some other type of data used by the monetization platform, as described herein. For example, the syndication facility may publish relevant data in RSS, XML, OPML or similar format, such as user data, wireless operator data, ad conversion data, publisher data, and many other types of information that may be used by the monetization platform. The syndication facility may be configured by the data integration facility to feed data directly to a monetization platform database, such as a user profile database, in order to populate relevant fields of the database with data, to populate attributes of the database, to populate metadata in the database, or the like. In embodiments the syndicated data may be used in conjunction with a rules engine, such as to assist in various inferencing processes, to assist in confirming other data, or the like.

In embodiments, the data integration facility may include a services oriented architecture facility. In the services oriented architecture facility, one or more data integration steps may be deployed as a service that is accessible to various computers and services, including services that assist in the development, updating and maintenance of a monetization platform database, such as a user profile database, or the like. Services may include services to assist with inferences, such as by implementing rules, hierarchies of rules, or the like, such as to assist in confirmation of data from various sources. Services may be published in a registry with information about how to access the services, so that various data integration facilities may use the services. Access may be APIs, connectors, or the like, such as using Web Services Definition Language, enterprise Java beans, or various other codes suitable for managing data integration in a services oriented architecture.

In embodiments, the data integration facility may include at least one of a spidering facility, a web crawler, a clustering facility, a scraping facility and a filtering facility. The spidering facility, or other similar facility may thus search for data, such as available from various domains, services, wireless operators, publishers, and sources, available on the Internet or other networks, extract the data (such as by scraping or clustering data that appears to be of a suitable type), filter the data based on various filters, and deliver the data, such as to a target monetization platform database. Thus, by spidering relevant data sources, the data integration facility may find relevant data, such as user behavioral data, contextual data relating to content, publisher data, and many other types (of the types variously described herein) of information. The relevant data may be used to draw inferences, to support inferences, to contradict inferences, or the like, with the inference engine, such as to assist in creation, maintenance or updating of a monetization platform database. The data may also be used to populate data fields directly, to populate attributes associated with data items, or provide metadata.

In embodiments, statistical analysis techniques, such as liner regression, logistic regression, decision tree analysis, Bayes techniques (including naïve Bayes), K nearest neighbors analysis, collaborative filtering, data mining, and other techniques may be used as part of the monetization platform to model, filter, and determine relevancies from among wireless operator data, data relating to a mobile communication facility and its user, ad network data, publisher data, or some other type of data used within the monetization platform. For example, linear regression analysis may be used to determine the relationship between one or more independent variables, such as mobile subscriber characteristics, and another dependent variable, such as an ad conversion, modeled by a least squares function, called a linear regression equation. This function is a linear combination of one or more model parameters, called regression coefficients. The monetization platform data may consist of n values $x_{i,1}, \ldots, x_{i,n}$ for each of the m independent variables (explanatory variables) $x_i$ (i=1, ... m), and n values, $y_1, \ldots y_n$ of the dependent variable y (response variable). The independent variables may also be called regressors, exogenous variables, covariates, input variables or predictor variables. In general there are m parameters to be determined, $\beta_1, \ldots \beta_m$. The model is a linear combination of these parameters, $$y_i = \sum_{j=1}^{m} X_{ij}\beta_j + \varepsilon_i.$$

Here, X includes, typically, a constant, that is, a column which does not vary across observations, and the independent variables or functions of the independent variables. $\varepsilon$ denotes the error term. Models used within the monetization platform that do not conform to this specification may be treated by nonlinear regression, and/or other statistical techniques.

In simple linear regression the data model represents a straight line and can be written as:

$$y_i = \beta_1 + x_i\beta_2 + \varepsilon_i$$

m=2, $\__1$ (intercept) and $\__2$ (slope) are the parameters of the model and the coefficients are $X_{i1}=1$ and $X_{i2}=x_i$.

A linear regression model need not be a linear function of the independent variable: linear in this context means that the conditional mean of y is linear in the parameters. For example, the model $y=\beta_1+\beta_2 x+\beta_3 x^2+\varepsilon$ is linear in the parameters, $\beta_1$, $\beta_2$ and $\beta_3$, but it is not linear in x, as $X_{i3}=x_i^2$, a nonlinear function of $x_i$.

A formulation of simple linear regression that explicitly shows the linear regression as a model of conditional expectation can be given as:

$$E(y|x)=\alpha+\beta x.$$

The conditional distribution of y given x is a linear transformation of the distribution of the error term.

In another example, Bayes' theorem may be used to analyze monetization platform data, such as wireless operator data, data relating to a mobile communication facility and its user, ad network data, publisher data, or some other type of data used within the monetization platform. Bayes' theorem relates the conditional and marginal probabilities of events A and B, where B has a non-vanishing probability:

$$P(A|B) = \frac{P(B|A)P(A)}{P(B)}.$$

Each term in Bayes' theorem has a conventional name:
P(A) is the prior probability or marginal probability of A. It is "prior" in the sense that it does not take into account any information about B.
P(A|B) is the conditional probability of A, given B. It is also called the posterior probability because it is derived from or depends upon the specified value of B.
P(B|A) is the conditional probability of B given A.
P(B) is the prior or marginal probability of B, and acts as a normalizing constant.

Using Bayes' theorem, conditional probabilities may be assigned to, for example, mobile communication facility user profile variables, where the probabilities estimate the likelihood of an ad conversion and are based at least in part on prior observations of the users' interactions with mobile content.

Naïve Bayes classifiers may also be used to analyze monetization platform data, such as wireless operator data, data relating to a mobile communication facility and its user, ad network data, publisher data, or some other type of data used within the monetization platform. A naive Bayes classifier is a probabilistic classifier based on applying Bayes' theorem with strong (naive) independence assumptions. A naive Bayes classifier assumes that the presence (or lack of presence) of a particular feature of a class is unrelated to the presence (or lack of presence) of any other feature. For example, a mobile communication facility user may be classified in a user profile as a sports fan if he has visited a sports-related website, purchased a sporting event ticket, and uses a college football team fight song as his ringtone. A Bayes classifier considers all of these properties to independently contribute to the probability that this user is a sports fan. Once a classification is assigned within the user profile (e.g., User X=sports fan), the user's information may be stored and shared by the monetization platform (e.g., sending the data to an ad server where the classification "sports fan" may be used to select sports-related sponsored content to deliver to the user's mobile communication facility). A single user profile may include a plurality of classifiers. For example, the sports fan's user profile may also include classifiers indicating that the user is an "international traveler," or a "horticulturalist," and so forth, using the stream of wireless data that is associated with the user's mobile communication facility, the wireless account data, behavioral data relating to the user, contextual data relating to the content and applications accessed on the user's mobile communication facility, and any other data sources as described herein. An advantage of the naive Bayes classifier is that it requires a small amount of training data to estimate the parameters (means and variances of the variables) necessary for classification. Because independent variables are assumed, only the variances of the variables for each class need to be determined and not the entire covariance matrix. This characteristic of naive Bayes may enable the classification In embodiments, a behavioral data analysis algorithm may be used for developing behavioral profiles for mobile communication facility users. Behavioral profiles may then be used for targeting advertisements and other content to the users' mobile communication facilities. A behavioral profile may include a summary of a user's activity on a mobile communication facility, including the types of content and applications accessed, and other behavioral properties. The user's activity summary may include searches, browses, purchases, clicks, impressions with no response, or some other activity as described herein. The behavioral properties may be summarized as continuous interest scores of a content category. Continuous frequency scores and continuous recency scores (e.g., how recently the activity occurred) may be considered as behavioral properties for use in constructing a behavioral profile. A user's activity summary and the behavioral properties may be categorized using the analytic techniques as described herein (e.g., naïve Bayes classifiers).

Content data, including sponsored content, and its characteristics may also be used for the generation of a behavioral profile. For example, data such as advertisement identity, ad tag, user identity, advertisement spot identity, date, and user response for each impression may be used. In addition, content categories may be used for targeting each advertisement based on a behavioral profile, or portion of a behavioral profile. Further, content categories may be associated with each search, browse, purchase, or other online behavioral and/or transaction.

In embodiments, an algorithm may be implemented to assess the behavior profile associated with a mobile communication facility user. Algorithm parameters may be calculated by using different formulae, as in the example embodiment listed below:

Interest Score=1/(1^−z)
z=Intercept+Weighted Activity
eighted Activity=Browse Amount*Browse Factor+Search Amount*Search Factor+Purchase Amount*Purchase Factor+Click Amount*Click Factor+No Click Amount*No Click Factor
Activity Amount=Previous Activity Amount*(History Factor APassing Days)+New Activity Amount
Previous Activity Amount=Previous calculation of Activity Amount
New Activity Amount=Weighted Activity that wasn't counted in the Activity Amount calculation
Passing Days=Days that passed since latest update date
Implementation: z=Intercept+[−ln(1/Previous Interest Score−1)−Intercept]*(History Factor A Passing Days)+ New Activity Amount The algorithm for the generation of a behavioral profile may be simplified by keeping the same activity factors for a plurality of content categories, in a plurality of situations. In addition, it may be simplified further by keeping the same history factor for similar activities, content categories and situations.

In embodiments, behavioral profiles may be updated to account for new user behaviors.

Figure 38A:
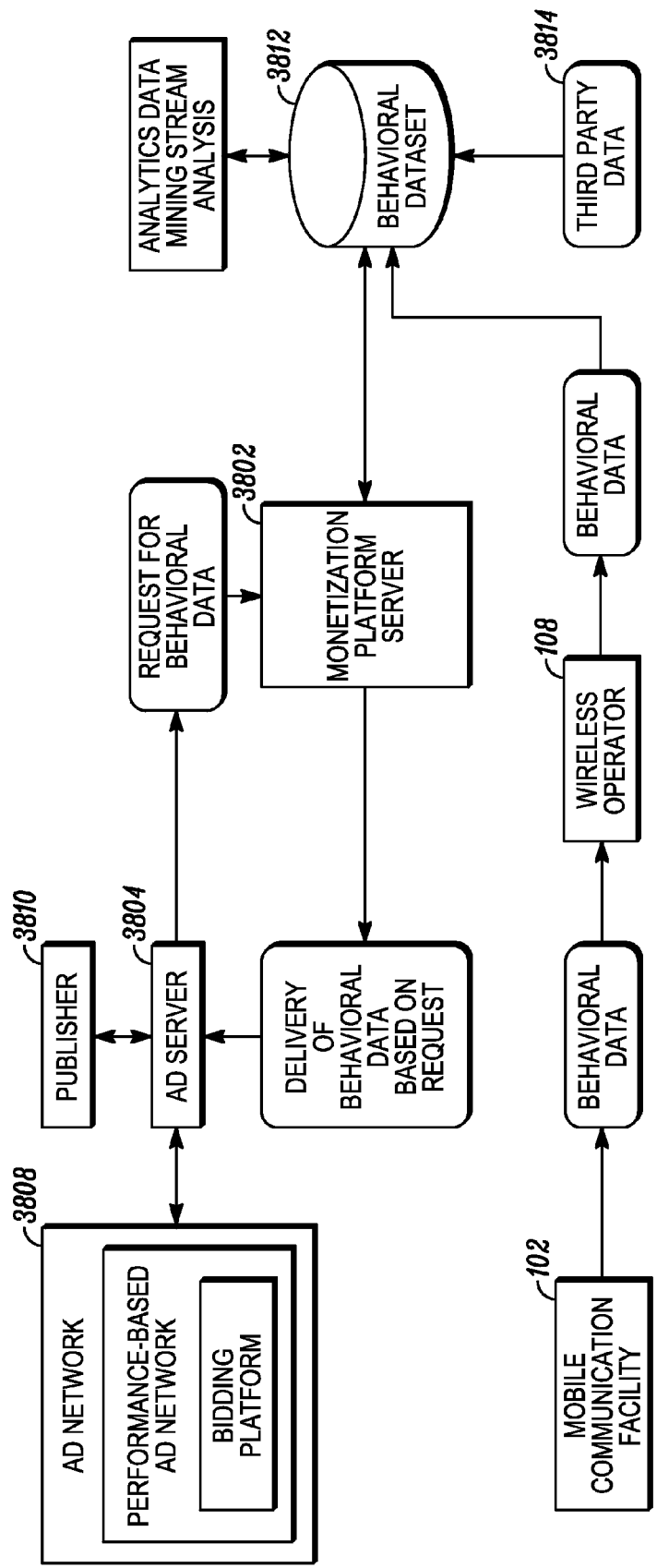
FIG. 38A depicts a flowchart representing an embodiment of behavioral profile syndication.
Figure 38B:
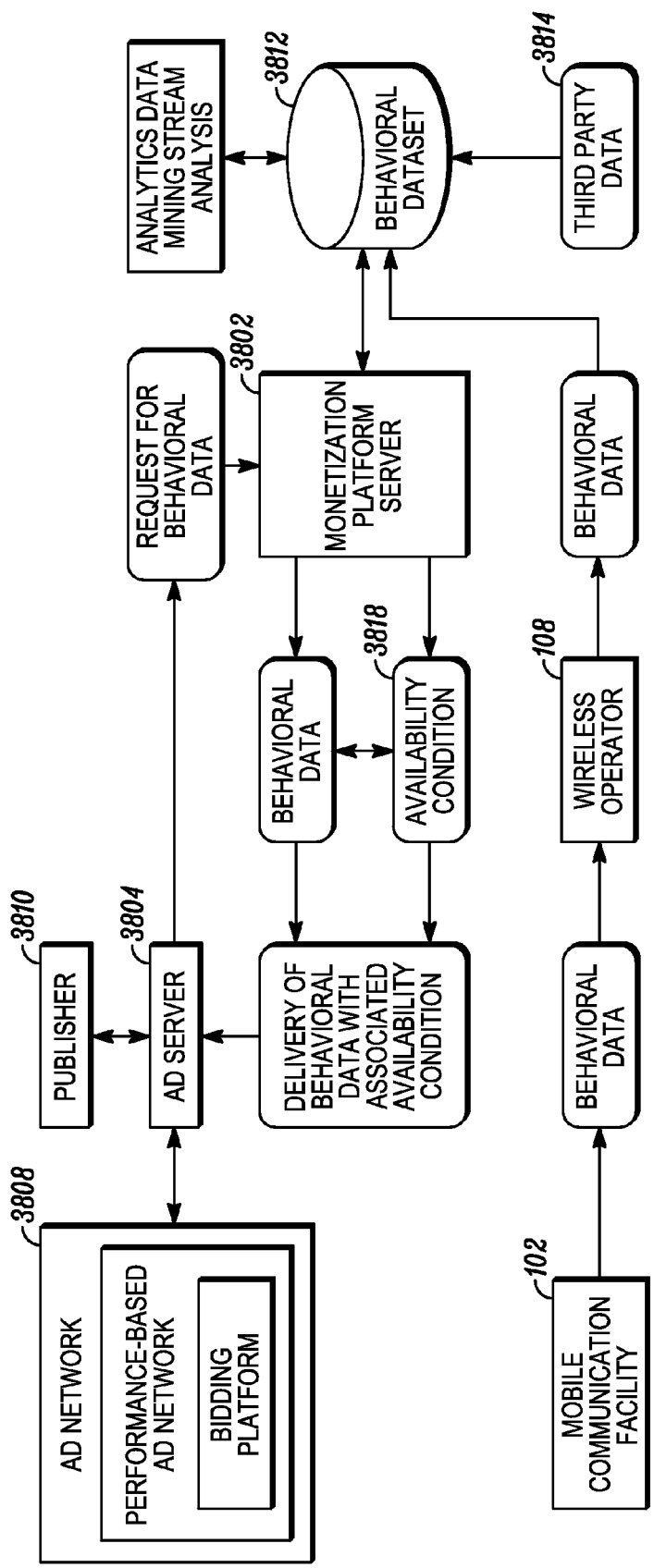
FIG. 38B depicts the embodiment of FIG. 38A including syndication of availability conditions associated with behavioral profiles.

In embodiments, a user behavior or activity may be analyzed in relation to a particular content, content type, content category, and so forth. Referring to FIG. 38A, in an example, an activity factor may be learned based at least in part on logistic regression methodology. Realtime mobile traffic data may be associated with a user profile, including a historical user profile that includes prior activities, behaviors, and the like. Data derived from the updated request profile may be used in a responsiveness model (based on logistic regression or some other statistical modeling methodology). For example, independent variables of a logistic responsiveness model may account for content categories and the like in order to predict a dependent variable, such as a user activity or response. This type of responsiveness model may be used for success estimation, where success estimation is a stated target activity or response, such as an ad conversion, a click-through, a user transaction following click-through on advertisement content, or some other type of response. As shown in FIG. 38B, this type of responsiveness model may be iteratively updated and the model adapted as new data, user behaviors, content types, and the like are added to the user profile and data model.

In embodiments, the selection of a relevant advertisement may be based at least in part on the results of a responsiveness model, as described herein.

In embodiments, a responsiveness model may be built for each user, each content, or some aggregation of a plurality or users and/or content. When content is requested, for example by a publisher, the responsiveness model and its analytic results, may be used to estimate the relative responsiveness for each advertisement by users on the basis of their user profile, and a selection of which relevant content to ultimately present to the user may be based on the responsiveness model results.

In embodiments, responsiveness modeling may determine a success estimation parameter based at least in part on an increase in a click through ratio, or click through ratio rise. User profile characteristics and behaviors may be used in the responsiveness model to predict a response outcome, such as a click through, and the model optimized to select those user profile characteristics that are most associated with the wanted response of a clickthrough. Other users that have the same, or similar, user profile characteristics may be targeted for receiving the advertisements in the future. Once the new recipients' activities in response to the advertisements are known, the responsiveness model may be recalculated using this new data, and revised success estimates generated.

Figure 37A:
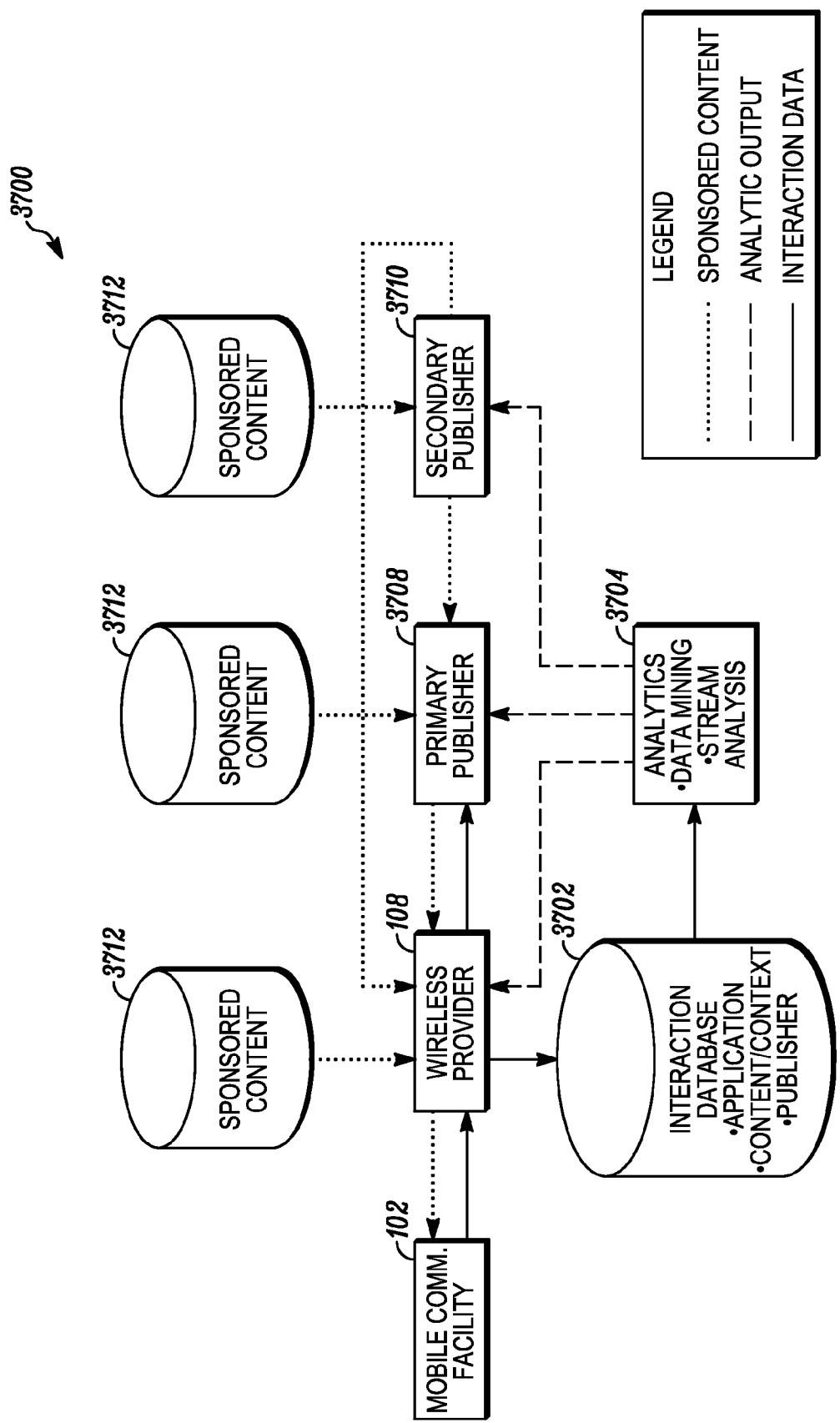
FIG. 37A depicts a system for providing sponsored content to a user.

FIG. 37A depicts a system for providing sponsored content to a user. In particular and as described hereinafter and elsewhere, the system 3700 may be directed at providing sponsored content to the user while the user interacts with an application resident on a mobile communication facility. The system 3700 includes the mobile communication facility 102, the wireless provider 108, an interaction database 3702, an analytics facility 3704, a primary publisher 3708, a secondary publisher 3710, and one or more databases of sponsored content 3712.

All of the elements of the system 3700 may be operatively coupled as shown. These operative couplings may include any and all suitable communications channels, including without limitation wireless and/or wired communications channels. The information flowing over the operative couplings may include sponsored content, analytic output, interaction data, or the like as respectively indicated by solid, dashed, or dotted lines. It will be understood that a variety of such channels are possible.

The interaction database 3702 may store data related to the user's interactions with the mobile communications facility 102. The user's interactions with the mobile communications facility 102 may be relative to an application, content, or other information presented to the user by the mobile communication facility 102.

In embodiments, contextual data may include data relating to an application and its usage ("application contextual data") and/or content that is interacted with using an application ("content contextual data").

Application contextual data may vary based upon the type of application used on a mobile communication facility. For example, a media player may be associated with application contextual data relating to the media player controls, such as play, pause, rewind, fast-forward, record, and other media player functionalities. In another example, a navigation application may be associated with application contextual data including but not limited to geographic coordinates corresponding to a location of a mobile communication facility, a data inquiry made within the navigation application by a user (e.g., "where is the nearest gas station"), a user saving a location as a favorite, the entering of an address to navigate to, the downloading of a navigation guide's voice file, the purchase of a map layer, or some other type of navigation application data. In another example, a gaming application may be associated with application contextual data including but not limited to a game purchase, a time and/or duration of game play within the application, a keystroke combination mistake made more than once by a user during game play, or some other type of gaming application data.

Content contextual data may include an ad tag, a file type, a file size, resolution, duration, popularity ranking, usage history, cost, publisher, rating, ranking, genre, participant information (e.g., actor, artist, musician, music label, participant), product code, a semantic relationship of keywords within the content, a link structure, an inbound link, an outbound link, a text, a keyword, metadata, or some other type of contextual information. Metadata may include information relating to an origin of content. Metadata may describe a portion of a content that is currently on display within an application running on a mobile communication facility. Metadata may be discovered by text, voice recognition, image recognition, or some other means of discovery.

In embodiments, a wireless carrier may receive mobile traffic data indicating that a user is currently using a media player to view a video on his mobile communication facility. The application contextual data relating to the application in use may include data indicating the brand or type of media player in use, the duration of use contextual data relating to how the video player is being used (e.g., what video is being played, what volume level is used, the duration of viewing the video, and so forth). The content contextual data relating to content within the application may include a video content's publisher, a genre of media being played, products placed within the media content, or some other data relating to the content on display within the application. This application contextual data and the content contextual data may be further associated with information relating to the mobile communication facility, the user, and/or the wireless network, as described herein.

The interactions may take place within a context. For example and without limitation, the context may include a time, date, or location; contextual information encoded in a metadata tag or the like that is associated with the application, content, and so on; demographic, geographic, or other information, which may be associated with the user; past or present behaviors or interactions of the user; external or third-party information relating to the user, the application, the content, the publisher, and on; and so forth.

The application, content, or other information may be provided by or associated with a publisher. For example and without limitation, the publisher may include an original producer, a distributor, a re-distributor, a retailer, a wholesaler, and so on. A variety of kinds of publisher will be understood.

Thus, the data stored by the interaction database 3702 may include data about the application, content, context, publisher, and so on.

The analytics facility 3704 may from time to time receive from the interaction database 3702 any and all of the data stored therein. To this data, the analytics facility 3702 may apply data integration, statistical analysis, data mining, stream analysis, or some other type of data processing or analytic technique, as described herein. In embodiments these techniques may be directed at selecting or suggesting sponsored content to be delivered to the user. Additionally or alternatively, these techniques may be directed at generating information related to the selecting or suggesting of sponsored content to be delivered to the user. In any case, the analytics facility may generate analytic output embodying the selection, the suggestion, or information relating to the selection and suggestion. As depicted, the analytic output may be communicated to any and all of the wireless provider 108, the primary publisher 3708, and the secondary publisher 3710.

The primary publisher 3708 may include an entity that publishes primary content. Primary content may include any and all content that the user explicitly requests or in which the user is primarily interested. In embodiments the primary content may include any and all forms of content described herein and elsewhere. In embodiments the primary content may be free to the public, available to subscribers only, available for a fee, and so on. It will be understood that a variety of primary content is possible.

The secondary publisher 3710 may include an entity that publishes secondary content. Secondary content may include any and all content that the user does not explicitly request or in which the user is not primarily interested. In embodiments the secondary content may include sponsored content such as and without limitation advertisements, promotions, or the like. In embodiments the secondary content may appear within the primary content, alongside the primary content, before or after the primary content, and so on. It will be understood that a variety of secondary content is possible.

The one or more databases of sponsored content 3712 may contain sponsored content, which may be the secondary content. In embodiments, a database of sponsored content 3712 may include an object database, a relational database, a spatial database, and so on. It will be understood that a variety of implementations of the sponsored content database 3712 are possible, including data integration techniques as described herein.

Embodiments of the system 3700 may provide sponsored content to a user via the mobile communication facility 102 while the user is interacting with facility 102. In embodiments such messaging may include sponsored content such as advertisements, promotions, or the like. A variety of other sponsored content may be described herein and elsewhere, and still other sponsored content will be appreciated. All such sponsored content is within the scope of the present disclosure.

In some embodiments the user may interact with the mobile communication facility via a keypad or keyboard to navigate menus, enter text or numbers, or the like via a text entry application. The keypad or keyboard may be operatively coupled to the mobile communications facility such as and without limitation by being wired to the facility, connected via Bluetooth or the like to the facility, and so on.

In some embodiments the user may interact with the mobile communication facility via a voice recognition application of the mobile communications facility. The voice recognition facility may provide voice prompts to the user, receive voice commands from the user, direct operation of the mobile communications facility in response to the user's voice commands, and so on.

In some embodiments the user may interact with the mobile communication facility by tilting or accelerating the facility, which may cause a change in output of an accelerometer of the mobile communications facility.

Unless otherwise stated or clear from the context, interacting with the mobile communication facility may but does not necessarily include the user providing input to the mobile communication facility. For example, a user who is watching a video on his mobile communication facility may be said to be interacting with the facility even though he does not provide input to the facility while he watches. It will be understood that a variety of ways of interacting with the mobile communication facility are possible.

Use of a mobile communication facility may include interacting with an application resident on the mobile communication facility. Examples of applications resident on a mobile communication facility include but are not limited to a media player, an SMS application, an MMS application, a video game, a calendar, an address book, an email application, a camera, a business productivity application (such as and without limitation Microsoft PowerPoint, Word, Excel, Adobe Acrobat, and so on), a navigation application, a ring tone, an instant messaging application, an e-book, a document reader, a presentation reader, and so on.

In embodiments applications resident on a mobile communication facility may include local applications, client applications, embedded applications, applets, scripts, executables, and so on. Such local application may or may not receive remote inputs in order to function. Such client applications may include thin clients, thick clients, or the like. In any case, the applications resident on a mobile communication facility may be integral to the mobile communications facility, installed after-market, accessed from a remote repository as needed and thus never be installed, and so on. It will be appreciated that a variety of applications resident on a mobile communication facility are possible and all such applications are intended to fall within the scope of the present disclosure.

A wireless operator may receive communications containing interaction data related to a user interacting with an application resident on a mobile communication facility.

The communications may indicate the application with which the user is interacting, content being provided to the user by the application, a publisher related to the content, and so forth. The communications may also include a contextual datum that is associated with context, and/or datum from which context can be inferred, deduced, calculated, or otherwise obtained. The contextual datum may include an application contextual datum and/or a content contextual data, as described herein.

The content may be embodied as any kind of electronic file, document, message, or the like. It will be understood that a variety of kinds of content are possible.

For example, when the content is a multimedia file the contextual datum may include a genre, rating, keyword, or the like. For another example, when the content is a vCard the contextual datum may include the date on which the vCard was created, modified, or received; the location at which the user received the vCard; and so on. For still another example, when the content is a map of the user's location the contextual datum may include the user's location, the user's route or direction of travel, and so on. For yet still another example, when the content is sponsored content the contextual datum may include metadata that describes the sponsored content's origin and/or that describes a portion of the sponsored content currently displayed on the mobile communication facility. A variety of embodiments of the contextual datum will be understood and all such embodiments are within the scope of the present disclosure.

In embodiments, a wireless provider 108, or a third party associated with a wireless provider 108, may create an interaction database 3702 to store the association between an application in use on a mobile communication facility, a contextual datum relating to a content of the application during its use, and a publisher of the content. The interaction database 3702 may store a plurality of such application-contextual datum-publisher associations that are derived from a plurality of application uses by a plurality of users. In embodiments, a third party may create a mobile traffic database based at least in part on application-contextual datum-publisher associations that are derived from a plurality of wireless carriers.

In embodiments, a wireless provider 108 (such as a wireless operator or the like) may receive information through a wireless carrier network relating to an application that is in use on a mobile communication facility 102 connected to the network. For example, a wireless carrier may receive mobile traffic data indicating that a user is currently using a media player to view a video on his mobile communication facility 102. The data relating to the application in use may include data indicating the brand or type of media player in use, the duration of use, contextual datum relating to how the video player is being used (e.g., what video is being played, what volume level is used, the duration of viewing the video, and so forth), contextual datum relating to content within the application (e.g., a video content's publisher), or some other data relating to the application. This application data may be further associated with information relating to the mobile communication facility, the user, and/or the wireless network, as described herein.

Statistical analysis, data modeling, data mining, or some other type of analysis, as described herein, of the analytics facility 3704 may be applied to the contents of the interaction database 3702 database to derive models that may be used to select sponsored content 3712 for presentation to a mobile communication facility.

In embodiments, content, such as an advertisement or other sponsored content from a database 3712 of sponsored content, may be selected and sent to a mobile communication facility 102 for display based at least in part on data relating to an application in use on the mobile communication facility and based at least in part on contextual datum relating to content that is present within the application that is in use. This data may be sent from the mobile communication facility 102 to a wireless operator and/or a third party service provider.

In embodiments, a contextual datum may include an ad tag, a link structure, an inbound link, an outbound link, a text, a keyword, metadata, or some other type of contextual information. Metadata may include information relating to an origin of content. Metadata may describe a portion of a content that is currently on display within an application running on a mobile communication facility. Metadata may be discovered by text, voice recognition, image recognition, or some other means of discovery.

In embodiments, a publisher may be a wireless operator, website owner, content producer, advertiser, game developer, videographer, media company, blogger, or some other type of publisher.

In embodiments the wireless provider 108, the primary publisher 3708, and/or the secondary publisher 3710 may retrieve or select sponsored content from a database 3712 in response to analytic output from the analytics facility 3704.

Figure 37B:
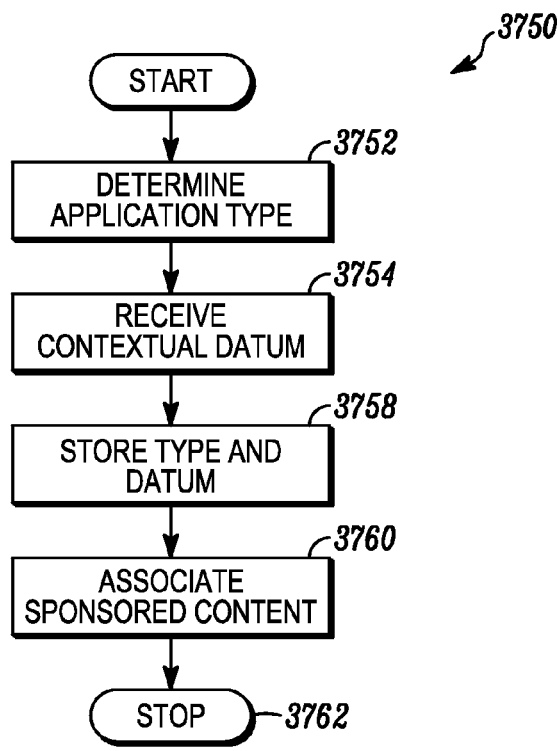
FIG. 37B shows a method of associating sponsored content with non-Internet activities.

FIG. 37B shows a method 3750 of associating sponsored content with activities relating to an application resident on a mobile communication facility. The method may first determine an application type that is in used on a mobile communications facility 102, as shown by step 3752. Next, as shown by step 3754, the method may receive a contextual datum that is associated with a content presented within the application type, wherein the content is further associated with a publisher. The method may store the application type-contextual datum-publisher association in a database at step 3758. Finally, as shown by step 3760, the method may further associate a sponsored content with the application type-contextual datum-publisher association, wherein the further association of sponsored data is stored in the database.

Figure 37C:
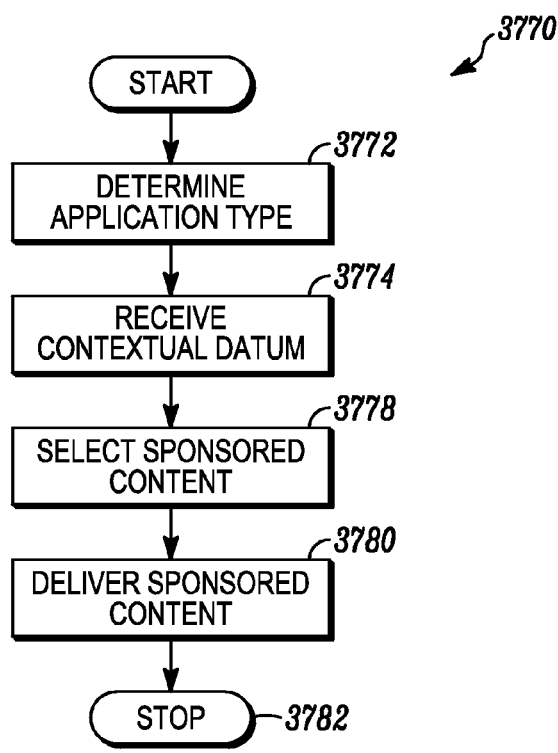
FIG. 37C shows a method of providing sponsored content for non-Internet activities.

FIG. 37C shows a method 3770 of providing sponsored content for activities relating to an application resident on a mobile communication facility. The method may first determine an application type that is in use on a mobile communication facility, as shown by step 3772. Next, as shown by step 3774, the method may receive a contextual datum that is associated with a content presented within the application type. The method may select a sponsored content for presentation to the mobile communication facility, wherein the selection is based at least in part on a relevancy score between the sponsored content, the contextual datum, the publisher associated with the content, and the application type that is in use on the mobile communication facility at step 3778. Finally, as shown by step 3780, the method may deliver the selected sponsored content to the mobile communication facility.

Referring to FIG. 38A, behavioral profile syndication may include a wireless operator 108 receiving user related behavioral data from a mobile communication facility 102 and then providing the information or some derivative of the information to a third party for consideration in the form of revenue sharing. The wireless operator 108 may also provide the user behavioral data to be stored in a behavioral dataset in a behavioral database 3812. Third party data 3814 relating to the user or the mobile communication facility may be included with or accessible in association with the behavioral database 3812. Processing of the behavioral and/or third party data may include a data integration step, as described herein elsewhere, to facilitate the cleansing, formatting and integration of the disparate data into a useable form. The data in the behavioral database 3812 may be analyzed such as through statistical analysis, data mining, stream analysis, as described herein. The analysis results may also be stored in or accessible through the behavioral database 3812. A monetization platform server 3802 may access the behavioral database 3812, the analytics, the third party data 3814 and the like. An ad server 3804, such as an ad server 3804 associated with an ad network 3808 may issue a request for behavioral data from the monetization platform server 3802. In response to this request, the monetization platform server 3802 may deliver to the ad server 3804 behavioral data that is based on a relevance with the request. The ad server 3804 may interface to an ad network 3808 that may be a performance based ad network 3808 that may include a bidding platform. The bidding platform may facilitate advertisers associated with the ad network 3808 bidding for access to behavioral data. The advertisers may bid for the right to submit a request for the behavioral data, the right to access delivered behavioral data, and the like. The ad server 3804 may also interface with publishers 3810, such as content publishers, to facilitate forming requests for behavioral data, and the like.

In embodiments, a monetization platform may be used to receive, analyze, select, aggregate, and deliver behavioral data and other data that may be associated with wireless subscribers, to an ad server, publisher, or some other party that may use the data for a commercial purpose (e.g., targeting mobile content for display to mobile communication facilities). Datasets used by the monetization platform may come from a plurality of sources, such as a wireless operator, publisher, or a third party source (e.g., a commercial consumer database). In embodiments, the monetization platform may associate other data, metadata, or business rules with the user behavioral data, including but not limited to an availability condition, access grant, financial consideration, or some other type of conditional grant of use. The grant of use to the behavioral, or other type of data may be conditionally determined by the monetization platform, wireless operator, or some third party (e.g., such as a commercial dataset that may be used to enrich behavioral data within the monetization platform, but carries terms of use specified by the commercial dataset provider). In embodiments, the conditional grant to use the data that is delivered by the monetization platform may be based on a financial consideration that is shared, exchanged, and/or transacted between the parties, such as a wireless operator, ad network, publisher, or some other third party, and is based at least in part on access and/or use of the data. In other cases, the conditional grant may be based on a time period for use or based on other considerations.

In embodiments, the wireless operator data, behavioral data, and other data (e.g., demographic or geographic data relating to a user of a mobile communication facility) may be accessible to a third party (e.g., an ad network, publisher, or some other content provider) through the monetization platform server. The monetization platform server may receive ad network requests, publisher requests, operator requests, or some other third party requests for mobile subscriber data (e.g., a wireless user behavioral profile, demographic profile, geographic profile, or some other type of user data). As a condition for allowing access to the data, the monetization platform may require that a financial consideration be provided by or on behalf of the requesting ad network, publisher, wireless operator, or some other party. The financial consideration may be a flat fee, a fixed amount, variable amount, impression-based (e.g., cost per thousand impression, or CPM), cost-per-click (CPC), cost-per-action (CPA), time-based, based on a shared revenue of user transactions, shared with a wireless operator whose data is being accessed, shared with a publisher, shared with an ad network, or otherwise arranged.

In embodiments, the data that may be accessed by the ad network, ad server, publisher, or third party may be stored separate from the wireless operator, or other party from which the data derives, such as in a behavioral dataset associated with the monetization platform. The monetization platform may facilitate linkage between ad network participants (e.g., publishers), wireless operators, and their subscribers (e.g. users of mobile communication facilities) to better target advertisements to subscribers. The wireless operator may collect subscriber information, including behavioral information, from interactions with mobile communication facilities, and then provide this information to the monetization platform. Publishers may collect user information, including behavioral information, from interactions between publishers' content and mobile communication facilities, and then provide this information to the monetization platform. Ad network participants may be provided contingent access to the monetization platform to gain access to the subscriber data. Once the ad network participant gains access to the subscriber information, the ad network participant may use the subscriber information to target advertisements, or for some other purpose (e.g., analyzing the effectiveness of a prior ad campaign). In an example, the ad network participant may have selected subscriber information relating to a specific type of user (e.g. sports fan) such that advertisements of interest to sports fans can be sent to the subscribers with a behavioral data history that has been categorized within the monetization platform as indicative of the user(s) being a sports fan. In other embodiments, the ad network participant may access groups of subscriber information and then perform their own analytics on the data to decide what advertisements should be matched with particular subscribers or groups of subscribers.

The wireless operator, or publisher data may include user profile data which may include or reference behavioral data that relates to the user's mobile communication facility usage. The user profile data may include geographic data, demographic data, historical usage data, device and configuration data, and the like. The financial consideration derived from the access and/or use of user data provided by the monetization platform may be based on a flat fee, a fixed amount, variable amount, impression-based (e.g., cost per thousand impression, or CPM), cost-per-click (CPC), cost-per-action (CPA), time-based, based on a shared revenue of user transactions, shared with a wireless operator whose data is being accessed, shared with a publisher, shared with an ad network, or otherwise arranged. The fee may include a revenue sharing component that may be based in part on an advertising fee generated by the ad network, publisher, wireless operator, or third party. The revenue shared with the wireless operator may include a portion of the flat fee, a portion of the advertising fee, a combination of both, or other revenue sharing alternatives as may be understood. The ad network may be a performance-based ad network that may include a bidding platform that may be used to purchase an access grant to mobile users' behavioral, or other data, through the monetization platform. In embodiments, the monetization platform may include a bidding platform for the purpose of determining a financial consideration to be paid upon access to data from the monetization platform. The monetization platform bidding platform may accommodate bids from ad networks, publishers, wireless operators, and third parties and enable these entities to bid on specific user data, user data categories, user profile types, user profile segments, data aggregations, grouped user data, user data that is enriched with third party data, or some other subset or data type that is available through the monetization platform. In embodiments, an ad server and/or ad network may be associated with a publisher, a wireless operator, a website owner, a content producer, a game developer, an application developer, a videographer, a blogger, and the like.

Referring still to FIG. 38A, wireless user behavioral data (otherwise referred to as subscriber behavioral data) may be syndicated through a monetization platform server 3802, to facilitate targeting of ads to mobile communication facility users. Behavioral data may be requested by an ad server 3804, such as an ad server that is associated with an ad network or publisher, to facilitate targeting of ads to mobile communication facility users. When an ad server 3804 requests behavioral data from the monetization platform, the advertisers that subscribe to the ad server 3804 and at least the wireless operator 108 or publisher that collects and provides the behavioral data may benefit. The benefit may be a financial benefit in that the monetization platform server 3802 may facilitate collecting financial considerations from the ad server 3804 and sharing the financial considerations with the wireless operator. Financial consideration may include a flat fee, a fixed amount, variable amount, impression-based (e.g., cost per thousand impression, or CPM), cost-per-click (CPC), cost-per-action (CPA), time-based, based on a shared revenue of user transactions, shared with a wireless operator whose data is being accessed, shared with a publisher, shared with an ad network, or otherwise arranged. Financial consideration may also include a share of revenue derived from the advertisements. Financial consideration may be based on a number of mobile users who receive a targeted advertisement based on the delivered behavioral data. Other types of financial consideration related to behavioral data delivery and use for ad targeting may be understood and are herein included.

In an example of financial consideration and sharing with a wireless operator, an ad server 3804 may request behavioral data for mobile users who routinely use their mobile communication device to access the wireless operator 108 network during weekday morning commuting hours. The monetization platform may establish a fee for this data based on a variety of criteria, including without limitation, a count of users meeting the criteria, a geographic area (e.g. metro NYC may be more valuable than Sharon Mass.), and the like. Based on the fee paid, the monetization platform may deliver behavioral data that sufficiently matches the request. The monetization platform may retain a portion of the fee, such as 30% for facilitating the delivery of the data, and provide a portion of the remainder to the wireless operator. Other splits of the financial consideration, as described herein, between at least the monetization platform and the wireless operator 108 may be included.

As part of delivering the behavioral data to the ad server 3804, the monetization platform may request an update of behavioral information from the wireless operator 108, or publisher, to ensure the information delivered to the ad server 3804 is up to date. The wireless operator 108 may determine when the last update of behavioral data was sent to the monetization platform for storage in a behavioral database 3812 and an incremental update of behavioral data may be sent. Data integration, validation, and other data handling techniques as described herein may be used to integrate and/or associate new behavioral or other data with the data already stored in the behavioral database 3812. Statistical analysis techniques, data mining, and other analytic techniques as described herein may be used to integrate and/or associate new behavioral or other data with the data already stored in the behavioral database 3812. Statistical analysis techniques, data mining, and other analytic techniques may also be used to draw statistical inferences based at least in part on the new data, derive new behavioral profile categories or associations, and the like. The update may include only behavioral data collected from mobile communication facility users since the last update. Alternatively, the flow of behavioral data from the mobile communication facility to the wireless operator 108, or publisher, and on to the behavioral database 3812 may be continuous so that no request for updating is required. Delivery may be made in a batch delivery or streamed to the monetization platform in realtime as the new data are made available based on new user behaviors.

In another example of revenue sharing, an ad server 3804, such as an ad server that is associated with an ad network or publisher, may request behavioral data from the monetization server and base financial consideration on a count of users that will receive a targeted ad based on the behavioral data. The ad server 3804 may make the request to the monetization platform server 3802 and the monetization platform server 3802 may provide an estimate of the number of users who may receive an ad. The ad server 3804 may agree to pay for at least a minimum number of users based on the estimate. In an example, the ad server 3804 may request behavioral data for all female mobile communication users who have recently searched for eyewear. The monetization platform may analyze the behavioral data provided by the wireless operator(s) (e.g., using the data integration and/or statistical analytic techniques, as described herein) and determine that approximately 27,000 female mobile communication facility users spread across four wireless operators 108 (operators A, B, C, and D) have recently searched for eyewear. The ad server 3804 may agree to pay a fixed amount, or any other type of financial consideration as described herein, to serve ads to up to 11,000 of the users only for operators A and C. The monetization platform server 3802 may deliver the behavioral data for the users from operators A and C but may or may not provide the behavioral data for users from operators B and D. The financial consideration provided by the ad server 3804 may be split among the monetization platform, operator A and operator B, publishers, or other parties associated with the monetization platform, based on the number of users targeted for each operator. Further in the example, operator A users may represent 20% of the targeted users and operator B users represent 80%. The monetization platform may retain 30% of the fee, and then provide 14% to operator A and 56% to operator B.

Financial consideration may include payments associated with a bidding platform that may be associated with an ad network 3808, an ad server 3804, and/or the monetization platform. In embodiments, the bidding platform may be included within the monetization platform. The ad server 3804 may propose as financial consideration a portion of revenue from bidding to be provided to the monetization platform. The ad server 3804 may provide a request for behavioral data to the monetization platform and in response to the request, the monetization platform may identify minimum bids for the data. The minimum bids may be associated with various aspects of the data. In an example, minimum bids may be established for regional aggregate data, demographic aggregate data, data based on a count of users, individual user profile data, a category of user data, related third party data 3814, and the like. Based on the results of bidding for the requested behavioral data, the monetization platform may provide one or more deliveries of the behavioral data to the ad server 3804. Also based on the results, the wireless operator 108, or publisher, providing the behavioral data may be compensated for providing the behavioral data.

Other sources of financial consideration may include publishers 3810. An ad server 3804 may be associated with a publisher or communicate with a publisher 3810, such as content publishers 3810, who may wish to target their publications to users. All financial considerations as described herein may apply to publishers 3810. In an example, a publisher 3810, such as a game developer, may desire to target a newly developed game to an audience of mobile users who have played similar games. An ad server 3804 associated with the publisher may provide a request to the monetization platform for behavioral data that meets, for example, a game play similarity criterion, user characteristic, usage history datum, or some other type of user data or data associated with a mobile communication facility. With a financial consideration established, the monetization platform server 3802 may provide behavioral data to the ad server 3804 to facilitate identifying candidate users for targeting. The game developer may contact one or more of the candidate users to offer the newly developed game, an advertisement for the game, a subscription offer, or some other type of sponsored content. A wireless operator 108 or publisher, including the game developer publisher, may provide and capture users' behavioral data and provide it to the monetization platform. In a continuation of the example, the game developer publisher may provide copies of its own behavioral data that is has collected from its customers to the monetization platform, such as those mobile communication facility users that have previously accessed the game developer's content. The monetization platform may provide data integration and/or statistical analysis of the publisher's data using any or all of the techniques described herein, and provide back to the publisher actionable data that the publisher may use to select or target a desired subset of the users represented in the dataset. This publisher dataset may also be used to select non-publisher users that are available in another dataset maintained by the monetization platform and that match the publisher's desired user subset upon some criterion (e.g., a behavioral history of accessing gaming content on a mobile communication facility). Behavioral data may be provided automatically or may be offered to the game developer for an additional financial consideration that could be distributed to at least the wireless provider, publisher, third party, or the monetization platform.

In embodiments, publishers 3810 may communicate with an ad server 3804 and/or with ad networks 3808 associated with advertisers. Publishers 3810 may provide ad spots in their publications that may be filled by ads provided from advertisers (e.g., secondary content providers). The monetization platform may facilitate providing targeted ads in the publisher's 3810 ad spots by providing behavioral data in response to a request by the ad server 3804. The ad server 3804 may form a request for behavioral data based on information provided by the publisher 3810. The monetization platform server 3802 may analyze behavioral data stored in a behavioral database 3812 that may include behavioral profile data for a plurality of mobile users across a plurality of wireless operators 108. The analysis may be based on the request so that behavioral data may be provided to the ad server 3804 that may facilitate targeting ads for placement in the publisher's 3810 ad spots. In an example, a publisher 3810 of a parent on-line newsletter may request the ad server 3804 to fill ad spots in the newsletter with appropriate ads. The ad server 3804 may query the monetization platform for behavioral data that may relate to parenting (e.g. users with family share mobile usage plans). Relevant behavioral data from an ad network 3808 that is associated with an advertiser may be selected for users that relate to parenting, and the data delivered to the monetization platform and ad server 3804 which may use the data to identify and place ads in the ad spots identified by the parent news letter publisher 3810. Alternatively, the monetization platform server 3802 may send the ad network content to the publisher's ad server, rather than data that is to be used to select the ad network content.

The monetization platform server 3802 may have access to third party data 3814 that may be accessed when performing any and all of the data integration and statistical analytic steps, as described herein, including preparing behavioral data for delivery in response to a request from an ad server 3804. Third party data 3814 may include public databases, subscription databases, freeware databases, purchased databases, and the like. Public databases may include census data, voter registration, real estate assessment data, public registry, vehicle registry, court records, and the like. There are many sources of public and private information that may be relevant to behavioral data use that may be understood and included herein. Subscription and/or purchased, private databases may include a wide variety of internet access analytics and clickstream analytics data including normalized, aggregated, regional, and the like. In an example of third party data 3814 use in association with syndicating behavioral data, the monetization platform server 3802 may receive a request for behavioral data of users in the Boston area who have recently used their mobile communication facility to search for information about mortgage financing or refinancing. The monetization platform may access third party data 3814 related to home sales and/or refinance activity, such as from local registry of deeds databases. By combining the third party information with the behavioral information, users who have recently refinanced or recently purchased a home may be identified within the behavioral data. The monetization platform may deliver behavioral data that may include integrated third party data in order to provide a more comprehensive set of behavioral data. As described above, a financial consideration may be based on an availability of relevant third party data 3814. In this example, due to the relevant third party data 3814, the monetization platform server 3802 may offer a version of the behavioral data without the third party data 3814 for one financial consideration and offer an integrated version for another (potentially greater) financial consideration.

In embodiments, behavioral data provided from a wireless operator 108, publisher, or third party may be analyzed based at least in part on the data integration and statistical analysis techniques, as described herein, to create and maintain a behavioral profile, such as a behavioral profile of a subscriber to the wireless operator 108 network. Behavioral data may include wireless operator 108 network interactions associated with a user's mobile communication facility. Interactions such as calls received, calls made, SMS and other text messages sent and received, email sent and received, internet activity such as searching, web browsing, file downloading, file uploading, mobile application execution, and the like may be captured and provided by the wireless operator 108 for creation of a wireless user behavioral profile. The user behavioral profile may be used to facilitate targeting ads to the user by associating information included in and derived from the profile with other information such as aggregated behavioral data and the like. In an example of using user behavioral profile data in ad targeting, an ad server 3804 may request a monetization platform server 3802 to provide behavioral information associated with users whose behavioral profile contains information that can be matched to criteria, such as users who have recently searched the internet using their mobile communication facility for a new wireless service plan. In the example, the monetization platform may analyze user behavioral profiles to determine that certain users meet these criteria. The monetization platform may select a portion of the information contained in the behavioral profiles of matching users and deliver the selected information to the ad server 3804. The ad server 3804 may then perform some additional analysis to determine which ads currently being offered by an ad network 3808 may be appropriate to target to these users. Further in the example, the ad server 3804 may determine that users of a wireless operator 108 A who meet the criteria may be targets to receive an ad offering discounted service from wireless operator 108 B. In this way, the ad server 3804 can identify user profiles to target and can then communicate with the monetization platform server 3802 to facilitate delivery of the ads to the target users. In an alternate embodiment of the example, the entire analysis of user data may take place within the monetization platform server, using the data integration and statistical analytic techniques as described herein, so that the information delivered to the ad server 3804 already includes the matching between users to the content that they should receive, such that no additional analytic step is required at the ad server 3804, and the ad server 3804 may execute content delivery to users per the instructions and data it receives from the monetization platform.

A monetization platform server 3802 may include features to manage a behavioral database 3812 of wireless user behavioral data. Wireless operators 108, and publishers, may provide behavioral data, such as individual transactions associated with individual mobile communication facilities that the monetization platform server 3802 may manipulate and store in the behavioral database 3812. By including behavioral data from a plurality of mobile users in the behavioral database 3812, the monetization platform may perform analysis of this data to generate important aggregated and differentiated results that may be valuable to advertisers and therefore may allow the wireless operator 108 to be compensated for the data. Although the data may be stored in the behavioral database 3812 as individual records or individual transactions, the data may be related through the database (e.g. a relational database of behavioral data) to enable access to all behavioral data associated with a specific mobile communication facility or a specific wireless user. Behavioral information stored in the behavioral database 3812 may be maintained by the monetization platform server 3802 so that the data remains relevant and timely. In an example, as behavioral data is added to the database, it may be time stamped to ensure that only current or recent information is used. Maintenance activities such as identifying aging data and requesting updates of the aged data from a wireless operator 108 may be performed by the monetization platform server 3802. Such maintenance activities may be associated with the data integration and statistical analysis techniques as described herein. Many other database functions, maintenance activities, and the like will be understood and are herein incorporated.

Referring to FIG. 38B, behavioral data syndication may include a wireless operator 108, or publisher, receiving user related behavioral data from a mobile communication facility 102 and then providing the information or some derivative of the information to a third party for consideration in the form of revenue sharing. The wireless operator 108 may also provide the user behavioral data to be stored in a behavioral dataset, such as behavioral database 3812. Third party data 3814 may be included with or accessible in association with the behavioral database 3812. The behavioral database 3812 may be transformed and/or analyzed using data integration and statistical techniques as described herein. The analysis results may also be stored in or accessible through the behavioral database 3812. A monetization platform server 3802 may access the behavioral database 3812, the analytics, the third party data 3814 and the like. An ad server 3804, such as an ad server 3804 associated with an ad network 3808 or publisher may issue a request for behavioral data to the monetization platform server 3802. In response to this request, the monetization platform server 3802 may deliver behavioral data that is based on the request and an associated availability condition 3818 to the ad server 3804. The associated availability condition 3818 may limit access to the delivered behavioral data. Access by the ad server 3804 may be limited. Alternatively, distribution of the data to an ad network 3808 may be limited. Other availability conditions 3818 may be included. The ad server 3804 may interface to an ad network 3808 that may be a performance based ad network 3808 that may include a bidding platform. The bidding platform may facilitate advertisers associated with the ad network 3808 bidding for access to behavioral data. Alternatively, the bidding platform may be included within the monetization platform, and the bidding activity of sponsors and others occur as part of their interaction with the monetization platform. The monetization platform may set a minimum, or reserve, bid amount at which a bidder must begin a bidding process. The advertisers may bid for the right to submit a request for the behavioral data, the right to access delivered behavioral data, and the like. The ad server 3804 may also interface with publishers 3810, such as content publishers 3810 to facilitate forming requests for behavioral data, and the like.

Availability conditions 3818 associated with the behavioral data that is delivered to the ad server 3804 may include time access limitations (e.g. expiration date for access), frequency of access limitations, a limit on the number of behavioral profiles accessed, a limit on access to information identifying an individual, a limit on access to information that represents details below a resolution limit (e.g. geographic detail below a region, such as a city), terms of use of the data, and the like.

In embodiments, availability conditions 3818 may be based on the behavioral data delivered in response to a request for behavioral data. Aspects of the behavioral data may influence the availability conditions. If the behavioral data is blinded behavioral data, then the availability conditions 3818 may include limits on access to information that may be associated with the blinded data. Blinded data may include datasets that have had data variables omitted or altered (i.e., "blinded" to observers), so that the use of the data cannot include a variable or variable quantity. In an example, the variable "sex" may be blinded in the dataset through omission so that an ad server may not exclusively target male or female user. In another example, the variable "Time" may be blinded to include only "A.M." or "P.M.," such that an advertiser wanting to only target users that have performed some sort of mobile communication facility activity during rush hour (i.e., 4 pm to 6 pm) would be required to purchase an additional access grant (i.e., a new availability condition) to receive the "Time" variable with hourly gradations as opposed to the less-useful "A.M.-P.M." designation. In an example, blinded data may include any data type and variable used by the monetization platform.

In an example of time availability constraints, the behavioral data may be accessible through an interface that may respond to an access request by comparing the current date and time (e.g. retrieved through a system function of the ad server 3804) with a data expiration data defined in the availability condition. If the expiration date has not yet been passed, the interface may provide access to the data. If the expiration date has passed, access to the data may be disallowed by the interface.

In an example of limiting access to a portion of the data, the portion to which access is limited may be encoded while the remainder of the data may be accessible without having to be decoded. Alternatively, all of the data may be encoded, however a portion of the data to which access is not allowed may be encoded differently than other portions to which access is allowed. In an example of geographic limitation associated with geographic accuracy, data may be structured so that data elements associated with individual users may be encoded, whereas data associated with a geographic region (e.g. a city block, a village, a city, a state, a county, a time zone, a political voting district, a congressional district, and the like) may not be encoded and therefore may not be accessible to the ad server 3804. Further in the example, while aggregate behavioral data derived from users who reside in a voting district may be provided, access to the behavioral data of the individuals within the voting district may be prohibited through the availability condition. An example of aggregate data may include, without limitation, a percentage of registered democrats, republicans, and independents in a voting district. Other aggregate examples may be understood and are included herein. Although ad server 3804 access to the user data may be limited, the monetization platform may support fulfilling an ad server 3804 request that an ad be delivered to selected users residing in a voting district based on the availability conditions. In an example, if the ad server can access behavioral data that facilitates distinguishing registered republicans from registered democrats, such as in the example above, the monetization platform server 3802 may facilitate providing ads to the registered republicans in a voting district.

Availability conditions 3818 associated with behavioral data may include restrictions on access to personal identification data. Information that may identify an individual wireless operator user (e.g. a name, address, mobile phone number, and the like) may be included in the information provided to the ad server 3804 but may not be available to the ad server 3804. The ad server 3804 may be allowed to access individual user behavioral profiles but the identification information may be encoded so that only a unique code is available to the ad server 3804 for each wireless user profile. Blinded data may facilitate analysis and targeting of individual users without identifying the user. Blinded data also may provide privacy to wireless mobile network subscribers so that the ad server 3804 can target individuals based on behavioral profile data but cannot access personal information, such as identifying information about the user. In an example, an ad network 3808 may wish to target an advertisement to be delivered to individual mobile network users who have searched for information about the democratic presidential nominee within the last 72 hours. Even without having access to the mobile number of the individual users, the ad server 3804 may access the delivered behavioral data to determine if individual users matching the criteria are included in the data. If so, the monetization platform may facilitate delivery of an advertisement targeted to the users matching the targeting criteria. This may be possible because even though the ad server 3804 does not have access to the mobile user contact information, the monetization server may have such access and therefore may facilitate delivery of the ad to the selected users.

Availability conditions 3818 associated with wireless user behavioral data delivered from the monetization platform may include a limitation on the number of user behavioral profiles that can be accessed by the ad server 3804. Although the behavioral data may represent substantially all subscribers to a wireless service, the availability condition 3818 may limit access to fewer than all of the users provided. In an example, an ad server may receive the behavioral data for more than 10,000 mobile users, however the availability condition 3818 may limit access to only 5,000 mobile users. In this way, once the ad server 3804 has accessed 5,000 user behavioral profiles from the delivered behavioral data, further access will be denied.

In embodiments, availability conditions 3818 associated with the behavioral data that is delivered to the ad server 3804 may include a behavioral data interface layer that may be a program, such as a driver so that the behavioral data must be accessed through the interface layer. This may be accomplished by encoding the information and encapsulating the data with an application program type interface (API). The ad server 3804 could access the data only through the API. In this way availability conditions 3818 may be enforced by the API.

In embodiments, availability conditions 3818 may also be influenced by results of bidding associated with an ad network 3808 bidding platform. The monetization platform server 3802 may establish a minimum bid requirement to make available certain portions of the behavioral data. If advertisers do not meet the minimum bid requirements, the availability condition 3818 may limit access to the portions for which a minimum bid was established and not met.

While the invention has been disclosed in connection with the preferred embodiments shown and described in detail, each of the technologies described herein may be incorporated, associated with, combined, and the like with each of the use scenarios described herein, and each of the applications described herein, including market applications.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system comprising one or more computers having computer readable mediums having stored thereon instructions which, when executed by one or more processors of the one or more computers, causes the system to perform the steps of:
 receiving a request from a performance-based ad network for a wireless operator user profile datum containing behavioral data relating to content and applications accessed on a user's mobile communication facility, wherein the performance-based ad network includes a bidding platform;
 receiving data from the bidding platform indicating which advertisers within the ad network have the right to request the user profile datum based on submitted bids by the advertisers;
 receiving a financial consideration from the ad network;
 delivering the user profile datum to the advertisers having been determined as having the right to request the user profile datum; and
 sharing a portion of the financial consideration with the wireless operator from which the user profile datum is derived, wherein the portion of the financial consideration is a flat fee.

2. The system of claim 1, wherein the portion of the fee is a shared revenue based at least in part on an advertising fee received from the advertising network.

* * * * *